United States Patent [19]

Miller et al.

[11] Patent Number: 4,511,895

[45] Date of Patent: Apr. 16, 1985

[54] METHOD AND APPARATUS FOR CONTROLLING DISTRIBUTED ELECTRICAL LOADS

[75] Inventors: Edward B. Miller, West Warwick, R.I.; Charles W. Eichelberger, Schenectady, N.Y.

[73] Assignee: General Electric Company, Bridgeport, Conn.

[21] Appl. No.: 324,640

[22] Filed: Nov. 24, 1981

Related U.S. Application Data

[62] Division of Ser. No. 89,478, Oct. 30, 1979, abandoned.

[51] Int. Cl.$^3$ ............................................... H04Q 9/00
[52] U.S. Cl. ............................. 340/825.5; 340/825.52
[58] Field of Search ........................ 340/825.5, 825.52

[56] References Cited

U.S. PATENT DOCUMENTS

| | | |
|---|---|---|
| 2,177,843 | 10/1939 | Seeley . |
| 2,994,804 | 8/1961 | Skirpan . |
| 3,004,193 | 10/1961 | Bentham et al. . |
| 3,205,368 | 9/1965 | Miracle . |
| 3,221,214 | 11/1965 | Wolff et al. . |
| 3,246,304 | 4/1966 | Brown et al. . |
| 3,259,802 | 7/1966 | Steen . |
| 3,323,013 | 5/1967 | Lord . |
| 3,348,440 | 10/1967 | Jensen . |
| 3,359,551 | 12/1967 | Dennison . |
| 3,384,713 | 5/1968 | Duncan . |
| 3,400,374 | 9/1968 | Schumann . |
| 3,403,381 | 9/1968 | Haner . |
| 3,403,382 | 9/1968 | Frielinghaus et al. . |
| 3,414,878 | 12/1968 | Smith . |
| 3,430,222 | 2/1969 | Gratrix, Sr. et al. . |
| 3,444,521 | 5/1969 | Brease . |
| 3,445,814 | 5/1969 | Spalti . |
| 3,448,338 | 6/1969 | Bentham et al. . |
| 3,467,835 | 9/1969 | De Cola . |
| 3,483,424 | 12/1969 | Woodnutt . |
| 3,491,263 | 1/1970 | Isaacs . |
| 3,508,113 | 4/1970 | Isaacs . |
| 3,508,114 | 4/1970 | Johannsson et al. . |
| 3,510,845 | 5/1970 | Couleur et al. . |
| 3,513,443 | 5/1970 | Andersen . |
| 3,514,670 | 5/1970 | Isaacs . |
| 3,529,292 | 9/1970 | Neil et al. . |
| 3,551,885 | 12/1970 | Henzel . |
| 3,555,251 | 1/1971 | Shavit . |
| 3,558,902 | 1/1971 | Casey . |
| 3,579,030 | 5/1971 | Bentham et al. . |
| 3,582,896 | 6/1971 | Silber . |
| 3,590,271 | 6/1971 | Peters . |
| 3,603,961 | 9/1971 | Duris . |
| 3,614,378 | 10/1971 | Goodell et al. . |
| 3,622,992 | 11/1971 | Schoenwitz . |
| 3,622,994 | 11/1971 | Schoenwitz . |
| 3,626,370 | 12/1971 | Stubbs . |
| 3,633,166 | 1/1972 | Picard . |
| 3,649,873 | 3/1972 | Vlack . |
| 3,668,467 | 6/1972 | Isaacs . |
| 3,668,653 | 6/1972 | Fair et al. . |
| 3,686,632 | 8/1972 | Olcelli et al. . |
| 3,689,886 | 9/1972 | Durkee . |
| 3,689,887 | 9/1972 | Falce et al. . |
| 3,697,821 | 10/1972 | Johnson. |
| 3,702,460 | 11/1972 | Blose. |
| 3,706,914 | 12/1972 | VanBuren. |
| 3,714,453 | 1/1973 | Delisle et al. |
| 3,716,096 | 2/1973 | Berrett et al. |
| 3,723,753 | 3/1973 | Davis. |

(List continued on next page.)

*Primary Examiner*—Donald J. Yusko
*Attorney, Agent, or Firm*—Cushman, Darby and Cushman

[57] ABSTRACT

An apparatus for controlling distributed electrical loads including a microprocessor based central controller coupled via a twisted pair bidirectional data line to a plurality of microcomputer based transceiver decoders. Each transceiver decoder is coupled to a plurality of relays, each relay associated with a particular load to be controlled. Override switches and sensors, coupled to transceiver decoders provide override requests and information related to ambient conditions at the site of a load. A user defined data base includes sub-sets of relays called sectors, patterns of relay states, remote switches, a time dependent schedule and condition responses. A communication protocall and arbitration scheme provide for interactive communication between the central controller and each transceiver decoder with interfacing with the operation of any other transceiver decoder. Enhanced data storage capacity is achieved through dynamic allocation of memory space for pattern data.

18 Claims, 45 Drawing Figures

U.S. PATENT DOCUMENTS

| | | | | | |
|---|---|---|---|---|---|
| 3,729,581 | 4/1973 | Anderson. | 3,925,680 | 12/1975 | Dixon. |
| 3,766,431 | 10/1973 | Isaacs. | 3,925,704 | 12/1975 | Camic. |
| 3,774,056 | 11/1973 | Sample et al. | 3,937,978 | 2/1976 | Owenby, Jr. |
| 3,784,874 | 1/1974 | Barrett et al. | 3,940,660 | 2/1976 | Edwards. |
| 3,784,875 | 1/1974 | Baker et al. | 3,942,170 | 3/1976 | Whyte. |
| 3,787,728 | 1/1974 | Bayer et al. | 3,964,023 | 6/1976 | Fuchez. |
| 3,790,848 | 2/1974 | Lai. | 3,964,047 | 6/1976 | Antonaccio. |
| 3,796,995 | 3/1974 | Stronjny. | 3,965,335 | 6/1976 | Ricci et al. |
| 3,803,491 | 4/1974 | Osborn. | 3,965,336 | 6/1976 | Grahmann. |
| 3,819,932 | 6/1974 | Auer et al. | 3,971,010 | 7/1976 | Falhn. |
| 3,820,078 | 6/1974 | Curley et al. | 3,971,028 | 7/1976 | Funk. |
| 3,820,073 | 6/1974 | Vercellotti | 3,987,430 | 10/1976 | Saarem et al. |
| 3,831,059 | 8/1974 | LoNigro. | 4,001,557 | 1/1977 | Stephenson. |
| 3,832,688 | 8/1974 | Strojny. | 4,007,458 | 2/1977 | Hollabaugh. |
| 3,842,249 | 10/1974 | Geyer et al. | 4,008,458 | 2/1977 | Wensley. |
| 3,845,376 | 10/1974 | Brushwyler et al. | 4,012,734 | 3/1977 | Jagoda et al. |
| 3,845,467 | 10/1974 | Oman et al. | 4,017,845 | 4/1977 | Kilian et al. |
| 3,845,472 | 10/1974 | Buchanan et al. | 4,021,615 | 5/1977 | James et al. |
| 3,854,122 | 12/1974 | Cross. | 4,027,301 | 5/1977 | Mayer. |
| 3,882,465 | 5/1975 | Cook et al. | 4,031,470 | 6/1977 | Kokado et al. |
| 3,903,515 | 9/1975 | Haydon et al. | 4,107,656 | 8/1978 | Farnsworth. |
| 3,906,242 | 9/1975 | Stevenson. | 4,177,450 | 12/1979 | Sarrand ............................ 340/825.5 |
| 3,911,415 | 10/1975 | Whyte. | 4,259,663 | 3/1981 | Gable ............................... 340/825.5 |
| 3,919,461 | 11/1975 | Hunting et al. | 4,376,278 | 3/1983 | Jacobsthal ........................ 340/825.5 |

SEQUENCE OF TRANSMISSION FROM TRANSCEIVER/DECODER

DATA LINE ARBITRATION

| | |
|---|---|
| PRIORITY OVERRIDE AREA | BA58 |
| | B66E |
| CURRENT RELAY TABLE ? | B66D |
| | B284 |
| CODED AREA | B273 |
| PRIORITY CHECKSUM | B278 |
| PRORITY ERASE TIME | B276 |
| | B266 |
| SWITCH CHECKSUM | B263 |
| | B262 |
| SWITCH DEFINITION AREA | |
| | A28F |
| SECTOR CHECKSUM | A28C |
| | A28B |
| SECTOR DEFINITION AREA | |
| | 7180 |
| SCHEDULE CHECKSUM | 71AD |
| ALTERNATE SCHEDULE-2 (9TH DAY) | 710D |
| ALTERNATE SCHEDULE-1 (8TH DAY) | 7071 |
| MAIN SCHEDULE AREA | |
| | 5E15 |
| PATTERN CHECKSUM VALVE | 5E14 |
| | 5E12 |
| | 5E11 |
| PATTERN STORAGE AREA | |
| | 4000 |

Fig. 25

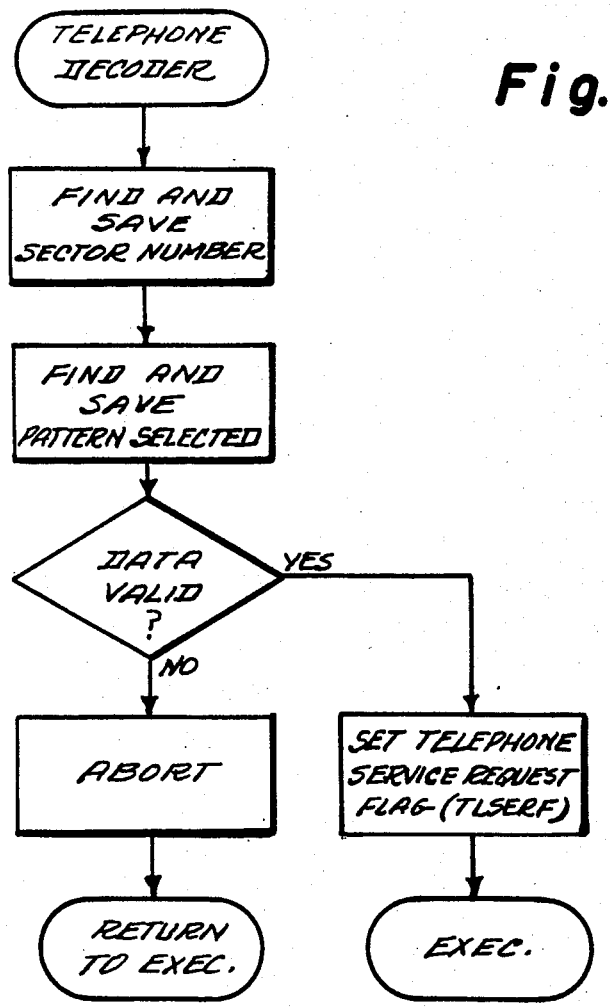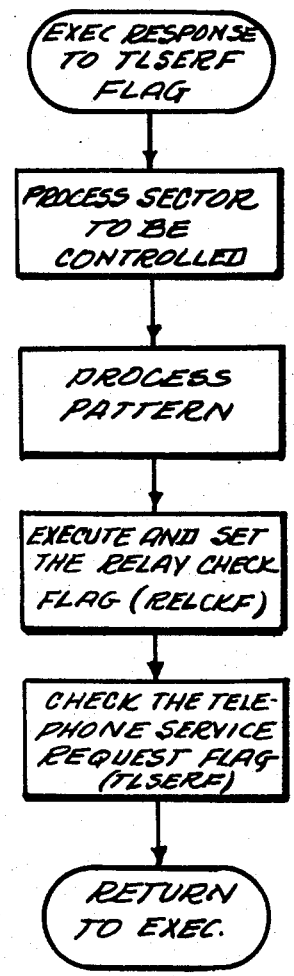
Fig. 29
Fig. 30

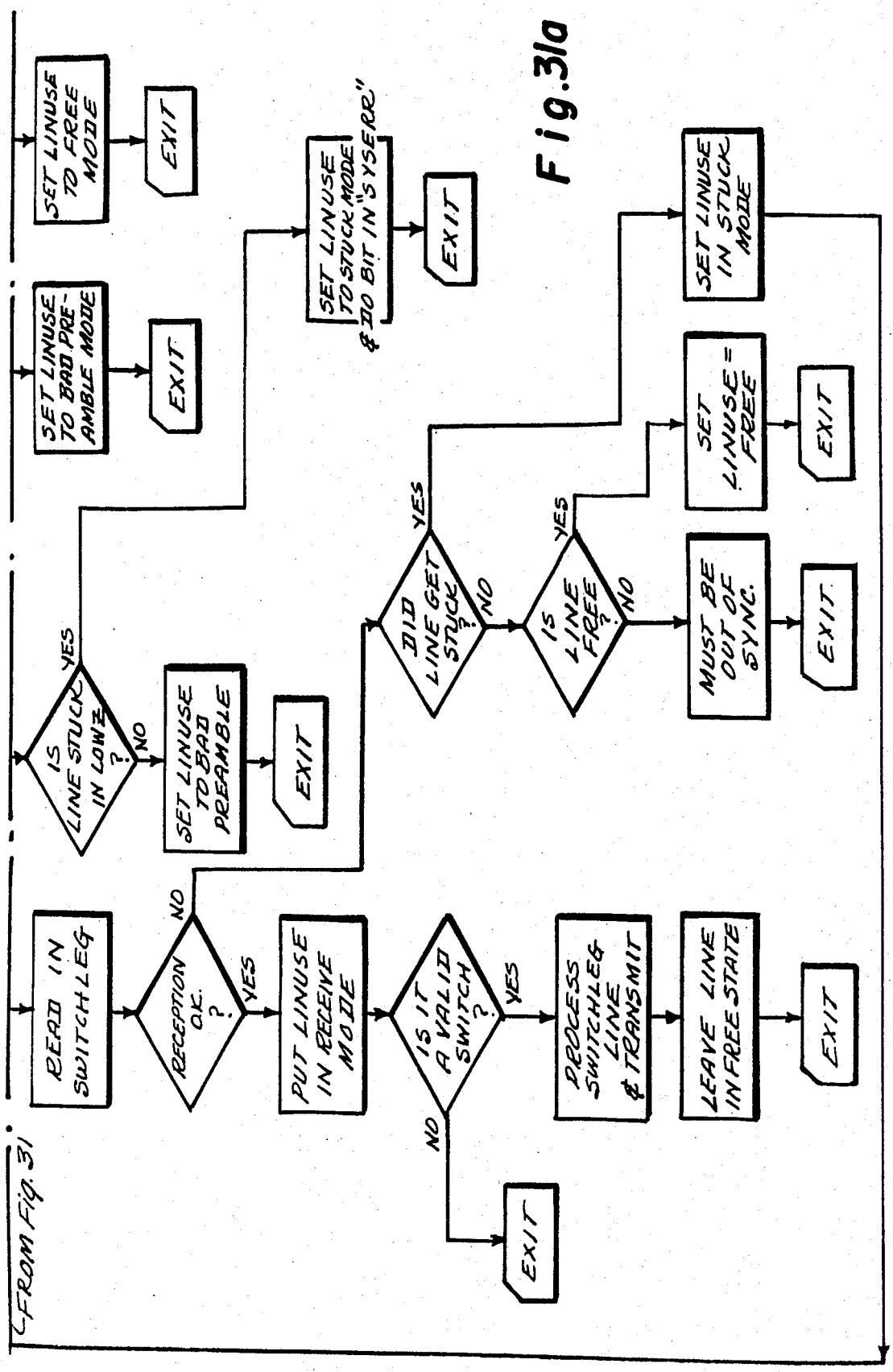

METHOD AND APPARATUS FOR CONTROLLING DISTRIBUTED ELECTRICAL LOADS

This is a division of application Ser. No. 89,478 filed Oct. 30, 1979 now abandoned.

INTRODUCTION

This invention generally relates to methods and apparatus for controlling distributed electrical loads. This invention also relates to novel components, combinations and sub-combinations capable of implementing such control. More particularly, it relates to a programmable microprocessor based system having a central controller under program control which communicates with plural distributed microprocessor-based transceiver decoders (also referred to as transceivers) connected together through a common communication channel (e.g. an unshielded twisted pair of wires in the presently preferred embodiment). Remotely located switches and/or sensor devices can be employed throughout the system for modifying the nominally defined time-dependent schedule of load control functions and for rendering the system condition responsive. Control inputs may also be received at the central processor site via telephone connections. As disclosed in the presently preferred, nonlimiting, specific exemplary embodiment, the system is used to control the distributed lighting loads throughout a building, cluster of related buildings, a building site, etc. However, the system is capable of controlling virtually any type of electrical load according to a user defined schedule and/or according to conditions sensed at remote locations. Such loads could include heating systems, air-conditioning systems, etc.

Programmable electrical load control systems of this general type have been known and proposed heretofore by the applicants and/or their assignee. For example, a microprocessor based distributed control system for lighting loads in a building was disclosed by T. K. McGowan and G. E. Feiker in an article entitled "A New approach to Lighting System Control" published in the Journal of IES, Oct. 1976 (pages 38–43) and a subsequent discussion of this article by others appears at pages 125–126 of the January 1977 issue of that Journal.

An early approach is described in two pending, commonly assigned, U.S. patent applications:

a. Ser. No. 809,939, filed June 24, 1977, entitled Distribution Control System and naming George E. Feiker as inventor now issued as U.S. Pat. No. 4,173,754; and b. Ser. No. 029,614, filed Apr. 13, 1979, as a division of Ser. No. 809,939, entitled Distribution Control System and filed Apr. 13, 1979, naming George E. Feiker as inventor now issued as U.S. Pat. No 4,185,272.

Feiker was instrumental in having a first rudimentary lighting control system developed and installed in a single room at the Nela Park Plant of General Electric in Cleveland, OH. Some of the actual design work was done by C. Eichelberger for this first rudimentary lighting control. This installation is described in the article entitled "A New Approach to Lighting System Control" by T. K. McGowan and G. E. Feiker along with some projections of alternative ways to achieve similar results.

A system for reducing noise error was developed and is the subject matter of Pat. No. 4,091,361 issued on application Ser. No. 748,932, filed Dec. 9, 1976 for Noise-Immune Carrier Current Actuated Control; naming Charles W. Eichelberger and Philip M. Garratt inventors.

Based on a substantially different approach to lighting control, the present applicants designed and installed an experimental "first generation" system which incorporates several improvements. This first generation system and several features thereof are described in earlier copending, commonly assigned, patent applications or issued patents the texts of which are incorporated herein by reference:

a. application Ser. No. 966,816 filed Dec. 6, 1978 entitled Programmable Energy Load Controller System & Methods and naming Charles W. Eichelberger and Edward B. Miller as inventor now issued as U.S. Pat. No. 4,213,182;

b. application Ser. No. 871,988, filed Jan. 24, 1978 entitled Load Control Processor and naming Edward B. Miller and Charles W. Eichelberger as inventors; now issued as U.S. Pat. No. 4,167,786.

c. application Ser. No. 871,991, filed Jan. 24, 1978 entitled Interface Driver Circuit and naming Edward B. Miller and Charles W. Eichelbeger as inventors;

d. application Ser. No. 871,990, filed Jan. 24, 1978, and entitled Programmable Real Time Clock and naming Charles E. Eichelberger and Edward B. Miller as inventors now issued as U.S. Pat. 4,168,531.

While the prior art load control systems just referenced have been successfully operated at an experimental test site so as to produce significant energy savings which permit the cost of such a system to be recovered in a very short time, operating experience with these earlier prior art systems has also revealed several areas where further significant improvements in operating convenience and capability would be highly advantageous. We have now discovered many such improved features which are incorporated in the "second generation" control system of this invention.

One of the primary commercial applications for programmable load control is for the control of lighting, particularly for large office buildings, or groups of office buildings. Effective lighting control requires achieving the right amount of light where it is needed and when it is needed. Energy and money are wasted when there is too much or too little light for a particular task, when lights are on where not needed and when lights are not on when needed. In a typical office, lighting accounts for 30–40% of the total electrical load and in many cases a substantial amount of this light is wasted by having lights on when not needed or on at higher levels than required.

In addition to energy savings, better lighting control can increase flexibility in future use of office space. Control of individual fixtures can allow offices, classrooms or other space to be rearranged and partitions moved without expensive, hard wiring changes. With adequate control, ceiling systems can remain unchanged even when work areas are rearranged. Furthermore, the ability to control individual fixtures also permits finely tuned lighting arrangements for different activities, for example, normal lighting or desk work; reduced lighting for conferences; and dim lighting for slides, security lighting, etc.

Since lighting relates to people and tasks, the ability to control lighting can be used to control the use of space. For example, unwanted use of an area can be minimized by not allowing the lighting to be controlled by unauthorized personnel. Thus, the use of conference rooms can be curtailed for unauthorized meetings or as temporary work areas for tasks which should be performed in offices.

In a typical office building, using circuit breaker control, around 6:00 a.m. when people start arriving, the lights on each floor would be turned on by the first person to arrive. The lights would stay on, at full intensity all day. About 6:30 p.m. when most offices are empty, a guard would begin to switch off lights. A cleaning crew would begin work about this time and hopefully switches off each floor as they finish. By 11:30 p.m. when the cleaning crew is finished, all lights should be off. This scenario for a typical office building inherently includes a significant degree of energy waste. For example, lights are on when people are not in the area, near the beginning of each working day and during lunch hour. There is no way to provide a lower light level for tasks which do not require strong lighting. It may be appropriate that cleaning and maintenance chores in the evening be performed at a lower light level than could be used for the routine work of office workers during the day. In addition, the amount of daylight near window areas is not taken into account. It is not necessary to light areas near windows to the same extent that more internal ofice areas must be lit.

The programmable load control system as set forth herein allows for control over these built-in energy wasting situations. It calls for the automatic shutting off of lights during the progammed non-use times while permitting selected overrides for providing light in the immediate area of a person working outside his normal hours. It allows light levels to be altered in accordance with a pre-defined schedule such that tasks performed at or during preset times requiring a lower light level than normal will not waste power. Futhermore, in areas near windows, where daylight adds a substantial amount of light, a photo relay is used to automatically reduce lighting levels when adequate sunlight is available.

The difference in energy cost for the normal electrical load for a typical office building and that for a building controlled by the present invention is substantial. A typical payback time for the cost of installation of the control system is 1-2 years.

The presently described system for distributed electrical load control for lighting provides a degree of flexibility and economy not previously available with any prior system. It uses mechanically latching relays to control groups of lighting fixtures or other loads. These relays are turned on or off by a 24-volt pulse. However, the relays are not hard wired to manual switches, time switches, photocells, etc. All control comes from a central controller, through a data line to a transceiver decoder associated with the relay to be operated.

The central controller utilized in the present system is micro-computer based and has an internal program providing the function of a user programmable load control system. It incorporates a 7-day clock and provides minute-by-minute control of the entire load system including up to 8000 separate relays according to a predetermined schedule when operating in its automatic mode. The data format selected would allow the use of up to 16,000 relays. However, the memory space available in the memories selected for this presently preferred embodiment limits the number of relays to 8,000. A load control schedule can be entered manually through a keyboard or by reading mark-sense cards through a cardreader. In addition to the automatic schedule, any lighting circuit can be controlled manually from the keyboard of the central controller when operating in its manual mode. The central controller also provides monitoring of the system and can display the on/off state of each relay. If hard copy records are desired, the controller can print data out through a standard printer.

A low voltage twisted pair data line running throughout a building under load control forms a communication channel which connects the central controller to a plurality of transceiver decoders and provides for two-way (bi-directional) communications between the controller and each of the transceiver decoders.

Up to 32 relays are coupled to each transceiver decoder. Each relay turns on and off a particular load in response to a command from the central controller, propagated through the data line to its associated transceiver decoder. The transceiver decoder is generally located near the loads to be controlled by its relays so as to minimize the amount of hard wiring needed. The transceiver decoder receives a signal from the central controller over the data line when one of its relays is to be opened or closed and transmits an activating pulse to the relay.

Communication between the controller and each of the transceivers is bi-directional. Each transceiver decoder can send a message to the controller requesting that the controller issue a command to alter the state of a particular load.

Each transceiver decoder has 8 switchleg inputs which can be connected to manually operable or condition responsive switches, either of the momentary or maintained contact type. Each switch can control "on" or "off" a designated subset of lighting control relays, known as a sector, anywhere in the building. This is accomplished by activating a switch causing the transceiver decoder to send a signal through the data line to the central controller. The central controller interprets that signal and determines which relays require activation and in turn sends a signal to the transceiver decoder involved for actuating the relays associated with the lights to be turned on or off. Automatically actuated switches such as photo-relays can be connected to a switchleg input of a transceiver decoder for condition responsive automatic control such as fire and smoke detection.

Analog sensors such as thermistors or photo-transistors can be wired to a transceiver decoder through an analog sensor input circuit in each transceiver decoder. These analog sensing devices are interrogated (polled) by the central controller which may decide to send a command to a transceiver decoder to operate selected relays. The analog sensors enhance the condition responsive capability of the system. Any condition that can be sensed and transformed into a variable impedance or variable voltage condition can be polled by the central controller so as to make the system responsive to that condition.

. The central controller can also accept manual override from a standard telephone of those sectors that have been user defined.to have "priority" status. By connecting the telephone system to the central controller, any group of relays can be controlled by any Touchtone TM or push-botton telephone (with appropriate interface equipment a standard dial telephone access is possible).

The system is highly adaptable to changes in space utilization and to personnel shifts. Simply by altering the data base originally defined by the user, time dependent schedule changes can be made, different subsets of loads to be controlled simultaneously can be defined and switches can be programmed to control different loads. This flexibility is achieved by the entry of new data to replace previously entered data. Such data replacement can be accomplished either by reading cards or by making keyboard entries and does not require expensive re-wiring. The system can be easily expanded by extending the twisted pair data line and adding more transceiver decoders without affecting the existing installation. For excessively long data lines, repeaters (boosters) can be used. Therefore there is no practical limitation of system size other than the address space of the data structure (a ten bit address specifies 1024 unique devices). More than 1024 transceiver decoders can be used if multiple transceiver decoders are to respond to an identical address.

In the earlier referenced prior art systems, the central controller was generally in one way communication with the remote distributed receiver/decoders which, in turn, controlled a bank of up to 16 relays. However, the present second generation system of this invention now provides for bi-directional data communication between the central controller and plural remote distributed transceiver decoder units which can each control a plurality of relays. Futhermore, provisions are now made for remotely located switchlegs connected to any desired transceiver decoder as remote inputs to the central controller. That is, the actuation of a specific remotely located switchleg will cause a unique signal to be transmitted back to the central controller. The controller, in turn, will interpret such actuation in accordance with a desired programmable function. Typically, such a remote switchleg might be used by the controller to modify the lighting load in a predetermined area of the building. However, with subsequent reorganization of furniture, office walls, etc., the particular sector of lighting load affected by the switchleg can be redefined (i.e., different relays associated with a sector number) as desired. Furthermore, the function controlled by such a remote switchleg could be re-programmed at will to control other lighting loads remote from the switchleg, heating or air conditioning loads, or any other control functions as might be appropriate.

Bi-directional communcation with the central processor also permits the use of remotely located electrical sensors (i.e., photocells, thermisters, etc.) so as to remotely control selected, programmable functions. For example, light sensors at the periphery of a building might be used to control the lighting load at the periphery of the building in response to ambient light levels incident through transparent window panes or the like. Proximity sensors might also be used to control loads as a function of human presence.

The microprocessors used in the present exemplary embodiment of this invention (one microprocessor is each transceiver decoder and one in the controller) are controlled by programs permanently embodied as firmware in a read only memory (ROM). Accordingly, once the ROM has been appropriately structured, e.g., by initial IC manufacturing techniques or by selectively severing fusable links within the ROM or by injecting charge under oxides (floating gate avalanche injected metal oxide semiconductor), the entire system of interconnected integrated circuits, discrete components, and the like becomes a fixed-purpose control system defined by a unique physical structure—albeit certain control functions remain "programmable" by altering the user defined data base stored in RAM devices or the like. However, as those in the art will appreciate, similar systems can be realized by storing the control determining program in other forms of memory devices which are not permanently altered by their content values (e.g., read/write memory devices such as a RAM or a PROM). Furthermore, many of the digital microprocessor-based circuit operations in the present exemplary embodiment could be realized in analog discrete and/or integrated circuits (e.g., a phase-lock oscillator loop as described below). While the presently preferred exemplary embodiment thus includes a fixed-purpose computer, it should be appreciated that this invention can be realized in many other equivalent forms without in any way departing from the novel and patentable features of this invention.

The data structures employed for controlling loads have been organized in this invention so as to provide a more flexible, convenient and comprehensive system operation. For example, a greater number of load control patterns than were feasible using the referenced prior art teachings (e.g., the "on" and "off" state of each controlled relay in the system or part of a system may comprise a pattern) are realized by using variable length records, by permitting the definition of partial load definition patterns and by dynamically allocating the available memory locations for such pattern data.

Furthermore, in the present invention as contrasted with prior art inventions referenced above greater system flexibility is achieved by pemitting the time dependent scheduling of sectors rather than of entire load patterns. A sector is defined as a particular sub-set of all the system relays. In turn, when a particular sector is scheduled (for a particular day of the week and time of the day) a particular one of a plurality of separate available and predefined patterns is also identified. Since patterns can be defined as sub-patterns to include less than all of the system transceivers (but all relays for any transceiver included in a given pattern or sub-pattern must be defined therein) and since there is virtually no limit to the number of sectors that can be defined (including overlapping sub-sets of relays), the actual programming of desired load control functions for a given building can be defined with virtually unlimited flexibility.

According to the commonly assigned prior art system referred to above, one was limited to the scheduling of a relatively small number of patterns where each pattern included all relays in the system. However, using the new virtually unlimited flexibility of the second generation system of this invention, all kinds of peculiar operating conditions can be easily accommodated. For example, employees on different "flex time" hours of work can be easily accommodated. Furthermore, when one group of employees at some location in the building changes its desired flex time hours, such changes may be easily accommodated. Applicants know of no other system providing a degree of flexibility adaptable to "flex time". Furthermore, where a building has many different tenants, the peculiar operting modes for any given tenant can be more easily accommodated with this second generation system of scheduling sectors rather than patterns.

Accordingly, the novel organization of data storge structures, their identification, and their intended meaning within the second generation system of this invention offer significant advantages over the prior art.

The second generation system of this invention also permits sectors to be defined and controlled, if desired, such that no remote input can achieve a priority override.

In the normal (automatic control) mode of this invention, the central controller constantly self-diagnoses the system for various types of faults or errors. For example, the integrity of the data communications circuit is tested from time to time. After instructing a remote transceiver to control a relay to a particular state, the central controller can obtain feedback information from the transceiver so that it may verify that the intended relay actually was controlled as intended. If any of these automated system testing procedures detects a problem, the system operator is notified via communcations on the processor console. At that time, the operator may enter a manual control mode during which normal scheduling and automatic functioning of the processor is temporarily interrupted. In the manual control mode, the operator can cause any sector to assume a desired relay state without regard to the scheduled program.

In the presently preferred exemplary embodiment, all of the transceivers are interconnected to the central controller over a common twisted pair of electrical conductors which are typically unshielded. Communications are bidirectional between the central controller and any of the transceivers (possibly as many as a thousand or so). Furthermore, each transceiver is also microprocessor-based and may initiate a transmission at any arbitrary time (asynchronously) in response to control inputs from connected switchlegs, electrical transducers, etc.

A form of pulse width modulation (modified ratio signalling) is used to transmit a serial bit stream. The data is transmitted in blocks of 40 bits and preceded by an inter-block gap and a predefined preamble.

Prior to transmission on the common party line, ny given device first of all monitors the line to see if it is free. A desired transmission is delayed until the line is found to be free. Nevertheless, with so many separate devices all independently capable of arbitrary communication initiation times, it will not be uncommon for two or more transceiver decoders to simultaneously sense a free line and to begin simultaneous transmissions. Indeed, if two or more devices have data to send and are waiting to send such data because the line is currently being used by another device, they may well both find the line free at the same time and begin transmitting simultaneously.

A special bus arbitration technique is therefore employed in such circumstances to cause all but one of the interferring transceivers to drop out of operation while yet permitting the one selected transceiver to continue its data transmission without any loss of any of the data which any transceiver has begun transmiting For example, if two transceivers begin simultaneous transmission, the state of the transmission line will be identical anyway through the inter-block gap (2-6 milliseconds) and the preamble of 50% duty cycle pulses (during which a phase lock loop is used to lock a clock oscillator onto the correct frequency for interpreting the following 40 bits of data). While the data is actually being transmitted, each transceiver does a bit-wise read-after-write sampling of the common transmission line. If the bit that is read is not the same as that which the transceiver must attempted to transmit, then this is taken as an indication that another transceiver is transmitting different data (by holding the transmission line at a low impedance level for a longer time or sending different data bits during the pulse width modulation transmission of a single bit) and the transceiver which has detected this difference then drops out, aborts its attempted data transmission, saves its data, and waits to try again the next time it detects the data line as being free.

Accordingly, as soon as competing transceivers attempt to transmit differing data bits during the same bit cell, the transceiver decoder which has attempted unsuccessfully to transmit a high impedance signal on the data bus (which is still being held at a low impedance value by another transceiver) will immediately detect this condition and abort any further transmission attempts until the line is again detected as being free (such as by detecting a high impedance bus line condition which persists for more than three nominal bit periods). In this way, only one of the transceivers will continue to transmit all of its 40 bits and they will be transmitted without any interference from other transceivers in spite of the fact that the other transceivers may have initially been competing to transmit their own data at the same time.

Each transceiver in this second generation system of this invention is capable of several different modes of opeation. For example, in one mode it may accept data transmitted from the central controller relating to desired controlled relay states. In another mode, it may transmit the existing controlled relay states back to the central processor. In yet another mode, it may transmit data to the central processor repesenting the current value of a connected electrical sensor (e.g., photocell, thermistor, etc.). In yet another mode, it may transmit data back to the central processor indicating that a particular connected switchleg has been activated. In the presently preferred exemplary embodiment, the data bit stream (e.g., 40 bits) includes a special function word (e.g., 3 bits) which is utilized to select the different modes of transceiver operation and/or to provide for enhanced data security or for specifying the correct interpretation to be accorded the remaining bits of a given data block.

The self-diagnosis of transceiver decoder failures (i.e., failure of a transceiver to confirm that it has carried out a prior instruction with respect to a particular relay or respond to any command or status check from the central controller) is followed by continuous reinterrogation of that particular transceiver until either the manual mode is entered by the operator or until the diagnosed transceiver failure is self-cleared by successfully receiving a transmission from that paticular transceiver. Thereafter, if the transceiver has not confirmed a correct state for the relay in question, appropriate instructions are re-transmitted and the whole cycle of relay state verification and failure self-diagnosis is carried out again.

If the data line becomes stuck in a low impedance state, then it is assumed that one of the connected transceiver decoders has seriously malfunctioned or that there is an electrical short on the data line. Each of the transceiver decoders is connected to the common data line through a fusable link. Accordingly, if the low impedance condition exists in a given transceiver, it may be physically disconnected from the data line by driving a relatively high current (e.g., 1 amp) pulse down the data line. The central processor is programmed so as to carry out this self-correcting function whenever the data bus is detected as being stuck in a low impedance state.

If a whole sequence of successive transceivers are self-diagnosed as failing to communicate, it probably indicates an open condition in the common data line and the approximate location of the open condition can be deduced by noting the location of the group of transceivers for which failures are indicated.

A non-volatile storage system such as a magnetic tape micro-cassette device is utilized for storing programmable data (i.e., schedules, patterns, sector identification, etc. In the event of power failures or for any other desired reason, the program information for a particular system can then be read into the central processor from this micro-cassette. However, because the micro-cassette tape drives presently available are not of very high quality for use in digital systems special clocking techniques have been employed. For example, because the frequency of digital signals read off the micro-cassette will normally vary significantly during the course of a given reading of the tape, special resynchronization self-clocking techniques are utilized to keep a clock circuit synchronized with the data being read from the tape. In the presently preferred exemplary embodiment, a continuous weighted average of detected data pulses is used to resynchronize the clock circuit. This results in a continuous lock on the clock frequency with the most recently detected bit frequency being the most effective in controlling the clock frequency. Using this technique, variations of bit frequency approaching 50% in only a single clock cycle may still be successfully read.

BRIEF DESCRIPTION OF THE DRAWINGS

These and other objects and advantages of this invention will be more completely understood by study of the following detailed description of the presently preferred exemplary embodiment of this invention in conjunction with the accompanying drawings, wherein:

FIG. 25 is a more detailed diagram of the memory storage areas within the controller's RAM;

FIG. 29 is a flow chart illustrating the telephone decoder task;

FIG. 30 is a flow chart illustrating the telephone service task;

FIGS. 31 and 31a show a flow chart illustrating the data line checker task;

Figures 33A, 33B:
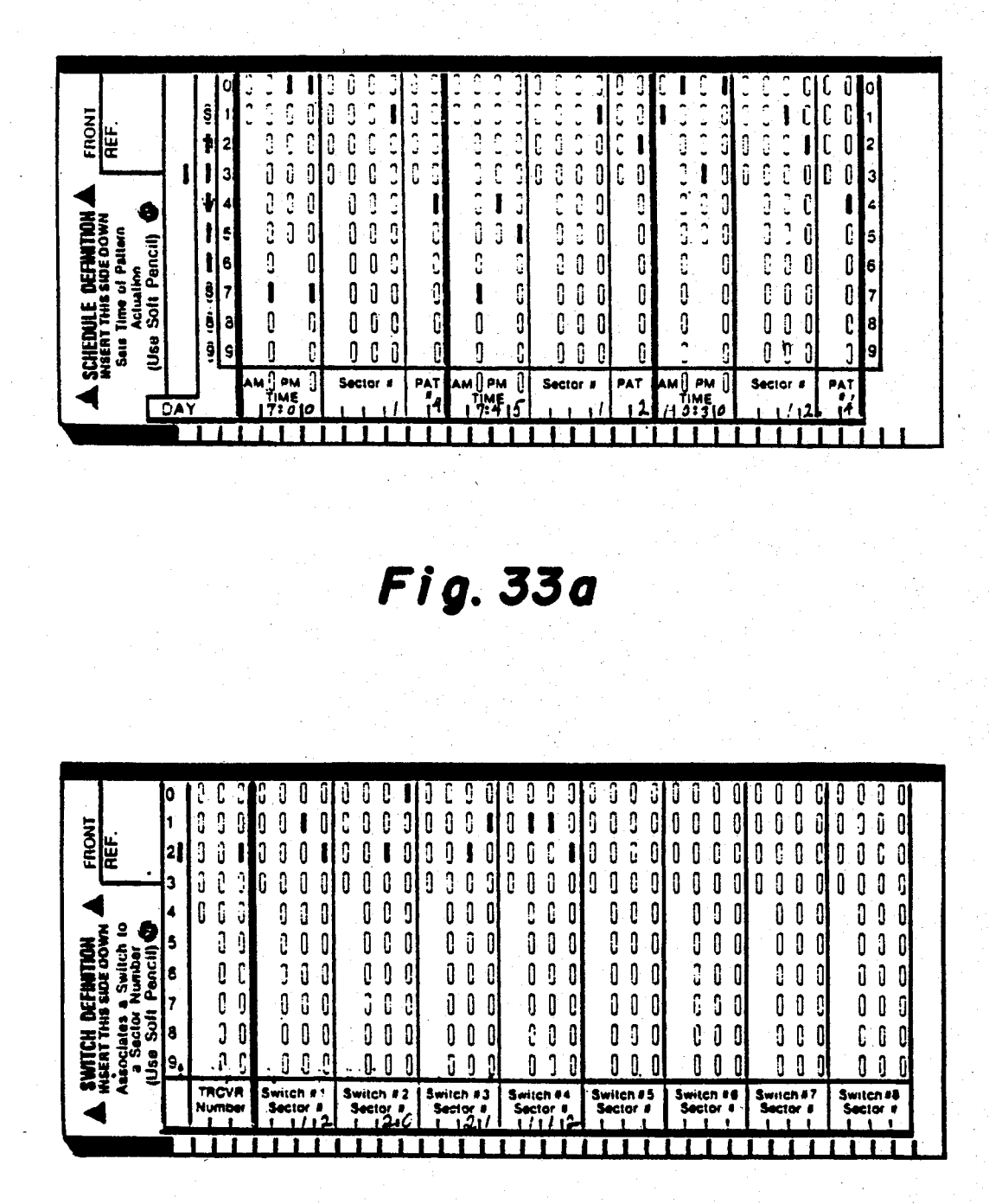
Figures 33C, 33D:
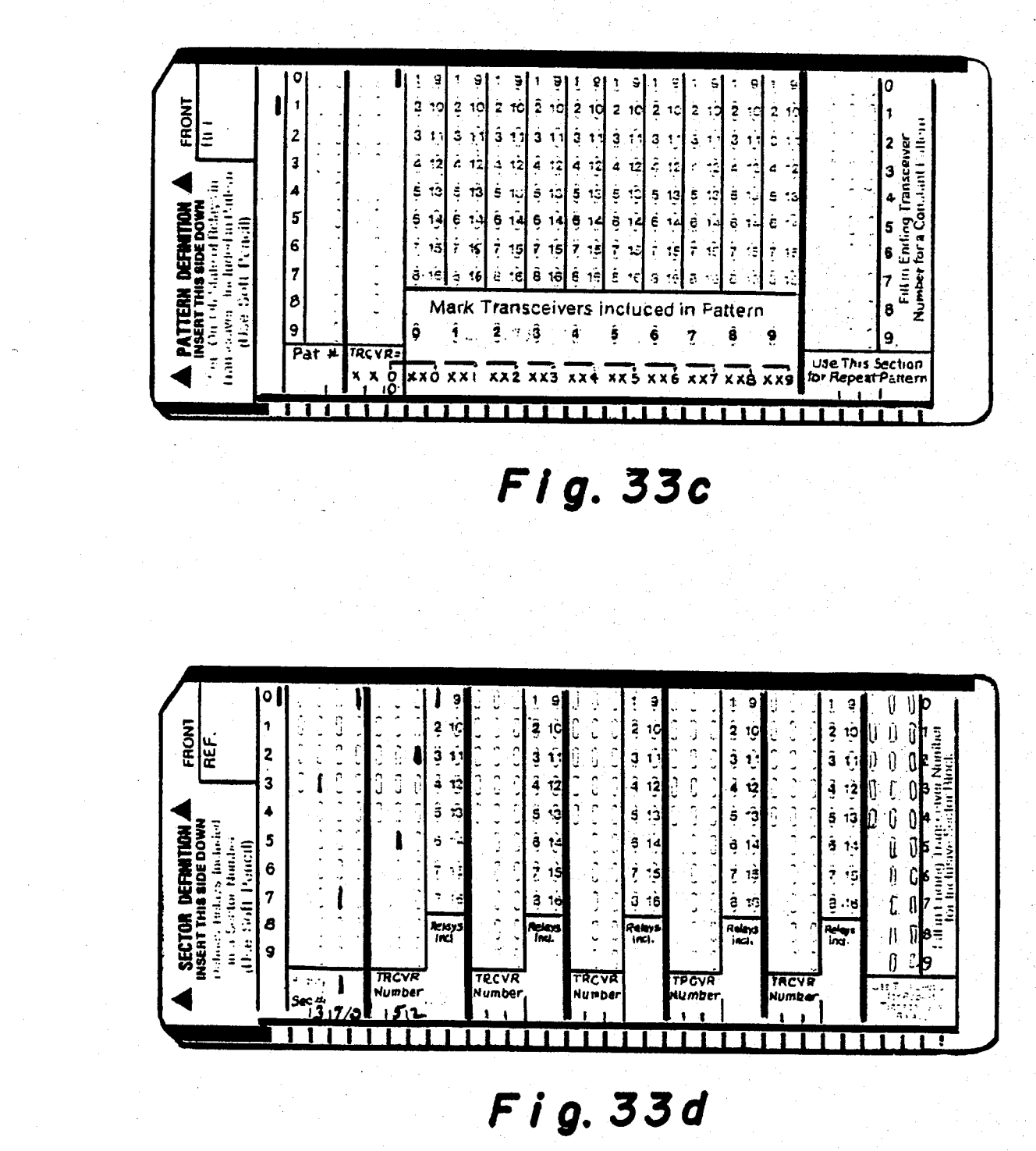

FIGS. 33 (a), 33(b), 33(c), and 33(d), are photocopies of mark-sense data input cards (partially completed for particular data) for use with the exemplary embodiment.

DETAILED DESCRIPTION OF THE PREFERRED EMBODIMENT

System Overview

Figure 1:
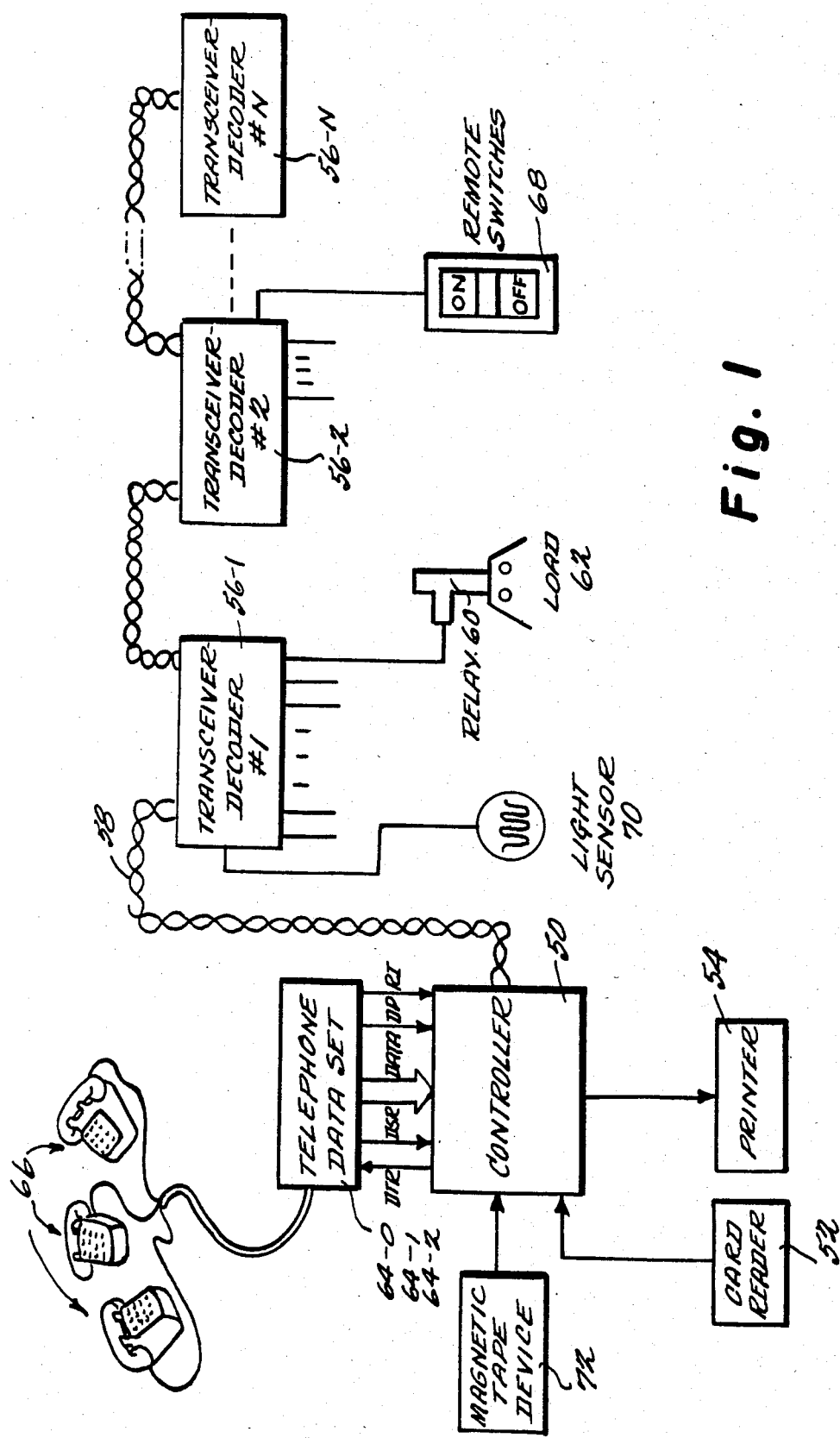
FIG. 1 is a general block and pictorial diagram of the apparatus for controlling distributed electrical loads according to the present invention.

Referring now to FIG. 1, there is shown a general block and pictorial diagram of the apparatus for controlling distributed electrical loads according to the present invention.

The heart of the apparatus for controlling distributed electrical loads is a central controller 50 which automatically controls a user-defined, time-dependent lighting schedule in accordance with a built-in 7-day clock. Operating in a manual mode, controller 50 provides for control of any lighting circuit through its keyboard (not shown in this Figure). For operation in its automatic mode, controller 50 accepts a user defined data base specifying sectors to be controlled (which relays are defined to be in each sector), patterns specifying the states of all relays or any subset of relays, time schedules (when a particular sector or sectors will assume the relay states defined by a particular pattern), switches and condition responsive switchleg inputs (which relays will be activated in response to each particular switch), and condition responsive relationships controlled by analog sensors (a user determines the criteria for analog sensor activation). This data is entered through its keyboard or via mark-sense data cards. Mark-sense data cards carrying scheduling, sector and priority status (including priority erase time), switch, and pattern information are read by a card reader 52 coupled to controller 50. A printer 54 can be coupled to controller 50 to provide a hard copy printout of the user supplied data base, a list of the status of all relays, any priority sector overrides that are in effect and the total number of relays in an "on" state along with the day and time.

Controller 50 is coupled to a plurality of transceiver decoders 56 (labeled 56 (1), 56 (2), . . . 56 (N)) in the figure. The coupling from controller 50 to transceiver decoders 56 is achieved via a data line 58 constituted by a twisted pair of wires. Data line 58 provides a bi-directional communications channel for communication between controller 50 and any of transceiver decoders 56. Associated with each transceiver decoder 56 are a plurality of relays 60 (up to 32 relays) for turning "on" or "off" individual loads 62.

All commands including those resulting from a condition response for changing the state of a relay 60 (and its associated load 62) come from controller 50. However, controller 50 can be requested by a user to initiate a command for changing the status of a particular relay 60 and its associated load 62. Through telephone data sets 64, up to three users can simultaneously access controller 50 via telephones 66. Telephone data sets 64-0, 64-1 and 64-2 provide for interface between controller 50 and the standard public telephone system so that a user can call controller 50 from any location desired. For example, a user could initiate a lighting control function from his home by calling controller 50 through data set 64 before he leaves for the office. Secret codes can be employed to restrict telephone access to authorized persons only.

It is also possible to communicate with controller 50 via transceiver decoders 56. Each transceiver decoder 56 includes provisions for remote switches 68 to be coupled to switchleg inputs thereof. Activation of a remote switch 68, either of the momentary type or maintain type, will cause its associated transceiver decoder 56 to communicate with central controller 50 so as to request a lighting control command to be issued thereby. Sensors having a switch output can be substituted for a manually operable switch (such as switch 68 shown in FIG. 1) to permit a condition responsive override (i.e., fire or smoke detector having a relay output that closes when heat or smoke levels exceed predetermined thresholds).

In addition, analog sensing devices such as a light sensor 70 can be coupled to an analog sensor input section of transceiver decoder 56. These sensors can be polled (interrogated) by controller 50 to provide information related to light levels, heat levels, etc. Based upon the information provided by these analog sensors, controller 50 can issue appropriate commands for altering the status of selected relays. The incorporation of analog sensors and associated information generating capability in transceiver decoders 56 and the use of condition responsive switches coupled to switchleg inputs of the transceiver decoders provide a condition responsive capability for the system.

Controller 50 can be coupled to a non-volatile memory storage system such as a magnetic tape device 72 for storing sector, pattern switch, priority erase time and schedule information. Thus, if controller 50 were to lose power for a substantial period of time, such that all data stored in a volatile form of memory were lost, the data could be easily recovered through the magnetic tape device 72. Means are provided within controller 50 for reading the data stored within magnetic tape device 72.

Because the micro-cassette tape drives presently available for tape device 72 are not of very high quality for use in digital systems, special clocking techniques are employed. For example, because the frequency of digital signals read off the micro-cassette will normally vary significantly during the course of a given reading of the tape, special resynchronization self-clocking techniques are utilized to keep a clock circuit synchronized with the data being read from the tape. A continuous weighted average of detected data pulses is used to resynchronize the clock circuit. This results in a continuous lock on the clock frequency with the most recently detected bit frequency being the most effective in controlling the clock frequency. Using this technique, variations of bit frequency approaching 50% in only a single clock cycle may still be successfully read.

Communications Link

As stated, communication between controller 50 and each of transceiver decoders 56 is via a data line 58 formed by a single twisted pair of wires, constituting a bi-directional data communication link or bi-directional communications channel. Both controller 50 and each of transceiver decoders 56 include circuitry for transmitting and circuitry for receiving information. The communication link provides a protocol for the transfer of information to and from these communicating points. The protocol insures that information transmitted and received is free of errors and will not be garbled or interfered with by other communication devices also connected to the data communication link. The communication link, since it can be coupled to different types of synchronized machines each running on an independent clock, is independent of any system timing. The communication link is bi-directional in nature and in one selected mode provides for the utilization of data verification as well as interactive data processing to insure data security while maintaining system throughput.

Arbitration is provided for resolving any bus conflicts arising during simultaneous transmission of two or more control points without garbling, degrading, or interferring with any data being transmitted. The arbitration scheme is suitable for use with the load control system described herein or independently thereof.

As used throughout the description of the communication link, the term "communication point" will be used to refer to any point connected to the data link that has transmitting and/or receiving capability; thus including both controller 50 and all of transceiver decoders 56. The terms "data communication link" and "communication link" include both data line 58 and the protocol in which data is transferred between communication points. The terms "time to compute mode" and "time to compute state" define a time period during which a communication point is not monitoring the communication link. This time is overhead to allow a receiving device sufficient time to process and decode the incoming signal. The term "lockout" is defined to be a mode in which specific communication points are using the communication link in an interactive manner locking out other points from interfering.

The protocol of the communication link defines two possible signal states of the communication link. An active state refers to the state in which the actual information and clock are found during a transmission. As applied to data line 58, the "active" state is defined to be the existence of a voltage potential of 10-30 volts between the two wires of data line 58. The "inactive" state refers to a state wherein the voltage between the two wires of data line 58 is less than 10 volts. The inactive state is of arbitrary duration and is essentially ignored during a transmission sequence. By utilizing a dedicated twisted pair of wires for data line 58, a bus arbitration technique and the data communication protocol, base band signals are transmitted between communication points without the need of extra modulating and demodulating devices. Of course, other communications channels such as power lines, radio channels, etc., could be utilized with appropriate modulating and demodulating devices. The use of an interactive data communication link allows a single communication point to be polled and interrogated without interferring with other communication points. However, other communication points can be actuated asynchronously to use the data line and send information on command from a remote user.

The protocol is based upon a modified form of a standard $\frac{1}{3}$, $\frac{2}{3}$ pulse-width modulated signaling technique. This modified pulse width modulated signaling technqiue is hereafter referred to as "modified ratio signaling".

Controller 50 is coupled to a plurality of transceiver decoders 56 via data line 58. Controller 50 is utilized as the command controller that transmits load control information over the data communication link (including data line 58) to the remote transceiver decoders.

Controller 50 is also responsible for normal system maintenance, i.e., the controller interrogates the transceiver decoders in order to verify the state of their relays as well as transceiver decoder operation. This maintenance function is achieved through the same bi-directional communication link between transceiver decoders 56 and the controller 50. At the time when controller 50 is interrogating a particular transceiver decoder 56 for either specifying relay information or checking the status of the transceiver decoder, individual polling is used. Individual polling refers to a transceiver decoder answering a specific question by controller 50 immediately upon receipt of the question. No other transceiver decoder 56 will be allowed to respond to a question directed to a particular transceiver decoder. This condition is defined to be transceiver decoder lock-out as will be further described.

Transceiver decoders 56 are capable of transmitting switch input information from a remote switch 68 coupled to a switchleg input thereof immediately upon its actuation by a user. In this mode, the transceiver decoder 56, to which the remote switch 68 is coupled, responds to a switch input on command of the remote user and does not wait for or require controller 50 to poll for information. This form of data line control is known as asynchronous access of the data communication link. Accessing the data communication link by this method eliminates the need for polling schemes that take much mode time and degrade system throughput. The throughput that is realizable by this asynchronous bus access is solely dependent on the current activity on the data link. Therefore, if the data link is not being utilized by another transceiver decoder 56 found on the data bus, the transfer of information from the closure of a remote switch 68 will occur immediately from the particular transceiver decoder 56 to which the switch is connected to controller 50.

In summary, a transceiver decoder 56 will use data line 58 when there is information requested by controller 50 or it will use the data line asynchronously upon a switch input command at its remote control point. Information is transferred in a half duplex form of communication.

The data communication link can couple controller 50 with up to 1,024 transceiver decoders 56. This limitation results from the data bit stream format described hereafter.

Figure 2:
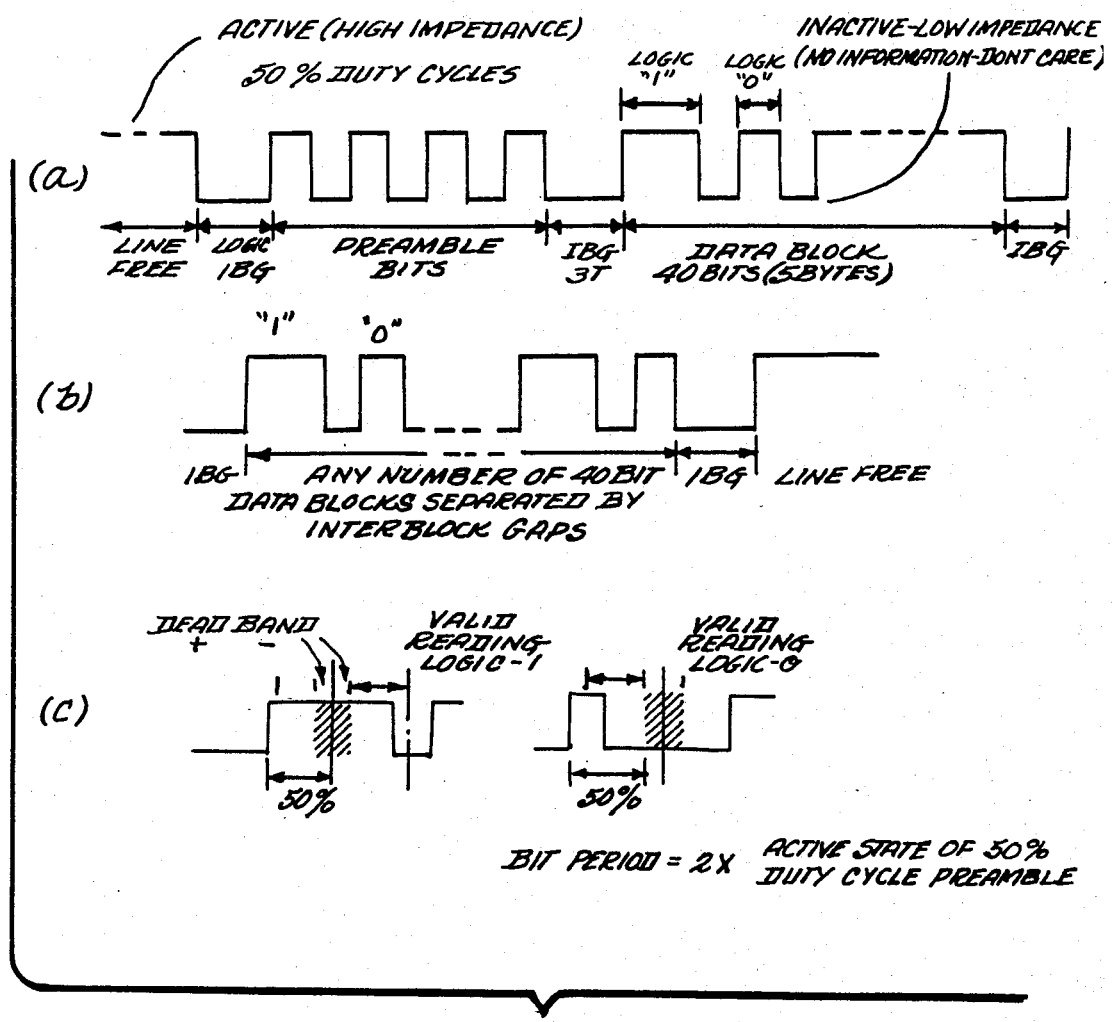
FIG. 2 is a graphical representation of various hypothetical data wave forms illustrating the communication protocol.

Referring now to FIG. 2 there is shown a graphical representation of various hypothetical data waveforms describing the communication protocol. FIG. 2A illustrates that a transmission sequence starts with the data line deemed "free for access or usage". The line free condition is an active (high impedance) state of the line and corresponds to a voltage between the two wires of data line 58 of from 10 to 30 volts. The communication point in need of gaining access of the data communication link sends a long interblock gap (IBG) to grab the line. After the data line has been accessed, a preamble is sent so that the other communication points receiving the data will lock in on the data signal and establish the data rate. The regular IBG follows so that the system may be synchronized thereon. Then the data is transmitted serially as digital information comprising logic level 1's and 0's. Forty bits of information are transmited during the data segment. The forty bits of information correspond to five bytes (eight bits/byte). An IBG follows the data block of forty bits and if more data needs to be sent, another forty bit data stream is sent and if there is no more data, then the line is released.

FIG. 2B shows a data block of forty bits preceded by and followed by an interblock gap. Note that at the end of the final interblock gap, a line free condition exists wherein the line is returned to the active (high impedance) state.

Figure 3:
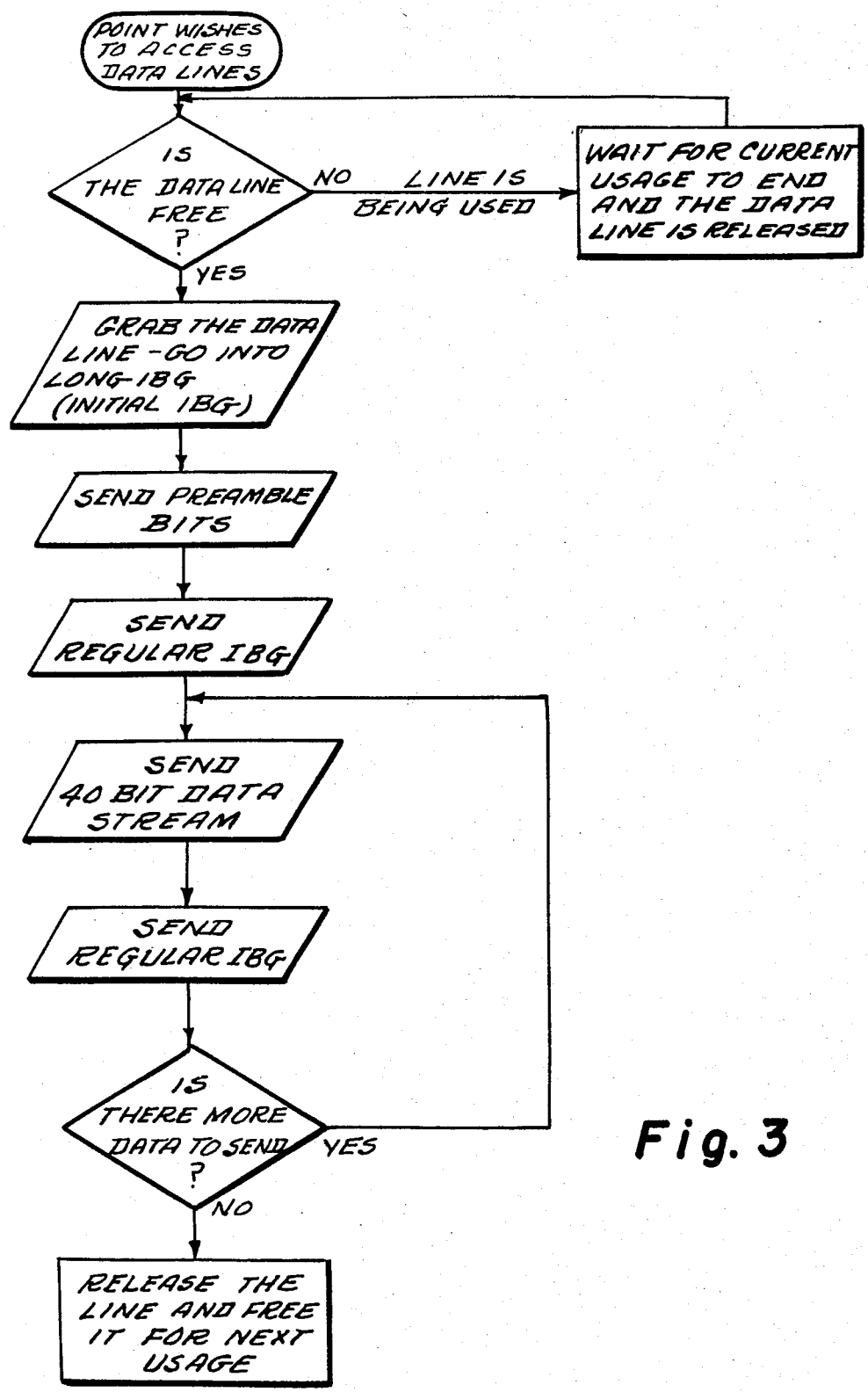
FIG. 3 is a flow chart illustrating the transmission sequence utilized by a transceiver decoder for communicating with the controller.

Referring now to FIG. 3 there is shown a flow chart of the transmission sequence utilized by a transceiver decoder 56 to communicate with controller 50. In the "data line free" mode the data line is in a dormant state. It is not being used by any communication point. Protocol to deem the line as being in a free mode as opposed to being accessed is achieved by timing out the inactivity of the data line in the active state for a minimum of three (3) bit periods T. Timeout can be 6-25 msec. depending upon whether phase lock is achieved. With phase lock, timeout can be as short as 6 msec. In the absence of phase lock, timeout automatically occurs at 25 msec. If a signal is to be sent during this time out period for the line free protocol then the previous data rate just received is used to receive the next transmission sequence. It uses the last data rate established and does not expect to see a new preamble. When the line is free it is released for general access and any communication point can attempt to gain control of the line. Therefore, if the state of the data line remains active for a period of time, then the line will be deemed free of data and can be accessed by any communication point.

There are two types of IBG's, one for grabbing the line, and the second for delineation of data blocks within the data stream by an IBG between each block of forty bits of data. In order for a communication point to grab the data line, it accesses the line by forcing an initial IBG (long IBG). The duration of the IBG must be long enough to allow all devices maintained on the line time to set up for receiving the data stream that is to follow. Since the devices on the data line are sequential machines (microcomputers), it is necessary that this duration be a minimum of two msecs. so as to gain the attention of these machines. The duration of the IBG must be long enough so that any communication point will have time to compute before the IBG is recognized. The normal IBG is a minimum of three bit periods (3T) of the data rate. The IBG serves as a synchronizing signal to delineate the data blocks being transmitted. When a receiver is out of sync with the transmission, the IBG serves to justify the system and resync a receiver.

The preamble is sent only once during a transmission sequence independent of the number of the data blocks being transmitted. Preamble includes a minimum of four bits at the receiver, a weighted average is taken during each bit period from which the data rate is calculated and its logic threshold determined. The preamble is a sequence of 50 percent duty cycle pulses which a receiver utilizes in order to lock in the data rate (generally 350–4000 bits/second).

A data block includes 40 bits of information using modified ratio signalling for transmitting a series of logic 1's and 0's. The duration and decoding of each received bit is referenced to the previously received preamble. The decoding of the logic levels are not determined by any present condition internal to a receiver. Any number of data blocks separated by IBG's may be transmitted during the time that a communication's point has control of the line.

As stated, the logic levels are transmitted using a modified ratio signalling scheme. The signalling scheme utilizes the active state of the data line for the exchange of information and clock. The duration of the active state during the data block sequence is compared to the previously transmitted preamble which has been stored in memory. This comparison is used to determine the actual logic level being received. Since the data bit input is being referenced to a previous data input, i.e., preamble, it is said to be a ratioed reception. Therefore, common mode distortions caused by parametric shifts in the receiver electronics or in the data line cancel. Since both preamble and data are coupled through data line 58 to a particular control point acting as a receiver, the elimination of parametric variations allow the use of a more simple receiver circuit than might normally be required since tolerances need not be very strict. The logic level thresholds of the received signals are calculated from the preamble.

Modified Ratio Signaling

Referring back to FIG. 2 and specifically to FIG. 2(c), there is shown a signal diagram illustrating the modified ratio signalling scheme and particularly illustrating the effective calculation of the minimum and maximum pulse width value and defining dead bands where no signals are permitted.

The receiver of a communication point has an initial band width of 4–5 Khz for receiving the preamble. After the preamble has been received and data logic thresholds have been calculated, the bandwidth of the receiver is narrowed to reject signals outside of that narrowed bandwidth. This bandwidth narrowing is achieved by a digitally simulated phase locked loop in each transceiver decoder 56, or controller 50. The rejection of signals outside the narrowed bandwidth is achieved by dynamically setting the bandwidth of filters in accordance with the preamble.

Logic levels are defined in terms of the percentage of a total bit period (T) where a bit period is defined to be two (2) times the period of the active state of the 50% duty cycle preamble signal (T50). The duration of the active state as a percentage of the total bit period that determines whether the logic 1 or the logic 0 is present. The preamble is defined to have a bit period of 50 percent of the total clock period (a fifty percent duty cycle signal) and this reference time is used as the basis for making all logic level decisions. As shown in FIG. 2(c), the dead band corresponds to 12.5 percent of the total bit period. The logic "1" and "0" levels are calculated as follows:

The total data bit period (T)=2×T50=100% (i.e, total duration of the active state).

Let the deadband=T50/4=12.5% of the duration of the active state.

Then logic "1" level (threshold determination filtering) is defined by:

| | |
|---|---|
| T50 + deadband | ≧ logic 1 ≧ T − deadband |
| T50 + T50/4 | ≧ logic 1 ≧ T − T50/4 |
| 62.5% | ≧ logic 1 ≧ 87.5% |

Similarly, logic "0" level (threshold determination filtering) is defined by:

| | |
|---|---|
| Deadband | ≧ logic 0 ≧ T50 − deadband |
| T50/4 | ≧ logic 0 ≧ T50 − T50/4 |
| 12.5% | ≧ logic 0 ≧ 37.5% |

Since the data logic levels are determined only by the active state of the line, the inactive state is ignored and is used to provide a time needed by the microcomputer to compute. This period of the inactive state between bits is constant but cannot exceed two bit periods. Thus, it can not be mistaken for an IBG. A bit period (T) is defined as two active state preamble bits. Of course, regardless of the particular data bit, logic "1" and "0" interpretations are made with respect to the bit period established by the preamble received immediately prior to the data. Information is only carried by the duration of the active state. The inactive state is the time between bits and its minimum duration is determined by the time needed to compute at the communication point acting as a receiver. The inactive state is approximately 160 microseconds in duration. The use of a constant inactive state duration while modulating the active state of the line for the transfer of information provides for a varying bit transfer rate. A logic "0" bit period is approximately ⅓ less in duration than a logic 1 bit period. Therefore, a word transmitted with logic zeros will be transmitted at a higher baud rate than a word with a logic ones. Thus it is possible to communicate with a central point faster that would be possible using a conventional pulse width modulation scheme. Faster throughput is achieved by carrying information only on one state (active) of the data line while making the other state an "I don't care" state. In conventional pulse width schemes, the inactive state period is varied to maintain a fixed clock rate. It takes the same length of time to send eight "1"'s as it does to send eight "0"'s. However, in this system eight "0"'s will be sent faster because the inactive state is not lengthened to maintain a constant clock rate.

Data Line Arbitration

The communication link which is a bi-directional communications channel is able to arbitrate any data line contention without interferring with the current communication sequence. When two or more communication points access the data line for transmission of information there is a bus conflict. This conflict is arbitrated so that there is no loss of information or interference with the current transmission. The arbitration of the data line is achieved either during the line access level or bit transmission level at the communication point. The flow of the arbitration logic is set forth in FIG. 4.

Figure 4:
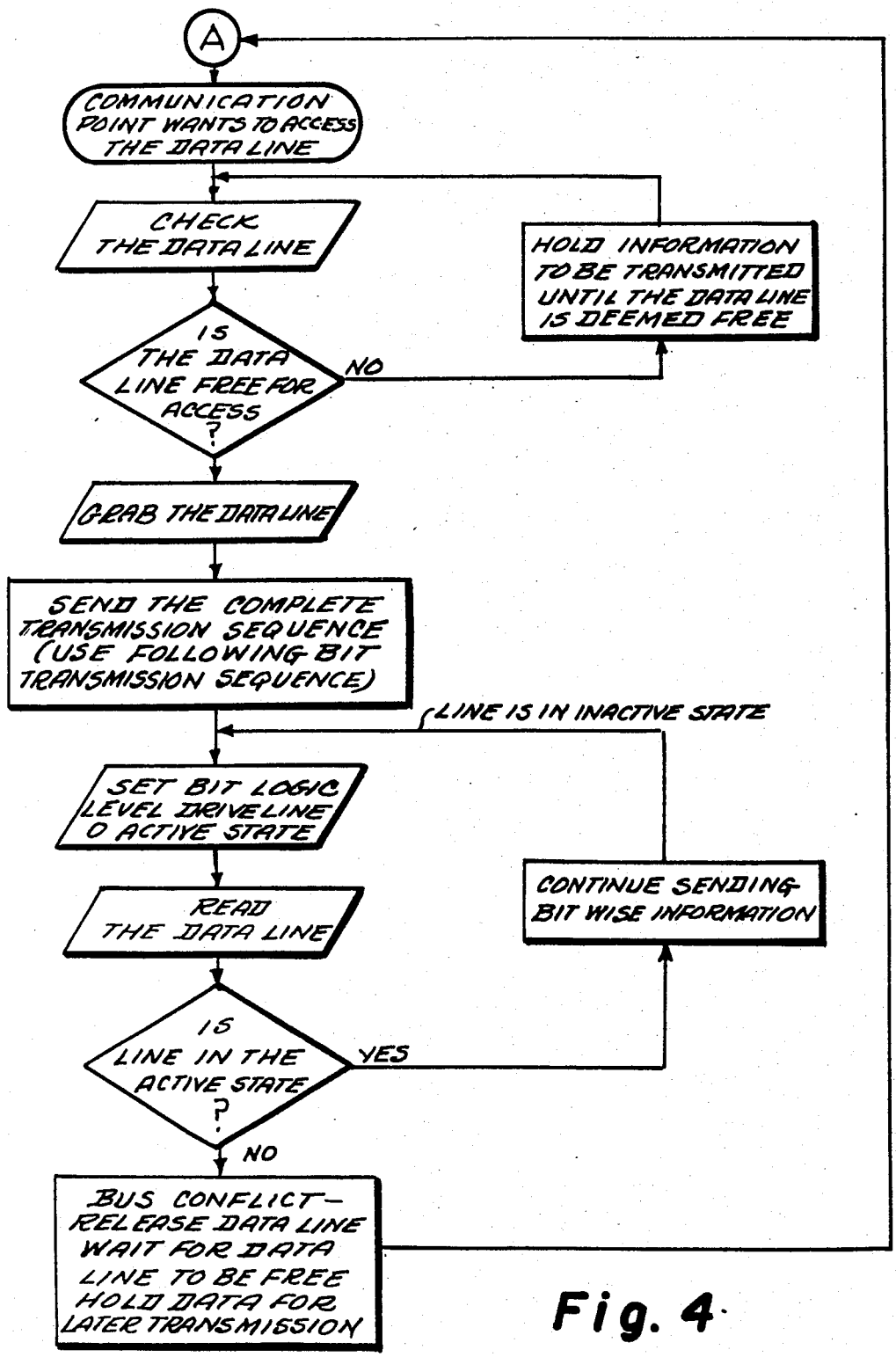
FIG. 4 is a flow chart illustrating the data line arbitration protocol.

Referring now to FIG. 4 there is shown a flow chart of the data line arbitration protocol. When a communication point has information to be transferred over the data line it must first access data line 58. Data line 58 must be in a free state (high impedance, active state) for the communication point to begin the transmission sequence. If the data line is currently being used by another communication point, the point desiring access automatically holds until the data line is deemed free. During this holding period, the communications point is also receiving whatever data is being sent during the current transmission on the data line. The data held in the communications point needing to be transferred is stored and therefore not lost until the transfer of the information can take place. This stored data can be held indefinitely until the data line has been released and is deemed free for subsequent transmission.

Since the communication points consist of identical electronics and sequential logic, it is possible for two or more transmitting devices to be synchronized with each other. If two devices are synchronized, then they will attempt to access the data line at the same time and not realize that other devices are using it as well. To guard against multiple simultaneous transmissions interferring with the integrity of the data being transferred over the data line, a bit level arbitration scheme has been developed.

The bit level arbitration flow charted in FIG. 4 is achieved by reading the data line on a bit-wise basis after driving the line to a particular state, i.e., the inactive or active state. If there is a discrepancy between the state desired and the actual state of the line as read, then that transmitting device will automatically realize the line is in use and drop off the line into the hold data mode for subsequent transmission when the line is deemed free. The selection of the device driven off the line is achieved dynamically during the course of the transmission sequence and not by a predetermined priority and queuing scheme. As two or more communications points transmit, the first bit of information that is different between the two devices will immediately resolve the bus conflict. Since each communication point is uniquely addressable, having its own name, then there is guaranteed to be a sequence of bits during the course of the transmission that will differ. Therefore, there will only be one device left transmitting on the data line at the completion of this transmission sequence. During the arbitration of this information, no data is inteferred with or garbled by this data line conflict since it is being achieved on a bit wise level.

The arbitration tecnnique is dependent on the impedance levels of the active and inactive states of the data communications line. The inactive state, is the low impedance state of the line (e.g., the DC resistance of the line in the inactive state is less than 50 ohms). The active state is a higher impedance (e.g., greater than 90 ohms). The impedance of data line 58 is relative to the driver circuit found on the communication point. When there is a conflict between two devices (where one is driving the line to the active state), while the other is driving the line to the inactive state, it is the latter that will win the bus. The device driving the line to the active state is driven off the line since the active state is of higher impedance and, therefore, yields to the low impedance state of the line. Thus, during the bit level arbitration mode, the device that drives the line to the inactive state when the other devices are driving it to the active state, will gain full and uncontested access of the data line.

Performing this arbitration technique dynamically at the time of the actual transmission, provides the utmost in system throughput; i.e., the actual throughput is solely dependent upon the activity on the data communications line at any given time. Furthermore, this also eliminates the need for lengthly polling techniques when information must immediately be transferred and processed upon demand.

The arbitration technique may also be used to freeze or hold the current status of the system without any loss of information. This may be desired during maintenance or downtime procedures. This freezing is achieved by holding the data line in the inactive state for an indefinite period of time so that maintenance procedures can be performed. Since the data line is being held in the inactive state, all information will be held at the communications point and, therefore, not be lost until the information can be effectively transferred.

There is a mode of operation during which controller 50, which is an overriding master device, holds an interactive uninterrupted data conversation with a transceiver decoder 56 (slave). During this interactive interchange of information to a particular transceiver decoder 56, no other transceiver decoder can contest the use of the data line. The other transceiver decoders 56 are said to be locked out and yield the data line to the control of controller 50. This is achieved by defining a master device and slave devices in the system.

The determination of the master/slave relationship of the system components are built into each of the communication points, i.e., controller 50 is the master and the remote transceiver decoders 56 are the slaves. Controller 50 has overriding control of the data communication line such that it can interrupt, stop, or access data line 58 over any of the other slave devices.

The master/slave mode of operation is achieved through the line free determination logic. In this logic the deeming of a line to be free has a different timeout period in masters and slaves. A master device will have a shorter time out period (4 msec.), so that it can slip in and grab the line before a slave device times out (slave time out is 6 msec.). Furthermore, the slave device may become a master upon command of the actual master device. During an interactive conversation between controller 50, a master, and a transceiver decoder 56, a slave, control of data line 58 is automatically transferred to the slave device being accessed. This transfer allows controller 50 to select or poll a specific transceiver decoder 56 without being endangered by a response from an arbitrary device transmitting data.

Therefore, the master device is capable of transferring the control of data line 58 to a specific slave device without any interference.

Transceiver decoder—hardware

Figure 5:
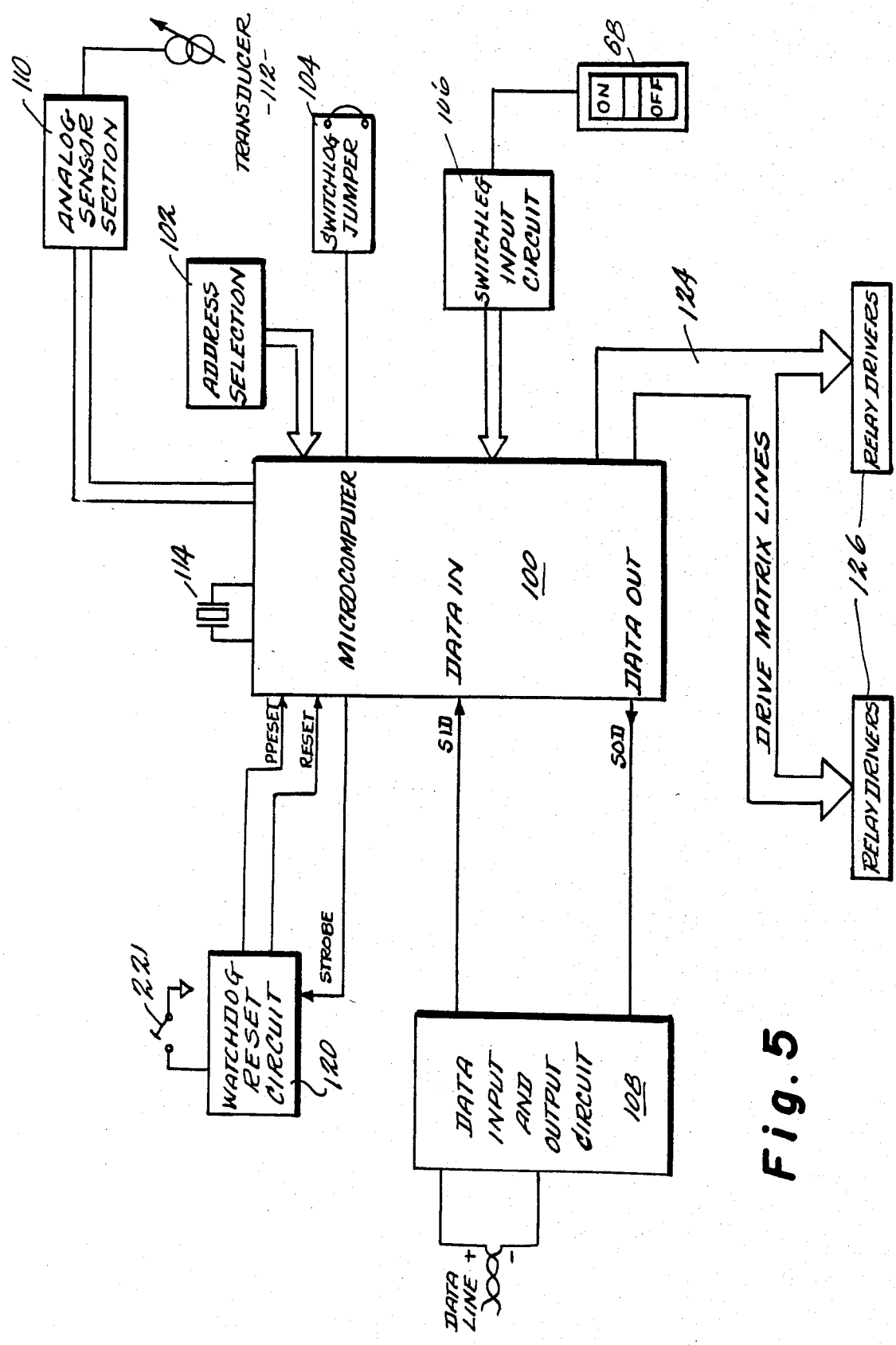
FIG. 5 is a general block diagram of a transceiver decoder.

Referring now to FIG. 5, there is shown a general block diagram of a transceiver decoder 56. Each transceiver decoder 56 is built around a single chip microcomputer 100, suitably a 3870, which performs all of the logic control functions of the transceiver decoder including the encoding of data from switch and analog sensor inputs for ultimate transmission to the central controller, and the interpretation and execution of the instructions from the central controller. The address of each transceiver decoder 56 is jumper-selectable by an address selection bus 102 which sets a 10-bit binary word giving each transceiver decoder an address from "0" to "1023". A switchleg jumper 104 allows the user to select the type of switchleg (momentary or maintain) 68 to be coupled to microcomputer 100 of transceiver decoder 56 through a plurality of switchleg inputs 106. A data input and output circuit 108 couples the data line (data line 58) to microcomputer 100. Data input and output circuit 108 includes optoisolators for providing an isolated differential data input and output for enhancing noise immunity against electromagnetically coupled noise sources. As previously stated, the data communications link is bi-directional. An analog sensor section 110 allows the coupling to a transceiver decoder 56 of up to eight analog sensors (temperature, light sensors, snow, ice, humidity, wind, smoke, etc.) using an 8-channel analog multiplexer and a dual-slope A/D converter. The analog sensors are of the variable impedance type and are represented by transducer 112 in the Figure (analogous to light sensor 70 shown in FIG. 1). These analog sensors can be polled by controller 50 and in response to such polling, send data via their associated transceiver decoder 56 through data line 58 to the controller providing information related to ambient lights, temperature conditions, etc. for initiating an appropriate response to such conditions.

The use of analog sensors and switches renders the system "condition responsive". The time dependent scheduling of relays of selected sectors responding to a pattern of relay states illustrates the use of time as a condition. However, the system can also be condition responsive through its switchleg inputs and analog sensor inputs. Analog sensor section 110 (see FIG. 5) provides connection for up to eight (8) analog sensors, i.e., devices providing a range of impedances or voltages responsive to ambient conditions such as light level, temperature, humidity, etc. Controller 50 can poll (interrogate) these sensors periodically and issue programmed commands in response to their status. There are also available on the commercial market switch type sensors. Such sensors detect thresholds of temperature, light, humidity, etc. and close switch contacts when their predetermined threshold is exceeded. These switch type sensors can be treated as substitutes for switches 68 coupled to the switchleg inputs of a transceiver decoder 56. The response to the actuation of a switchleg is defined by the user regardless of the particular device utilized to close the contacts of the switchleg. Thus a smoke detector having a switch-type output can be coupled to a switchleg of a transceiver decoder 56 and programmed to activate a specific lighting pattern for an emergency sector.

Watchdog reset circuit 120 provides reset and preset capability for transceiver decoder 56. When microcomputer 100 is operating normally, i.e., sequencing through its instructions beginning at its base (zero) address and proper sequence of instructions it sends a STROBE signal to watchdog reset circuit 120. Whenever the STROBE signal ceases, watchdog reset 120 senses that microcomputer 100 is malfunctioning. Either it has lost a bit and is executing an improper instruction or it has locked into a loop and is not following its proper sequence of instructions. Watchdog reset circuit 120, in response, sends a RESET signal to microcomputer 100 forcing it back to its zero address to begin its instruction sequence again. Watchdog reset circuit 120 also includes a preset switch for giving a user the ability to override a transceiver decoder 56 by turning on all relays. The present switch would be utilized in the event of a data line 58 or controller 50 failure and permits circuit breaker control of all relays without the present necessity of hard wiring changes.

Microcomputer 100 is clocked by an external clock crystal 114.

Commands to specific loads issue from microcomputer 100 through drive matrix lines 124 and are coupled to a bank of relay drivers 126 for activating individual relays associated one with each specific load.

The general block diagram shown in FIG. 1 shows several transceiver decoders 56 coupled along data line 58 serving as the bi-directional data link. Transceiver decoders 56 are individually addressable and are utilized to directly control relays specified on command of controller 50.

The system is a closed loop wherein controller 50 can interrogate the status of the remote transceiver decoder 56. This status information can be the current relay pattern in force such that justification of system activity can be made and verified. A command from controller 50 can either initiate load actuation or be in a responsive mode for interrogation and self-diagnosis. Data sent to controller 50 from a transceiver decode 56 can either be in response to an interrogation command from the controller or it can be asynchronously sent in response to a remote user input, such as the activation of a switchleg by a switch 68 or a condition responsive device coupled to a switchleg input. Since there is no critical system timing, a user can actuate an input to a transceiver decoder 56 at any time. When an input is recognized, the appropriate information is transmitted to controller 50 which in turn decodes the switchleg signal and sends the appropriate command to actuate the proper relays and loads.

The transfer of data between controller 56 and a transceiver decoder 56 is achieved over data line 58. Data is transmitted in a serial fashion as described in great detail above.

Data Stream Format

Figure 6:
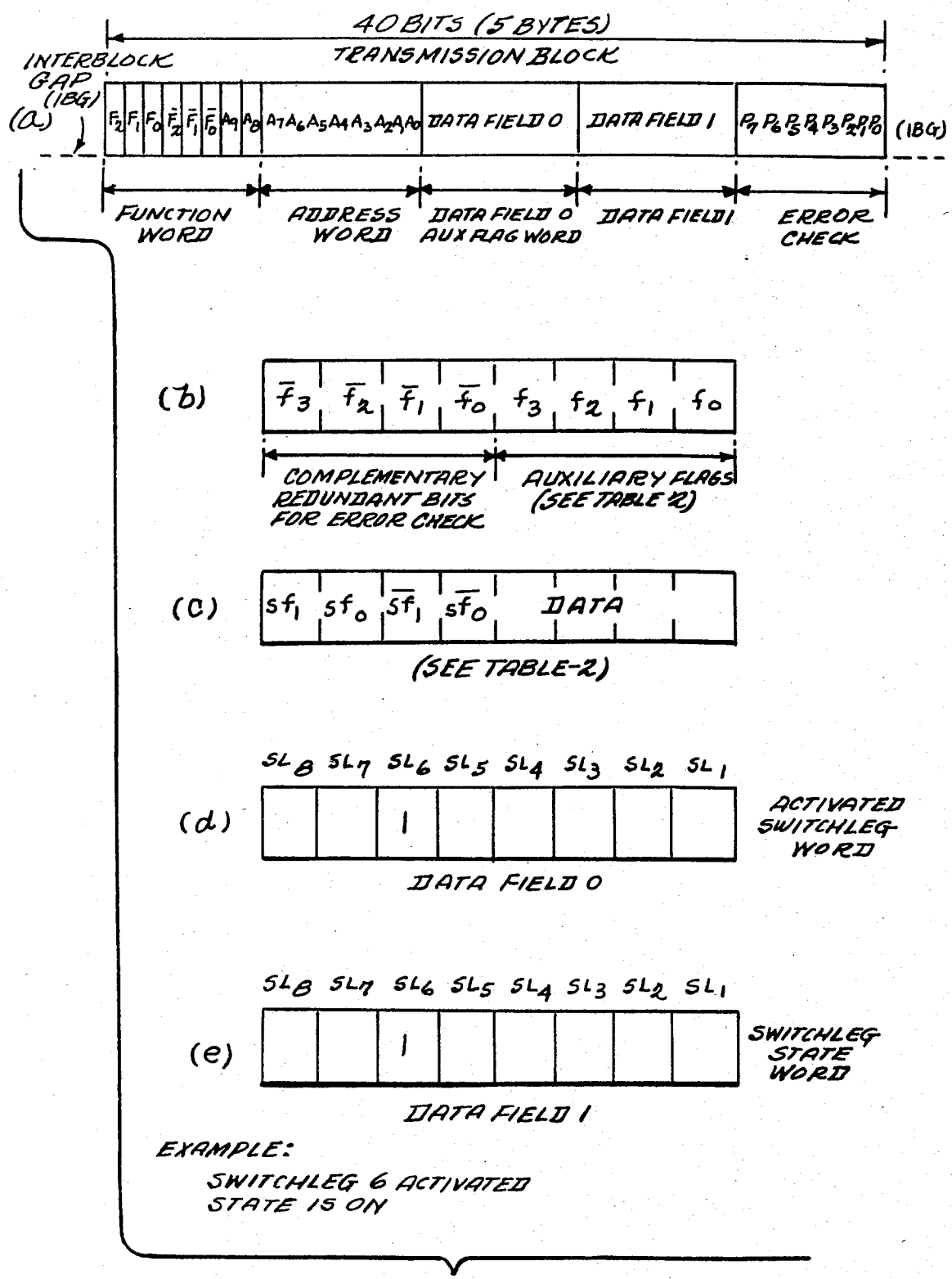
FIG. 6 is a diagrammatic representation of the format of a data stream.

Referring to FIG. 6, there is shown a diagrammatic representation of the format of the data stream. FIG. 6(a) shows a transmission block of 40-bits (5-bytes) including multiple fields. The data stream includes a function word, an address word, a data field zero, a data field 1, and an error check work. A word refers to one byte of 8 bits of binary information.

The first byte of the 40-bit data stream is the function word. Three bits called F0, F1 and F2, shown in FIG.

6(a), comprise the binary pattern that is used to dynamically set the type of transmission sequence. Since the decoding of this function word is critical to the accurate transfer of data, it is complementary-redundant bit-wise error-checked. The error checking for the function bits is in the three bits following F0, F1 and F2 called $\overline{F0}$, $\overline{F1}$ and $\overline{F2}$. Before the data is decoded, the function words are error-checked for accuracy. These six bits are exclusively OR'ed together in the appropriate bit positions such that valid data exist when they differ in logic level in each bit position. This will produce a logic one in the exclusively OR'ed section indicating that data is valid.

The function word is present in all data transfers between the controller 50 and a transceiver decoder 56. The three bits provided in the function word provide a binary number from 0 through 7 which indicates one of eight possible modes. Modes 0 through 4 indicate that the data stream was transmitted by controller 50. Modes 5 through 7 indicate that the transmission emanated from a remote transceiver decoder 56. Table 1 summarizes the different modes specified in the function word. In general, the function word specifies the type of data being transferred and the data security which affects the system throughput.

TABLE 1

FUNCTION WORD -
TRANSMITTED BY CENTRAL CONTROLLER

| $F_2$ | $F_1$ | $F_0$ | | |
|---|---|---|---|---|
| 0 | 0 | 0 | Mode 0 | Install Specified Relay States in Data Fields 0 and 1 |
| 0 | 0 | 1 | Mode 1 | First Transmission of Relay States in Data Fields 0 and 1 |
| 0 | 1 | 0 | Mode 2 | Second Transmission of Complementary Relay States in Mode 1 |
| 0 | 1 | 1 | Mode 3 | Interactive Data Verification |
| 1 | 0 | 0 | Mode 4 | Data Interrogation Mode- Use (Auxiliary Function Word in Data Field 0) |

FUNCTION WORD -
TRANSMITTED BY TRANSCEIVER DECODER 56

| $F_2$ | $F_1$ | $F_0$ | | |
|---|---|---|---|---|
| 1 | 0 | 1 | Mode 5 | Current Relay States in Data Fields 0 and 1 |
| 1 | 1 | 0 | Mode 6 | Remote User Activated Switchleg |
| 1 | 1 | 1 | Mode 7 | Data Type Found in Data Field 0 Analog Sensor Data Transceiver Decoder 56 Status for Testing (Secondary Auxiliary Function Word in Data Field 0) |

Continuing to refer to FIG. 6(a), the address of the transceiver decoder 56 includes 10 binary bits which provide 1024 unique addresses that exist on a single data communication line. The high order address bits, A8 and A9, exist in the least two significant bits of the function word. The remaining address bits, A0 to A7, are contained in the second byte of the transmission block, the address word.

The type of data that is contained in data field 0, which is the third byte of the transmission block, is specified in the function word. For modes 0 to 3, data fields 0 and 1 contain the appropriate loading pattern for 16 relays specified by controller 50. In mode 4 (see Table 1) data field 0 contains an auxiliary function word which is decoded similarly to the function word of the first transmission byte. Each auxiliary function word includes a lower and upper order nibble of 4 bits each. The lower order nibble of the auxiliary function word, (see FIG. 6(b)), f0–f3, specifies the particular flag which must be decoded. The higher order nibble, $\overline{f0}$–$\overline{f3}$, consists of the complementary redundant bits of the auxiliary function word which is used for error checking. These bits are exclusively OR'ed with the auxiliary flag to determine their validity. Table 2 is a summary of the auxiliary function words.

TABLE 2

AUXILIARY FUNCTION WORD TABLE FOR MODE 4
(Decoded in Data Field 0 Transmitted by Central Controller)

| $f_3$ | $f_2$ | $f_1$ | $f_0$ | |
|---|---|---|---|---|
| 0 | 0 | 0 | 0 | Individual relay override, force to OPEN state. Relay number in data field 1. |
| 0 | 0 | 0 | 1 | Individual relay override, force to CLOSE state. |
| 0 | 0 | 1 | 0 | Acknowledge of valid loading pattern - Mode 3 response (See Table 1) |
| 0 | 0 | 1 | 1 | Negative acknowledge indication of erroneous relay pattern data, Mode 3 response. |
| 0 | 1 | 0 | 0 | Interrogate current status of relays. NOTE - Does not override pending switchleg request. |
| 0 | 1 | 0 | 1 | Reserved for future use. |
| 0 | 1 | 1 | 0 | Interrogate system status used in debugging. Does not override pending switchleg request. |
| 0 | 1 | 1 | 1 | Reserved for future use. |
| 1 | 0 | 0 | 0 | Request for analog sensor reading whose sensor address is in data field 1. |
| 1 | 0 | 0 | 1 | Interrogate relay status- overrides any pending switchleg request. |
| 1 | 0 | 1 | 0 | Interrogate current system status - override any pending switchleg request. |
| 1 | 0 | 1 | 1 | Not used |
| 1 | 1 | 1 | 1 | |

Modes 5 and 6 (see Table 1) are transmitted by tranceiver decoder 56. Data fields 0 and 1 contain either the current state of the relays or the activated switchlegs by the remote user.

Referring now to FIG. 6(c) mode 7 is also sent by the transceiver decoder 56 and indicates, in the high order nibble of data field 0, a second set of auxiliary function words f0 and sf1 specifying the type of data found in data field 1 and in the low order nibble of data field 0. This second auxiliary function word is used to send the analog sensor reading as well as information used in testing the transceiver decoder 56. Table 3 summarizes this second auxiliary function word.

TABLE 3

SECOND AUXILIARY FUNCTION WORD

| $sf_1$ | $sf_0$ | |
|---|---|---|
| 0 | 1 | System status contained in low nibble of data field 0 and in data field 1. |
| 1 | 0 | Analog Data enclosed in data field 1 - addressed in low nibble of data field 0. |

The fifth and last byte of the transmission block (see FIG. 6(a)) is the parity error check word. This generates even parity for every four bits of data of the previous four bytes of the transmission block. Before any action is taken by transceiver decoder 56, a parity check on the previous bytes is performed with the error check word to determine the validity of the transmission block. If an error is detected, no action will occur and the transceiver decoder will continue its normal activity and wait for a new command from the controller 50, or remote user input.

Mode 0 is the binary bit pattern 000 shown in Table 1. This is the fastest mode providing the highest degree of system throughput. This mode, sent by the controller 50, informs a transceiver decoder 56 that load control data is contained in data fields 0 and 1. Transceiver decoder 56, upon receipt of this data block, performs an address and error check using the error check word and immediately installs the specified states of relays 60.

Modes 1 and 2 provide a higher level of data security at a reduced system throughput than mode 0. Mode 1 indicates to transceiver decoder 56 that load control information is contained in data fields 0 and 1, as in mode 0. However, no action occurs until after a second transmission, mode 2, which must follow immediately. The mode 2 transmission consists of complementary redundant load control information in data fields 0 and 1. After the reception of mode 2, data fields 0 and 1 of mode 1 and mode 2 are exclusively OR'ed together to insure that each appropriate bit position differs in logic level indicating valid data before actuation occurs. If the transmission is made out of sequence, that is, mode 2 before mode 1, or if the data field bits agree in logic level, then an error condition is said to exist and no action by the transceiver decoder will take place.

Mode 3 is an interactive sequence of data transfer to and from transceiver decoder 56. It provides the highest degree of data security at the slowest system throughput. The sequence of events in this communication scheme are in the following order.

a. Controller 50 specifies load control information in data fields 0 and 1 as in mode 0.

b. Transceiver decoder 56 performs an address and error check on this transmission block and immediately responds by transmitting the load control information from data fields 0 and 1 back to controller 50.

c. Controller 50, upon receipt of this data, verifies that the loading pattern is correct and then immediately transmits a positive acknowledge so that load actuation can take place. If controller 50 receives conflicting load control data, it will issue a negative acknowledge signal indicating to transceiver decoder 56 to abort the transmission sequence.

d. Transceiver decoder 56, upon receiving a positive acknowlegement, will then install the specified loading pattern. If at any time the transmission of this information is out of sequence or a negative acknowledgement is received, transceiver decoder 56 will abort this operation.

Mode 4 specifies a particular task to be performed which may require a response by the transceiver decoder 56 to controller 50. The mode 4 task is described in Table 2 and is specified in data field 0.

The state of an individual relay can be modified by controller 50 without affecting the other loads connected to a transceiver decoder 56. Controller 50 can also request a reading of an analog sensor whose address appears in data field 1. Controller 50 can interrogate the status of the loads controlled by transceiver decoder 56.

Mode 5 is transmitted by transceiver decoder 56 and contains the current state of the relays in force in response to a read request from controller 50.

In mode 6, the state of an activated switchleg is transmitted to controller 50 by transceiver decoder 56. A switchleg 68 is activated by a user and indicates whether the position is on or off.

Mode 7 contains status information requested by controller 50. Transceiver decoder responds in this mode for the following two cases:

a. Analog Sensor Reading An analog sensor (such as transducer 112 shown in FIG. 5) whose address is in the low order nibble of data field 0 is supplied in data field 1. This is only sent back to controller 50 after it has requested the analog sensor reading.

b. System Inquiry Mode

This mode is used for testing and debugging transceiver decoder 56. When controller 50 asks for system status, the low order nibble of data field 0 will contain the condition of several user selectable jumpers. Data field 1 will contain the value of the data rate counter used in determining the logic level inputs from data line.

Up to eight switches 68 can be connected to switchleg input circuit 106 of transceiver decoder 56 providing programmable remote user inputs to controller 50. Switches 68 can be either maintain or momentary type. The type of switchleg is determined at the time of installation a jumper selection at switchleg jumper 104 (see FIG. 5). When momentary switches are selected, transceiver decoder 56 will only transmit data indicating the state or direction of the contact when there is a MAKE condition or on positive action only. For the maintain switches, transmission to controller 50 will occur on a MAKE or BREAK condition, i.e., whenever the switchleg changes state. Switchleg actuation is achieved asynchronously and independently of any activity of controller 50 and other transceiver decoder 56 connected with data line 58. This independence allows each transceiver decoder 56 to function without any critical system timing and thereby reduces system complexity and its susceptibility to erroneous action while increasing system throughput. Activation of a switchleg input by the closure of a switch 68 asynchronously causes a signal to be sent to controller 50 requesting an override instruction for a particular relay 60 and its associated load. If controller 50 has been programmed to respond to the activation of switch 68, a command will be sent to the transceiver decoder 56 associated with the relay requiring activation.

Transceiver decoder 56 contains filtering and debouncing logic for eliminating multiple switchleg actuations and for rejecting errors caused by noise. Switchleg inputs are read at 80 msec intervals and require that the user enable a switch for at least 100 msec to guarantee a true reading.

When a switch 68 is activated by a remote user, a switchleg output word is formed in data fields 0 and 1 of a transmitter buffer in transceiver decoder 56. The switchleg word is then transmitted to controller 50 as soon as the data line is deemed free. Data field 0 will contain the particular switchlegs that have been activated and data field 1 contain the desired state. The bit positions that are set in data field 0 indicate which switchlegs were activated by the remote user. The corresponding bit positions in data field 1 indicate the state of the activated switch 68 (on or off). For example, referring to FIGS. 6(d) and 6(e), if switchleg 6 has been activated, then data bit 6 will contain a 1 in data fields 0 and the corresponding bit position in data field 1 will contain the state of the switchleg (logic 1 for on and logic 0 for off).

If data line 58 is in use, transceiver decoder 56 will standby, latching the switchleg request until the information can be sent. Therefore, the switchleg actuation is not lost and does not require multiple actuations by the user. If while transceiver decoder 56 is standing by another switchleg is activated or if multiple switchleg inputs occur at the same time or if the same switchleg is reactivated, then all the inputs will be added to the current switchleg output word waiting to be sent to controller 50. All inputs are latched and provide "N-key rollover" insuring accurate readings even if multiple switches are simultaneously actuated. This will guarantee that no data is lost due to the interaction of the other devices.

The transmission of the switchleg data occurs asynchronously with controller 50. This eliminates the need for slow polling methods. The throughput is therefore a function of the current activity on the data bus.

FIGS. 7-17 detail the specific circuitry and logic functions performed by transceiver decoder 56. The heart of each transceiver decoder 56 is a 3870 single chip microcomputer 100 which contains a 2K ROM program providing all required logic functions.

Transceiver Decoder Microcomputer-Connections

Microcomputer 100 is a general purpose microcomputer that is transformed into a special purpose microcomputer by its particular program burned into read only memory (ROM). All logic functions of transceiver decoder 56 are carried out by microcomputer 100. Signal or pin names as used throughout this specification can be correlated to those shown on FIG. 7.

Figure 7:
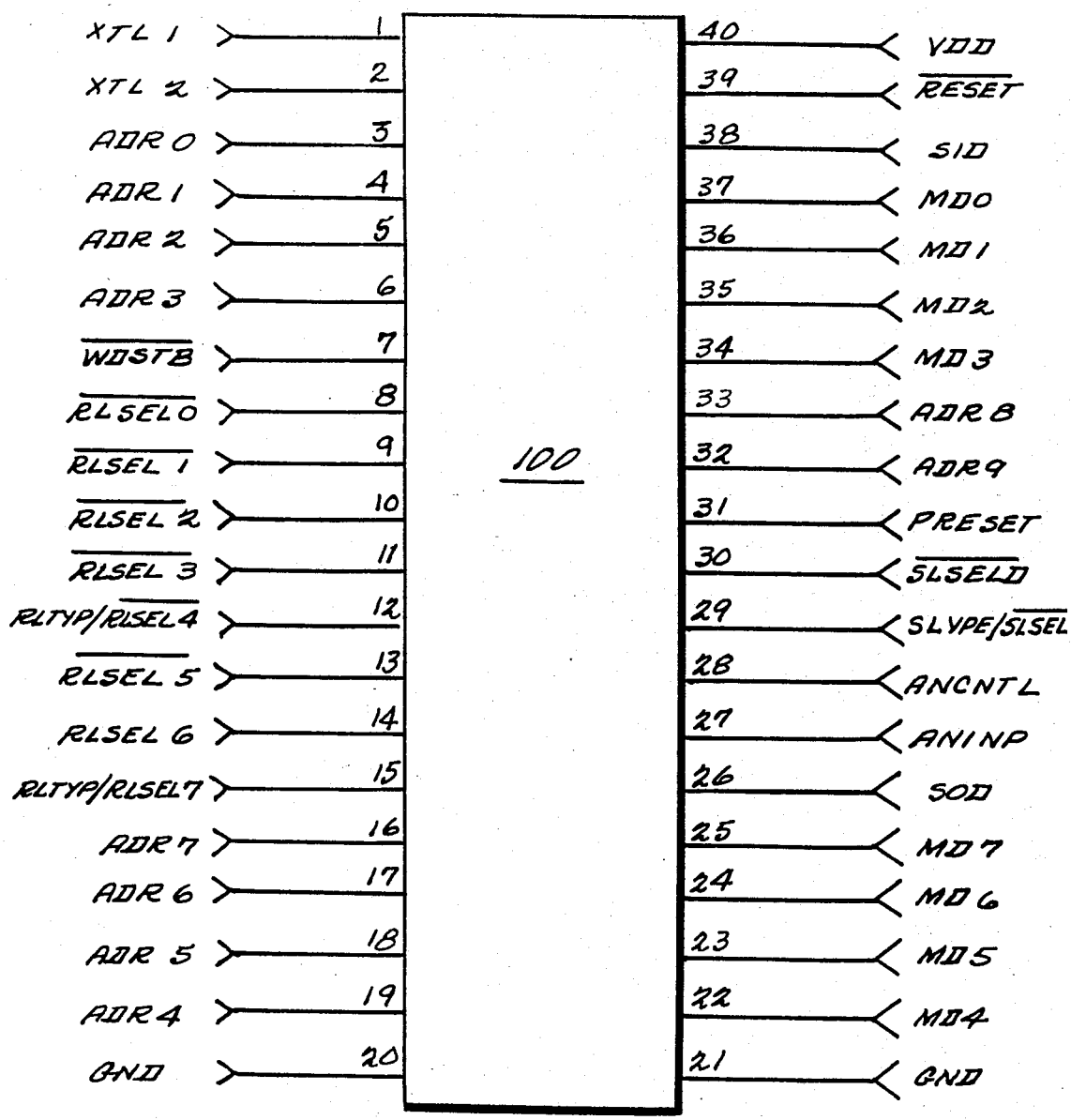
FIG. 7 is a detailed signal and pin assignment for the microcomputer in a transceiver decoder.

Referring now to FIG. 7, there is shown a detailed signal and pin assignment for microcomputer 100. The address bus includes pins 3-6, 19-16 and 33-32, respectively. Serial input data from data line 58 is coupled into SID on pin 38. Serial output data to data line 58 is coupled from SOD pin 26. The digital signal representing the status of the analog sensors coupled to analog sensor section 110 (see FIG. 6) is coupled into ANINP pin 27. Selection of particular banks of relay drivers is made by signals on a relay bank selection bus including RESEL0 ... RESEL7 at pins 8-15 respectively. Particular relay drivers within each bank are selected by MD0-MD7 at pins 37-34 and 22-25 respectively. Switchleg inputs 106 are multiplexed onto the MD0-MD7 lines.

Figure 8:
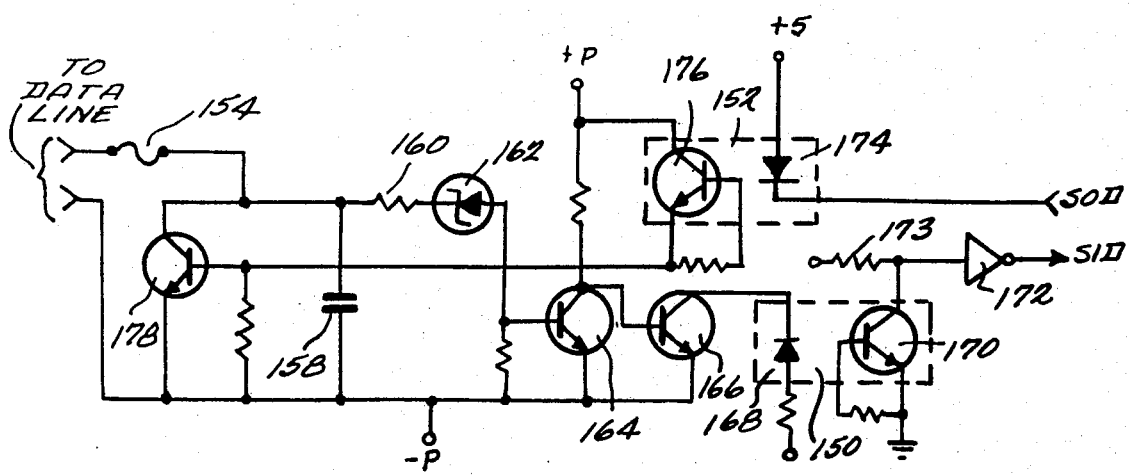
FIG. 8 is a schematic diagram of the data input and output circuit of a transceiver decoder.

Referring now to FIG. 8, there is shown a schematic diagram of data input and output circuit 108.

Transceiver Decoder Data I/O

Data input and output circuit 108 provides isolation between data line 58 and microcomputer 100. Specifically, isolation from data line 58 to input SID (pin 38 of microcomputer 100) is provided by an optoisolator 150. Isolation from the data output SOD (pin 26 of microcomputer 100) to data line 58 is provided by a second optoisolator 152. All circuitry from the data line side of optoisolators 150 and 152 to data line 58 are powered by an isolated power supply providing voltages +P and −P.

Data is coupled to and from data input and output circuit 108 via a fusable link 154. A high impedance is provided to the data line by a series resistor 160 in the data path. A small amount of filtering is provided by a capacitor 158 across the data line. Only minimal filtering is required because the primary filtering is handled by digital signal processing techniques within microcomputer 100. A zener diode 162 establishes a 10 volt threshold level for decoding the logic levels of received data. This threshold provides a certain measure of noise immunity.

The normal state of data line 58 is active (high impedance) when the line is free. This corresponds to a voltage level of greater than 10 volts between the two wires of the twisted pair forming data line 58 in accordance with the definition of the active state and the detailed discussion of the communication link.

A voltage of greater than 10 volts at data line 58 effectively turns on transistor 164 which turns off transistor 166 and maintains optoisolator 150 in an off condition. Since the normal condition is low power, there is very little stress on optoisolator 150, enhancing system reliability. When optoisolator 150 is off, the collector of transistor 170 is pulled up to five volts by a resistor 173 coupled thereto. Because amplifier 172 is an inverting amplifier, a logic level zero will appear at the data input SID for coupling into pin 38 of microcomputer 100. In summary, the normal, active state of the data line (data line 58) impresses a logic level zero on the SID input of microcomputer 100.

When data line 58 is driven by controller 50 or another transceiver decoder 56 to a voltage level of less than 10 volts between the wires of the twisted pair, zener diode 162 blocks current to transistor 164 causing it to be in the cut off state. Transistor 164 then turns on transistor 166 which causes optoisolator 150 to turn on (current through diode 168). The turning on of optoisolator 150 causes transistor 170 to turn on thereby establishing a zero level at the input of amplifier 172 and a logic level one to appear at the data input SID of microcomputer 100. Thus, when the data line is driven to an inactive state (low impedance) a logic level "1" will appear at the data input SID of microcomputer 100.

When microcomputer 100 of a transceiver decoder 56 wants to drive the data line (data line 58) it must bring the data line to an inactive (low impedance) state. No transceiver decoder 56 is capable of sourcing current onto the line, but rather drives the data line 58 to a lower impedance state thereby impressing a signal upon it. Only controller 50 sources current onto data line 58. There are two states defined for the data line: a high impedance state (greater than 90 ohms) wherein the voltage level between the wires of data line 58 exceeds 10 volts and a low impedance state (less than 50 ohms) wherein the voltage level between the wires of the twisted pair is less than 10 volts. This impedance level difference allows the use of bus arbitration. In order to drive the data line, a transceiver decoder 56 must drive the data line to a low impedance condition. A logic level "0" appearing at the output data line SOD of microcomputer 100 will turn on an LED 174 within optoisolator 152. Optoisolator 152 includes a phototransistor 176 which is turned on by the conduction of LED 174 thereby supplying current from the isolated power supply to the output drive transistor 178. Turning on transistor 178 across the data line sinks enough current so that the voltage level between the wires of data line 58 falls to less than 10 volts and the impedance between the wires drops below 50 ohms. Current is sunk through fusable link 154. If transistor 178 fails so as to present a low impedance between its collector and emitter, data line 58 is effectively shorted. By virtue of data line 58 being held in a low impedance state for an abnormal length of time, controller 50 detects a malfunction and responds by sending a pulse of approximately one amp down data line 58. This pulse is designed to blow fusable link 154 of the malfunctioned transceiver decoder 56 thereby severing that particular transceiver decoder from data line 58. This detection and subsequent response by attempting to blow fusible link 154 on a malfunctioning transceiver decoder 56 constitutes the self clearing mode of the transceiver decoder operation.

As stated, optoisolators 150 and 152 and an isolated power supply provide isolation between microcomputer 100 and the data line. This isolation helps to maintain the integrity of data line 58 and provides noise immunity. Data line 58 runs throughout the entire system and is quite long. It is possible for noise to be coupled into data line 58 from various electrical sources. Even if the line were brought to a level of 1,000 volts with respect to earth ground, isolation prevents this higher voltage level on data line 58 from affecting either controller 50 or microcomputer 100. Both controller 50 and microcomputer 100 will still be able to distinguish active and inactive data levels by sensing the differential voltage between the wires of data line 58.

By using a twisted pair for data line 58, common mode rejection is enhanced. A property of twisted pair is that in the presence of a strong magnetic field, signals coupled into one wire of the twisted pair will also be coupled into the other wire. Common mode noise is therefore rejected on input and output circuit 108 and only the differential signal between the wires of data line 58 is amplified and decoded. If one wire of the twisted pair of data line 58 were referenced to ground, this would not be possible.

Analog Sensor Section

Figure 9:
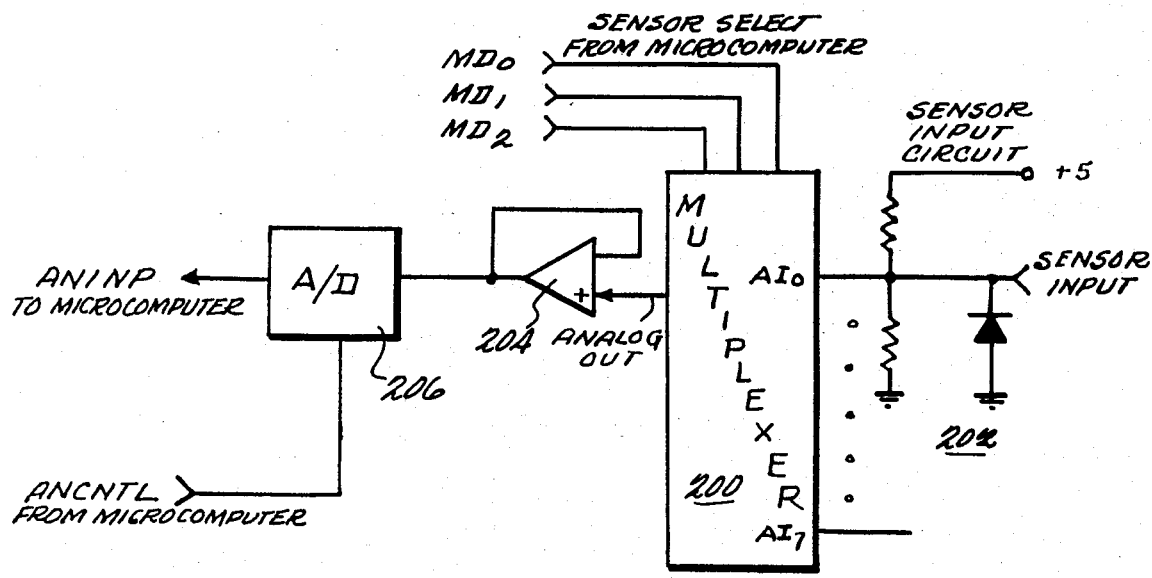
FIG. 9 is a schematic and block diagram of the analaog sensor section of a transceiver decoder.

Referring now to FIG. 9 there is shown a more detailed diagram of analog sensor section 110 of a transceiver decoder 56. Analog sensor section 110 accommodates up to eight analog inputs for coupling to analog devices such as photocells and thermistors. These analog inputs are periodically interrogated by controller 50 to determine the ambient conditions that exist at a remote control point. Light and temperature levels can be read by connecting the appropriate sensors to analog sensor section 110.

One of eight analog inputs is selected by a multiplexer 200 having sensor select inputs multiplexed onto the MD0, MD1, and MD2 outputs (pins 37, 36, and 35) of microcomputer 100. Utilizing these three sensor select bits, multiplexer 200 is able to select one of eight sensor input circuits 202. A representative sensor input circuit 202 is shown coupled to the $AI_0$ input of multiplexer 200. The output of multiplexer 200 is coupled through an isolation amplifier 204, suitably a voltage follower circuit utilizing an operational amplifier, to an analog to digital converter 206. Analog to digital converter 206 is suitable a dual slope A/D converter having a maximum conversion cycle time of 22 milliseconds. The output of analog to digital converter 206 is coupled to the ANINP input (pin 27) of microcomputer 100. Ramp control of analog to digital conveter 206 is coupled to the ANCNTL output (pin 28) of microcomputer 100.

Watchdog Reset

Figure 10:
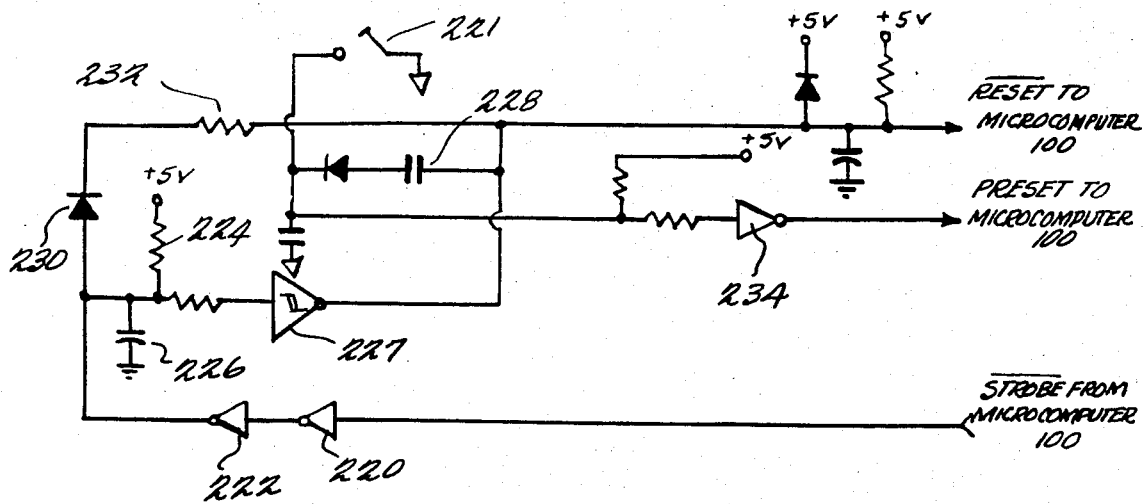
FIG. 10 is a schematic diagram of the watchdog reset circuit of a transceiver decoder.

Referring now to FIG. 10 there is shown a detailed schematic diagram of Watchdog reset circuit 120. Because transceiver decoder 56 is based upon a single chip microcomputer 100, it operates as a sequential machine executing a sequence of instructions. In its normal power-up mode, the microcomputer must periodically reset itself in order to justify its operation back to its zero address. In addition, the sequence of instructions to be executed depends upon values stored within internal registers such as its program counter. Due to the presence of noise, it is possible for internal registers to drop a bit of data in such a manner that the data bit loss would cause microcomputer 100 to execute an improper instruction, an out of sequence instruction, or execute on data rather than the appropriate instruction. It is possible for microcomputer 100 to be forced into an operating loop which effectively latches the entire board and prevents it from responding to any command from external sources. In addition, it is advantangeous to provide the capability to override the system at a transceiver decoder 56 in the event of a controller 50 or data line 58 failure.

Watchdog reset circuit 120 provides a source of periodic reset pulses for justifying the operation of microcomputer 100 to its zero address for the start of each of its normal cycles through its address sequence. In addition, watchdog reset circuit 120 provides reset pulses to justify microcomputer 100 after a dropped data bit has caused it to stray from its normal sequence of operation. In addition, an emergency override switch 221 provides a preset signal for causing all relays to be turned on regardless of signals on data line 58. Operating in such a preset mode effectively returns all relays associated with the preset transceiver decoder 56 to circuit breaker control.

In the absence of a STROBE signal from microcomputer 100, watchdog reset circuit 120 provides RESET pulses to the microcomputer every 240 milliseconds. Thus, in the absence of a STROBE pulse from microcomputer 100, the microcomputer would be returned to its zero address every 240 milliseconds when a pulse is received at its reset input. The time period between reset pulses is controlled by the RC time constant associated with a resistor 224 and a capacitor 226. When allowed to charge, in the absence of a STROBE pulse, capacitor 226 charges through resistor 224 to a predetermined voltage level, typically 2.5 volts. When capacitor 226 is permitted to charge, it trips a Schmitt trigger 227 having an inverting output coupled to the reset input line of microcomputer. Once activated by a RESET signal, microcomputer 100 executes the instruction at its zero address location as if it were being powered up for the first time.

When microcomputer 100 is functioning normally and executing its instructions in proper sequence, it clears the charge from capacitor 226 by coupling a STROBE signal through inverting amplifiers 220 and 222 to capacitor 226. When microcomputer 100 is operating properly, a STROBE of approximately 4 microseconds appears every 25 milliseconds. These STROBE pulses, 25 milliseconds apart, clear the voltage from capacitor 226 before Schmitt trigger 227 can be triggered, thus inhibiting RESET pulses from watchdog reset circuit in the absence of STROBE pulses from microcomputer 100, a feedback loop formed by a diode 230 and resistor 232 cause a periodic pulse signal to appear on the RESET line. In essence, the STROBE can be thought of as the heart beat of microcomputer 100. Until that heart beat is sensed, the RESET line will continue to pulse the microprocessor until the computer is operating properly and the STROBE is found.

When controller 50 fails or data line 58 is severed, no data can be transferred to the relays associated with a transceiver decoder 56. Therefore means are provided for overriding data line control of relays. The activation of preset switch 221 provides a signal forcing all relays on thereby returning them to circuit breaker control without the necessity for hard wiring them around a transceiver decoder 56. This provides an emergency backup for a controller 50 or data line 58 failure.

Preset switch 221, when activated, provides a pulse on the RESET line. When microcomputer 100 senses a RESET pulse, it reads the PRESET input line. The PRESET input line is coupled through inverter 234 to preset switch 221. The activation of switch 221 effectively grounds the input of inverter 234 thereby providing a logic level 1 at its output. That logic level 1 at the output of inverter 234 appears on the preset line simultaneously with the appearance of a RESET pulse on the reset line. Switch 221 is AC coupled by a capacitor 228 to the RESET line. AC coupling insures that the RESET line will pulse while the PRESET line stays at DC. This insures that when microcomputer 100 responds to a reset pulse, it will read the PRESET as being at a logic level 1 and know that it should go into a PRESET state and force all relays on.

Switchleg Input

Figure 11:
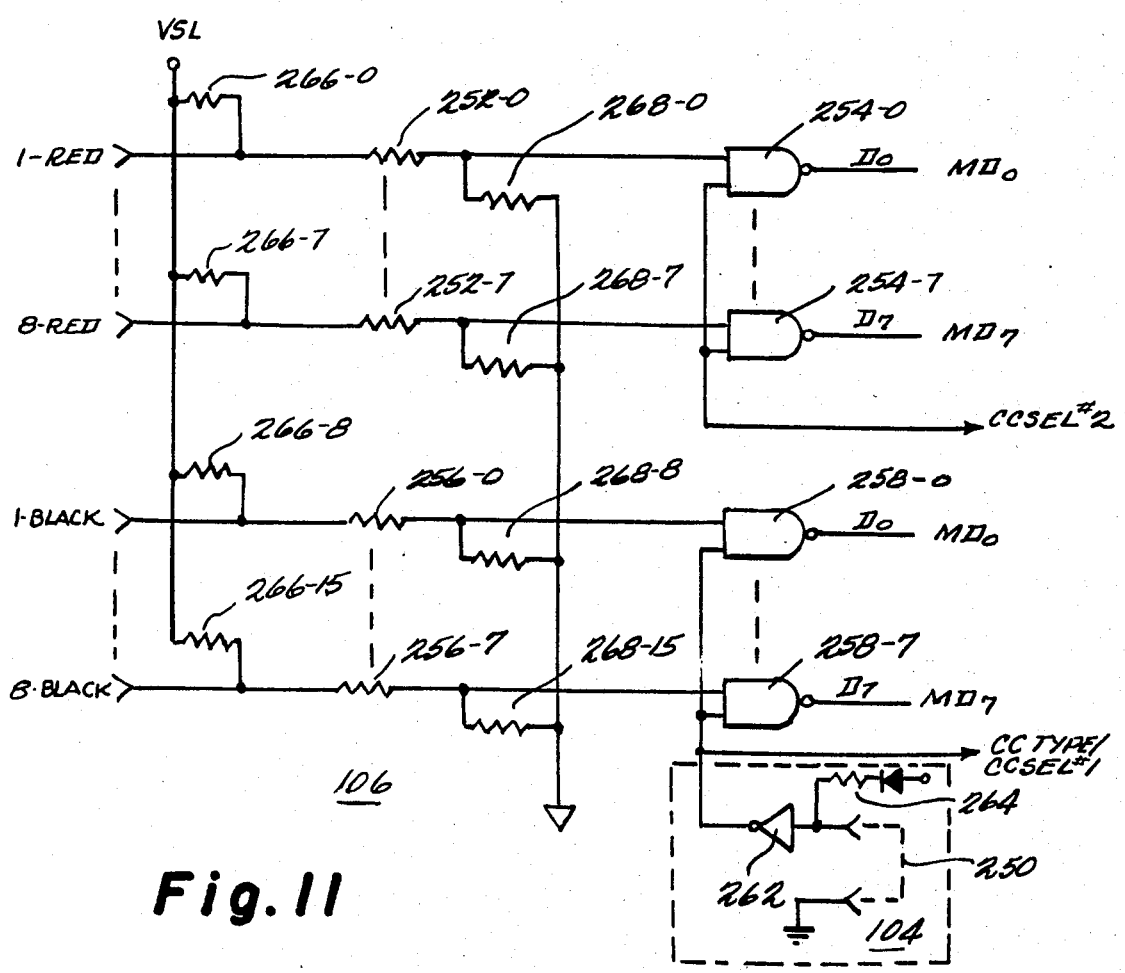
FIG. 11 is a schematic diagram of the switchleg input circuit and switchleg jumper circuit of a transceiver decoder.

Referring now to FIG. 11, there is shown a detailed schematic diagram of switchleg input circuit 106 and switchleg jumper circuit 104. Each transceiver decoder 56 includes switchleg inputs for up to eight remote switches 68. By the coupling or decoupling of a switchleg jumper 250, switchleg jumper circuit 104 appropriately instructs microcomputer 100 so that either momentary or maintained type switches can be used. There are 16 inputs labeled 1-red . . . 8-red, 1-black . . . 8-black. Each of the red inputs is coupled through a resistor 252-0 . . . 252-7 to one input of a NAND gate 254-0 . . . 254-7 respectively. The outputs of NAND gates 254 are coupled respectively to the MD0 . . . MD7 input lines of microcomputer 100. The other inputs of NAND gates 254 are tied together and coupled to the CCSEL #2 input of microcomputer 100. Similarly, the eight black switch inputs are respectively coupled through resistors 256-0 . . . 256-7 to one input each of NAND gates 258-0 . . . 258-7 respectively. The respective output lines of NAND gates 258 are also coupled to the MD0 . . . MD7 inputs of microcomputer 100. The second inputs of NAND gates 258 are tied together and are coupled to the CCTYPE/CCSEL #1 input of microcomputer 100. The output of switchleg jumper circuit 104 is also coupled to the CCTYPE/CCSEL #1 input of microcomputer 100.

The switchleg voltage VSL is 20-40 volts generated in a switchleg power supply (not shown). The combination of resistors 266 and 268 coupled into each of gates 254 and 258 provide appropriate voltage levels to operate the gates so as to provide a 3.5-5 volt output for coupling into standard TTL logic entering microcomputer 100. When jumper 250 is removed from jumper circuit 104, the input of an amplifier 262 is pulled up to a 5 volt level by the action of a resistor 264 in series with a diode. This forces the inverted output of amplifier 262 and the connected CCTYPE/CCSEL #1 input at pin 29 of microcomputer 100 to a logic level 0. With pin 29 of microcomputer 100 at a logic zero, switchleg input circuit 106 is set for the use of maintain switches, that is switches which maintain contact between their poles rather than making a momentary contact and returning to an open normal condition immediately thereafter. By forcing pin 29 of microcomputer 100 to a saturated logic level zero state, it is impossible to drive that input line high and thus, one input to each of gates 258 will be a logic level zero disabling gates 258 since they are not used with maintain switches.

The maintain mode switches will be coupled to the eight red inputs coupled to gates 254. Again, a maintain mode switch maintains contact closure until the contact is opened. Using maintain mode switches, coupled to the eight red inputs, if a switch is open, the red input line is pulled up to switchleg voltage VSL which is between 20 and 40 volts depending upon voltage variations and loading. A voltage of 20-40 volts is utilized so that there will be sufficient voltage to prevent the mechanical contacts of the switches from building up an oxide layer thereby rendering the switch unreliable. Also, the use of a voltage between 20 and 40 volts, as opposed to using logic level voltage, allows the switchleg to be somewhat remote from the transceiver decoder 56. With the IR loses associated in long wires, a logic level signal would require that the switches be only a short distance from transceiver decoder 56. With voltage VSL applied, the switchleg voltages are divided through resistors 266, 252 and 268. This voltage division provides a standard TTL logic level of 3.5-5 volts.

In order to utilize momentary type switches, jumper 250 is inserted in switchleg jumper circuit 104 thereby forcing the output of amplifier 262 to a logic level 1. Thus, gates 258-0 . . . 258-7 become operable and momentary type switches or contact closures can be coupled between the corresponding red and black inputs for a particular switch member.

Microcomputer 100 at intervals of from 75 to 80 milliseconds reads (polls) the switchlegs connected to its MD0-MD7 inputs at its pins 37-25 respectively. This reading operation is done without any command from any other devices connected to its data lines. This reading is under the logic control of microcomputer 100. It is done independently and on its own, and in accordance with its internal clock. Essentially, microcomputer 100 is a sequential machine which operates through its various states to do specific tasks. Even though it is continuously interrogating the switchlegs to determine their status, it is not continuously sending that data back to controller 50. The only time a switchleg 68 requires action is when there is a change in its state. That is, when its state is different from the previous reading of it 75 to 80 milliseconds before. For example, assuming a switch 68 is coupled to switchleg input 1, the input of NAND gate 254-0 will be allowed to pull up to a plus voltage thereby enabling the gate. When a switchleg is interrogated or polled by microcomputer 100, a high voltage appears on the output of gate 254. A TTL gate is used where output is of the open collector variety. It will either saturate and stick the line at a logic zero or be in a high impedance state. Therefore, the driving of the line to a logic level 1 is performed on internal pull-up devices or in this case by resistors located internal to the microcomputer 100.

Once a transition has been made from an open switch state to a closed switch state or from a closed switch state to an open switch state a change in disposition of the switch from the prior reading about 80 milliseconds ago takes place. A series of readings then follows in order to prevent an erroneous reading. To guard against erroneous readings, 10 readings are successively made and they just all have the same reading for a switch to be accepted as a closure or as a change of state. Once the change of state has been verified, the microcomputer 100 will attempt to access the data line in order to transmit this information to controller 50.

In the case of a momentary type switch only the positive action of temporarily closing the switch is meaningful. Contact is made and then broken. However the breaking of contact is not acted upon. Momentary type switch connections can be used for photo relays and other types of condition responsive devices having a switch-like trigger mechanism coupled to a switchleg input as well as for momentary type switches. By using momentary type switches you can connect the off stage of the switch to different switch numbers to provide increased flexibility for the system.

Relay Drivers

Figure 12:
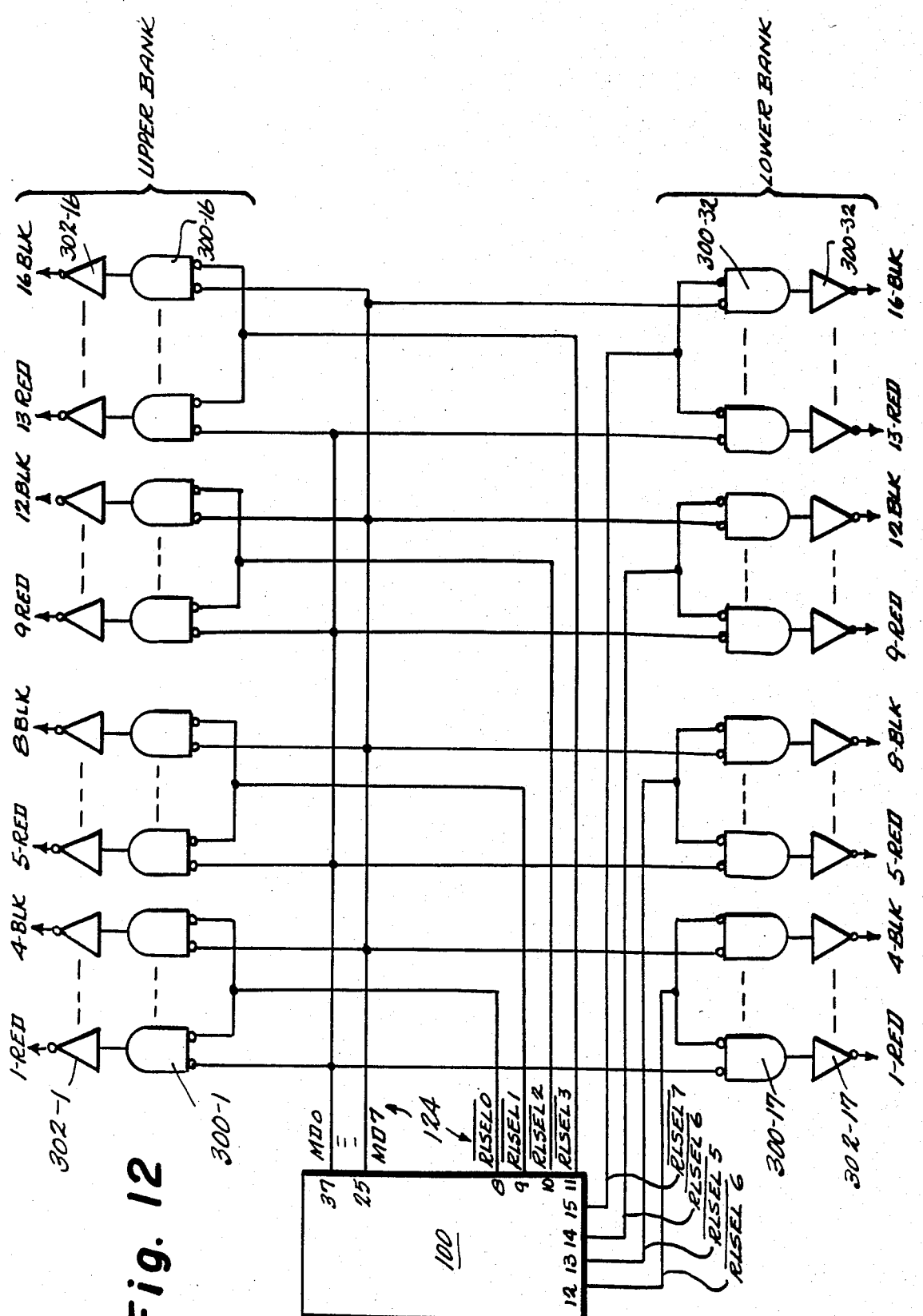
FIG. 12 is a schematic diagram of the relay drive circuitry of transceiver decoder.

Referring now to FIG. 12 there is shown a detailed schematic diagram of relay drivers 126 coupled to their drive matrix lines 124. Transceiver decoder 56 includes a bank of 32 relay drivers organized into an upper bank of 16 relay drivers and a lower bank of 16 relay drivers. Each relay is associated with two gates 300 and two amplifier drivers 302. In the upper bank the gates are numbered 300-1 . . . 300-16 and the inverting amplifiers are numbered 302-1 . . . 302-16. In the lower bank the gates are numbered 300-17 . . . 300-32 and the amplifier drivers are numbered 302-17 . . . 302-32. In both the upper and lower banks, the gate/amplifier combinations are wired in groups of eight (to control four relays) with one gate input commonly connected. Pins 8-15 of microcomputer 100 are relay bank select signals RLSEL0 . . . RLSEL7 respectively and are coupled to the common input of each group of gates/amplifiers. Data bus lines MD0 . . . MD7 on pins 37-25 of microcomputer 100 are connected one each to each of the gates/amplifiers of each group. Thus, a particular relay bank select signal coupled with a specific address line defines only one relay including two gates 300 and two amplifier drivers 302. When using all 32 relays, transceiver decoder 56 is assigned two consecutive addresses, the first being an even address and the second being the odd address immediately following the even address.

Microcomputer 100 responds to the even and odd address coding wherein the least significant figure is in essence a "don't care" bit. The particular transceiver decoder 56 addressed will respond to either of these addresses. The upper bank of relay drivers will respond to the even address and the lower bank of relay drivers will respond to the odd address. Each of amplifier drivers 302 includes a Darlington pair (open collector) of transistors for directly driving a relay. It further includes a transient protection diode to protect from inductive load kick-back from a relay that has been triggered. The relays are standard latching type relays having three wires, one red and one black and one blue. The red and black wires of the relay connect to a pair of adjacent amplifier drivers 302. A pulse on the black wire forces the relay into an open state and a pulse on the red wire forces the relay into a closed state. The blue wire is the common and is coupled to a power supply. To drive the relay to either of its bistable states (open or closed) the red or black wire is grounded by an enabling pulse from amplifier driver 302.

As stated, each group of four relays is coupled to a relay bank select signal (one of pins 8-15 of microcomputer 100). Enabling a given bank select signal enables up to four relays. However, due to excessive loading on the semiconductors in the relay drivers, only two relays in a bank are activated at the same time. Data appearing on data lines MD0 . . . MD7 specify the particular state for each relay winding when a relay becomes energized. After the data is stable on lines MD0 . . . MD7, a bank select signal activates a particular bank. Relays are pulsed in groups of two and microcomputer 100 cycles through the entire bank of relays repeatedly. It takes 25 milliseconds to pulse a single relay winding and two such windings are activated at the same time. After a period of 200 milliseconds 16 relays have been pulsed. However, because of mechanical shifts in the properties of the relays, i.e., armature displacements, etc., a particular relay may not be pulsed on or off as desired. Therefore, each relay is pulsed three times so that in case it does not change state on the first pulse it will probably change state on either the second or third pulses. Three full cycles require 600 milliseconds so that an entire bank of 16 relays can be pulsed three times in succession.

Transceiver Decoder Microcomputer Logic Function

All logic functions of transceiver decoder 56 are carried out by microcomputer 100. Microcomputer 100 is suitably a 3870 (originally developed by MOSTEK and also sourced by Fairchild and Motorola). The 3870 is a single chip microcomputer system providing standard architecture that is customized through the use of firmware built into an on-chip read only memory (ROM) to perform the specific logic functions required. With the specific ROM code set forth below in Appendix A, microcomputer 100 is transformed into a custom transceiver decoder chip.

As customized by the ROM code set forth in Appendix A, microcomputer 100 performs tasks falling within four main codes of operation:
 data communications handling
 relay actuation and control
 contact closure (processing)
 analog sensor handling Along with these four main modes of operation, a built in fifth mode allows the contents of its internal ROM to be dumped and checked. Even though all logic functions are built into the ROM code for microcomputer 100, these logic functions can be represented by functional blocks and can be hard wired using standard logic components.

Figure 13:
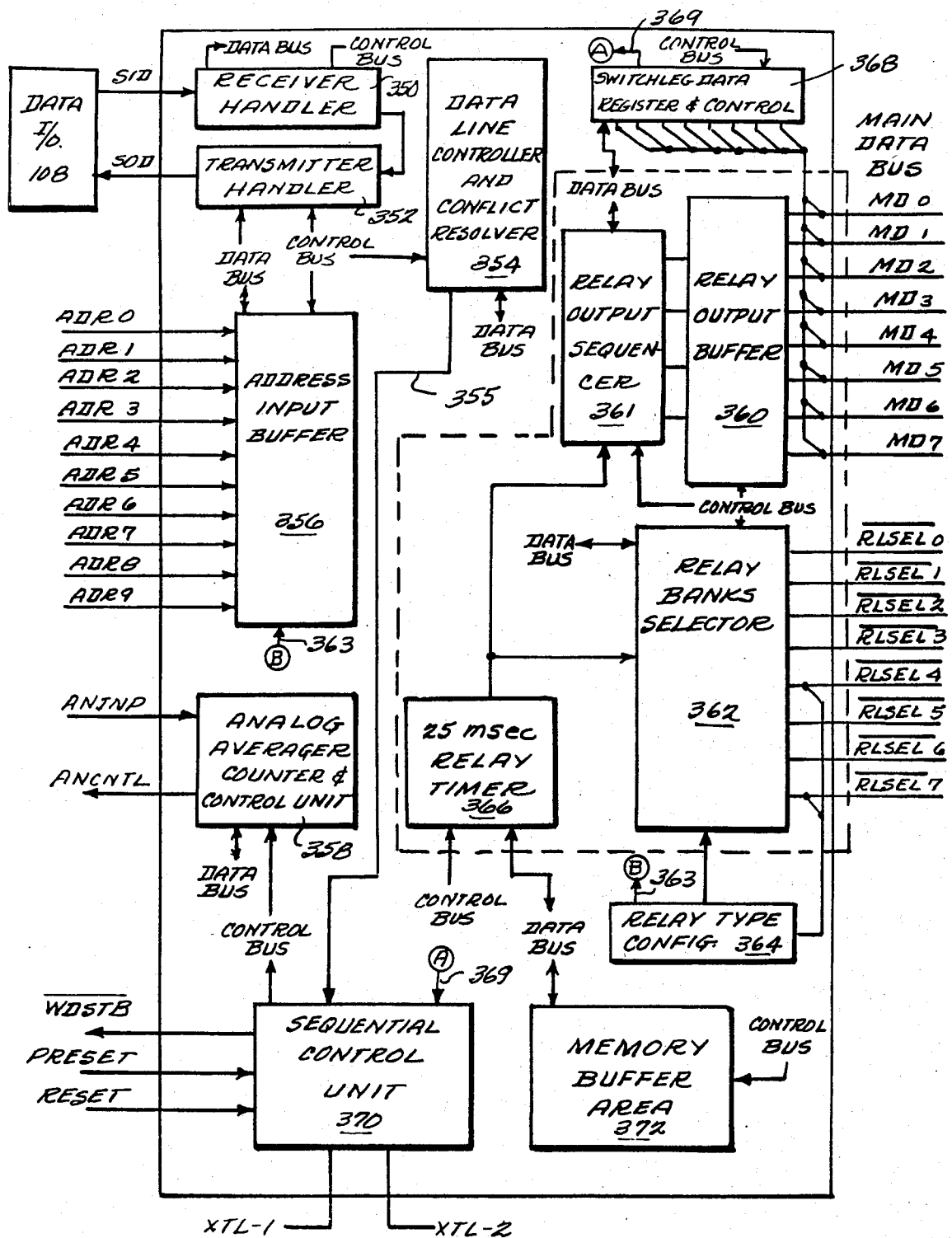
FIG. 13 is a functional block diagram of the microcomputer in each transceiver decoder.

Referring now to FIG. 13 there is shown a functional block diagram of microcomputer 100. In essence, these functional blocks correspond to the blocks that would exist if the functions of transceiver decoder 56 were hard wired into discrete components instead of being implemented by a specialized microcomputer. Overall sequential control of the logic function of microcomputer 100 is provided by a sequential control unit 370 which receives signals indicating the status of various blocks and generates control signals on control lines for stepping the various functional blocks through their respective tasks. Data received from data line 58 through ata I/O 108 is coupled to the SID (pin 38) input of microcomputer 100 and is received by a receiver handler 350. Receiver handler 350 provides input logic and phase locked loop filtering for incoming data. Data to be transmitted by microcomputer 100 through data I/O 108 is coupled onto the SOD line (pin 26) of the microcomputer from a transmitter handler 352.

Receiver handler 350 and transmitter handler 352 are each coupled to a data line controller and conflict resolver 354 for resolving conflicts between received data and data to be transmitted. Transmitted data includes switchleg activations, analog sensor inputs and relay status information. When data has been received by data line controller and conflict resolver 354 from receiver handler 350, the data line controller and conflict resolver sends a signal on a signal line 351 to sequential control unit 370 indicating that data has been received.

Switchleg data on the MD0 to MD7 data bus is coupled into a switchleg data register and controller 368. Switchleg data register and controller 368 includes registers storing the previous state of each switch input and its current state and includes a comparator for comparing the values in these two registers to determine if a switch has changed state; i.e., a user has turned his switch on or off. When a status change of a switch is indicated switchleg data register and controller 368 sends a signal on a line 369 to sequential control unit 370 indicating that switch data must be sent onto data line 58 for transmission to controller 50. Sequential control unit 370 then issues a command on its control line to switchleg data register and controller 368 causing it to couple its data onto an internal data bus for transfer to data line controller and conflict resolver 354 for ultimate transfer through transmitter handler 352 and data I/O 108 to data line 58. An internal 8 bit wide data bus couples all block sending and receiving data so that data can be freely transferred between blocks at the direction of control signals from sequential control unit 370. Sequential control unit 370 is coupled to each functional block through control lines for disseminating control signals for controlling the flow of data and sequence of operation of the blocks.

An address input buffer and latch 356 is coupled to the address lines ADR0 ... ADR9 at pins 3-6 and 19-16 and 33-32 respectively. Address input buffer 356 couples address information into microcomputer 100 and latches the address information into a set of buffers so that the information can subsequently be compared with the address called for in data received from data line 58. When data is received through receiver handler 350 and coupled to data line controller and conflict resolver 354, the data line controller and conflict resolver sends a signal on a line 355 to sequential control unit 370 indicating that data has been received. Through its control lines, sequential control unit gates the address information in address input buffer 356 (address set for this particular transceiver decoder 56 by the user when installed) to data line controller and conflict resolver 354 for comparison with the address received from data line 58. The address information from address input buffer 356 is transferred to data line controller and conflict resolver 354 on the internal data bus. If an address comparison indicates a valid address (transmission intended for this transceiver decoder 56) a signal is sent on line 355 to sequential control unit 370. Sequential control unit 370 causes a decode of the data and takes the required action. The required action may be the taking of an analog sense reading, the activation of a relay or the sending of relay status information. If an analog sensor reading is required, sequential control unit 370 activates through its control lines an analog averager and control unit 358.

Analog averager counter and control unit 358 accepts analog information ANINP coupled to pin 27 of microcomputer 100 from an A/D converter 206 and provides the ANLNTL signal to the A/D converter. Analog averager counter and control unit 358 has the capability to control the dual slope of A/D converter 206 and to read a dual slope conversion circuit within the A/D converter. Analog averager counter and control unit 358 includes an analog averaging counter and a control circuit. In essence, it is merely a preset counter that is gated on and off to count up or down from a preset count.

If sequential control unit 370 determines from the decoded data that a relay activation is required, it activates via its control lines, a relay output sequencer 361. Sequential control unit 370 also enables data line controller and conflict resolver 354 to impress the data in data fields 0 and 1 onto the internal data bus for coupling to relay output sequencer 361. A control signal from sequential control unit 370 causes the data in relay output sequencer 361 to transfer its data to a relay output buffer 360 for driving relays through lines MD0 to MD7. Simultaneous with the control signal to relay output sequencer 361, a control signal is coupled to a relay timer 366 which is a 25 msec. timer. Relay timer 366 activates a relay bank selector 362 causing it to select the appropriate relay bank through lines RLSEL0 to RLSEL7. Together, relay timer 366, relay bank selector 362, relay output sequencer 361 and relay output buffer 360 determine the duration and which relays are to be actuated and to which states they are to be actuated. These four blocks are activated simultaneously by sequential control unit 370 in response to the received data in data line controller and conflict resolver 354. Relay timer 366 controls the sequencing of the eight banks of relays by relay bank selector 362 so that there is a continuous cycling from one bank to the next so that relays will be pulsed in turn at regular intervals.

A relay type configuration 364 determines whether the particular transceiver decoder 56 has a 16 or 32 relay configuration. A 16 relay configuration transceiver decoder responds to a single address and a 32 relay configuration transceiver decoder responds to two consecutive addresses, one for each bank of 16 relays. The information from relay type configuration 364 is coupled to address input buffer 356 via a line 363 so that the address input buffer will provide both address to data line controller and conflict resolver 354 for address comparison.

A memory buffer area 372 contains system constants representing the previous states of relays and other information, such as sensor input values that are provided by interrogation (polling) by controller 50 over data line 58.

Figure 14:
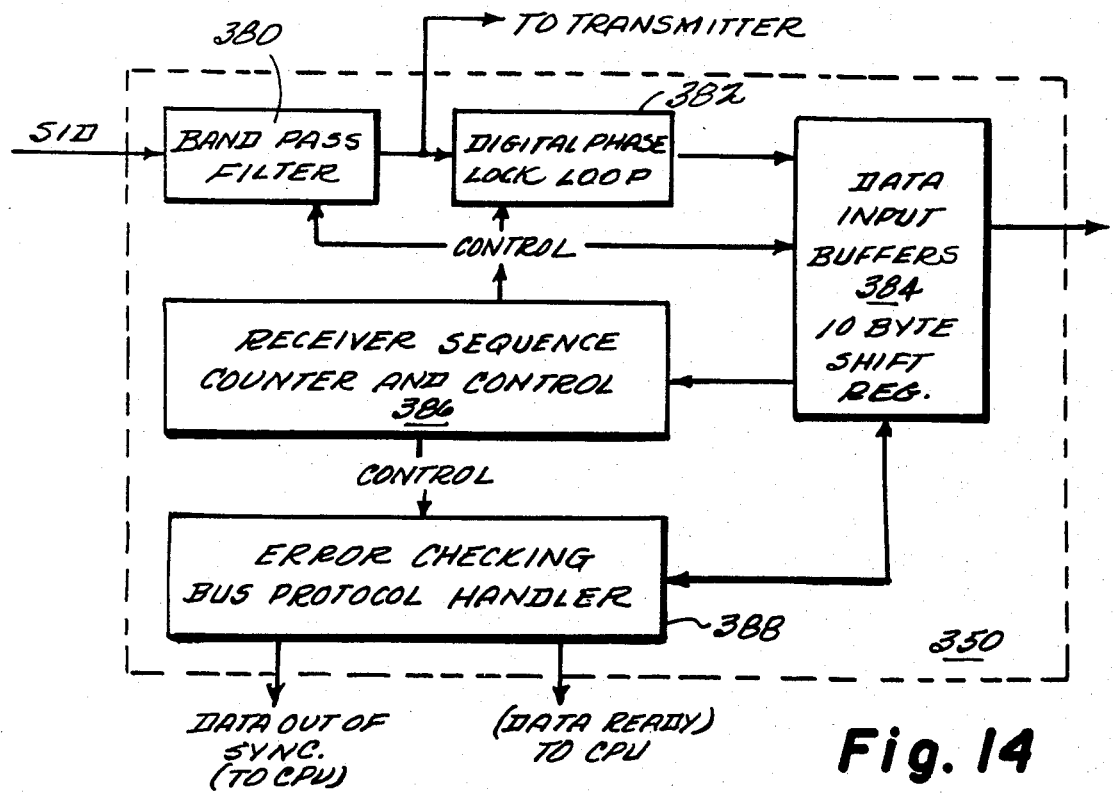
FIG. 14 is a more detailed block diagram of the receiver handler block shown in FIG. 13.

Referring now to FIG. 14 there is shown an expanded block diagram of receiver handler 350. Data bus input SID at pin 38 of microcomputer 100 is coupled to a band pass filter having an initial band width of 4–5 KHz. The output of band pass filter 380 is coupled to the input of a digital phase lock loop 382. During the time that a preamble is being received, digital phase lock loop 382 operates with a capture range of about 5 KHz. After phase lock has been achieved and the preamble has been "captured", the bandwidth of the loop tightens. After lock-up has occurred, digital phase lock loop 382 supplies information to data input buffers 384. In the meantime, a receiver sequence counter and control unit 386 adjusts the bandwidth of band pass filter 380. This bandwidth can be adjusted by triggering a set of transmission gates switching on various capacitive values on an opamp active filter.

After lock has been achieved, digital phase lock loop 382 is reduced in bandwidth to roughly one-half of the frequency that is being transmitted and has been captured. This frequency is determined only by the data coupled into microcomputer 100 on the data input bus SID. Since all transceiver decoders 56 and controller 50 are operating asynchronously, the capture range of digital phase lock loop 382 must be wide. Receiver sequence counter and control 386 is coupled to a conventional error checking bus protocol handler 388 which is a standard parity bit generator and comparator. The free output lines from receiver handler 350 shown in FIG. 15 correspond to the signal line from the receiver handler to data line controller and conflict resolver 54 in FIG. 14. A flow chart of the function of receiver handler 350 is set forth in FIG. 15.

Figure 15:
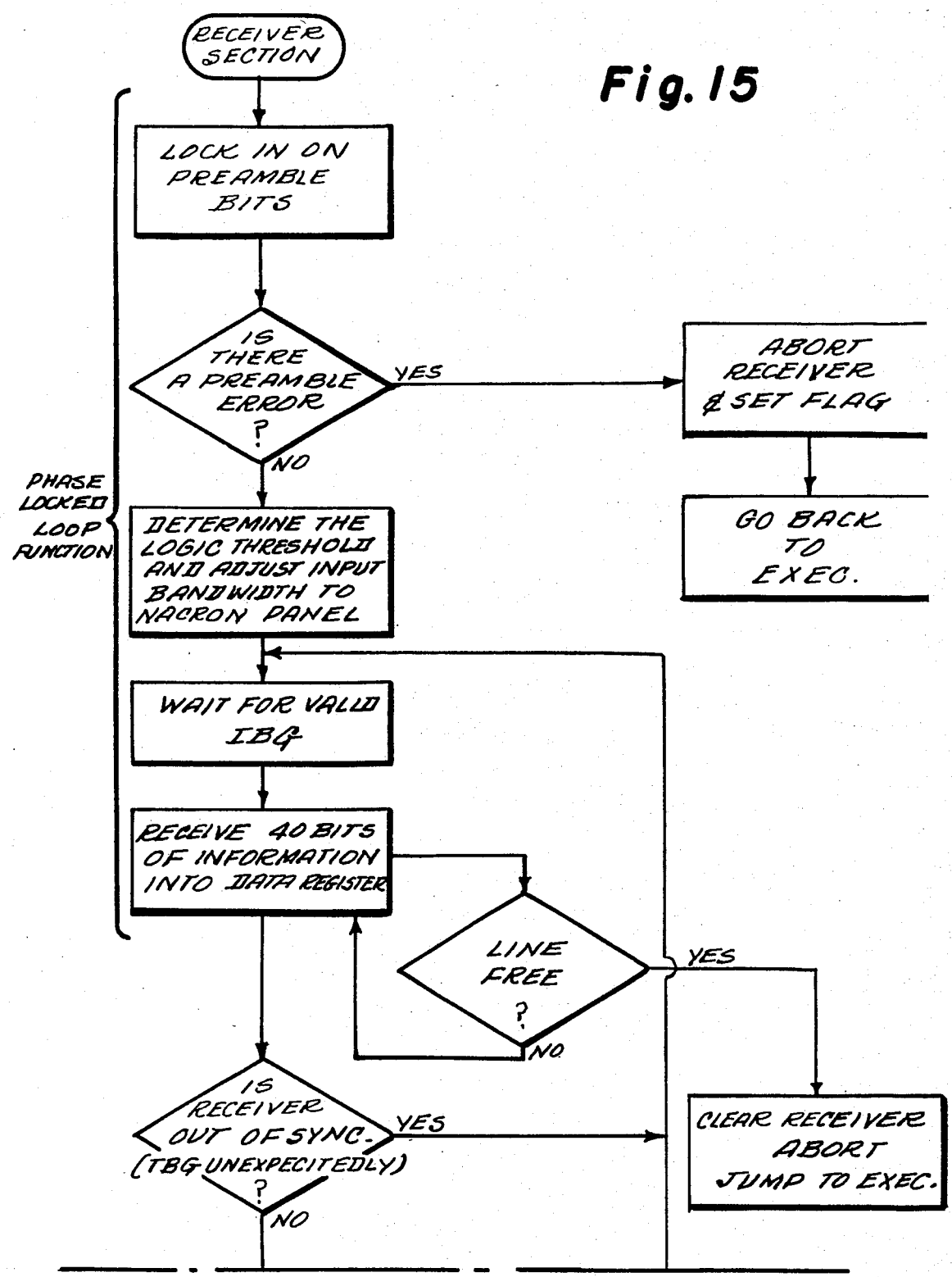
FIGS. 15 and 15a show a flow chart illustrating the logic flow of the receiver function of a transceiver decoder.
Figure 15A:
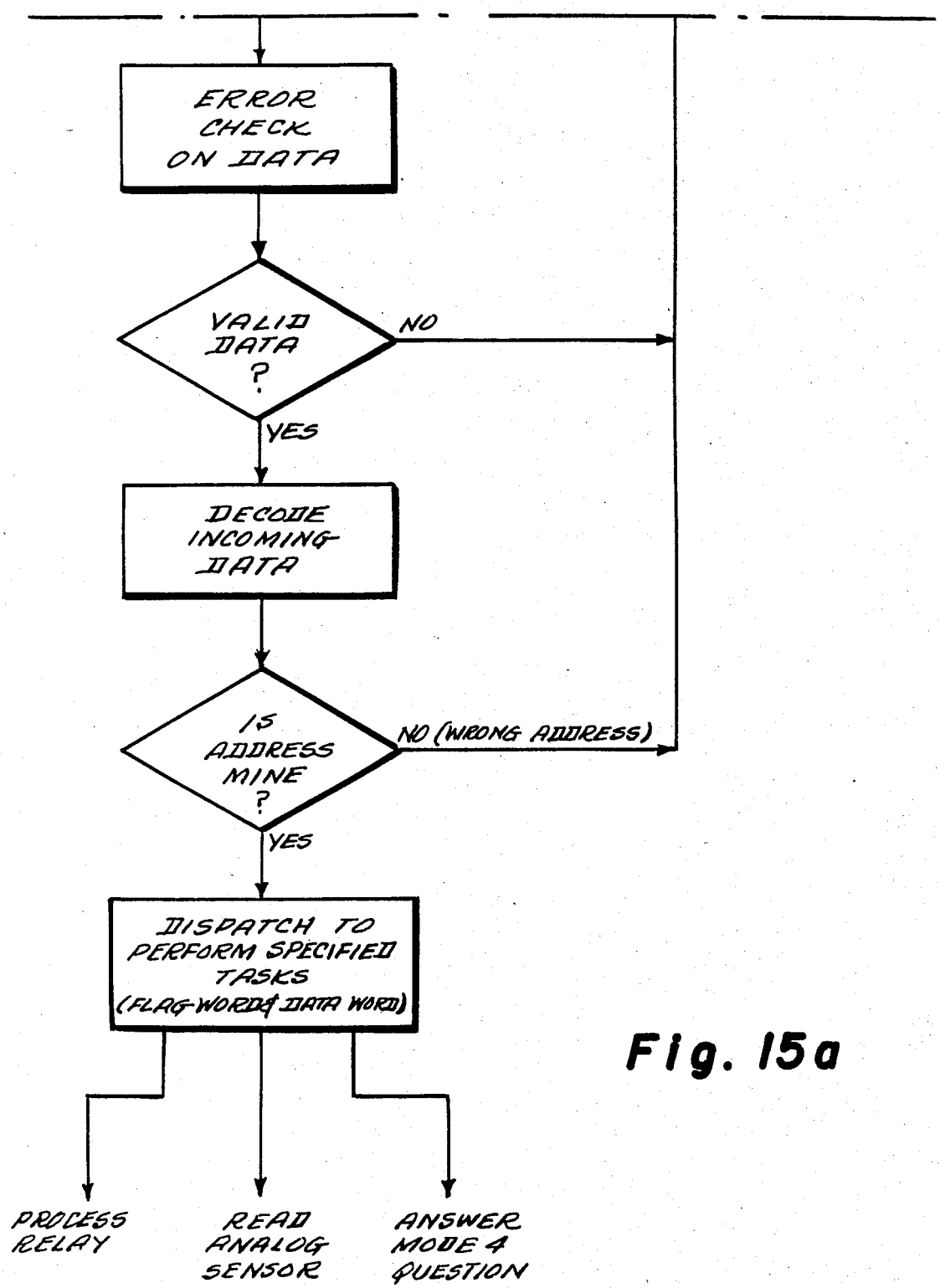

Referring now to FIG. 15, the logic flow of the receiver function of transceiver decoder 56 is set forth. When data line 58 is observed to be in an IBG (low impedance state), data begins to flow with a preamble. During the transmission of the preamble, a digitally simulated phase locked loop locks onto the preamble bits. A minimum of four bits is required for lock. The initial bandwidth of the loop allows lock to a data rate of 300–5000 bits/second.

After preamble lock, it is determined whether or not there is a preamble error.

If there is a preamble error, the received function is aborted and a flag set, control is returned to the executive.

However, if there is no preamble error, the logic thresholds are determined from the preamble bits. During the discussion of the communications link, it was defined that the preamble bits were a 50% duty cycle signal and that logic levels one and zero were determined as a pulse width greater than or less than the width of the preamble bits. It is from the four preamble bits received that the logic threshold levels are established from which logic ones and zeros will be decoded.

After logic level thresholds have been established, the band width of the digitally simulated phase lock loop is narrowed to a range more closely approximating the data rate established by the preamble. After a valid IBG, 40 bits of data are received into data input buffer 84. fter ata has been received into data input buffer 384, it is determined whether or not the receiver is out of sync. his is determined by the presence of an IBG at an unexpected point in time.

If the receiver is not out of sync, the data is checked by error checking bus protocol handler 388. If the data is determined to be valid, the data is decoded.

After data is decoded, the address transmitted is compared with the address of the transceiver decoder 56 receiving the data (see FIG. 6—Address Election Bus 102). If the address corresponds, the transceiver decoder 56 is dispatched to perform a specific task called for by the flag word and data word in the data received. This data could correspond to processing a relay function, reading an analog sensor, or answering a mode four interrogation by controller 50.

Returning to the reception of the 40 bits of information into data input register 384, a line check is performed to see if the line is free. If the line is not free, data is received, however, if the line is free, then the receiver is cleared and reception aborted, and control returned to the executive.

If the receiver is determined to be out of sync, then the receiver waits for another valid IBG. If the data check by error checking bus protocol handler 388 is determined to be invalid, then the receiver also waits for a valid IBG before proceeding. Furthermore, if when the address is compared, the address is not for a particular transceiver decoder receiving data, then that receiver aits for a valid IBG before proceeding. An expanded block diagram of the transmitter handler 352 is set forth in FIG. 16.

Figure 16:
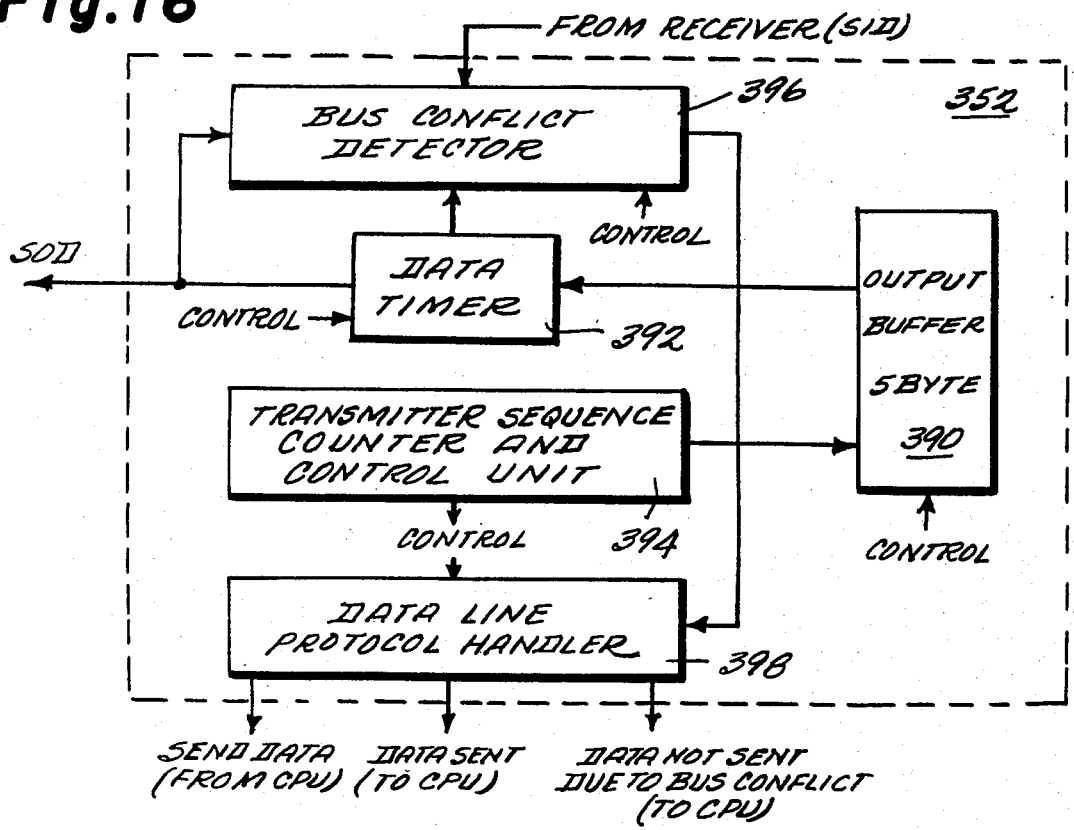
FIG. 16 is a more detailed block diagram of the transmitter handler block shown in FIG. 13.

Referring now to FIG. 16, there is shown a ore detailed blocked diagram of transmitter handler 352. An output buffer 390 is coupled to a data timer 392 which also receives information from a transmitter sequence counter and control unit 394. Data timer 392 is coupled to a bus conflict detector 396 also receiving a signal from receiver handler 350. Bus conflict detector 396 provides the arbitration between conflicting control points. The output of data timer 392 is coupled to the data output bus SOD. In addition, the output of bus conflict detector 396 is coupled to a data line protocol handler 398. The three signal line outputs shown at the bottom of FIG. 16 correspond to the signal line from transmitter handler 352 to data line controller and conflict resolver 354 shown in FIG. 13. The transmission sequence has already been detailed in the flow chart shown in FIG. 3. The function of bus onflict detector 396 has been detailed in FIG. 4 . An expanded block diagram of the switchleg data input circuit 368 is set forth in FIG. 17.

Figure 17:
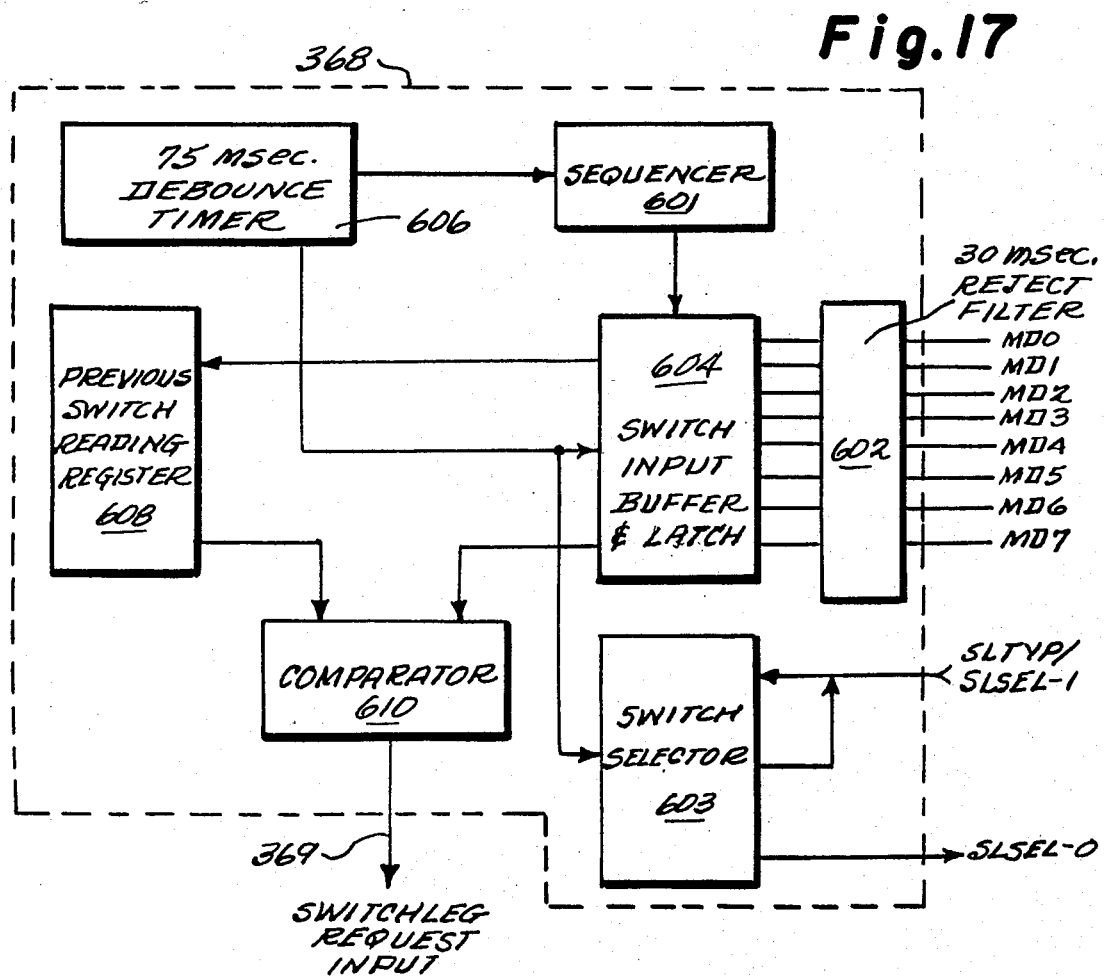
FIG. 17 is a more detailed block diagram of switchleg data register and control block shown in FIG. 13.

Referring now to FIG. 17, there is shown an expanded diagram of the switchleg data input section of the receiver handler. This section includes a 30 msec reject filter 602 coupled to a switch input buffer and latch 604. A 75 msec debounce timer 606 insures that the bouncing of a switch 68 will not produce a false triggering of the switchleg data input. A previous switch reading register 608 contains the status of each witch associated with a particular transceiver decoder 56 after its last switchleg entry. A comparator 610 coupled to the previous switch reading register 608 and to the switch input buffer 604 compares the states of the switch after its previous use and present activation to determine whether there has been a change. If a change is indicated, a switchleg request input signal is ctivated on line 369 (also see FIG. 14).

A sequencer 601 is a counter providing signals to switch input buffer 604 requesting an alternating read of the two banks of switchlegs. A switch selector 603 receives signals from sequencer 601 and timer 606 and determines which bank of switchlegs are to be read. The bank selection is indicated on the SLSEL-0 and SLSEL-1. The SLTYPP signal (pin 29 of microcomputer 100) is also coupled to switch selector 603 and determines whether momentary or maintain type switches are being used.

A complete printout of the ROM code specifying the entire program permanently fixed into microcomputer 100 included herein as Appendix A. All data values set forth therein are in hexadecimal format.

Controller-Hardware Overview

Figure 18:
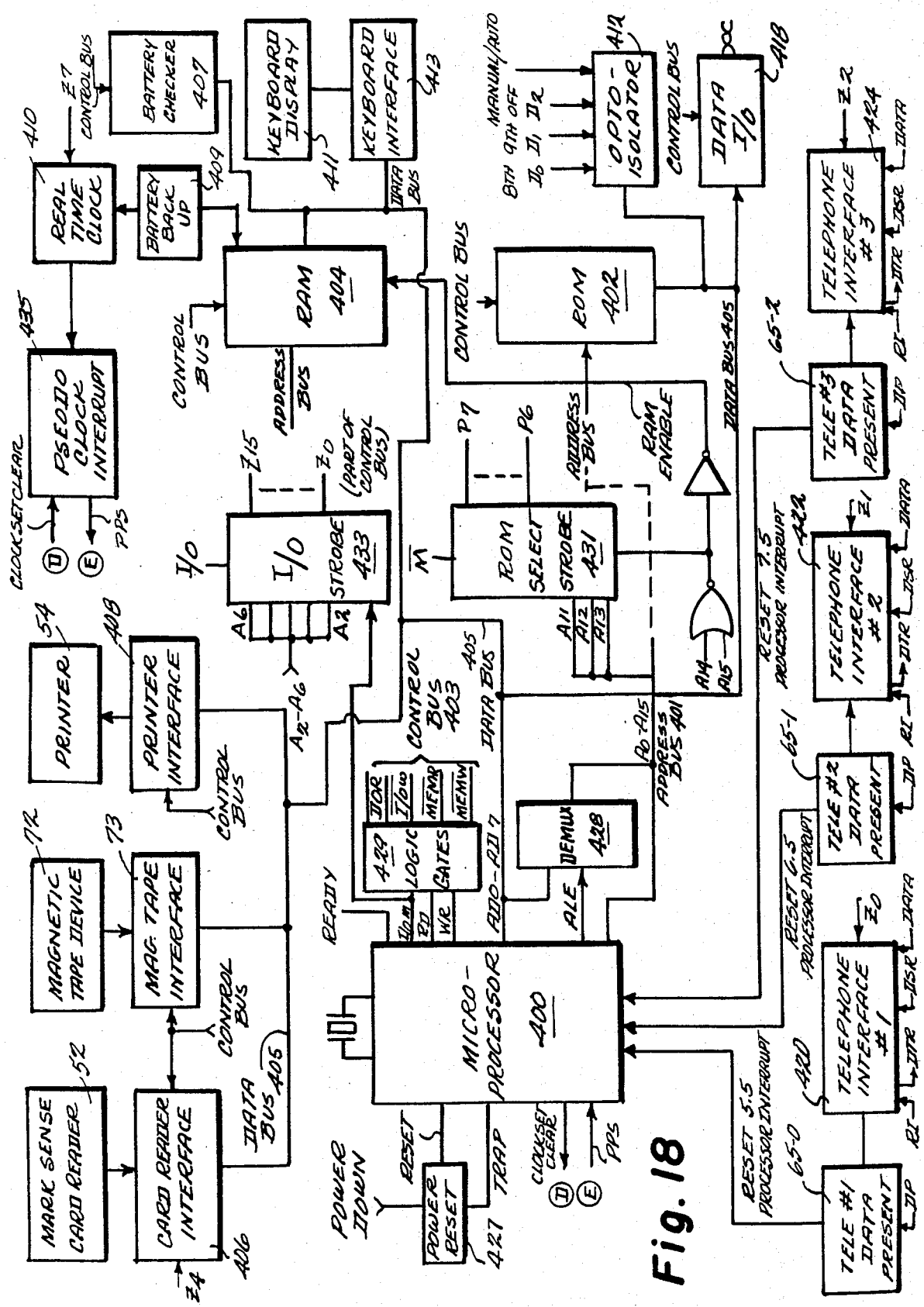
FIG. 18 is a general block diagram of the controller.

Referring now to FIG. 18, there is shown a general block diagram of controller 50. The specific logic functions required for programmable lighting control are implemented by a microcomputer including a microprocessor 400 and associated memory and input/output devices. Microprocessor 400, suitably an Intel 8085 is a general purpose device useable with a variety of input/output devices. It's coupled to memory and to input/output devices via an address bus 401, a control bus 403, and a data bus 405. Memory includes a ROM 402 and a RAM 404. The specific logic functions for performing programmable lighting control are "burned" into ROM 402 and transform microprocessor 400 and its associated memory and input/output devices into a fixed purpose computer. The user defined data base including sectors, patterns, schedule, switches and priority erase times is stored in RAM 404 and occupies 95% of its 32k storage capacity. A real time clock 410 tells controller 50 when to effectuate lighting changes in accordance with the user defined schedule. Both RAM 404 and real time clock 410 are backed up by a battery back up 409 including an internal battery and a connection for an external battery. Battery back up 409 maintains the data base stored in RAM 404 which would be otherwise volatile during a power outage. In addition, during a power outage, battery back up 409 maintains real time clock 410. When power returns after an outage, any load changes called for by the user defined schedule and not executed during the power outage can be caught up.

Mark-sense card reader 52, coupled through a card reader interface 406 provides the user a vehicle for conveniently defining the data base and rapidly entering that data base into RAM 404. Mark-sense cards having formats for sector, pattern, and schedule data are marked by the user and are then passed through card reader 52.

A keyboard/display 411 coupled through a keyboard display interface 413 provides for manual access by an operator and for a display of status information. Keyboard/display 411 includes a key lock switch for selecting either automatic or manual mode; a key lock switch for selecting alternate schedule overrides (8th day override; 9th day override and schedule off); tape control switches for selecting tape load or tape store; an output mode switch for selecting a lighted display or printer 54; a set of command keys for selecting program, display clear, manual control, set clock, or check status; a set of item keys for selecting pattern, schedule, sector, priority erase time, switch or sector override table data inputs; a set of number keys for specifying addresses of transceiver decoders, sector numbers, pattern numbers and the like, and several control keys. Using the various keys in combination a user can manually enter data, check the status of relays, switches, transceivers, etc. A lighted display indicates the time on real time clock 410 and annunciates failures in response to self-diagnostics. An audible alarm indicates certain types of failures including involved keyboard entries.

Magnetic tape evice 72 is coupled through a magnetic tape interface 73 and provides a non-volatile medium for storing the user defined data base after it has been entered via mark sense card reader 52 or keyboard/display 411. Thus stored data is in machine readable form and is in a suitable format to be laoded directly into RAM 404. In the event of a power failure longer than is protectable by battery back up 409, data is automatically read from tape device 72 upon power up.

Controller 50 further includes a standard RS232 serial printer interface 408 for coupling to printer 54. Printer 54 can provide, on user demand, a hard copy of the data base or a portion thereof or system status information. A printout might include a copy of the schedule in force during the automatic mode operation of controller 50, a list of sectors overriden, or a list of the status of all relays in the system.

The alternate schedule override switch (not shown) and the automatic/manual switch are coupled through an optoisolator 412 8th day, 9th day and schedule off alternate automatic schedules are respectively selected by lines $D_0$, $D_1$ and $D_2$ coupled to optoisolator 412.

A data input/output circuit 418 couples signals to and from data line 58, providing the necessary isolation.

Three telephone interfaces 420, 422, and 424, respectively coupled to ata sets 64-0, 64-1, and 64-2 couple telephone entered signals to data reset circuits 65-0, 65-1 and 65-2 respectively. Data preset circuits 65-0 to 65-2 indicate to microprocessor 400 that data has been entered by a telephone user and flags a request for telephone service.

A power reset circuit initializes microprocessor 400 after a power shut down.

Controller 50 utilizes a multiplexed bus for the lower order address A0–A7 and data D0–D7 lines. A demultiplexer and optical latch 428 performs the required multiplexing. An address latch enable signal ALE from microprocessor 400 latches in the lower order address bits, thus providing a 16-bit address line including A0–A7 from demultiplexer 428 and A8–A15 from the higher order address lines from microprocessor 400.

Control bus 403 includes four standard control signals: inut/output read (I/O R), input/output write (I/O W), memory read (MEMR), and memory write (MEMW) which, through logic gates 429 activate the various input/output devices and memory associated with microprocessor 400. The data bus 429 is bi-directional.

A ROM select strobe 431 coupled to address lines $A_{11}$, $A_{12}$, and $A_{13}$ selects ROM memory banks and an I/O strobe 433 provides strobe lines Z0–Z15 of control bus 403 for selecting particular input/output devices to be read or written.

A pseudo clock interrupt 435 receives a pulse each second from real time clock 410 and latches that pulse. In turn, pseudo clock interrupt 435 sends a pseudo pulse second signal PPS to microprocessor 400. A clock set clear signal from microprocessor 400 clears the latching of pseudo clock interrupt 435.

Memory Access Hardware and Battery Back-Up

Standard circuit techniques have been applied to access ROM 402 as well as RAM 404. The particular memory address is determined by a 16-line (A0–A15) address bus 426 emanating from microprocessor 00. The low order address byte (A0 to A7) is multiplexed on the address bus 426 (also called the address and data lines). An external low order address latch (demultiplexer 428) is used to demultiplex. This address is coupled to a ROM select strobe 430, suitably a standard 75LS138, which is a 1 out of 8 line selector. ROM select strobe 430 is used to select a given bank of memory. That is because the high order address bits are coupled to ROM select strobe 430. The low order address bits are coupled directly to the memroy to select a specific memory location to be accessed.

RAM 404 used is of the dynamic type. That is, it requires refreshing at specific intervals. This refreshing must take place within a 15 microsecond period. The dynamic memory used is based on the current state of the art. It is based on a standard 4116 16K memory integrated circuit. Since RAM 404 is dynamic, allowing greater storage density than that available in static memories, a multiplexed addressing scheme and refresh circuitry is utilized and is considered to be circuit overhead for maintaining this RAM 404.

RAM 404 and real time clock 410 are battery backed-up. Thus, if there is a power failure, microprocessor 400, ROM 402, and all the other input/output interfaces are allowed to fail and lose power. However, a battery back-up provides RAM 404 and real time clock 410, and the associated circuit overhead to maintain the current status of the controller 50. When power is reinstated, the system will self justify with respect to its time of day schedule. This is particularly important since RAM 404 contains temporary data of the disposition of remotely actuated overrides through switchlegs or through the telephone. This temporary data is not part of the data base defined by the user. Instead, at pedetermined times through the priority erase time feature of the controller 50, this temporary override information entered through switches and telephones is erased. If there is a power failure beyond battery life which backs up the real time clock 410 and RAM 404, then magnetic tape device 72 would be automatically load the required data base defined by the customer once power is reinstated. Once power is reinstated, the controller is capable of responding to switchlegs and telephone commands once this data base has been reloaded. Therefore, the system is capable of some operation after prolonged power outages or after short power outages without any user intervention. It is capable of loading itself and running without any outside commands. However, in the event that data is reloaded via magnetic tape after a power failure and real time clock 410 and RAM 404 were not kept alive using battery backup, the time of day would have to be manually reentered for automatic operation to take place. Without setting real time clock 410, only the manual control operations, or overrides through switches and telephones, would be operational.

Data Line Coupling to Controller

Figure 19:
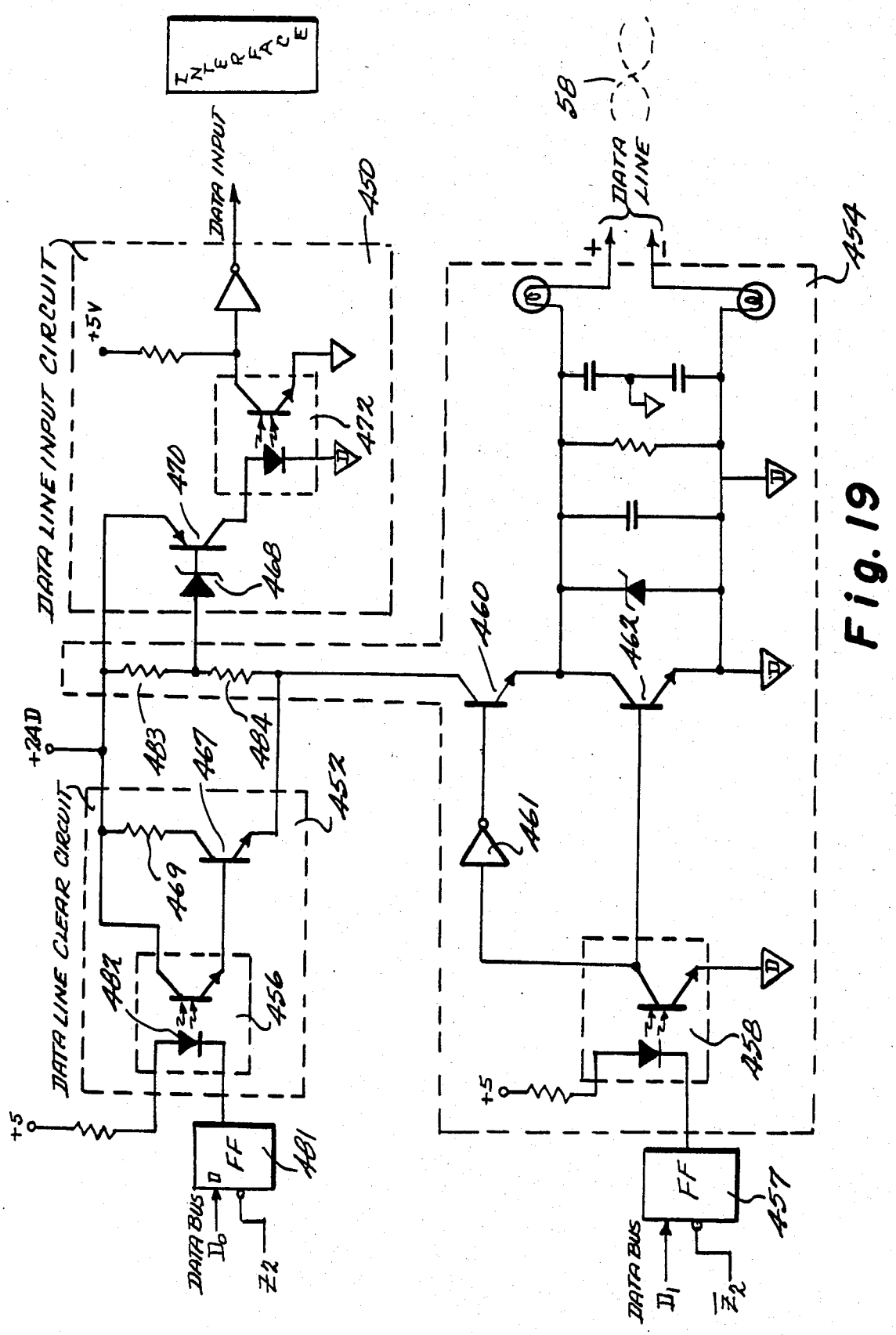
FIG. 19 is a schematic diagram of the data I/O circuit of the controller.

Referring now to FIG. 19, there is shown a schematic diagram of Data I/O 418 of controller 50. Data I/O 418 is responsible for driving and maintaining the data line (data line 58) and includes three sections: a data line input circuit 450, a data line clearing circuit 452 and a data line transmitter circuit 454.

As previously stated, the data line is an isolated communications channel and is not referenced to system ground. Isolation of the data line is provided at transceiver decoders 56 by optoisolators 150 and 174 (see FIG. 8). Similarly, isolation is provided at the controller end of the data line 56 by optoisolators 456, 458, and 472 associated with data line clearing circuit 452, data line transmitter circuit 454 and data line input circuit 450, respectively. All circuitry on the data line side of each of optoisolators 456, 458 and 472 is powered by an isolated power supply (+24 volts with respect to an isolated common ground connection D). This isolation insures that data line 58 is floating and is not referenced to system or earth ground. This isolation helps to provide noise immunity. Common mode noise is rejected and only differential signals (potential difference between the wires of the twisted pair) are detected and decoded.

Data line transmitting circuit 454 is used to send data onto data line 58 in accordance with data signals on data bus line $D_1$ and an enabling strobe signal Z2. Strobe Z2 is coupled to the clock input of a flip-flop 457. Data bus line $D_1$ is coupled to the data input of flip-flop 457. The output of flip-flop 457 is coupled to the cathode of a diode 459 in optoisolator 458. Data is impressed onto the data line by driving it to a low impedance state. A logic level "1" at the output of flip-flop 457 coupled to the diode of optoisolator 458 turns off the optoisolator thereby turning off a transistor 460 coupled thereto through an inverting amplifier 461. A transistor 462 coupled between the emitter of transistor 460 and isolated ground D is activated to bring data line 58 to the isolated ground level D through the collector-emitter junction of the transistor.

To maintain a high impedance state (greater than +10 V difference) on the data line, a logic level "0" is caused to appear at the output of flip-flop 457 to turn on optoisolator 458. Transistor 462 is turned off, pulling up ata line 58 to 24 volts through two resistors 483 and 484 coupled from the +24 volts (with respect to D) of the isolated power supply to the collector of transistor 460. The series combination of resistors 483 and 484 is 90-100 ohms thereby limiting the maximum current that can be drawn from the isolated power supply to 240 milliamps.

Data line input circuit 450 couples data from data line 58 to microprocessor 400 and is turned on and off in accordance with the varying current that is passed through a transceiver decoder 56. This passed through current affects the voltage rop across a resistor 483. If enough current is switched by a transceiver decoder 56, (approximately 150 milliamps) a diode 468 (a 4.8 V zener) becomes reversed biased. The cathode of diode 468 is coupled to the base of a transistor 470. Thus, when diode 468 becomes reversed biased, transistor 470 turns on. The turning on of transistor 470 turns on optoisolator 472 generating a signal for coupling to microprocessor 400. Therefore, if the line is externally driven to a low impedance state, i.e. by a transceiver decoder 56, then the data input to microprocessor 400 is a logic level 1.

Data line clear circuit 452 is used only when a data line failure condition exists. A data line failure condition exists when data line 58 is stuck such that there is a low impedance short between its twisted pair for an abnormally long period of time. Such a short can occur when transistor 178 in transceiver decoder 56 (see FIG. 9) fails with short between collector and emitter. When a low impedance short occurs on data line 58, no data can be transferred.

After controller 50 detects and diagnoses a stuck data line condition, data line clear circuit 452 provides a one amp pulse of current through data line 58 to intentionally blow fusable link 154 in the transceiver decoder 56 that is causting the short. To actuate a clear pulse, strobe line Z2 is enabled along with data line $D_0$. Data line $D_0$ is coupled to the input of a flip-flop 81. Strobe line Z2 is coupled to the clock input of flip-flop 481. The output of flip-flop 481 is coupled to the cathode of a diode 482 in optoisolator 56. By activating optoisolator 456, resistor 469 is placed in parallel with two resistors 483 and 484, lowering the effective impedance between the +24 volts (D) power supply and transistor 460. This lower impedance causes a 1 amp current pulse to be impressed through transistor 460 to the data line.

Magnetic Tape

Figure 20:
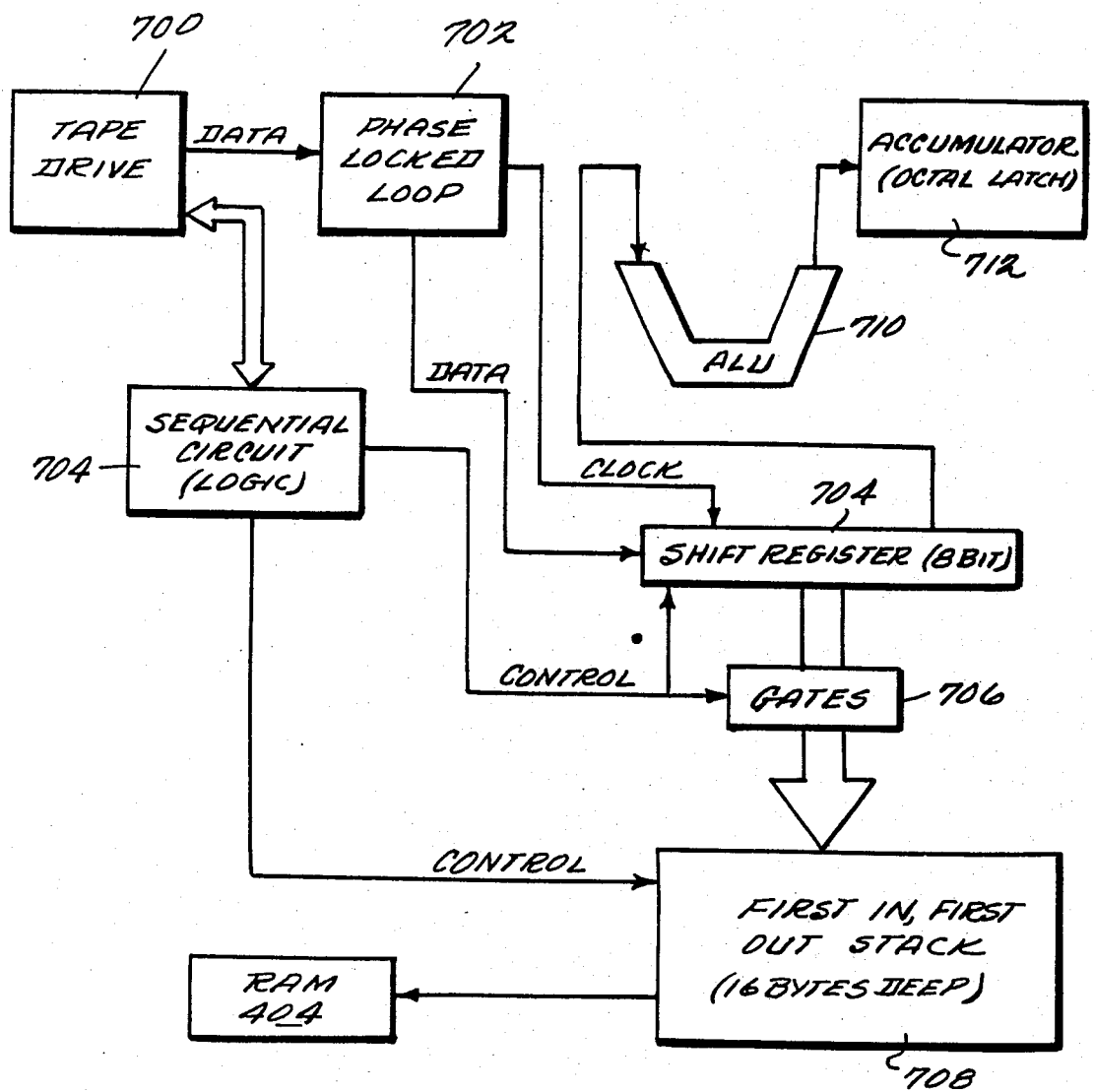
FIG. 20 is a functional block diagram of magnetic tape device 72, magnetic tape interface 73 and the logic built into the controller's microprocessor related to the reading of data from magnetic tape device 72.

Referring now to FIG. 20, there is shown a functional block diagram of magnetic tape device 72, magnetic tape interface 73 and the logic built into microprocessor 400 related to the reading of data from magnetic tape device 72.

A conventional tape drive 700 includes a transducer and tape drive electronics (not shown) for reading data from a magnetic tape. Data read from a magnetic tape is coupled to the data input of a phase locked loop 702. A sequential (logic) circuit 704 provides control signals for tape drive 700 including forward, reverse, stop and go, clear leader sensing, data present, and cassette present signals. Phase locked loop 702 tracks input data on a bit-wise basis using a weighted average technique to correct the logic level thresholds for determining the logic state of the data locked by the loop. Data from phase locked loop 702 is coupled to an 8-bit shift register 704. After shift register 704 has received 8 bits of data, the data is parallel transferred through gates 706 to a nventional FIRST IN FIRST OUT FIFO) stack 708 for temporary storage. FIFO 708 is 16 bytes eep. Data from shift register 704 is also coupled through an arithmetic logic unit (ALU) 710 to an accumulator register (octal latch) 712.

When tape drive 700 is in a continuous read mode, phase locked loop 702 is serial data with a clock determined by the tape being read. The clock information as well as data information is stored on the magnetic tape. The clock information is coupled on a clock line from phase locked loop 702 to shift register 704 and is used to clock data through the cells of the shift register After 8 bits of data are clocked into shift register 704 as counted by a counter within sequential circuit 704, the 8 bits are loaded into FIFO 708 for temporary storage. At the same time, the data in shift register 704 is added to the contents of accumulator 712 through ALU710, suitably a 74181 or equivalent. Accumulator 712 always contains the sum of all data clocked through shift register 704 and stored in FIFO 708. Once an entire record of data is read in (a record is 16 bytes of data and a block includes 8 records), a checksum byte (a control byte) of data is read from the tape. The checksum represents the 2's complement of the summation of the 16 bytes of data previously read in. Thus when the checksum is added to the tallied sum in accumulator 712, the net result should be zero. After the checksum byte is read in, accumulator 712 is checked to see if its contents equal zero. If so, the data is valid and sequential circuit 704 causes the contents of FIFO 708 to be coupled into RAM 404 to which it is coupled Thus valid data is loaded into RAM 404 through FIFO 708 acting as a ata buffer. This sequence continues until all records and blocks are entered. The last record on tape is signified by a zero record length.

The start of a record is indicated by a standard ASCII character (a colon":"). An 8-bit record length follows the introductory character. The record length indicates the number of data bytes in the record. A zero record length indicates the final record (after which data input operation is completed). Following the record length is the address specifying where to load the first data byte. The address byte is followed by a zero byte for synchronization. In turn, the data for that record (8 bit bytes) follows the zero synchronization byte.

In the exemplary embodiment only 16 bytes are used for each record. Therefore, after each 16 bytes of data are sent (i.e., after each record), an 8-bit checksum indicates the 2's complement of the entire record content up to that point. The 2's complement checksum added to the accumulated data should yield zero for valid data. If the checksum indicates invalid data, the reading of the tape will be attempted again. If three successive attempts to read a tape result in invalid data, the tape is considered bad and a failure signal indicating a bad tape is enunciated on keyboard/console 411.

Figure 21:
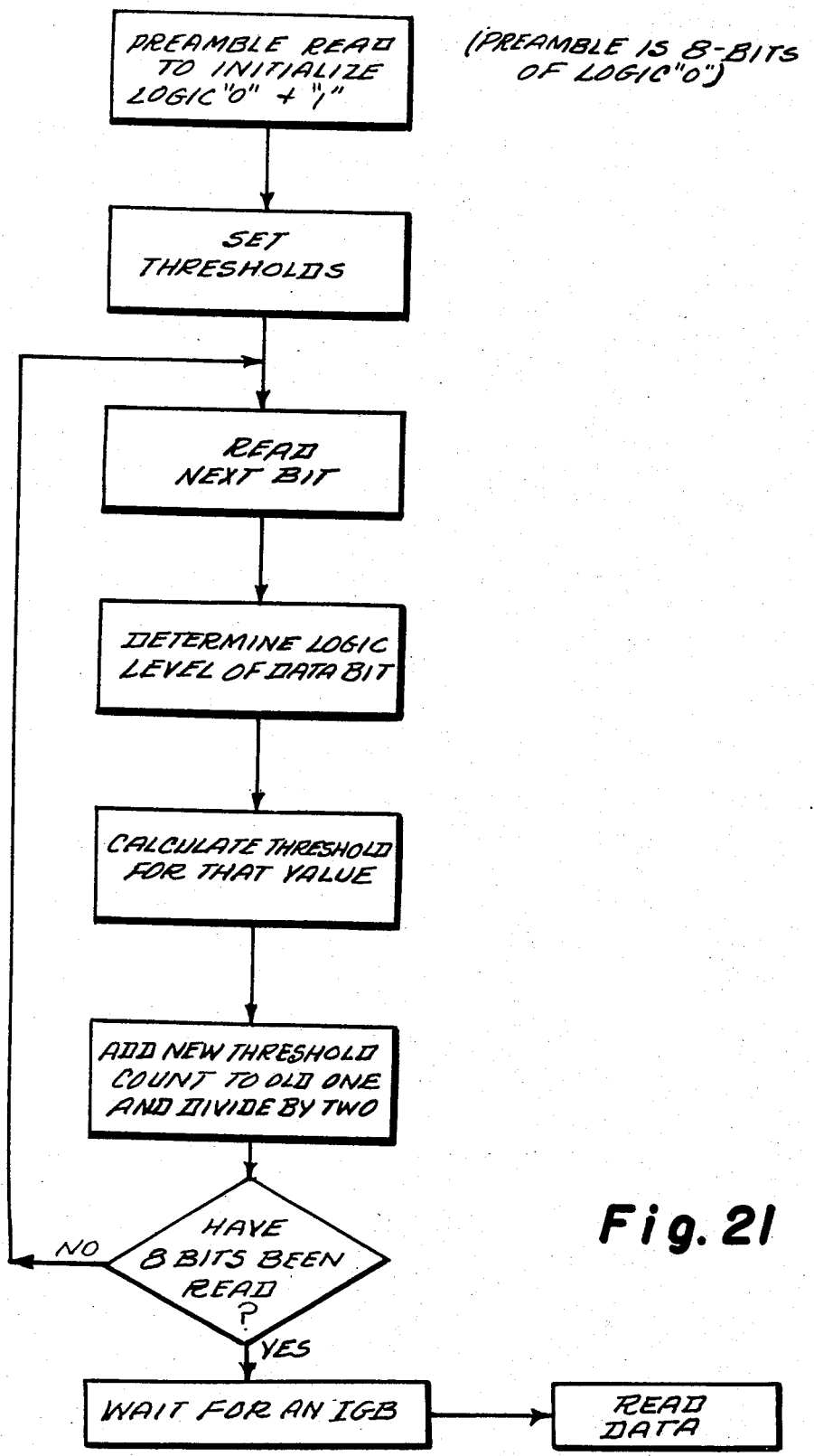
FIG. 21 is a flow chart of the weighted averaging technique implemented by the phase lock loop of the transceiver decoder.

Referring now to FIG. 21, there is shown a flow chart of the weighted averaging technique implemented by phase locked loop 702. The weighted averaging technique allows up to a 50% variation tape speed during a bit period.

A preamble is read to initialize the logic levels ("0" and "1"). One byte (8 bits) of logic "0" are sent in the preamble for phase locked loop 702 to lock onto. This is the logic "0" count. The logic "1" count is defined to be two times the logic "0" count. The logic thresholds for logic "0" and "1" are set and a data bit is then read. By comparing with the thresholds established just before a data bit is read, it is determined whether that data bit is a "0" or a "1". The result of that decision is output data from phase locked loop 702. After it is determined whether a data bit is a "0" or a "1", the threshold for the value of the last data bit is determined. The calculated threshold value is added to the old threshold value and the sum divided by two. The result becomes the updated threshold used for comparison with the next data bit.

Figure 22:
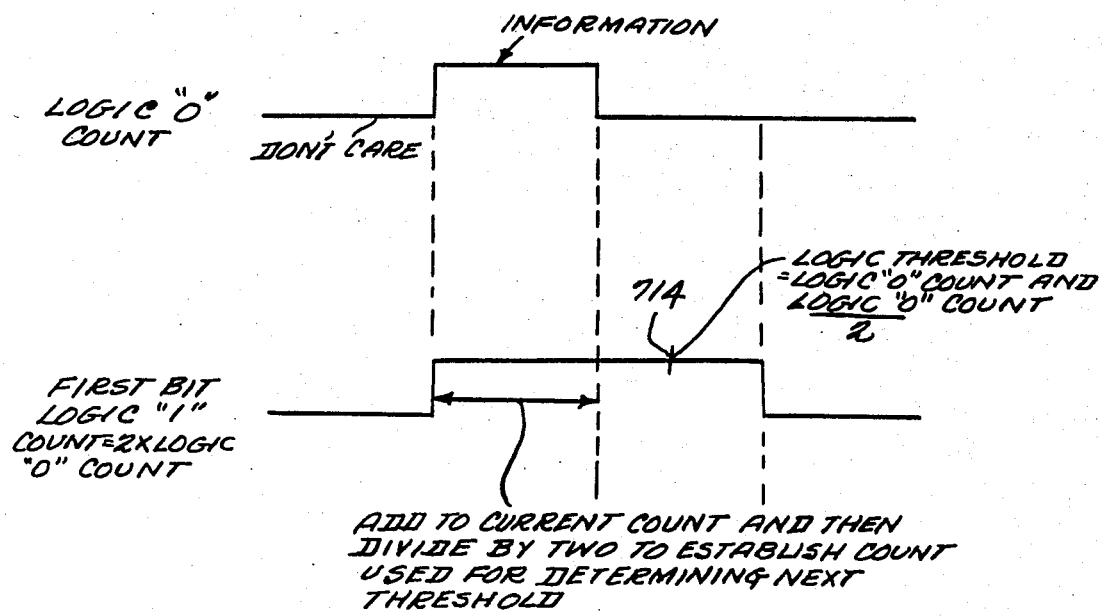
FIG. 22 is a graphical representation of serial data read from a magnetic tape illustrating the self adjustment of threshold levels.

Referring now to FIG. 22, there is shown a graphical representation of serial data read from a magnetic tape illustrating the self adjustment of threshold levels for determining whether a data bit is a "1" or a "0". During the preamble of 8 logic "0"'s, the initial logic "0" count and logic "1" count are established. The logic "1" count is defined to be 2x logic "0" count. The logic threshold established by the "SET THRESHOLD" block in FIG. 22 is $$\text{logic threshold} = \text{logic "0" count} + \frac{\text{logic "0" count}}{2}$$

and is indicated by a vertical line 714. The first bit is read by comparing its count (length) with the threshold level established during the preamble. If that first bit is a logic "0", its count is determined. This count is added to the count stablished during the threshold and the sum is divided by two. This new count determines the threshold used for reading the next bit. If the first bit is a "1", its count is divided by two before it is added to the previous count. This procedure is repeated for every bit. Thus there is a continuous bit-wise adjustment of the threshold value used for logic level determinations.

The use of a bit wise adjustment of the logic levels in this manner permits up to a 50% variation in tape speed while maintaining data read out accuracy. This allows the use of a less precise and less expensive tape drive 700.

System Definitions

This section recaps and further defines the terms "relay", "sector", "pattern", "schedule" and "switch".

A "relay" is defined to be a mechanical or solid state device which is capable of closing and opening one electrical circuit in response to an electrical control signal received from another electrical circuit.

The term "sector" is a user identification number that identifies a unique geographical area to be load controlled. That area could be of any size, could encompass any floor or part or parts of a floor or floors of the building. In essence, it could be any region under control. A sector can include any number of transceiver decoders 56. A sector is, in essence, a user selected subset of relays and could include only one relay, a plurality of relays, or all of the relays in the entire system. Sector definitions are part of the data base entered by the user to adapt the system to a particular building or complex to be controlled and to the use to be made of the controlled building or complex. When a building is initially wired, it is only necessary to know which relays and associated loads are coupled to which transceiver decoders 56. The sectors are defined by the user after the initial wiring and can be easily redefined (by the use of mark-sense cards or keyboard entries) when there are office reorganizations and personnel shifts.

It is possible to define overlapping sectors. In fact, much of the flexibility and thus the advantage of the present system is derived from the ability to define overlapping sectors. For example, sector 1352 may include control of the lights in room 1352 and sector 1380 may include control of the lights in room 352 and all of the other rooms on the thirteenth floor. Thus, sectors 1352 and 1380 would overlap a sector defined as including corridor lights and one room light in each room could be made responsive to detection of smoke or fire in the area. Either an analog type sensor coupled to analog sensor section 110 could be periodically polled or a switch type sensor could be coupled to a switchleg input of switchleg input circuit 106 to set up the desired condition response. Blinking corridor lights could be used to demonstrate a preferred degress route in the same sector. The capability of defining overlapping sectors and to make sectors condition responsive makes such control feasible. As stated, sector definitions can be altered either by entering the appropriate data at the keyboard of controller 50 or by utilzing mark-sense cards to re-enter the data base. For example, assume sector 1352 is defined to include the relays controlling the lights in room 1352. Further assume that sector 1354 is defined to include the relays controlling the lights in 1354 which is adjacent to room 352. If the wall between rooms 352 and 354 were removed and one larger room created, a new sector could be defined to include the relays controlling the lights in both original rooms. In essence, a sector defines which relays (and loads) are to be affected. The sector is thus represented by a number uniquely defining the geographical area under control.

Once entered by the user, a table of sectors and their associated relays are stored in RAM 404. A sector does not define what the status (on or off) each of those loads is to assume. The status of each load is defined by a pattern.

A "pattern" defines the status (on or off state) of the relays associated with one or more transceiver decoders 56. For each transceiver decoder 56 listed in a particular pattern, the status of each and every relay is defined, i.e., its status either "on" or "off" must be predetermined. Thus, when a particular sector number and pattern are requested by a telephone user, the sector number will be used to determine which relays are to be affected and the pattern will be consulted in order to determine what status to put each of those relays into. A pattern definition table is stored in RAM 404 for all user entered pattern data.

The term "schedule" refers to a time-dependent sequence of patterns that are to be executed in accordance with the time appearing on real time clock 410. When the time shown in the system clock reaches a predetermined time for a schedule change, that change is automatically executed if the system is operating in its automatic mode.

A particular schedule entry calls for the relays in a specific sector or sectors to assume the states called for by a selected pattern at a particular time. For example, the schedule may call for Sunday, 10:00 AM sectors 372, 374, 377 and 378 to assume relay states called for in pattern 6 and for sectors 804 and 805 to assume relay states called for by pattern 4. Multiple sectors can be scheduled for relay activation at the same time because sectors and patterns are independently defined. These basic definitions of sector, pattern, and schedule provide complete flexibility in the activation of particular relays and their associated loads. Sector, pattern, schedule, switch, and priority erase time information comprise the data base entered by the user and stored in RAM 404.

The term "switch" is defined to be a number of a particular transceiver decoder 56 plus a particular switchleg number of that transceiver decoder. Calling for a particular transceiver decoder 56 and a particular switchleg of that transceiver decoder uniquely defines a single switch. Transceiver decoders 56 are numbered from 0 to 1023, defining 1024 transceiver decoders. Associated with each such transceiver decoder 56 are 8 switchlegs, numbered 1-8. If a particular user has a switch 68, that switch will uniquely be defined and when activated, will cause a signal to be sent through its transceiver decoder 56 and data line 58 to controller 50 requesting that a command be sent to operate a particular subset (sector) of relays. A switch 68 is not tied directly to a particular light or relay but rather is utilized only to cause a signal to be sent from the particular transceiver decoder 56 with which it is associated to controller 50. Controller 50 then interprets the signal from that transceiver decoder and issues the appropriate command to a particular transceiver decoder associated with a relay to be activated in acccordance with the switch input.

Firmware Overview

The firmware that controls microprocessor 400 and provides its unique function, is stored in ROM 402. The program is responsible for managing, maintaining, as well as diagnosing, the system hardware and the data base that the user has defined for his particular application. Standard protection means have been provided in the firmware to insure that no action as opposed to an erroneous action would take place in the system. Furthermore, what is known as loop protection has been provided to guard the computer from a lockout condition inhibiting system operation.

Overall system function is achieved through an executive program, referred to hereafter as the executive. The executive loops through its entire program sequence continuously and is "flagged" to perform dispatch to a specific task related to data input/output, data management, self-diagnostics, telephone line management, relay checking, switchleg overrides, sensor polling, data line maintenance, etc. These specific tasks get the attention of the executive while it is looping by the use of flagwords which are indicators of the status of various input/output devices, data conditions and the like. In addition to the detailed discussion of these various specific tasks, there is provided in Appendix B a complete copy in hexadecimal code of executive and all referenced subroutines for effecting these specific tasks.

Flag Words

Table 4 is a summary of the various flag words and/or key memory locations that guide the executive in causing the various specific function tasks to be performed.

TABLE 4

| Flagword | FLAGWORDS Indication Provided | |
|---|---|---|
| SYSERR (system error status flag) | D0 = "1" | indicates data line failure - stuck in low impedance mode |
| | D1 - "1" | indicates transceiver failure |
| | D2 - "1" | indicates a memory failure |
| TAPBAD | Non-zero indicates bad tape in magnetic tape device 72 | |
| FLGOVR (schedule override) | Value = 0 | no override, main schedule in force |
| | = 1 | alternate schedule, 8th day override |
| | = 2 | alternate schedule, 9th day override |
| | = FFH | schedule off (respond only to switches and telephone |
| RELCKF (relay check) | D0 = "1" | check relays that were overridden by switch or telephone |
| | D1 - "1" | check relays requiring a status change in accordance with normal schedule |
| TLSERF (telephone service) | D0 = "1" | service telephone #1 |
| | D1 = "1" | service telephone #2 |
| | D2 = "2" | service telephone #3 |
| PATRQF (service a schedule change) | Value = 0 | no service requested |
| | Value = 1 | service requested |
| SYSCLK (system clock storage area) | SYSCLK: | Day #(1–7) |
| | SYSCLK + 1: | Minutes (0–59) BCD |
| | SYSCLK + 2: | Hours (00:00–23:59) BCD |
| | SYSCLK = | 0 indicates clock not set |
| LINUSE (status of data line) | value = | 1 - receive mode |
| | value = | 2 - transmit mode |
| | value = | 3 - bad preamble |
| | value = | 4 - line free (clean) |
| | value = | 5 - line stuck (low impedance) |
| TELUSE (telephone use) | Flag set indicates that a telephone is in use. | |
| CHECKSUM | Arithmetic check to insure the integrity of the bit values stored in a specific memory block. | |

Referring to Table 4, the key flag words and memory locations are set forth on the left side and their respective functions or indications on the right.

SYSERR is the system error status flag and utilizes three bits of an eight bit byte. Bit D0 indicates that the data line is stuck in a low impedance mode. Bit D1 indicates a transceiver decoder failure and bit D2 indicates a memory failure (as diagnosed by CHECKSUM).

TAPBAD is a flag word indicating whether there is a bad magnetic tape in magnetic tape device 72. A non-zero value in TAPBAD indicates that the tape in magnetic tape device 72 is bad and that the user should replace it. This flag is part of the self diagnostics of the system. The flag is set when microprocessor 400 attempts to read data from the magnetic tape and receives bad information after three successive read attempts.

FLGOVR is the schedule override flag which like the other flags is an eight bit flag (1 byte). A zero value for FLGOVR indicates that no overrides are in effect and that the system is operating automatically in its normal 7 day week, 24 hour day schedule. The schedule overrides refer to the eight day, ninth day and off schedule overrides selected by a schedule override switch on console display 415 and coupled through optoisolator 412. A "1" value for FLGOVR indicates that the eight day schedule is called for. A "2" value for flag over indicates that the ninth day schedule override is called for. The FFH (FF hexadecimal which is equivalent to 11111111) indicates that the schedule off override is in effect and that microprocessor 400 should ignore all schedules. As previously stated, in this mode, controller 50 will respond to switchlegs including switch type sensor coupled to switchlegs and telephone requests, but will ignore any user defined time dependent schedule. This is quite different from the manual mode wherein load controls are only under the control of the central controller keyboard and will not respond to remote input such as telephone requests and switchleg actuations.

RELCKF is a relay checker flag using the D0 and D1 bits of a byte. Bit D0 indicates that it is appropriate to check transceiver decoders 56 that have been subjected to a status change resulting from an override request (telephone or switchleg). The D1 bit indicates that it is appropriate to check a transceiver decoder that has been subjected to a status change due to normal scheduling. In other words, it is desirable to check the status of a transceiver very quickly after it has been changed due to an override. The remaining relay status checks can be done at times when the controller is not processing any system requests (flag words) at the leisure of controller 50. There is no reason to divert the attention of controller 50 from the relays which have been overridden in order to check the status of relays which are operated merely in accordance with the normal schedule.

TLSERF is the telephone service flag. This flag indicates that there is a telephone service request. Three bits of an eight bit word are utilized. The D0 bit indicates that services requested on phone 1; the D1 bit indicates that service is requested on phone 2; and the D2 bit indicates that service is requested on phone 3. Up to three telephones can be coupling data information to controller 50 simultaneously. Of course, any number of telephones can access controller 50 but only three can operate simultaneously.

PATRQF is a flag word indicating that service of a schedule change is required. This flag is set by its schedule check routine. A zero value indicates that no service is requested and a "1" indicates that service is requested. If service is requested, it is an indication to the executive that it should transmit the appropriate information to a transceiver decoder 56 so that a relay status change will be executed at the next available time period.

SYSCLK refers to b 3 memory storage locations where system clock information is stored. Each of these three locations includes an eight bit byte location. The base location is defined by SYSCLK. The next location is then address immediately after SYSCLK, i.e., plus 1 and the next address is SYSCLK plus 2. The SYSCLK location contains the day number corresponding to the day of the week in real time. This is a binary number from 1-7 representing the actual day of the week. A zero in this location indicates that real time clock 410 has not been set and any SYSCLK references should be ignored. Of course, it is impossible to do any scheduling until the system clock is set.

If the real time clock is set there will be a day number from 1 to 7 in memory location SYSCLK which will represent the actual day of the week. The next address location (SYSCLK plus 1) contains the minutes (0-59) in BCD format.

The next address location SYSCLK plus 2 contains the hours of the day in BCD format (00:00-23:59).

The system clock area including these three memory locations (SYSCLK, SYSCLK plus 1, and SYSCLK plus 2) are set or written into by the interrogation of the real time clock by the executive. Every sixty seconds the real time clock is interrogated and the value of the system clock will change to the next minute. It will also automatically change the day as it goes from 23:59 to 00:00.

Scheduling changes are therefore based on the time repesented in the SYSCLK area and this, in essence, is the purpose of the system clock. Furthermore, the actual value stored in the system clock area is displayed on the console. Therefore a user will be able to read the value stored in SYSCLK at all times. The system clock area is modified every sixty seconds. This sixty second period is determined by counting sixty clock pulses generated by a pseudo clock interrupt.

A pseudo clock interrupt is utilized so that the executive will not be tied up reading the real time clock every second. The pseudo clock interrupt provides a flag to the executive every sixty seconds to advise the executive that sixty seconds have elapsed. The executive then updates the SYSCLK storage area in response to that flag and does not have to constantly count pulses from a real time clock. The pseudo clock interrupt is also used to count down various system timers such as the telephone timer which specifies a twenty second maximum length telephone connection between a remote user and controller 50. A flow chart of the interrpolation of and updating by the pseudo clock interrupt is set forth in FIG. 23.

Figure 23:
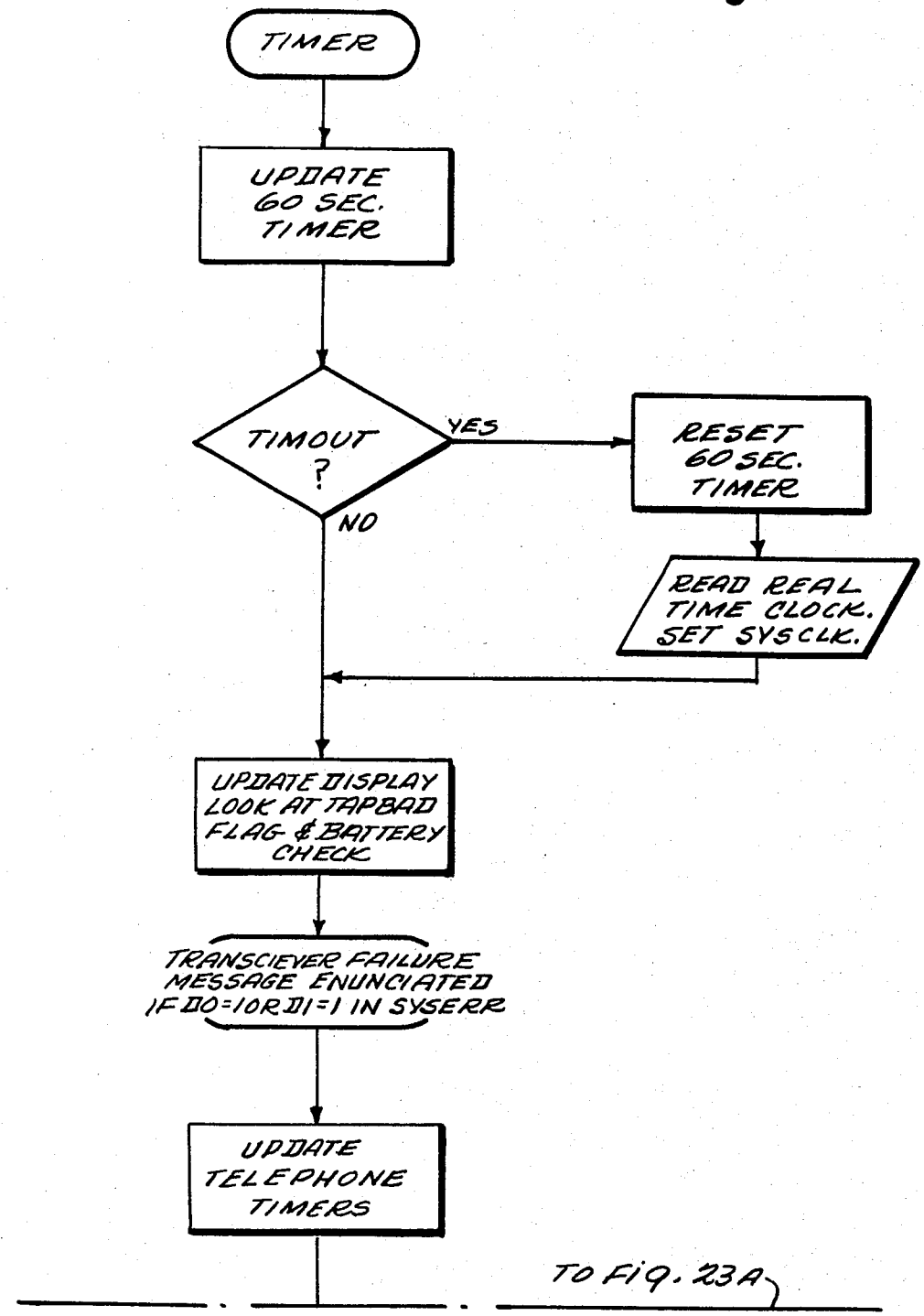
FIGS. 23 and 23a is a flow chart showing the updating function of the pseudo clock interrupt.
Figure 23A:
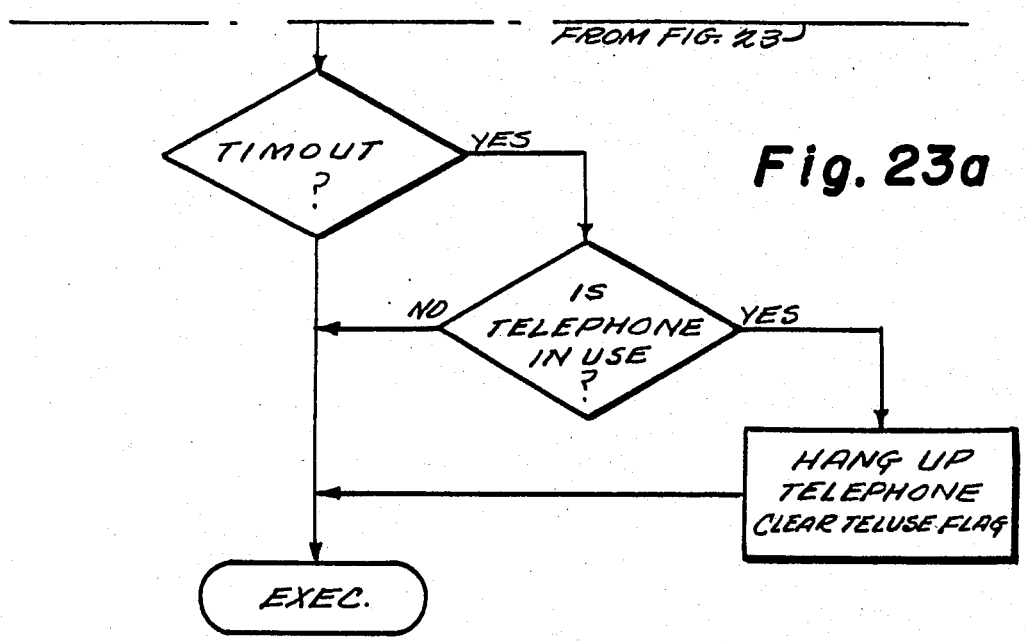

Referring now to FIG. 23, there is shown a flow chart of the timer task showing the updating function of the pseudo clock interrupt. This task is called from the main executive every one second. Each time this task is called, the sixty second timer is updated. It is then determined whether the sixty second timer has timed out. If so, the sixty second timer is reset. The real time clock is then read and SYSCLK is set.

However, if the sixty second timer has not timed out, the display is updated and the TAPBAD flag and battery checker are interrogated. If the D0 or D1 bits of the SYSERR flag are set to a logic level 1, a SYSERR is enunciated on the console. In other words, during each one second period, if the 60 second timer has not timed out, the disposition of the tape and battery checker are determined by interrogation and the result displayed.

Also, during every one second pseudo interrupt, the 20 second telephone timers are updated. If 20 seconds have time out on a telephone timer, the telephone associated with the timer is hung-up, freeing the line for access by other users. When a telephone is automatically hung up, the telephone is automatically hung up and the TELUSE flag is cleared. In the event that there is a time out of the twenty second telephone time and the telephone is not in use or if there is no time out of the twenty second telephone timer, control is returned to the executive.

LINUSE is a flagword indicating the mode of use of data line 58. Mode 1 indicates that the line is in a receive mode. Mode 2 indicates that the line is in a transmit mode. Mode 3 indicates a bad preamble. Mode 4 indicates that the line is free, Mode 5 indicates that the line is stuck in a low impedance (short circuit) condition.

CHECKSUM is a means for checking the validity of contiguous block of memory and is applied to the pattern storage block (PATTERN CHECKSUM), the schedule (SCHEDULE CHECKSUM), the sector (SECTSOR CHECKSUM), the switch (SWITCH CHECKSUM) and the priority (PRIORITY CHECKSUM). Each CHECKSUM location contains a summation of the values of all of the bytes in a block of memory associated with that CHECKSUM location. The CHECKSUM associated with each memory block (pattern, schedule, priority, and switch) is in the last two memory locations of the memory block. The value of CHECKSUM is represented by the 2's complement of that summation. Each time a word of memory is added to a memory block, the value of CHECKSUM for that memory block is updated. CHECKSUM is a 16-bit, modulo 64K summation. Periodically the executive causes the values of all words stored in a memory block to be summed. This summation is added to the value stored in the CHECKSUM location for that memory block. If the resulting sum is zero (the 2's complement value is stored in CHECKSUM) memory integrity is established. The CHECKSUM task is periodically called for by the executive. If a CHECKSUM check indicates that a memory failure has occurred, there is an indication to the user on the main console of controller 50 that there is a data memory failure. In addition, it causes an automatic reload of the data start on magnetic tape. The magnetic tape contains the machine information entered for all data initially acquired through the mark-sense card reader.

Figure 24:
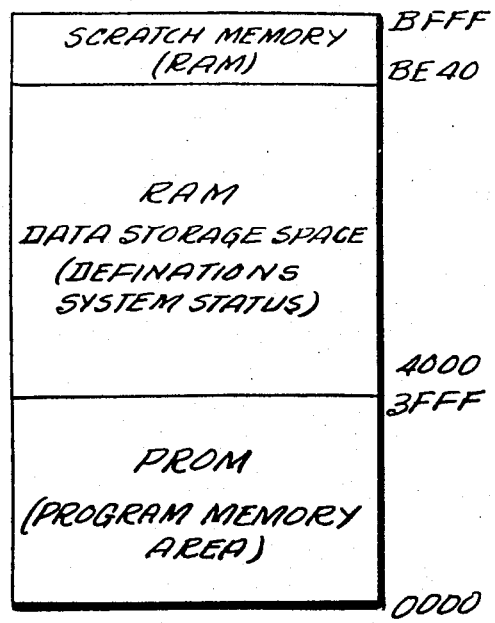
FIG. 24 is a diagram showing the various memory storage areas associated with the controller.

Referring now to FIG. 24, there is shown a diagram of the various memory storage areas associated with controller 50. ROM 402 storage is located from hex address 0000 to 3FFF and contains the logic functions defining the operation of the entire system. The firmware stored in ROM 402 includes the executive and all specific tasks to be performed in the procession of user defined data in order to determine the appropriate commands to be sent to transceiver decoders 56, perform system maintenance, etc.

RAM 404 storage is located from hex address 4000 to the hex address BFFF with user defined data base stored from hex address 4000 to the hex address just below BE40. RAM 404 contains the user entered data base which adapts the system to the user's specific building requirements. This data base entered by the use of the mark-sense card reader 52 and is redefinable as desired. The data base includes definitions of sectors, patterns, priority erase times, switches (including condition responsive switches) and schedules.

A scratch memory area is located from hex address BE40 to BFFF and is used for the temporary storage of data required for system operation. A more detailed breakout of the memory locations of RAM 404 is shown in FIG. 25.

The format of each data area in RAM 404 is defined by the program code for microprocessor 400 (Appendix B) and such formats are automatically realized by the user when data is input via mark-sense cards or by interactive keyboard inputs. The format of each of the four types of mark-sense cards is shown explicitly in FIGS. 33a, 33b, 33c and 33d.

Referring now to FIG. 25, from address 4000 to hexadecimal address 5Ell there is a PATTERN STORAGE AREA. In this area, information related to the individual status of relays required for a particular pattern is stored by the user.

Moving "up" into the memory toward higher addresses, there is a PATTERN CHECKSUM VALUE storage area which serves as a check on the data stored within the PATTERN STORAGE AREA. Next, there is a MAIN SCHEDULE AREA which includes user entered data related to the scheduling of various sectors and patterns. The MAIN SCHEDULE AREA includes the normal seven-day-week schedule based on a 24-hour day.

Above the MAIN SCHEDULE AREA is a memory area devoted to an ALTERNATE SCHEDULE-1 (8th DAY) and an ALTERNATE SCHEDULE-2 (9th DAY) which provide for alternate schedules selectable by the user. These are typically used for holidays and other special days out of the normal 7-day schedule. These alternate schedules are used when a temporary scheduling requirement is needed. By maintaining these alternate schedules, it is not necessary to alter the normal day of the week schedule for a special occasion. The 8th and 9th day alternate schedules are switch selectable by the user from console display 415 (see FIG. 19). Above the alternate schedule areas in ROM 404 is a SCHEDULE CHECKSUM area which provides an arithmetic check of the data storage in the entire schedule area.

Above SCHEDULE CHECKSUM is a memory area devoted to sector definitions called SECTOR DEFINITION AREA. In this section there is stored user entered data defining the group of relays to be in each sector. As stated, sectors may overlap. Any number of overlapping sectors are permitted. If a particular sector number is identified either by an automatic schedule change, a user telephone request, a switchleg activation, or a keyboard entry, this region of memory will indicate which relays are included within the sector called for and thereby indicates a specific area to be controlled. Above the sector definition area are the SECTOR CHECKSUM bytes which is an arithmetic check to assure that data entries of the sector definition area are correct.

Above SECTOR CHECKSUM is a SWITCH DEFINITION AREA which contains user definitions of switchleg and transceiver numbers. Using this section, controller 50 can identify which relays are desired to be affected by each switch command from a user. This achieved by associating each "programmable" switch with a sector number defining the particular area to be controlled. A SWITCH CHECKSUM area above the switch definition area provides an arithmetic check on the data bits within the switch definition area. Above SWITCH CHECKSUM is a PRIORITY ERASE TIME region of memory. In this region, user stored priority erase times are entered. The following is the hierachy of user control:

Manual

Priority Sector Override (Automatiac Mode)-Switchleg actuation or telephone

Non-Priority Sector Override (Automatic Mode)-Switchleg actuation or telephone

Schedule Override

Schedule

A command by the user when controller 50 is operating in the manual mode overrides any automatic control. However, in the automatic mode, there is a distinct hierachy of control as set forth above. When a priority erase time occurs, any memory of a priority override is erased and normal scheduling is executed. However, the override will not remain in effect forever. A priority erase time is specified so that eventually normal scheduling will again take over. In this manner, a user does not have to be concerned with removing his priority override. Above the PRIORITY ERASE TIME is a PRIORITY CHECKSUM REGION for providing an arithmetic check on the data stored in PRIORITY ERASE TIME.

Above PRIORITY CHECKSUM is a CODED area containing a sequence of binary information that it is read at predetermined intervals for the purpose of checking memory integrity. The pattern of information is selected such that if power were lost, it is unlikely that the sequence would reestablish itself identically after a power return. Thus by checking this sequence it can be determined whether RAM 404 contains invalid data requiring a new input of user defined data (magnetic tape, mark sense cards or manual entry).

Above CODED area is a CURRENT RELAY TABLE which indicates the current status of all relays in the system, i.e., their open or closed condition. When controller 50 is required to poll the system to determine the status of a relay, it can consult this region of memory which is updated each time a relay is instructed to change state. Above the CURRENT RELAY TABLE is a PRIORITY OVERRIDE area. The PRIORITY OVERRIDE area maintains a list of all priority overrides in effect on each relay. The addresses indicated on the right side of the figure correspond to the hexadecimal address of the particular memory locations or range of memory locations. Appendix B sets forth the firmware using these memory locations for data storage and processing.

Figure 26:
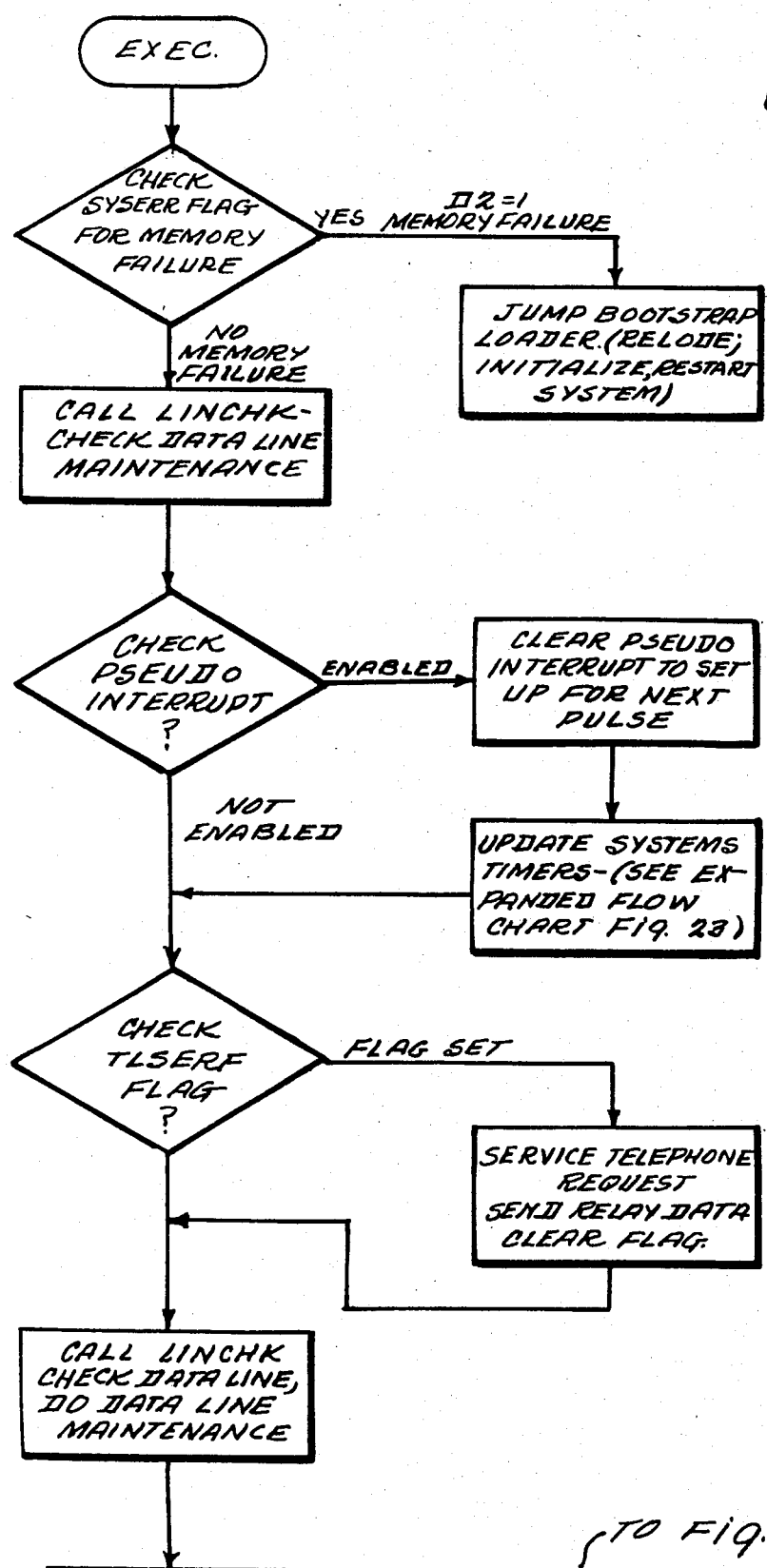
FIGS. 26 to 26c show a flow chart of the executive associated with the controller.
Figure 26A:
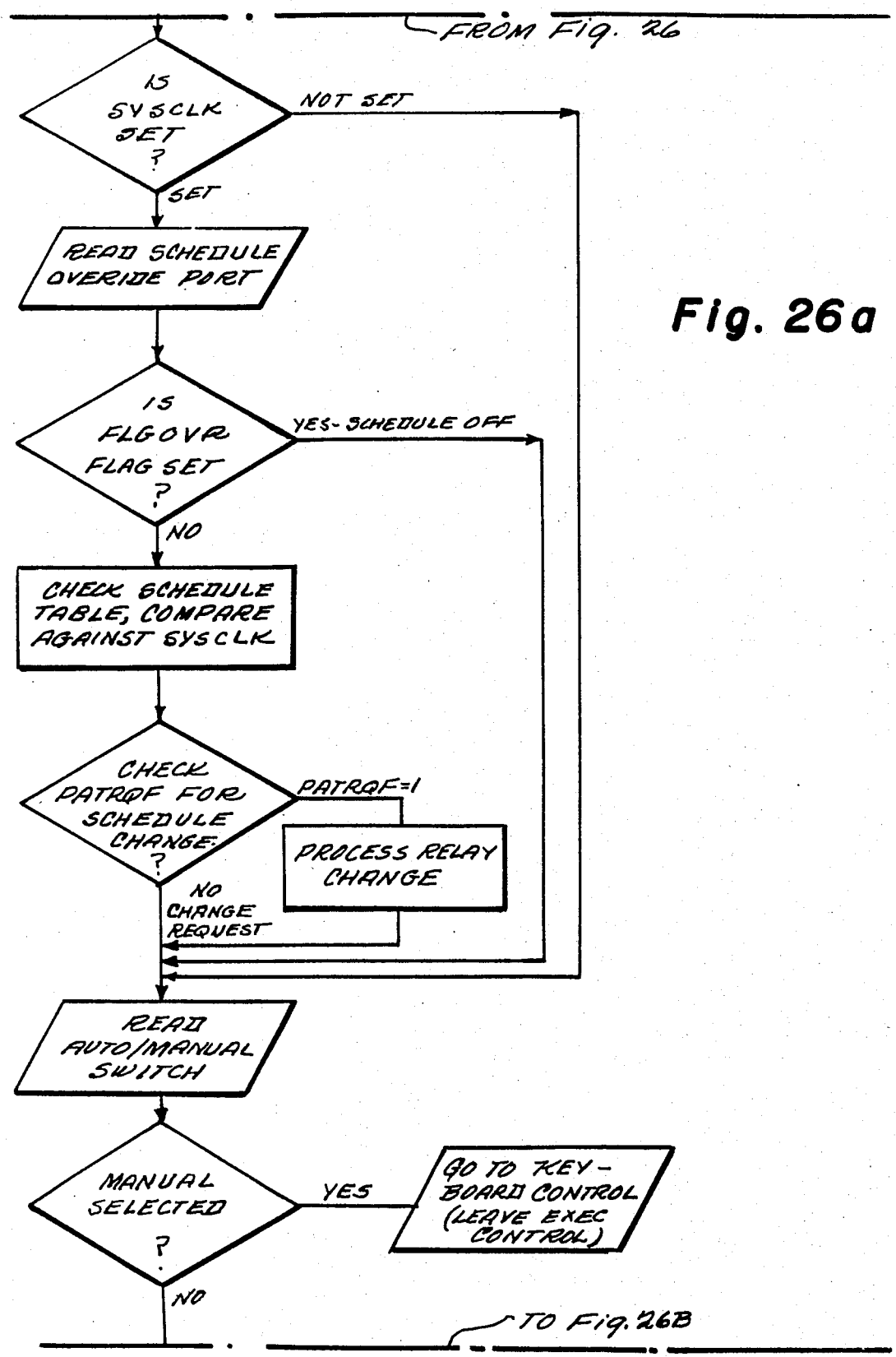
Figure 26B:
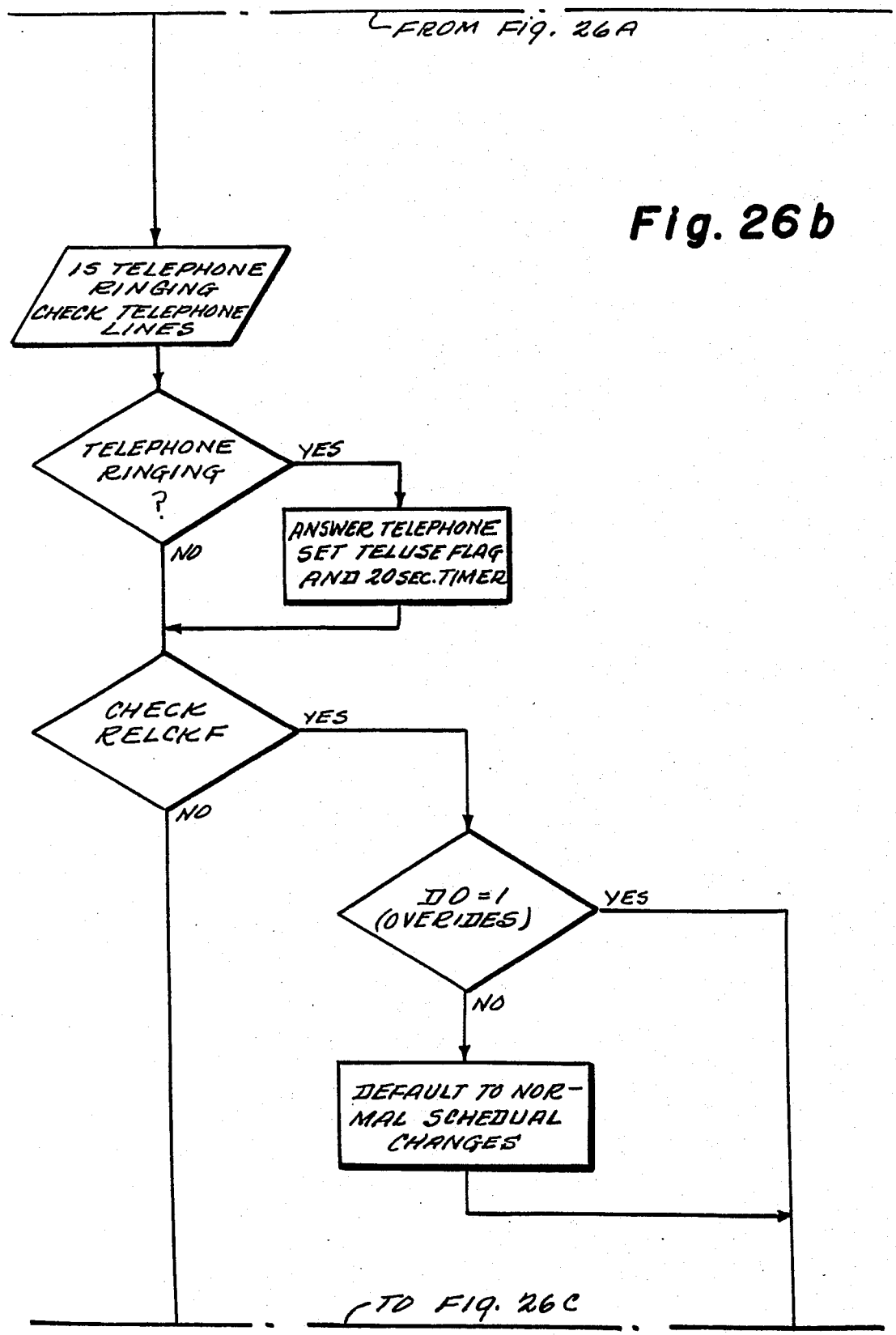
Figure 26C:
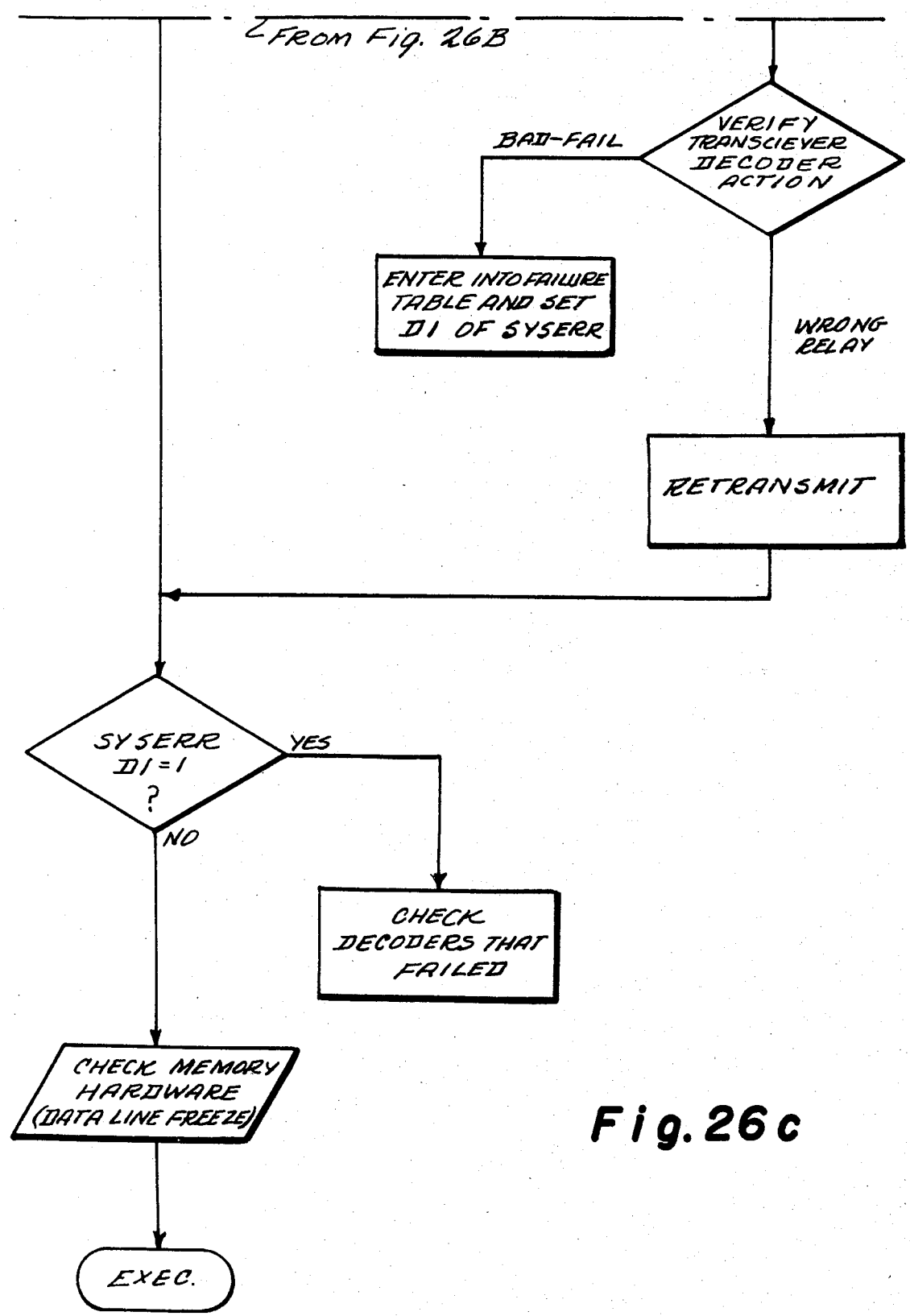

Referring now to FIG. 26, there is shown a flowchart of the executive program (Appendix B) of controller 50.

The executive is utilized for control of the system when it is operating in the automatic mode. The executive is, in essence, a loop of a sequence of instructions which periodically calls for each of a plurality of tasks to be performed. These tasks relate to system maintenance, and the processing of data to perform relay state changes as required and other load control functions.

The executive first checks a system error status flag SYSERR. Data bit D2 is examined in order to determine whether or not there has been a memory failure. If a memory failure is indicated by a logic level "1" in data bit D2, a bootstrap loader takes control and causes the entire system to be re-initialized and all data to be re-loaded through magnetic tape device 72. On the other hand, if no memory failure is indicated, data bit D2, is a logic level "0" and the executive calls LINCHK in order to have the data line checking tasks performed.

In the data line checking section, the LINUSE flag specifying a particular state of data line 58 specifies a specific task to be performed. The LINUSE flag indicates one of five possible states of data line 58, as will be discussed in detail hereafter.

After performing the data line checking tasks, the executive checks the one second pseudo clock interrupt. The executive acknowledges and clears this interrupt and performs the following task. When the pseudo clock interrupt is acknowledged system timers, such as the display timer and the 20 second telephone timer, are updated. These timers are essentially count-down timers that are pre-set to a specific time out and are decremented by servicing the pseudo clock interrupt. As shown on the executive flowchart, if the one second pseudo interrupt is enabled, the interrupt is cleared in order to set up for the next pulse.

The next task performed by the executive is the telephone servicing. If the TLSERF flag is present, there is an indication that a user has telephoned controller 50 and keyed in appropriate instructions for adjusting his lights. In essence, this flag indicates that remote control data has been entered and that it is now appropriate to process according to the command entered. If the telephone service flag is set, telephone service is attended and relay data is sent in accordance with the telephone request to the central controller 50. After the appropriate action has taken place in accordance with the user entered instructions, the telephone service flag is cleared and control returns to the executive. In this preferred embodiment, the telephone command results in the state of relays being affected. This relay state control results from the remoter user specifying a sector number and a pattern indicating the area controlled and the desired states of relays associated with what area.

After servicing the telephone line, the executive then checks the data line by performing the line check task by accessing the LINCHK section. There are several line checks throughout the executive program because the checking of the data line is an extremely important function. Communication between controller 50 and each of transceiver decoders 56 requires a data line 58 that is not impaired in any way, i.e., stuck either in a shorted or high impedance mode, etc. Also, the executive must check data line 50 often enough to insure that information transmitted asynchronously by a transceiver decoder 56 is not missed. A separate flowchart details the line check task.

After the line check task has been performed, the system clock SYSCLK is consulted. SYSCLK refers to a region of memory storage wherein the system clock information is stored. As set forth in Table 4 the SYSCLK memory location stores a relay of the week number 1-7 (a 0 in this location indicates that the clock is not set). The next memory location above SYSCLK, known as SYSCLK+1 indicates the time in minutes from 0 to 59 in binary coded decimal format. The next address location after SYSCLK+1 is known as SYSCLK+2 and stores the hour of the day on a twenty-four hour cycle from 00:00 to 23:59, also in BCD format. If the system clock is set, i.e., there is information in the SYSCLK memory location, the clock is interrogated to see whether or not it is time to execute a schedule change. If a schedule change is called for at the time appearing on the system clock, then the schedule change is executed or is serviced. A schedule service is dispatched by the executive if the schedule service request flag, PATRQF, is set. A schedule is serviced or set when the executive checks the status of the schedule. The schedule status is checked by comparing the next actuation time of service stored in the SCHEDULE area of RAM 404 pointed to by a schedule pointer with the system clock SYSCLK. It may be possible, after a lengthy power outage, for the system schedule to be significantly behind the system clock thereby calling for a "catch-up" during which several schedule changes would take place. The system would cycle through all schedule changes updating relays with each such schedule change until the schedule is justified with respect to the system clock.

After all schedule changes have taken place and the system schedule is caught up to the system clock, the executive then reads the state of an auto/manual switch located on console display 415. Auto/manual switch is user operated for determining whether the system will be operating in the automatic (under the control of the executive) or manual (data entered via the keyboard) mode. If the manual mode is selected, then controller 50 leaves executive control and is operating under keyboard control only where a console operator is required. However, if the manual mode is not selected, control remains in the executive and continues to check the status of the phone lines.

The phone lines are checked by first determining whether or not a telephone is ringing. If a telephone is ringing, the telephone is answered and the telephone use flag TELUSE is set with a telephone timer limiting the length of the call. It should be noted that the telephone use flag TELUSE is different from the telephone service flag TLSERF. The telephone service flag is activated after there has been a telephone service request, i.e., the user has keyed in the appropriate sector and pattern information and then hit the pound sign on his telephone keyboard. This indicates that the remote user has entered data into controller 50 and it is appropriate for controller 50 to process that data and determine the appropriate relays to be pulsed. The telephone answering block has been expanded into a separate flowchart detailed in FIG. 24.

Figure 27:
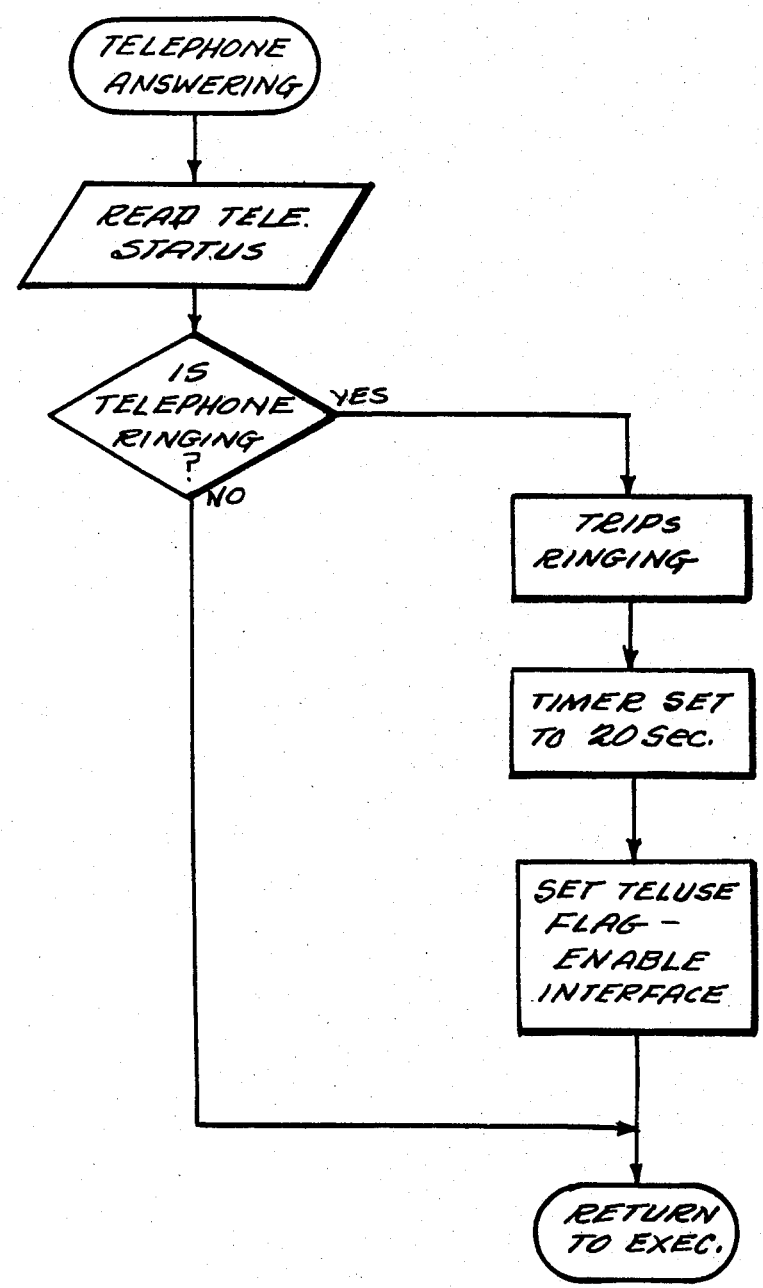
FIG. 27 is a flow chart illustrating the telephone answering task.

Referring now to FIG. 27, there is shown a flow chart of the telephone answering task. When the telephone is answered, in addition to setting the TELUSE flag, the 20 second telephone timer is set. This timer gives each telephone user 20 seconds within which to enter data specifying the sector to be controlled and the desired pattern indicating relay states and to then hang up the telephone.

Referring back to FIG. 23, after checking the telephone lines, the executive determines whether a relay status requires verification. This task assures that a relay has in fact assumed the state to which it was commanded to attain. A transceiver decoder 56 and all its associated relays are checked after any command to alter the status of any or all of those relays. There are two separate and distinct relay check tables. One such table is utilized to check the status of relays which have been pulsed in response to a telephone request or switchleg request from a user. Such requests set a "1" in the D0 bit of the relay check flag RELCKF. The other relay check table is utilized for the checking of the status of relays affected by normal scheduling changes. A normal scheduled change places a "1" in the D1 bit of the relay check flag RELCKF. Two separate and distinct tables are utilized so that relays can be checked quickly which have been the subject of an override while reserving the checking of relays pulsed in response to a normally scheduled change for a time when controller 50 is free of more pressing tasks. If the relay check flag RELCKF has been raised due to an override request, the relay state is verified for each of those transceiver decoders 56 that were subjected to the override command. If all relays are in the proper state no further action is required. However, if a relay or relays have not assumed the appropriate state, the instruction to is retransmitted in an attempt to correct the status of the relay or relays that have not assumed the appropriate state. In the event that a transceiver decoder 56 fails to respond to the controller 50 interrogation, it is said to have malfunctioned. The information that a transceiver decoder 56 has failed is put into a failure table. When a failure occurs, an enunciation (the flashing of the word "FAILURE" on display console 415) takes place to alert the console operator of the failure. The failure enunciation not only indicates that a failure has taken place, but also tells the operator which particular device has failed. Thus, the device can be replaced promptly.

After the executive has processed or checked transceiver decoders 56 in the check table or has retransmitted appropriate information to transceiver decoders that have not responded properly to a command, the executive then checks the system error flag SYSERR. A logic level "1" in the D0 bit of SYSERR indicates that data line 58 is stuck in a low impedance mode (short circuit). A logic level "1" in the D1 bit indicates a transceiver decoder 56 failure. If either of these bits are set, a failure message appears as a flashing signal on console 415.

After failures have been attended to, the SYSERR flag is again checked to determine if there remains any failure condition. If the system error flag indicates that there is a transceiver decoder 56 failure, the controller assumes that no other activity is going on and it checks to see if the transceiver decoder has come back on line (perhaps power had failed and was restored). If the transceiver now responds, it sets the associated the relays to the proper state, and the SYSERR flag is cleared. After the system error check, the executive checks on its memory and hardware.

The executive check of its memory and hardware is a low priority check and it occurs only when the controller is in an inactive state or idling state as indicated by other flag words. In order to check memory and hardware, the CHECKSUM tasks are executed. The check sum task performs a mathematical summation of data bits to determine whether a data bit has been dropped. Because the check sum routine takes a relatively long time, controller 50 would be in danger of missing a switchleg command transmitted over data line 58 from a transceiver decoder 56. Therefore, while memory is being checked in the check sum routine, the data line is frozen by entering a bus freeze condition. In the bus condition, data line 58 is maintained in the low impedance state. Therefore each transceiver decoder 56 thinks that it is being accessed by another device and stops transmitting. Thus all data transfer is inhibited. While in this hold condition, a transceiver decoder 56 holds its data and as soon as the data line is free, attempts to transmit it to controller 50 at which time the controller will be prepared to receive the information. This data line freeze guarantees that no data will be lost.

Telephone

Referring again to FIG. 27, in describing FIG. 1, it was stated that a user could access controller 50 via standard telephone 66 coupled to controller 50 through a telephone data set 64. In FIG. 17 it was noted that telephone data set 64 was in turn coupled to telephone interfaces 420, 422 and 424 of controller 50. The flowchart set forth in FIG. 23 details the actual telephone answering procedure conducted by microprocessor 400 so that data from a user will be acquired by controller 50 and executed upon. A telephone instruction from a user results in a command being sent to an appropriate transceiver decoder 56 coupled to a relay desired to be affected.

When a remote user calls controller 50 from a telephone, the telephone gets a ringing signal. Microprocessor 400 checks the telephone status port and reads that port. It simply looks at the signal status of the ring indicator line, RI, from a data set 64 to determine whether a telephone is ringing. This is achieved by microprocessor 400 checking a ring indicator for each of telephone interfaces 1, 2, and 3. If a ring indicator shows that a telephone is ringing, that telephone interface is triped by sending a signal onto a standard telephone trip circuit over its data terminal ready line DTR (see FIGS. 1 and 18). The answering of a telephone sets a timer to 20 seconds. After 20 seconds, microprocessor 400 hangs up on the remote user if the call has not been completed. This ensures that no user will be able to tie up the telephone interface circuitry to the exclusion of other users. After triping the ringing of a telephone, a TELUSE flag is set indicating to the executive that there is a telephone call in progress and an interrupt is enabled. This interrupt is coupled to the data present line DP of data set 64 and is active each time a user enters data. Control is then returned to the executive. If the status of the telephones is checked and it is determined that the telephone is not ringing, control is immediately returned to the executive. The telephone status check and answering task set forth in the flowchart of FIG. 23 is returned to periodically as are all other tasks called for by the executive. The executive causes microprocessor 400 to turn its attention to each task sequentially and then begin its task list all over again. In the case of the telephone answering task, once a telephone has been answered and a user is on the line for 20 seconds, the executive enables an interrupt circuit which will monitor the telephone and allow the executive to go to other tasks. When the telephone user enters data the executive is interrupted so that the data is read in for subsequent processing. This is done for each telephone data entry until either a telephone timer timeout or a pound sign "#" is entered or the telephone user hangs up prematurely, indicated by the status of the DSR line from data set 64 when a call is terminated. Microprocessor 400 reads the telephone data input and then goes back to its other tasks. Thus, there is no need for continuous polling of the telephone. Up to three telephones can be answered simultaneoulsy and 20 seconds will be given to each caller. Of course, any number of telephones can be used to call controller 50 however, only three telephones can be answered simultaneously. Controller 50 is coupled to the public telephone lines via data set 64 so that it can be reached by any telephone in the world. Data set 64 is suitably an AT&T type 407A data set which couples a telephone to telephone interfaces 420, 422 and 424 of controller 50.

Figure 28:
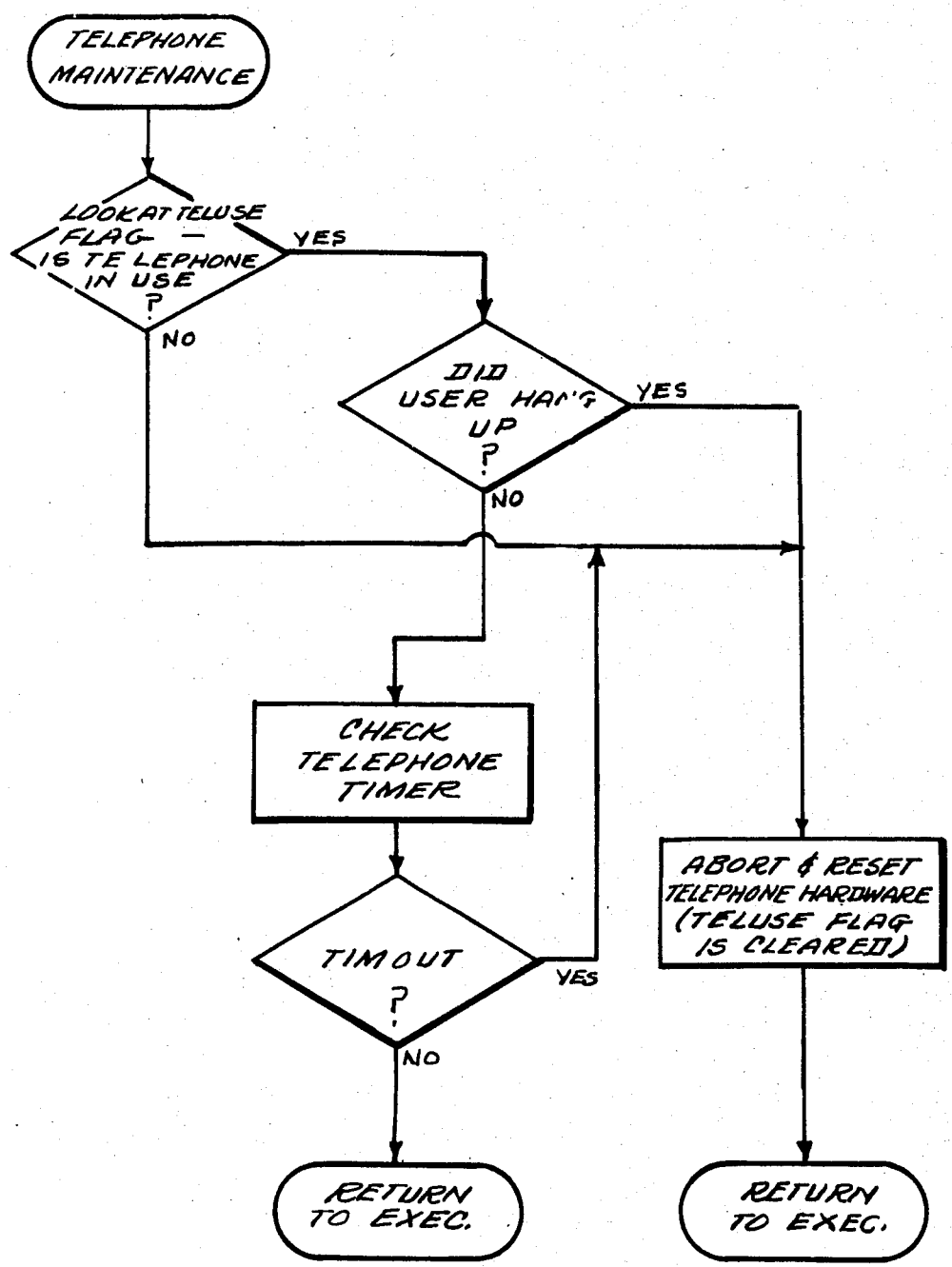
FIG. 28 is a flow chart illustrating the telephone maintenance task.

Referring now to FIG. 28, there is shown a flowchart of the telephone maintenance function. Periodically the telephone status is checked by looking at the TELUSE flag if the TELUSE flag indicates that a telephone call is in progress, the telephone line is examined to see if the call is still in progress or if the user has hung up the telephone. If the user has hung up the telephone the call is aborted and the TELUSE flag is cleared. However, if the telephone line is still in use, the 20 second timer is checked. If time is out, i.e, the 20 second period has elapsed, the call is aborted and control is returned to the executive. However, if time is not out, control is again returned to the executive and the telephone line will be checked again in due course.

Referring now to FIG. 29, there is shown a flowchart of the telephone decoder task. After a telephone has been answered, a beep of approximately one second in duration will appear on the line to advise the telephone user that the telephone has been answered and is ready for data. Typically the user will enter data calling for a specified sector number to have its relays placed in the status called for by a specified pattern. The user enters in numeric form a sector number which could be his room number or telephone extension number (whatever was originally programmed into the data base) that uniquely defines the area to be affected. The sector may include one or more relays anywhere in the system. After sector and pattern information have been entered, a final signal digit, the pound sign, is entered by the user specifying that all data have been entered. In essence, the depressing of the pound sign acts as a command to controller 50 that it should act on the data previously entered by this user. When the pound sign is depressed, the telephone is automatically hung up and cleared for use by the next caller. This is accomplished by the automatic clearing of the TELUSE flag and causing the DTR signal to be inactive. Then, the data entered by the caller is decoded. This is the point at which the flowchart in FIG. 29 beings.

An area of memory is set up and the binary equivalent of the sector number calculated and placed therein. This number is saved until the pattern level is located (one of 32 patterns) a check is then made to see if the data is valid if the data is not valid the action is aborted and control returns to the executive. However, if the data is valid a telephone service flag TLSERF is set. The TLSERF indicates to the executive that a telephone user is requesting service and that a complete sector number and pattern number have been entered. Using sector information, controller 50 determines which relays are to be controlled. Using pattern information, the states those relays are specified. This decision making process is started when the executive recognizes the TLSERF flag. The telephone service is detailed in a flowchart in FIG. 28.

Referring now to FIG. 30, there is shown a flowchart of the telephone servicing task. The TLSERF flag indicates to the executive that a telephone service is requested. The executive recognizes the telephone service request flag TLSERF and immediately takes up the task of telephone service it proceeds to process the sector number and determines which transceiver decoders 56 are affected. At least one transceiver decoder 56 is be sent a command to actuate a relay. Of course one sector number can control multiple transceiver decoders so that it may be necessry to send commands to more than transceiver decoder. By processing the sector number, controller 50 determines what loads are to be controlled. It must also determine what state each of those loads is to be put into. This is determined by the pattern number. A pattern defines all of the relays for a particular transceiver decoder 56. If there are 16 relays for a particular transceiver decoder 56, the "on" or "off" condition of each relay must be defined. Therefore, processing the sector and pattern numbers determine the unambiguious status of each relay to be affected. After the sector and pattern numbers have been processed, the information is executed and the appropriate control sent to a transceiver decoder 56. At the same time, a relay check flag RELCKF is set for each transceiver decoder 56 to which a command has been sent. This relay check flag tells the executive that later it is going to have to check the status of the relays associated with that particular transceiver to make sure that the relays have been affected and are in the proper state called for. By the use of a flag, the executive does not need to divert its attention to a check of the relay status immediately but can wait until it is not busy with another task.

Data Line Maintenance

As part of data line maintenance, controller 50 periodically checks data line 58 to insure that it is operating correctly (information flowing or capable of flowing as required). The line check task is called for by the executive with the flagword LINCHK. The status of data line 58 is recorded in a scratch memory location known as LINUSE. LINUSE contains the disposition of the data line and indicates five different modes or states of the data line:

1. receive mode,
2. transmit mode,
3. bad preamble (abort),
4. line free (clear), and
5. line stuck (low impedance state).

The line check task to be performed will be based upon the mode indicated by LINUSE. The line check task sets LINUSE in a particular mode and it receives and processes switchleg information as well as maintain the integrity of the transmitter, receiver, and the data and attempts to maintain the line free of any problems. The term LINCHK refers to the source code of the subroutine for this task called for by the executive.

Figure 31:
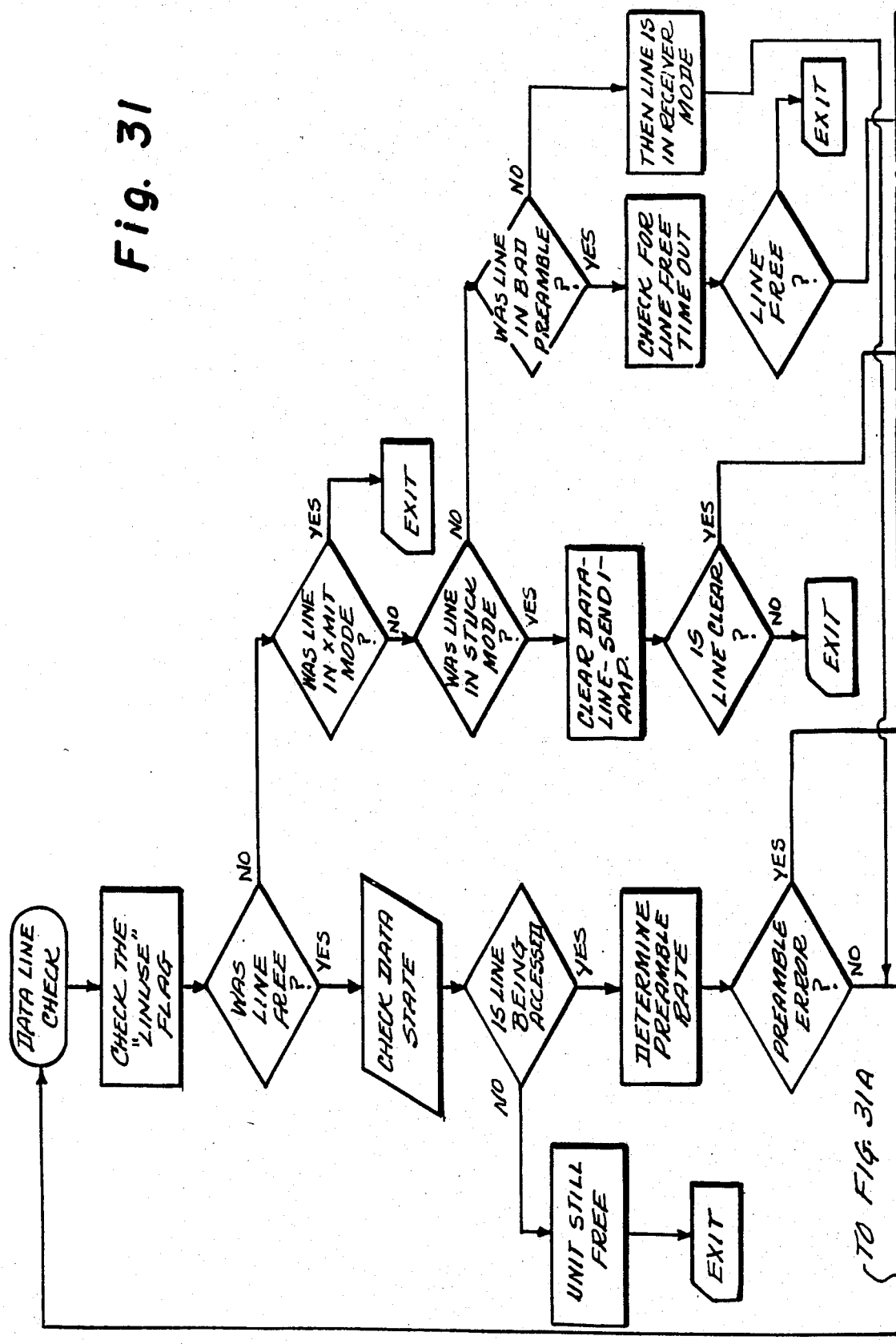

Referring now to FIG. 31, there is shown a flowchart of the entire line check task. When LINCHK is called from the executive, the line use flag is examined and the value of the line use flag is loaded. The line use flag indicates one of the five modes discussed above. It describes the past state of the data line or the disposition of the data or transmitter receiver circuit shown in FIG. 18. The first decision is whether or not line is free. If the line is not free, it must be determined whether or not the line was in a transmit mode the last time the line check task was carried out. If the line was in the transmit mode, then control is returned to the executive so that it can finish the transmission. However, if the line was not in a transmit mode, it must be determined whether the line is stuck. If the line is not stuck, then it must be determined whether there was a bad preamble. If there was no bad preamble, then the line must be in a receive mode and data is received.

Returning to the decision regarding whether there was a bad preamble, if the line is in a bad preamble state then it must be determined whether or not the line is free. If it went free, then the line use flag LINUSE is reset to reflect that line is in a free condition. If the line was not free, then return is controlled to the executive. No data can be received because the data rate is not known. Data cannot be received until the line is free and good preamble sent so that synchronization can take place.

Referring back to the line stuck decision three, if the line is in a stuck mode then there is a short on the data line. Therefore it is necessary to blow a fusable link on the transceiver decoder 56 that is causing the problem which removes the malfunctioned transceiver decoder from the data line. Therefore if it is determined that the line is in a stuck mode, a five millisecond pulse is sent down the data line in order to blow the appropriate fusable link.

Referring back to FIG. 19, a data line clear is initiated by activating the Z2 strobe line and signalling on the D0 data line coupled to data I/O 418. A pulse coupled into optoisolator 456 effectively shorts a transistor 467 placing a resistor 469 in parallel with the series combination of resistors 464 and 466. This causes an effective low impedance to the power supply enabling more current to flow through the data line (data line 58). This clearing current is appropriately one amp which still does not exceed the power limiting specification required by the National Electrical Code (NEC) for low voltage class two wiring.

After a line clear pulse has been sent down the data line, the line is again checked to determine whether or not it is clear. If fusable link 154 has been blown, the line will have been clear. However, if the fusable link has not been blown, the line will continue to be stuck. If the line has not been cleared, control is returned to the executive and the line use flag remains in the stuck mode condition. In this way, the next time the executive calls for the routine it will again note the line stuck condition and pulse the data line in an attempt to clear itself. This continuous loop pulsing will continue until the data line has become clear and the line use flag is set to a bad preamble mode before control returns to the executive. The next time the executive interrogates this routine and it is determined that the line is not free, since the line is not stuck, it will assume that a bad preamble condition exists and will check the line for a time out into the line free mode. After the line is deemed free microprocessor 400 clears the line use flag LINUSE to indicate the free line condition.

If the line is free when the executive initially enters this task, the state of the data line is checked. It is determined whether line is being accessed by a transceiver decoder 56 or other remote device. If the line is still free the routine returns control to the executive. However, if the line is being accessed, then a preamble is being received and controller 50 can determine the rate of data from the preamble. It is then determined whether a preamble error exists. If there is no preamble error, then the data from a switchleg entry is read. However, if there is a preamble error, it is determined whether the line is stuck in a low impedance mode, the line use flag LINUSE is set to indicate that a stuck mode exists (the D0 bit in the SYSERR flag is set before control is returned to the executive) or to indicate a bad preamble exists and should ignore the current transmission. Returning to the decision tree related to whether the line is stuck in a low impedance mode, the line use flag LINUSE is set to indicate a bad preamble and control is returned to the executive.

Assuming there is no preamble error, switchleg data can be read in. If reception is okay, the line use flag is set to indicate a receive mode. When in the receive mode, no transmission can take place and data on the line must be received. Once data is received, it is determined whether the switchleg is valid. That is, if the switchleg data is valid. If it is not, control is returned to the executive and the line is left in a receive mode. If the switchleg data is valid, the switchleg information data is processed, i.e., controller 50 grabs the data line away from whatever devices are using it and transmits a command immediately to the appropriate transceiver decoder 56. After the transmission, the line is left in a free state and control returned to the executive.

If the switchleg data was not valid, the line use flag is left in the receive mode and the next time the routine is executed another attempt will be made to read the switchleg transmission data. If it cannot read the data, it must be determined whether the line is stuck. If the line is stuck, the line use flag is adjusted to so indicate and control is returned to the executive. If the line is not stuck it is determined whether or not the line is free. If so, the line use flag is set to indicate the free line status and control returns to the executive. However, if the line is not free, then synchronization has not been achieved and control is again returned to the executive with the line use flag indicating that the receive mode is in effect.

Relay Check

When a command is sent to a particular relay pursuant to a telephone request or a switch activation, the RELCHK flag is set. Only two bits of an 8-bit byte are used. Bit D0 indicates that it is appropriate for controller 50 to check the status of relays which have been pulsed in response to a switch or telephone request. Bit D1 indicates that it is appropriate to check the status of relays that have been pulsed in response to a schedule change automatically occurring in accordance with the time showing on the real time clock. The use of two separate data bits allows a more leisurely check of relays automatically pulsed for a schedule change. It is not necessary to divert the attention of the executive to these routine checks. However, the executive is interrupted when a telephone or switch request by a user pulses a relay. The D0 bits indicates that the status of the affected relay should be immediately checked to make sure that it has been switched. If it has not responded to the users override instruction, another pulse is immediately sent to attempt to trigger the relay again.

Priority Override

Under normal scheduled control (automatic mode), the change of status of each relay is controlled in accordance with the 7-day-24-hour schedule stored in the main schedule area of RAM 404. For example, the schedule may call for Wednesday, 6:00 PM, lights out in sector 712. If the user controlling sector 712 which has been given priority status (which is entered on the mark-sense card at the time the sector definition is made), the user will be able to inhibit the upcoming schedule change from affecting the priority overridden sector by placing a telephone call to controller 50 in advance of that schedule change. To establish a priority override the remote user who has been assigned a priority sector calls controller 50 by telephone and indicates that even though his lights are scheduled to be turned off at 6:00, they should remain on when the rest of the normally scheduled changes occur at 6:00. When a priority override is in effect, normal schedule changes will not affect the status of the relays controlling the overriden sector.

The priority overrides can be cleared. The inhibiting of an up-coming schedule change can be asserted for sectors that have been overridden which have priority status. For non-priority sector overrides, the override is not retained. Of course, the current state of all relays is retained even for non-priority overrides. However, a subsequent schedule change will affect areas that have been overridden by a command to a sector having non-priority status. Only commands to a priority status sector can override a previously overridden priority status sector until the priority erase time clears all present priority sector overrides. A previously set priority erase time will automatically remove the priority request at a predetermined time. For example, if the previously set priority erase time is 8:00 PM, and the user takes no specific action to cancel his 6:00 PM priority override of the schedule lighting change, then his lights will automatically go out at 8:00 PM, the priority erase time. The priority erase times are stored in RAM 404 between address B266 and B276. The priority erase times are specified at the same time that priority status is assigned to a sector by the user. However, a separate priority erase time is not defined for each sector number. Thus, at the priority erase time, all priorities entered by all remote users for all sectors are erased. If a priority override is required the next day, it must again be specifically requested by the user. This feature is advantageous for energy savings because if a user forgets to turn his lights out after overriding a scheduled lights-out change, his lights will not remain on all night or all weekend, but rather they will go out at the priority erase time. Thus, the building or office complex is constantly forced back into automatic schedule and specific action or scheduling change commands required by the user to alter that schedule.

Alternate Schedules

When the system is operating in the automatic mode, it is regularly checking the real time clock 410 in order to determine when a program schedule change should be executed. These schedule changes are instituted in accordance with a particular day of the week and particular time of the day, based upon a twenty-four hour clock. While the system is operating in the automatic mode, it is also processing telephone requests and remote switchleg overrides. In addition, it is also performing self-diagnostics as will be further explained. In the manual mode (automatic and manual modes are switch selectable from the console of controller 50), all functions are entered via the keyboard through keyboard display interface 414. The system cannot operate in both the automatic and manual modes at the same time. In the automatic mode, no user interaction is required. However, user initiated telephone requests for priority override and switches will be responded to. In the manual mode, the system does not answer or service any telephone or process any remotely actuated switchlegs.

In addition to the main schedules entered for the seven days of the week and the twenty-four hours of each day, special days, such as holidays, may require a special schedule. During those times, there are two alternate schedules available providing a limited amount of scheduling capability without destroying the schedules stored corresponding to the main schedules. Schedule override circuitry is provided such that three possible schedule overrides exist. These are known as eight day override, ninth day override and schedule off. In the schedule off mode, controller 50 will not respond to any predefined schedule but will respond to remote switchleg activation and to telephone requests. Thus, in the schedule off mode the system becomes a fancy "switch".

The eighth and ninth day overrides are provided respectfully in RAM 404 addresses 710B and 71AD. There are 32 entries per alternate schedule available.

Once an eight day override is enabled, there is in place a twenty-four hour schedule specified by the eighth day override. This twenty-four hour schedule will be continously repeated until cancelled. There is no automatic sequencing back to the normal schedule until the eighth day override is cancelled. The normal schedule will continue to default to an override schedule each and every day.

Eighth and ninth day and off schedule overrides are switch selectable at the console of controller 50. Referring back to FIG. 17, the eighth day, ninth day, and off schedule overrides are shown as inputs to an optoisolator 412 coupled to the data bus of controller 50. Optoisolator 412 impresses the eighth schedule override on line D0 of the data bus, ninth day override on line D1 of the data bus and the schedule off override on line D2 of the data bus.

The use of schedule overrides provides significant advantage in that flexibility is provided for handling special situations which occur from time to time without having to redefine and reload the entire memory.

Dynamic Allocation of Pattern Data

Figure 32:
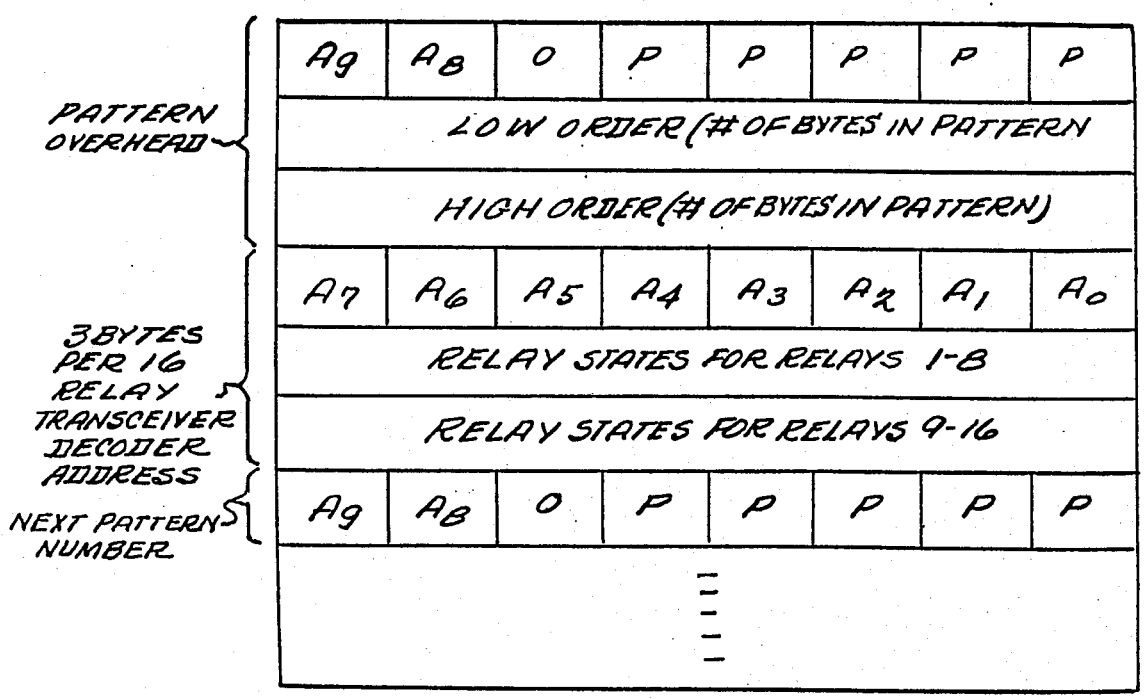
FIG. 32 is a diagram illustrating the dynamic allocation of memory storage areas within the controller's RAM.

Referring now to FIG. 32, there is shown a diagram of the dynamic storage of pattern data in RAM 404. In prior art load control devices, each pattern was assigned a specific amount of memory regardless of the number of relays defined by that pattern. Thus, a pattern including two relays took up as much memory room as a pattern including 30 relays. Under the fixed allocation arrangement, each pattern would have a base address which would be added to some relative address to find the absolute address associated for a transceiver in a particular pattern. This type of arrangment is very wasteful of memory space. The present system utilizes a dynamically allocated memory. In the dynamically allocated memory, there is no fixed amount of memory space dedicated to each pattern. Rather, if a particular pattern defines the status of fewer relays and transceivers than does another pattern, then it would occupy less memory space. In order to determine the location of each pattern from its preceding pattern, a bit of information is included in the pattern specification which indicates the number of bits of data within that pattern. Thus, if pattern 4 is being consulted, the bit indicating the number of data bits is added to the address pattern 4 to yield the address of the beginning of pattern 5. Thus, the pattern table can be scanned readily in order to determine the states of a relay in any pattern. Patterns can be expanded or contracted as long as the number of bits designated in the total bit byte is amended to reflect the new size of the pattern definition.

Keyboard

Figure 34:
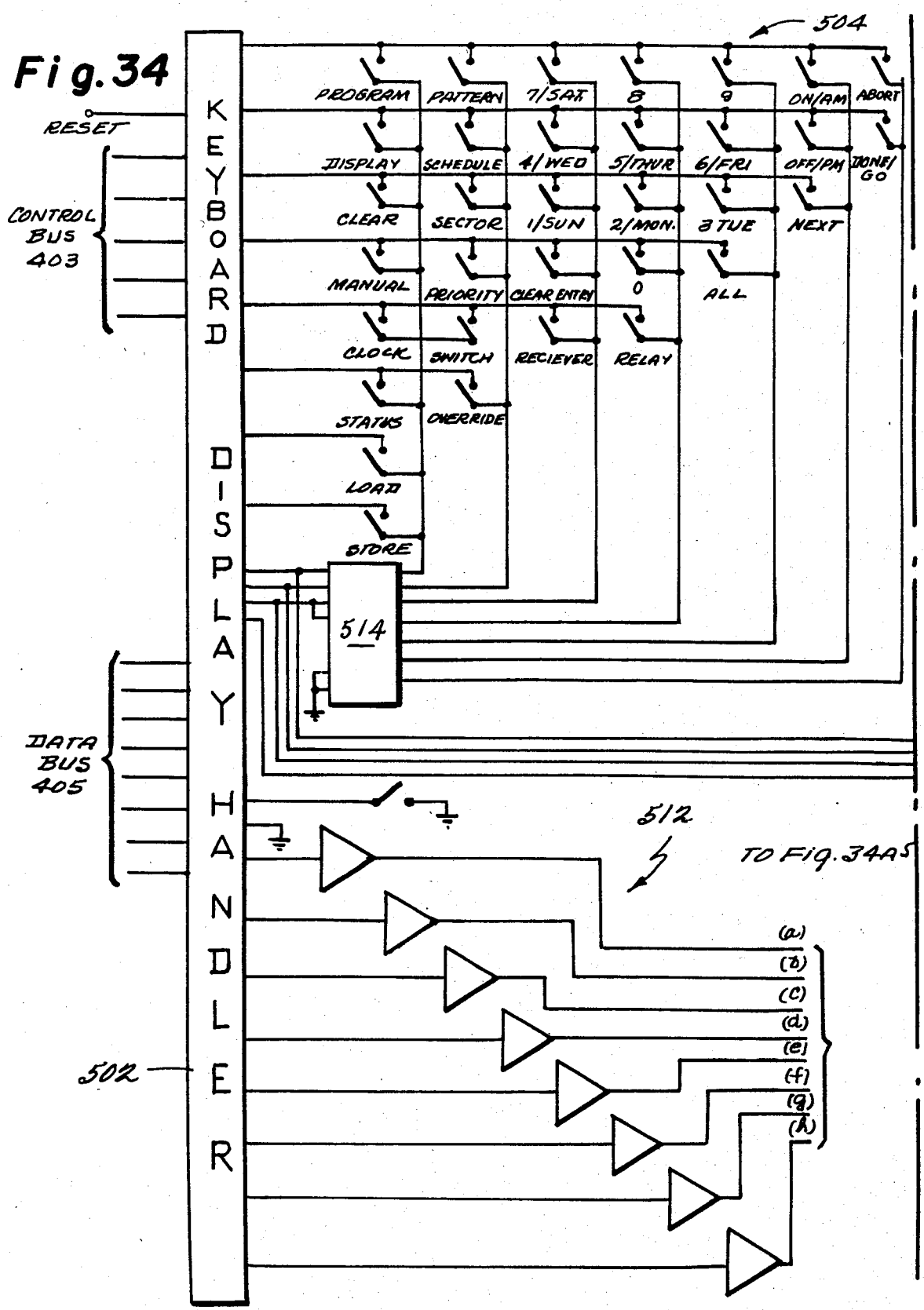
FIGS. 34 and 34a show a schematic diagram of the keyboard and interface.
Figure 34A:
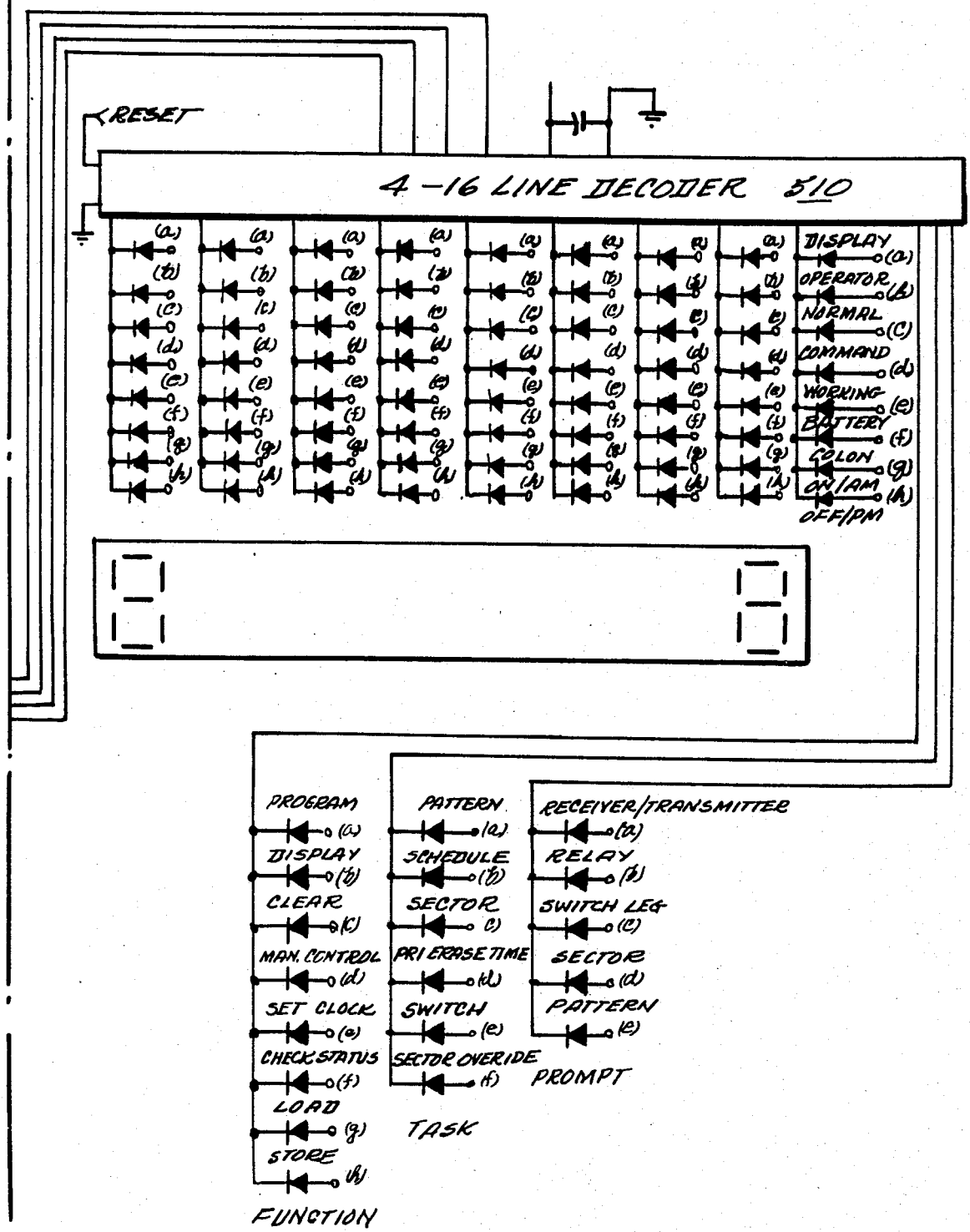

Referring now to FIG. 34, there is shown a schematic diagram of keyboard display 411 and keyboard interface 413.

Microprocessor 400 interfaces directly to a user console via a keyboard interface 413 and keyboard display 411. The keyboard interface 413 utilizes a standard keyboard display controller integrated circuit 502, suitably an Intel 8279, which manages keyboard and display operations. Keyboard interface 413 further includes driver and decoder circuitry 508 coupled to keyboard display controller integrated circuit 502.

Keyboard interface 411 includes a keyboard 504 including a plurality of special purpose keys and a display 506 including a plurality of light emitting diodes (LEDs).

Keyboard display controller 502 is interfaced to microprocessor 400 via data bus 405 and control bus 403 with a strobe Z8 eminating from I/O Strobe 433. At predetermined times, microprocessor 400 issues commands that set keyboard display controller 502 to specific modes which affect the information displayed by display 506. Furthermore, keyboard 504 is read by keyboard display controller 502 which in turn notifies microprocessor 400. In order for keyboard inputs to be read from keyboard display controller 502 microprocessor 400 must poll the status of keyboard display controller 502. The polling of this status for recognizing keyboard inputs is performed only in the manual mode of operation where commands from the user console device are accepted.

Display 506 is refreshed automatically by keyboard display controller 502 thereby allowing a X-Y matrix multiplexing display technique which reduces the number of connections to display 506 thus relieving microprocessor 400 of the time consuming burden of refreshing.

The multiplexing technique used to drive display 506 includes a 4-16 line decoder 510, suitably a 74159, to select the column of up to eight LEDs to be energized. These LEDs form a digital alpha-numeric display for ennunciating failure conditions, system status, and prompt for interactive system definition inputs, e.g., sectors, switches, patterns, priority erase times, and schedule. Once an LED column is selected by decoder 510, a bank of LED drivers 512, coupled to keyboard display controller 502 and receiving information therefrom, causes the appropriate LEDs to be lighted.

Through stages of the definition procedure by the console operator, as well as system status and failure modes, the information displayed on the LEDs is determined by microprocessor 400 instructed by the firmware set forth in Appendix B.

The user inputs to program display, clear, manual control, set the clock, read the status, load and store on tape and for each of the definition functions (pattern, sector, schedule, priority erase time, and switch) are provided in keyboard 504 and are read by a scanning X-Y matrix managed by keyboard display controller 502. The technique of scanning an X-Y keyboard matrix is similar to the X-Y matrix of the display described with reference to the display above. The scanning of the keyboard is achieved by selecting a column of keys and reading any that is enabled by epressing the appropriate key of the column selected of keyboard 504. The depressing of a key electrically connects a column line to a row line.

The column is selected by a 3-8 line decoder 514, suitably a 74156, coupled to the scan lines of keyboard display controller 502. As a column is selected and the row is read, the mechanical contacts of the keys of keyboard 504 are automatically debounced guarding against multiple contact readings. Once a valid key is read by keyboard display controller 502 a flag word is set which is subsequently polled by microprocessor 400 indicating this event. The decoding of the actual key in the X-Y matrix of keyboard 504 that determines if a pattern, sector, schedule, switch, priority erase time, is pressed is achieved in a look-up table provided in the firmware set forth in Appendix B.

Figure 35:
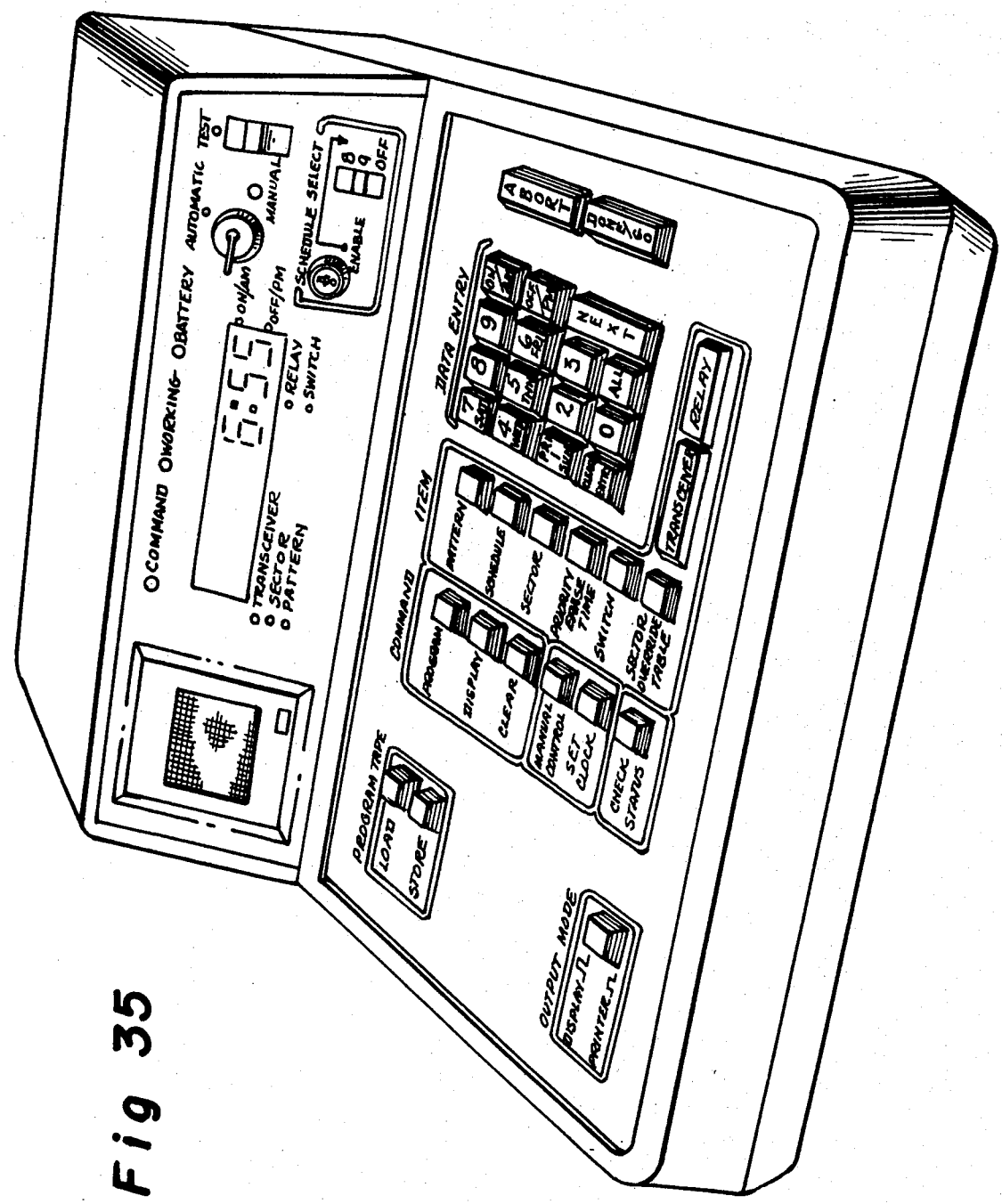
FIG. 35 is a perspective view of the console of the central controller.

FIG. 35 is a pespective view of the console showing the display and keyboard.

SUMMARY

Therefore it is apparent that there has been provided an apparatus for distributed load control providing enhanced flexibility and consequent greater utility to the user.

Many unique features combine to produce a highly sophisticated user interactive load control system:

use of a low voltage twisted pair data line for bi-directional communication;

use of distributed "smart" transceiver decoders;

use of a communication protocol and data format permitting data line arbitration among completing transceiver decoders;

use of switchleg and analog input circuits for condition responsiveness;

time dependent scheduling of sectors defining a subset of relays and loads rather than scheduling of patterns;

self-diagnosis of error and self-clearing;

self-clocking synchronization for magnetic tape reading; and mode control of transceiver decoders via function words in the data stream.

It should be apparent that the apparatus and methods and articles which are described above provide great facility and flexibility in the control of electric loads within a building.

In understanding the significance of some of the features which are incorporated in the system and apparatus, it is important to have an idea of the use of such a system from the point of view of a potential user.

In the first place the one feature of the system is that it is made up of components which are very susceptible to removal and replacement. The controller itself has basically two connections for a twisted pair of wires; it has a number of plug-in ports for accessories, such as card readers and it has the conventional power source which can be plugged into a convenient wall receptacle. To replace the controller involves simply a disconnection of the accessory plugs, the removal of the two twisted pair of wires, unplugging from the power source and replacement by another programmer which is the full equivalent of that which is removed. Similarly, the transceiver decoder units are built to include a board which can be removed from operation essentially as described in this application, and which can be removed physically from its container structure for replacement by an equivalent transceiver decoder structure with a minimum of disconnection and reconnection effort.

In other words, the system itself is made up of highly replaceable elements so that a user requires a minimum of maintenance and service in order to keep his system functioning and in good order and providing the inherent capability which has been discussed above.

The factor of relatively low level of needed service is important in a system of this type because the user is not confronted with a level of complexity in dealing with the installation or in dealing with the substitution of components which is characteristic of numerous other systems. From the user's point of view numerous features have been incorporated in the system which greatly facilitate the user installation and substitution of the components thereof with a minimum service requirement in putting the system to actual use and deriving the benefits including the economy and cost saving therefrom.

Another attribute of the system, apparatus and articles of this invention is that because of the numerous elements discussed and described above, the system is highly interactive. By interactive is meant that the user communicates with the system through interrogation and response and can adapt and utilize the system for the specialized uses to which his building is to be put. Such control includes furnishing and controlling energy distribution or supply within the building as well as in providing a desired lighting environment around the building.

One of the unique advantages of this system is that the features as described above have been combined and incorporated in the system so that the user can directly enter his energy distribution and control needs into the system and can establish control which is specially tailored to the user's particular building use and to the uses to be made of it. In other words, one of the results of the incorporation of the numerous features discussed above is that it makes it feasible for individuals who are not trained in the use of sophisticated control equipment to actually undertake and to establish control of the lighting within the building to serve the tasks which are to be performed in the building and to achieve cost saving economy in furnishing the energy needed for carrying out the tasks. This can be accomplished without the need for highly trained specialists to get the system working after it is first installed or to modify its operation after it has been working. Because of the described features the user need not engage in complex forms of programming to make the system operate or to perform in accordance with particular needs of building occupants. This is significant to the user of a building in that it is the user who has the greatest understanding of what the energy needs for the tasks are.

The system does not exclude the employment of a specialist in energy supply and control and the system can be used by a highly skilled individual. However, the highly skilled individual is not needed in order to initiate the energy supply and control within the building and in order to alter it to the changing tasks and pattern of tasks to be carried out. Skilled specialists are not needed to alter the energy supply and control when the building is to be used for other purposes.

What makes this great facility in initiating and modifying the supply and control of energy in a building are the numerous features which have been incorporated in the system as are described above. For example, one such feature is a great facility in exchange of the individual units. Another feature is that such exchange will be a rare occurrence because of the great reliability which has been built into the system. One of the contributing factors to the great reliability is the self-diagnostic features and the self-checking and automatic establishing of the most reliable mode of operation of the system. Accordingly it may be seen that the features which are combined in the subject invention are very significant in the combination provided in that they contribute significantly to the interactive control and supply of energy by non-specialists and directly by the building, occupants and operators and users.

The foregoing is true although the control and energy supply which is achieved is at a very sophisticated level involving the establishment of numerous economical and valuable patterns and changes in patterns with conditions and with time. Further, one of the additional novel aspects achieved because of the incorporation of the numerous unique features of the system, as described herein, is that the system can be fine tuned to the individual tasks performed within the building and to individual needs of the personnel who perform such tasks within areas of the building.

Moreover, because of the combination of features and means to achieve these features as set forth herein, it is feasible for modifications to be made on an individual employee basis to provide optimum energy supply for the needs of the individual, but at the same time to optimize the economy of his use of energy and thus the overall use of energy within the building. This is illustrated, for example, by the accommodation to a "flextime" schedule under which individual employees operate at different schedules and where in a series of six adjoining offices there may be six different schedules to be followed based on the individual preferences of those employees who use the offices.

It is particularly significant that although the system may be used with such great flexibility, nevertheless, this can be accomplished by individuals making the changes in the schedules who tailor them to the needs and working preferences of employees on an individual basis and yet there is great reliability in the system because of the numerous features which are described above which contribute to such reliability.

One feature which contributes to the responsiveness of the overall system to individual needs and the needs for specific tasks is the feature as discussed above. The arbitration feature actually permits accelerated communication in a system which can have data signals generated from many sources for transmission over a single communication data link. Such random accessing of the communication link by any of the numerous data sources is in contrast to the prior art schemes which depend on time consuming sequential polling.

A system such as that described can operate entirely by following a schedule, where there are no interrupts or overrides implemented by any parametric condition change or by a user override command. Where the schedule has been constructed to achieve optimum economy then the cost of operation is minimized. However, the criteria for optimum operation of the system is not operation at lowest cost. Rather what is sought and what is made possible by the system as described herein is an optimum use of a facility such as a building in the sense of both lower energy use but also in the sense of increased efficiency in use of the energy consumed to achieve the designated tasks within the structure. The significant gain in operation of this system is in facilitating a highly interactive mode of operation of the system so that individual uses of discrete portion of the structure can control energy usage in their respective position of the structure. Such interactive use is both by changing the overall schedule or condition responsive mode of operation and by overriding schedule or condition responsive operation of a position of a structure. Accordingly while increased energy use and increased energy cost may be incurred by overrides of schedule or condition response the efficiency of use of a part of a facility such as an office, conference room, cafeteria or the like can be accomplished.

Other embodiments and modification of the present invention will be apparent to those of ordinary skill in the art having the benefit of the teaching presented in the foregoing description and drawings. It is therefore, to be understood that this invention is not to be unduly limited and such modifications are intended to be included within the scope of the appended claims.

APPENDIX A

ROM CODE FOR MICROCOMPUTER 100 ASSOCIATED WITH TRANSCEIVER DECODER 56
© General Electric Company, 1979

| ADDRESS | DATA | ADDRESS | DATA |
|---|---|---|---|
| 0000 | 1A | 0001 | A5 |
| 0002 | 13 | 0003 | 21 |
| 0004 | 08 | 0005 | 1E |
| 0006 | 64 | 0007 | 6A |
| 0008 | 5D | 0009 | 20 |
| 000A | 80 | 000B | 5D |
| 000C | 70 | 000D | 5D |
| 000E | B0 | 000F | B1 |
| 0010 | B4 | 0011 | B4 |
| 0012 | 6F | 0013 | 5D |
| 0014 | 5D | 0015 | 73 |
| 0016 | 5D | 0017 | 65 |
| 0018 | 68 | 0019 | 70 |
| 001A | 5D | 001B | 5D |
| 001C | 5D | 001D | 5D |
| 001E | 90 | 001F | 49 |
| 0020 | 49 | 0021 | 21 |
| 0022 | 80 | 0023 | 84 |
| 0024 | 07 | 0025 | 31 |
| 0026 | 84 | 0027 | 03 |
| 0028 | 1B | 0029 | 1C |
| 002A | 0C | 002B | 70 |
| 002C | B4 | 002D | B1 |
| 002E | 64 | 002F | 69 |
| 0030 | 3C | 0031 | 84 |
| 0032 | 28 | 0033 | 6C |
| 0034 | 70 | 0035 | EC |
| 0036 | 94 | 0037 | 26 |
| 0038 | 20 | 0039 | FF |
| 003A | B7 | 003B | 20 |
| 003C | EA | 003D | B6 |
| 003E | 1B | 003F | 6B |
| 0040 | 70 | 0041 | EC |
| 0042 | 94 | 0043 | 1D |
| 0044 | 68 | 0045 | 70 |
| 0046 | EC | 0047 | 94 |
| 0048 | 1B | 0049 | 1B |
| 004A | A6 | 004B | 91 |
| 004C | 05 | 004D | 2B |
| 004E | 2B | 004F | 90 |
| 0050 | FA | 0051 | A6 |
| 0052 | 81 | 0053 | F7 |
| 0054 | A6 | 0055 | 81 |
| 0056 | F4 | 0057 | 29 |
| 0058 | 03 | 0059 | D0 |
| 005A | 29 | 005B | 05 |
| 005C | AE | 005D | 29 |
| 005E | 04 | 005F | 6B |
| 0060 | 29 | 0061 | 00 |
| 0062 | AE | 0063 | 29 |
| 0064 | 06 | 0065 | 8E |
| 0066 | 2B | 0067 | 2B |
| 0068 | 20 | 0069 | 38 |
| 006A | B5 | 006B | 20 |
| 006C | 18 | 006D | 85 |
| 006E | 20 | 006F | 10 |
| 0070 | B5 | 0071 | 2B |
| 0072 | A1 | 0073 | 5D |
| 0074 | 20 | 0075 | 08 |
| 0076 | B5 | 0077 | 2B |
| 0078 | A1 | 0079 | 5D |
| 007A | 20 | 007B | 18 |
| 007C | B5 | 007D | 62 |
| 007E | 68 | 007F | 70 |
| 0080 | 5C | 0081 | 1D |

APPENDIX A-continued

ROM CODE FOR MICROCOMPUTER 100 ASSOCIATED WITH TRANSCEIVER DECODER 56
© General Electric Company, 1979

| ADDRESS | DATA | ADDRESS | DATA |
|---|---|---|---|
| 0082 | 94 | 0083 | 0F |
| 0084 | 66 | 0085 | 6A |
| 0086 | 20 | 0087 | FF |
| 0088 | 5D | 0089 | 5D |
| 008A | 6E | 008B | 5D |
| 008C | 5D | 008D | 64 |
| 008E | 6C | 008F | 20 |
| 0090 | C0 | 0091 | 5C |
| 0092 | A5 | 0093 | 1F |
| 0094 | 94 | 0095 | 96 |
| 0096 | 29 | 0097 | 07 |
| 0098 | EA | 0099 | 2B |
| 009A | 2B | 009B | 2B |
| 009C | 2B | 009D | 2B |
| 009E | 2B | 009F | 2B |
| 00A0 | A6 | 00A1 | 81 |
| 00A2 | 08 | 00A3 | A6 |
| 00A4 | 81 | 00A5 | 05 |
| 00A6 | A6 | 00A7 | 81 |
| 00A8 | 02 | 00A9 | 0C |
| 00AA | 40 | 00AB | B6 |
| 00AC | 1B | 00AD | 1C |
| 00AE | 70 | 00AF | EC |
| 00B0 | 91 | 00B1 | 0A |
| 00B2 | 12 | 00B3 | 84 |
| 00B4 | 0A | 00B5 | 12 |
| 00B6 | 84 | 00B7 | 0A |
| 00B8 | 29 | 00B9 | 01 |
| 00BA | 8C | 00BB | 29 |
| 00BC | 04 | 00BD | 4C |
| 00BE | 29 | 00BF | 01 |
| 00C0 | BB | 00C1 | 1B |
| 00C2 | 67 | 00C3 | 68 |
| 00C4 | 72 | 00C5 | 51 |
| 00C6 | 20 | 00C7 | 18 |
| 00C8 | 52 | 00C9 | 70 |
| 00CA | 57 | 00CB | 78 |
| 00CC | 58 | 00CD | A6 |
| 00CE | 91 | 00CF | 04 |
| 00D0 | A6 | 00D1 | 81 |
| 00D2 | 1D | 00D3 | 70 |
| 00D4 | 54 | 00D5 | 74 |
| 00D6 | 55 | 00D7 | 1A |
| 00D8 | 70 | 00D9 | B6 |
| 00DA | A7 | 00DB | 56 |
| 00DC | 20 | 00DD | 81 |
| 00DE | 59 | 00DF | 4C |
| 00E0 | B7 | 00E1 | 20 |
| 00E2 | 7B | 00E3 | 50 |
| 00E4 | A6 | 00E5 | 81 |
| 00E6 | 0C | 00E7 | 34 |
| 00E8 | 94 | 00E9 | FB |
| 00EA | 35 | 00EB | 94 |
| 00EC | F8 | 00ED | 90 |
| 00EE | 5F | 00EF | 29 |
| 00F0 | 01 | 00F1 | 8C |
| 00F2 | 40 | 00F3 | B6 |
| 00F4 | 28 | 00F5 | 07 |
| 00F6 | 79 | 00F7 | 84 |
| 00F8 | 74 | 00F9 | A7 |
| 00FA | 31 | 00FB | 84 |
| 00FC | 08 | 00FD | 69 |
| 00FE | CC | 00FF | 92 |
| 0100 | 5C | 0101 | 70 |
| 0102 | 90 | 0103 | 07 |
| 0104 | 6A | 0105 | CC |
| 0106 | 82 | 0107 | 55 |
| 0108 | 20 | 0109 | 80 |
| 010A | 51 | 010B | 47 |
| 010C | 12 | 010D | E1 |
| 010E | 57 | 010F | 38 |
| 0110 | 84 | 0111 | 18 |
| 0112 | 67 | 0113 | 68 |
| 0114 | 70 | 0115 | B6 |
| 0116 | 4D | 0117 | B7 |
| 0118 | 54 | 0119 | A6 |
| 011A | 81 | 011B | 41 |

APPENDIX A-continued

ROM CODE FOR MICROCOMPUTER 100 ASSOCIATED WITH TRANSCEIVER DECODER 56
© General Electric Company, 1979

| ADDRESS | DATA | ADDRESS | DATA |
|---------|------|---------|------|
| 011C | 72 | 011D | 51 |
| 011E | 20 | 011F | 7B |
| 0120 | 50 | 0121 | A6 |
| 0122 | 81 | 0123 | CF |
| 0124 | 34 | 0125 | 94 |
| 0126 | FB | 0127 | 90 |
| 0128 | 29 | 0129 | 42 |
| 012A | 0B | 012B | 47 |
| 012C | 5D | 012D | 0A |
| 012E | 25 | 012F | 1D |
| 0130 | 94 | 0131 | 34 |
| 0132 | 64 | 0133 | 6B |
| 0134 | 71 | 0135 | 5C |
| 0136 | 68 | 0137 | 67 |
| 0138 | 4C | 0139 | CC |
| 013A | 82 | 013B | 12 |
| 013C | CC | 013D | 82 |
| 013E | 0F | 013F | CC |
| 0140 | 82 | 0141 | 0C |
| 0142 | 50 | 0143 | A6 |
| 0144 | 81 | 0145 | 17 |
| 0146 | 28 | 0147 | 07 |
| 0148 | 7E | 0149 | 92 |
| 014A | 04 | 014B | 90 |
| 014C | 6F | 014D | 1E |
| 014E | 29 | 014F | 00 |
| 0150 | 2B | 0151 | 20 |
| 0152 | 1E | 0153 | 50 |
| 0154 | 28 | 0155 | 07 |
| 0156 | 7E | 0157 | 92 |
| 0158 | F6 | 0159 | 29 |
| 015A | 00 | 015B | C1 |
| 015C | 20 | 015D | 1E |
| 015E | 50 | 015F | 28 |
| 0160 | 07 | 0161 | 7E |
| 0162 | 1B | 0163 | 90 |
| 0164 | 28 | 0165 | 52 |
| 0166 | 78 | 0167 | 58 |
| 0168 | 70 | 0169 | 57 |
| 016A | 90 | 016B | A7 |
| 016C | 1A | 016D | 74 |
| 016E | 50 | 016F | A6 |
| 0170 | 91 | 0171 | 1B |
| 0172 | 30 | 0173 | 94 |
| 0174 | FB | 0175 | 70 |
| 0176 | 08 | 0177 | 09 |
| 0178 | 1F | 0179 | 94 |
| 017A | FC | 017B | 20 |
| 017C | 28 | 017D | 50 |
| 017E | 28 | 017F | 07 |
| 0180 | 7E | 0181 | 64 |
| 0182 | 6B | 0183 | 70 |
| 0184 | 5C | 0185 | 6F |
| 0186 | 5C | 0187 | 1B |
| 0188 | 1E | 0189 | 29 |
| 018A | 00 | 018B | 49 |
| 018C | 1A | 018D | 64 |
| 018E | 6B | 018F | 74 |
| 0190 | 5C | 0191 | 1B |
| 0192 | A7 | 0193 | 25 |
| 0194 | 01 | 0195 | 84 |
| 0196 | 88 | 0197 | 1A |
| 0198 | 67 | 0199 | 68 |
| 019A | 4D | 019B | 57 |
| 019C | A6 | 019D | 81 |
| 019E | 0B | 019F | 37 |
| 01A0 | 94 | 01A1 | FB |
| 01A2 | 72 | 01A3 | 64 |
| 01A4 | 6B | 01A5 | 5C |
| 01A6 | 29 | 01A7 | 00 |
| 01A8 | C1 | 01A9 | A6 |
| 01AA | 91 | 01AB | F1 |
| 01AC | 67 | 01AD | 68 |
| 01AE | 4D | 01AF | 12 |
| 01B0 | 1F | 01B1 | 57 |
| 01B2 | A6 | 01B3 | 91 |
| 01B4 | E4 | 01B5 | 37 |
| 01B6 | 2B | 01B7 | 94 |
| 01B8 | FA | 01B9 | 90 |
| 01BA | C7 | 01BB | 1A |
| 01BC | 63 | 01BD | 6B |
| 01BE | 70 | 01BF | 56 |
| 01C0 | 28 | 01C1 | 07 |
| 01C2 | 92 | 01C3 | 28 |
| 01C4 | 07 | 01C5 | 92 |
| 01C6 | 28 | 01C7 | 07 |
| 01C8 | 92 | 01C9 | 28 |
| 01CA | 07 | 01CB | 92 |
| 01CC | 6C | 01CD | 4C |
| 01CE | E6 | 01CF | 1F |
| 01D0 | 94 | 01D1 | 4D |
| 01D2 | 68 | 01D3 | A5 |
| 01D4 | 21 | 01D5 | 03 |
| 01D6 | 1F | 01D7 | 50 |
| 01D8 | 4D | 01D9 | C0 |
| 01DA | 21 | 01DB | 03 |
| 01DC | 94 | 01DD | 41 |
| 01DE | A4 | 01DF | 18 |
| 01E0 | 21 | 01E1 | 90 |
| 01E2 | 1E | 01E3 | A0 |
| 01E4 | 1F | 01E5 | CC |
| 01E6 | 1D | 01E7 | 84 |
| 01E8 | 03 | 01E9 | 21 |
| 01EA | FE | 01EB | 19 |
| 01EC | 94 | 01ED | 31 |
| 01EE | 4E | 01EF | 1D |
| 01F0 | 84 | 01F1 | 04 |
| 01F2 | 21 | 01F3 | 01 |
| 01F4 | 1E | 01F5 | 4C |
| 01F6 | 14 | 01F7 | 12 |
| 01F8 | 50 | 01F9 | 4C |
| 01FA | 12 | 01FB | 12 |
| 01FC | 22 | 01FD | F8 |
| 01FE | E0 | 01FF | 1F |
| 0200 | 94 | 0201 | 1D |
| 0202 | 6A | 0203 | 4D |
| 0204 | 5A | 0205 | 4D |
| 0206 | 5B | 0207 | 40 |
| 0208 | 25 | 0209 | 04 |
| 020A | 92 | 020B | 13 |
| 020C | 84 | 020D | 0E |
| 020E | 25 | 020F | 00 |
| 0210 | 84 | 0211 | 20 |
| 0212 | 30 | 0213 | 84 |
| 0214 | 3D | 0215 | 30 |
| 0216 | 84 | 0217 | 5C |
| 0218 | 29 | 0219 | 02 |
| 021A | 97 | 021B | 29 |
| 021C | 02 | 021D | CD |
| 021E | 64 | 021F | 6B |
| 0220 | 72 | 0221 | 5C |
| 0222 | 29 | 0223 | 00 |
| 0224 | C1 | 0225 | 64 |
| 0226 | 6B | 0227 | 72 |
| 0228 | 5C | 0229 | 29 |
| 022A | 00 | 022B | C2 |
| 022C | 28 | 022D | 06 |
| 022E | C0 | 022F | 90 |
| 0230 | EE | 0231 | 66 |
| 0232 | 1D | 0233 | 94 |
| 0234 | 0A | 0235 | 6A |
| 0236 | 20 | 0237 | 5F |
| 0238 | 50 | 0239 | 20 |
| 023A | 80 | 023B | 51 |
| 023C | 90 | 023D | 08 |
| 023E | 6E | 023F | 20 |
| 0240 | AF | 0241 | 50 |
| 0242 | 20 | 0243 | 40 |
| 0244 | 51 | 0245 | 4A |
| 0246 | 5D | 0247 | 4B |
| 0248 | 5D | 0249 | 64 |
| 024A | 6C | 024B | 4C |
| 024C | F0 | 024D | E1 |
| 024E | 5C | 024F | 90 |

APPENDIX A-continued

ROM CODE FOR MICROCOMPUTER 100 ASSOCIATED WITH TRANSCEIVER DECODER 56
© General Electric Company, 1979

| ADDRESS | DATA | ADDRESS | DATA |
|---|---|---|---|
| 0250 | DC | 0251 | 66 |
| 0252 | 1D | 0253 | 94 |
| 0254 | 10 | 0255 | 68 |
| 0256 | 4A | 0257 | 5D |
| 0258 | 4B | 0259 | 5D |
| 025A | 64 | 025B | 6F |
| 025C | 4C | 025D | 21 |
| 025E | 0C | 025F | 22 |
| 0260 | 01 | 0261 | 5C |
| 0262 | 90 | 0263 | C2 |
| 0264 | 6C | 0265 | 4A |
| 0266 | 5D | 0267 | 4B |
| 0268 | 5D | 0269 | 64 |
| 026A | 6F | 026B | 4C |
| 026C | 21 | 026D | 03 |
| 026E | 22 | 026F | 04 |
| 0270 | 5C | 0271 | 90 |
| 0272 | B3 | 0273 | 64 |
| 0274 | 6F | 0275 | 4C |
| 0276 | 1D | 0277 | 94 |
| 0278 | 18 | 0279 | 21 |
| 027A | 01 | 027B | 84 |
| 027C | A2 | 027D | 68 |
| 027E | 66 | 027F | 4A |
| 0280 | EC | 0281 | 1F |
| 0282 | 94 | 0283 | A9 |
| 0284 | 4D | 0285 | 5A |
| 0286 | 4B | 0287 | EC |
| 0288 | 1F | 0289 | 94 |
| 028A | A2 | 028B | 4C |
| 028C | 5B | 028D | 29 |
| 028E | 02 | 028F | 31 |
| 0290 | 21 | 0291 | 04 |
| 0292 | 84 | 0293 | 8B |
| 0294 | 6C | 0295 | 90 |
| 0296 | E8 | 0297 | 1D |
| 0298 | 66 | 0299 | 94 |
| 029A | 2C | 029B | 68 |
| 029C | 7C | 029D | 50 |
| 029E | 72 | 029F | 51 |
| 02A0 | 4A | 02A1 | 5D |
| 02A2 | 52 | 02A3 | 4B |
| 02A4 | 5D | 02A5 | 53 |
| 02A6 | 64 | 02A7 | 6F |
| 02A8 | 4C | 02A9 | F0 |
| 02AA | E1 | 02AB | 5C |
| 02AC | 28 | 02AD | 06 |
| 02AE | CA | 02AF | 22 |
| 02B0 | A8 | 02B1 | 07 |
| 02B2 | 28 | 0283 | 06 |
| 0286 | 0A | 02B7 | 20 |
| 02B8 | 8C | 02B9 | 54 |
| 02BA | A6 | 02BB | 91 |
| 02BC | 07 | 02BD | 34 |
| 02BE | 94 | 02BF | FB |
| 02C0 | 29 | 02C1 | 02 |
| 02C2 | 2C | 02C3 | 29 |
| 02C4 | 02 | 02C5 | 25 |
| 02C6 | 6C | 02C7 | 73 |
| 02C8 | 50 | 02C9 | 78 |
| 02CA | 51 | 02CB | 90 |
| 02CC | D4 | 02CD | 4A |
| 02CE | 21 | 02CF | 0F |
| 02D0 | 50 | 02D1 | 4A |
| 02D2 | 14 | 02D3 | E0 |
| 02D4 | 25 | 02D5 | 0F |
| 02D6 | 94 | 02D7 | E9 |
| 02D8 | 40 | 02D9 | 13 |
| 02DA | 2A | 02DB | 03 |
| 02DC | 3D | 02DD | 8E |
| 02DE | 0E | 02DF | 0D |
| 02E0 | 4B | 02E1 | 5A |
| 02E2 | 20 | 02E3 | AA |
| 02E4 | 5B | 02E5 | 66 |
| 02E6 | 1D | 02E7 | 94 |
| 02E8 | 0B | 02E9 | 6A |
| 02EA | 20 | 02EB | 5F |
| 02EC | 50 | 02ED | 20 |
| 02EE | 20 | 02EF | 51 |
| 02F0 | 29 | 02F1 | 02 |
| 02F2 | 45 | 02F3 | 6E |
| 02F4 | 20 | 02F5 | AF |
| 02F6 | 50 | 02F7 | 20 |
| 02F8 | 10 | 02F9 | 51 |
| 02FA | 29 | 02FB | 02 |
| 02FC | 45 | 02FD | 4B |
| 02FE | 5A | 02FF | 20 |
| 0300 | 55 | 0301 | 90 |
| 0302 | E2 | 0303 | 64 |
| 0304 | 6F | 0305 | 4C |
| 0306 | 1D | 0307 | 94 |
| 0308 | 0E | 0309 | 21 |
| 030A | 02 | 030B | 84 |
| 030C | 11 | 030F | 4D |
| 0310 | 5A | 0311 | 4D |
| 0312 | 5B | 0313 | 29 |
| 0314 | 02 | 0315 | 31 |
| 0316 | 21 | 0317 | 08 |
| 0318 | 84 | 0319 | 04 |
| 031A | 6C | 031B | 90 |
| 031C | F2 | 031D | 29 |
| 031E | 02 | 031F | 1E |
| 0320 | 28 | 0321 | 06 |
| 0322 | D9 | 0323 | 94 |
| 0324 | 16 | 0325 | 65 |
| 0326 | 1D | 0327 | 94 |
| 0328 | 04 | 0329 | 68 |
| 032A | 90 | 032B | 02 |
| 032C | 6A | 032D | 4D |
| 032E | 52 | 032F | 4D |
| 0330 | 53 | 0331 | 28 |
| 0332 | 06 | 0333 | CA |
| 0334 | 22 | 0335 | A8 |
| 0336 | 07 | 0337 | 28 |
| 0338 | 06 | 0339 | 9F |
| 033A | 29 | 033B | 02 |
| 033C | 2C | 033D | 90 |
| 033E | A2 | 033F | 90 |
| 0340 | BD | 0341 | 90 |
| 0342 | C1 | 0343 | 90 |
| 0344 | F6 | 0345 | 90 |
| 0346 | DA | 0347 | 90 |
| 0348 | 0B | 0349 | 90 |
| 034A | 09 | 034B | 90 |
| 034C | 07 | 034D | 90 |
| 034E | 25 | 034F | 90 |
| 0350 | D5 | 0351 | 90 |
| 0352 | 06 | 0353 | 28 |
| 0354 | 06 | 0355 | D9 |
| 0356 | 94 | 0357 | E3 |
| 0358 | A4 | 0359 | 21 |
| 035A | 90 | 035B | 14 |
| 035C | 53 | 035D | 12 |
| 035E | 12 | 035F | E3 |
| 0360 | 21 | 0361 | 03 |
| 0362 | 64 | 0363 | 6A |
| 0364 | EC | 0365 | 22 |
| 0366 | 60 | 0367 | 52 |
| 0368 | 67 | 0369 | 68 |
| 036A | 4C | 036B | 53 |
| 036C | 2B | 036D | 06 |
| 036E | CA | 036F | 22 |
| 0370 | E0 | 0371 | 90 |
| 0372 | C4 | 0373 | A5 |
| 0374 | 21 | 0375 | 40 |
| 0376 | 84 | 0377 | E1 |
| 0378 | 70 | 0379 | B1 |
| 037A | B4 | 037B | 18 |
| 037C | 51 | 037D | 4B |
| 037E | B1 | 037F | 28 |
| 0380 | 03 | 0381 | A2 |
| 0382 | 28 | 0383 | 03 |
| 0384 | A2 | 0385 | 50 |
| 0386 | 28 | 0387 | 03 |

APPENDIX A-continued

ROM CODE FOR MICROCOMPUTER 100
ASSOCIATED WITH TRANSCEIVER DECODER 56
© General Electric Company, 1979

| ADDRESS | DATA | ADDRESS | DATA | ADDRESS | DATA | ADDRESS | DATA |
|---|---|---|---|---|---|---|---|
| 0388 | A2 | 0389 | C0 | 0422 | 25 | 0423 | 0A |
| 038A | 50 | 038B | 41 | 0424 | 92 | 0425 | 05 |
| 038C | 19 | 038D | 18 | 0426 | 71 | 0427 | 50 |
| 038E | 21 | 038F | 80 | 0428 | 90 | 0429 | 1B |
| 0390 | 51 | 0391 | 40 | 042A | 7A | 042B | 50 |
| 0392 | 12 | 0393 | E1 | 042C | 28 | 042D | 07 |
| 0394 | 53 | 0395 | 4B | 042E | 7E | 042F | 68 |
| 0396 | 22 | 0397 | 90 | 0430 | 42 | 0431 | 5D |
| 0398 | 52 | 0399 | 20 | 0432 | 12 | 0433 | 12 |
| 039A | FF | 039B | B7 | 0434 | 53 | 0435 | 33 |
| 039C | 20 | 039D | EA | 0436 | 43 | 0437 | 18 |
| 039E | 27 | 039F | 06 | 0438 | 1F | 0439 | 5D |
| 03A0 | 90 | 03A1 | CB | 043A | C2 | 043B | 18 |
| 03A2 | 70 | 03A3 | B6 | 043C | 1F | 043D | 5D |
| 03A4 | 20 | 03A5 | A8 | 043E | 29 | 043F | 01 |
| 03A6 | 52 | 03A7 | 20 | 0440 | 8C | 0441 | 20 |
| 03A8 | 38 | 03A9 | B5 | 0442 | 96 | 0443 | 50 |
| 03AA | 20 | 03AB | 81 | 0444 | 28 | 0445 | 07 |
| 03AC | B7 | 03AD | A5 | 0446 | 7E | 0447 | 64 |
| 03AE | 21 | 03AF | 40 | 0448 | 6B | 0449 | 20 |
| 03B0 | 94 | 03B1 | FC | 044A | 80 | 044B | 5C |
| 03B2 | 42 | 03B3 | B6 | 044C | 1B | 044D | 70 |
| 03B4 | A7 | 03B5 | 12 | 044E | 1E | 044F | 1A |
| 03B6 | 94 | 03B7 | FD | 0450 | 54 | 0451 | 73 |
| 03B8 | 20 | 03B9 | 18 | 0452 | 55 | 0453 | 34 |
| 03BA | B5 | 03BB | 20 | 0454 | 94 | 0455 | 04 |
| 03BC | 19 | 03BD | 53 | 0456 | 35 | 0457 | 84 |
| 03BE | 33 | 03BF | 94 | 0458 | 0A | 0459 | A6 |
| 03C0 | FE | 03C1 | 70 | 045A | 81 | 045B | F8 |
| 03C2 | B7 | 03C3 | 42 | 045C | 1B | 045D | A6 |
| 03C4 | B6 | 03C5 | A5 | 045E | 91 | 045F | FE |
| 03C6 | 21 | 03C7 | 40 | 0460 | 90 | 0461 | EB |
| 03C8 | 84 | 03C9 | FC | 0462 | 1A | 0463 | 64 |
| 03CA | A7 | 03CB | 84 | 0464 | 6B | 0465 | 70 |
| 03CC | 03 | 03CD | 18 | 0466 | 5C | 0467 | 1B |
| 03CE | 1F | 03CF | 1C | 0468 | 29 | 0469 | 00 |
| 03D0 | 1A | 03D1 | 67 | 046A | 49 | 046B | 70 |
| 03D2 | 6B | 03D3 | A7 | 046C | B4 | 046D | B1 |
| 03D4 | 56 | 03D5 | 20 | 046E | 4C | 046F | 21 |
| 03D6 | 81 | 03D7 | 59 | 0470 | 0F | 0471 | 84 |
| 03D8 | A6 | 03D9 | 91 | 0472 | 59 | 0473 | 12 |
| 03DA | 11 | 03DB | 73 | 0474 | 4D | 0475 | 4D |
| 03DC | 55 | 03DD | 70 | 0476 | 50 | 0477 | 4D |
| 03DE | 54 | 03DF | 34 | 0478 | 51 | 0479 | 63 |
| 03E0 | 94 | 03E1 | 04 | 047A | 6F | 047B | 84 |
| 03E2 | 35 | 03E3 | 84 | 047C | 09 | 047D | 3E |
| 03E4 | 5D | 03E5 | A6 | 047E | 91 | 047F | 4C |
| 03E6 | 81 | 03E7 | F8 | 0480 | 4C | 0481 | 50 |
| 03E8 | A6 | 03E9 | 81 | 0482 | 29 | 0483 | 05 |
| 03EA | F5 | 03EB | 70 | 0484 | A5 | 0485 | 70 |
| 03EC | B6 | 03ED | 70 | 0486 | EE | 0487 | 84 |
| 03EE | B7 | 03EF | 54 | 0488 | 43 | 0489 | 52 |
| 03F0 | 74 | 03F1 | 55 | 048A | 21 | 048B | 80 |
| 03F2 | 71 | 03F3 | 51 | 048C | 94 | 048D | 12 |
| 03F4 | 20 | 03F5 | 7B | 048E | 4C | 048F | 15 |
| 03F6 | 50 | 03F7 | 34 | 0490 | 94 | 0491 | 18 |
| 03F8 | 94 | 03F9 | 04 | 0492 | 32 | 0493 | 4E |
| 03FA | 35 | 03FB | 84 | 0494 | 4C | 0495 | 13 |
| 03FC | 45 | 03FD | A6 | 0496 | 84 | 0497 | 0E |
| 03FE | 91 | 03FF | F8 | 0498 | 25 | 0499 | 10 |
| 0400 | 40 | 0401 | B6 | 049A | 94 | 049B | 0C |
| 0402 | 28 | 0403 | 07 | 049C | 71 | 049D | 90 |
| 0404 | 79 | 0405 | 84 | 049E | 09 | 049F | 6F |
| 0406 | 3B | 0407 | A7 | 04A0 | 18 | 04A1 | FC |
| 0408 | 18 | 0409 | 1F | 04A2 | 52 | 04A3 | 90 |
| 040A | 5E | 040B | 8F | 04A4 | 07 | 04A5 | 20 |
| 040C | CC | 040D | 68 | 04A6 | 10 | 04A7 | 5D |
| 040E | 4D | 040F | 52 | 04A8 | 7F | 04A9 | 5D |
| 0410 | 70 | 0411 | 53 | 04AA | 42 | 04AB | 5C |
| 0412 | 28 | 0413 | 07 | 04AC | 21 | 04AD | 03 |
| 0414 | D3 | 0415 | 28 | 04AE | 52 | 04AF | 12 |
| 0416 | 07 | 0417 | D3 | 04B0 | 40 | 04B1 | 94 |
| 0418 | 28 | 0419 | 07 | 04B2 | 02 | 04B3 | 41 |
| 041A | D3 | 041B | 28 | 04B4 | 50 | 04B5 | 42 |
| 041C | 07 | 041D | C3 | 04B6 | 21 | 04B7 | 01 |
| 041E | 28 | 041F | 07 | 04B8 | 7F | 04B9 | 1E |
| 0420 | C3 | 0421 | 42 | 04BA | 84 | 04BB | 0B |

APPENDIX A-continued

ROM CODE FOR MICROCOMPUTER 100 ASSOCIATED WITH TRANSCEIVER DECODER 56
© General Electric Company, 1979

| ADDRESS | DATA | ADDRESS | DATA |
|---------|------|---------|------|
| 04BC | F0 | 04BD | 2A |
| 04BE | 07 | 04BF | DA |
| 04C0 | 8E | 04C1 | 16 |
| 04C2 | 50 | 04C3 | 29 |
| 04C4 | 05 | 04C5 | A5 |
| 04C6 | 15 | 04C7 | F0 |
| 04C8 | 14 | 04C9 | 90 |
| 04CA | F3 | 04CB | 64 |
| 04CC | 6C | 04CD | 4C |
| 04CE | 21 | 04CF | F0 |
| 04D0 | 84 | 04D1 | 23 |
| 04D2 | 91 | 04D3 | 41 |
| 04D4 | 13 | 04D5 | 91 |
| 04D6 | 63 | 04D7 | 13 |
| 04D8 | 91 | 04D9 | 1E |
| 04DA | 72 | 04DB | 5C |
| 04DC | 65 | 04DD | 6A |
| 04DE | 4D | 04DF | 50 |
| 04E0 | 4D | 04E1 | 51 |
| 04E2 | 66 | 04E3 | 6E |
| 04E4 | 28 | 04E5 | 05 |
| 04E6 | 76 | 04E7 | 65 |
| 04E8 | 6A | 04E9 | 40 |
| 04EA | 5D | 04EB | 41 |
| 04EC | 5D | 04ED | 20 |
| 04EE | 10 | 04EF | 51 |
| 04F0 | 66 | 04F1 | 6E |
| 04F2 | 90 | 04F3 | 59 |
| 04F4 | 29 | 04F5 | 05 |
| 04F6 | 71 | 04F7 | 20 |
| 04F8 | 10 | 04F9 | FC |
| 04FA | 22 | 04FB | 02 |
| 04FC | 5C | 04FD | 65 |
| 04FE | 6B | 04FF | 4D |
| 0500 | 50 | 0501 | 4D |
| 0502 | 51 | 0503 | 66 |
| 0504 | 6A | 0505 | 28 |
| 0506 | 05 | 0507 | 76 |
| 0508 | 65 | 0509 | 68 |
| 050A | 40 | 050B | 5D |
| 050C | 41 | 050D | 5D |
| 050E | 71 | 050F | 51 |
| 0510 | 66 | 0511 | 6A |
| 0512 | 90 | 0513 | 39 |
| 0514 | 20 | 0515 | 50 |
| 0516 | FC | 0517 | 22 |
| 0518 | 01 | 0519 | 5C |
| 051A | 66 | 051B | 6A |
| 051C | 4D | 051D | 50 |
| 051E | 4D | 051F | 51 |
| 0520 | 65 | 0521 | 68 |
| 0522 | 71 | 0523 | 52 |
| 0524 | 40 | 0525 | 5D |
| 0526 | 41 | 0527 | 5D |
| 0528 | 64 | 0529 | 6D |
| 052A | 40 | 052B | 5D |
| 052C | 41 | 052D | 5D |
| 052E | 63 | 052F | 6F |
| 0530 | 20 | 0531 | 8F |
| 0532 | 5E | 0533 | 7F |
| 0534 | 5E | 0535 | 42 |
| 0536 | 5E | 0537 | 90 |
| 0538 | 35 | 0539 | 20 |
| 053A | 20 | 053B | FC |
| 053C | 22 | 053D | 01 |
| 053E | 5C | 053F | 66 |
| 0540 | 6E | 0541 | 4D |
| 0542 | 50 | 0543 | 4D |
| 0544 | 51 | 0545 | 65 |
| 0546 | 6A | 0547 | 20 |
| 0548 | 10 | 0549 | 52 |
| 054A | 90 | 054B | D9 |
| 054C | 4C | 054D | 24 |
| 054E | FC | 054F | 92 |
| 0550 | 0A | 0551 | 84 |
| 0552 | 08 | 0553 | 5C |
| 0554 | 41 | 0555 | 13 |
| 0556 | 51 | 0557 | 4C |
| 0558 | 90 | 0559 | F4 |
| 055A | 73 | 055B | 3C |
| 055C | 84 | 055D | 05 |
| 055E | 13 | 055F | 13 |
| 0560 | 90 | 0561 | FA |
| 0562 | 5D | 0563 | FC |
| 0564 | 50 | 0565 | 63 |
| 0566 | 6F | 0567 | 73 |
| 0568 | 5E | 0569 | 40 |
| 056A | 5E | 056B | 41 |
| 056C | 5E | 056D | 64 |
| 056E | 29 | 056F | 00 |
| 0570 | 38 | 0571 | 70 |
| 0572 | 5C | 0573 | 29 |
| 0574 | 00 | 0575 | 38 |
| 0576 | 4D | 0577 | 52 |
| 0578 | 24 | 0579 | F7 |
| 057A | 1E | 057B | 82 |
| 057C | 08 | 057D | 71 |
| 057E | 32 | 057F | 84 |
| 0580 | 08 | 0581 | 13 |
| 0582 | 90 | 0583 | FB |
| 0584 | 1F | 0585 | 52 |
| 0586 | 90 | 0587 | F6 |
| 0588 | 18 | 0589 | 53 |
| 058A | 1D | 058B | 82 |
| 058C | 0D | 058D | F0 |
| 058E | 50 | 058F | 4C |
| 0590 | 19 | 0591 | 91 |
| 0592 | 12 | 0593 | 40 |
| 0594 | 18 | 0595 | F3 |
| 0596 | 18 | 0597 | 50 |
| 0598 | 1C | 0599 | F1 |
| 059A | 51 | 059B | 4C |
| 059C | 19 | 059D | 91 |
| 059E | 06 | 059F | 41 |
| 05A0 | 18 | 05A1 | F3 |
| 05A2 | 18 | 05A3 | 51 |
| 05A4 | 1C | 05A5 | 40 |
| 05A6 | 63 | 05A7 | 6E |
| 05A8 | FE | 05A9 | B1 |
| 05AA | 4C | 05AB | B4 |
| 05AC | 90 | 05AD | C0 |
| 05AE | 73 | 05AF | 5C |
| 05B0 | 70 | 05B1 | 52 |
| 05B2 | 53 | 05B3 | 5A |
| 05B4 | 20 | 05B5 | 10 |
| 05B6 | B5 | 05B7 | A1 |
| 05B8 | 50 | 05B9 | 78 |
| 05BA | B5 | 05BB | A5 |
| 05BC | 21 | 05BD | 10 |
| 05BE | 1E | 05BF | A1 |
| 05C0 | 51 | 05C1 | 20 |
| 05C2 | 18 | 05C3 | B5 |
| 05C4 | 65 | 05C5 | 6C |
| 05C6 | 40 | 05C7 | 18 |
| 05C8 | EC | 05C9 | 25 |
| 05CA | FF | 05CB | 84 |
| 05CC | 6D | 05CD | 07 |
| 05CE | 28 | 05CF | 06 |
| 05D0 | 75 | 05D1 | 42 |
| 05D2 | 5A | 05D3 | 43 |
| 05D4 | 5B | 05D5 | 20 |
| 05D6 | 10 | 05D7 | B5 |
| 05D8 | 28 | 05D9 | 06 |
| 05DA | 7B | 05DB | 84 |
| 05DC | 5D | 05DD | 28 |
| 05DE | 06 | 05DF | 7B |
| 05E0 | 84 | 05E1 | 58 |
| 05E2 | 4A | 05E3 | F6 |
| 05E4 | 56 | 05E5 | 4A |
| 05E6 | 18 | 05E7 | F0 |
| 05E8 | E6 | 05E9 | 50 |
| 05EA | 1D | 05EB | 94 |
| 05EC | 2E | 05ED | 4A |
| 05EE | FB | 05EF | 54 |

APPENDIX A-continued
ROM CODE FOR MICROCOMPUTER 100 ASSOCIATED WITH TRANSCEIVER DECODER 56
© General Electric Company, 1979

| ADDRESS | DATA | ADDRESS | DATA | ADDRESS | DATA | ADDRESS | DATA |
|---------|------|---------|------|---------|------|---------|------|
| 05F0 | 6D | 05F1 | 41 | 068A | 5B | 068B | 22 |
| 05F2 | 18 | 05F3 | EC | 068C | 01 | 068D | 0C |
| 05F4 | 25 | 05F5 | FF | 068E | 1A | 068F | 72 |
| 05F6 | 84 | 05F7 | 6D | 0690 | 56 | 0691 | 28 |
| 05F8 | 07 | 05F9 | 28 | 0692 | 06 | 0693 | F4 |
| 05FA | 06 | 05FB | 75 | 0694 | 84 | 0695 | 04 |
| 05FC | 42 | 05FD | 5A | 0696 | 29 | 0697 | 00 |
| 05FE | 43 | 05FF | 5B | 0698 | 49 | 0699 | 1B |
| 0600 | 78 | 0601 | B5 | 069A | 2B | 069B | 2B |
| 0602 | 28 | 0603 | 06 | 069C | 29 | 069D | 03 |
| 0604 | 7B | 0605 | 84 | 069E | D0 | 069F | 08 |
| 0606 | 5E | 0607 | 28 | 06A0 | 62 | 06A1 | 68 |
| 0608 | 06 | 0609 | 7B | 06A2 | 03 | 06A3 | 5D |
| 060A | 84 | 060B | 59 | 06A4 | 41 | 06A5 | 5D |
| 060C | 4A | 060D | F6 | 06A6 | 42 | 06A7 | 5D |
| 060E | 56 | 060F | 4A | 0648 | 43 | 0649 | 5C |
| 0610 | 18 | 0611 | F1 | 06AA | 70 | 06AB | 56 |
| 0612 | E6 | 0613 | 51 | 06AC | 28 | 06AD | 07 |
| 0614 | 4A | 0615 | FB | 06AE | 92 | 06AF | 28 |
| 0616 | E4 | 0617 | 5A | 06B0 | 07 | 06B1 | 92 |
| 0618 | F4 | 0619 | 5B | 06B2 | 28 | 06B3 | 07 |
| 061A | 6C | 061B | 40 | 06B4 | 92 | 06B5 | 28 |
| 061C | 5D | 061D | 41 | 06B6 | 07 | 06B7 | 92 |
| 061E | 5D | 061F | 4A | 06B8 | 46 | 06B9 | 18 |
| 0620 | FA | 0621 | 84 | 06BA | 6C | 06BB | 5C |
| 0622 | 3B | 0623 | 64 | 06BC | 09 | 06BD | 29 |
| 0624 | 68 | 0625 | 70 | 06BE | 06 | 06BF | DF |
| 0626 | EC | 0627 | 71 | 06C0 | 64 | 06C1 | 6F |
| 0628 | 5C | 0629 | 62 | 06C2 | 1D | 06C3 | 73 |
| 062A | 6A | 062B | 84 | 06C4 | 94 | 06C5 | 02 |
| 062C | 0F | 062D | 4A | 06C6 | 7C | 06C7 | FC |
| 062E | 18 | 062F | FC | 06C8 | 5C | 06C9 | 1C |
| 0630 | EA | 0631 | 5D | 06CA | A0 | 06CB | 1D |
| 0632 | 4A | 0633 | 18 | 06CC | 84 | 06CD | 05 |
| 0634 | FC | 0635 | EB | 06CE | 21 | 06CF | FE |
| 0636 | 5E | 0637 | 90 | 06D0 | 07 | 06D1 | 03 |
| 0638 | 07 | 0639 | 90 | 06D2 | 18 | 06D3 | 51 |
| 063A | 31 | 063B | 4A | 06D4 | A5 | 06D5 | 18 |
| 063C | 5D | 063D | 4B | 06D6 | 21 | 06D7 | 03 |
| 063E | 5D | 063F | 68 | 06D8 | 1C | 06D9 | 64 |
| 0640 | A0 | 0641 | 07 | 06DA | 68 | 06DB | 70 |
| 0642 | 28 | 0643 | 06 | 06DC | EC | 06DD | 84 |
| 0644 | D1 | 0645 | 22 | 06DE | 15 | 06DF | 71 |
| 0646 | C4 | 0647 | 5D | 06E0 | 56 | 06E1 | 70 |
| 0648 | 41 | 0649 | 5D | 06E2 | 54 | 06E3 | 77 |
| 064A | 6B | 064B | 70 | 06E4 | 55 | 06E5 | 34 |
| 064C | 56 | 064D | 28 | 06E6 | 94 | 06E7 | 04 |
| 064E | 07 | 064F | 92 | 06E8 | 35 | 06E9 | 91 |
| 0650 | 28 | 0651 | 07 | 06EA | 07 | 06EB | A6 |
| 0652 | 92 | 0653 | 28 | 06EC | 91 | 06ED | F8 |
| 0654 | 07 | 0655 | 92 | 06EE | 29 | 06EF | 06 |
| 0656 | 28 | 0657 | 07 | 06F0 | F4 | 06F1 | 21 |
| 0658 | 92 | 0659 | 46 | 06F2 | 00 | 0673 | 1C |
| 065A | 6C | 065B | 18 | 06F4 | A6 | 06F5 | 91 |
| 065C | 5C | 065D | 64 | 06F6 | 24 | 06F7 | A6 |
| 065E | 20 | 065F | 18 | 06F8 | 91 | 06F9 | 21 |
| 0660 | B5 | 0661 | 29 | 06FA | 20 | 06FB | 98 |
| 0662 | 00 | 0663 | 33 | 06FC | B5 | 06FD | 20 |
| 0664 | 44 | 0665 | 5A | 06FE | 8C | 06FF | 55 |
| 0666 | 5B | 0667 | 4C | 0700 | 77 | 0701 | 58 |
| 0668 | 51 | 0669 | 90 | 0702 | 35 | 0703 | 84 |
| 066A | B0 | 066B | 1D | 0704 | 05 | 0705 | A6 |
| 066C | 94 | 066D | F0 | 0706 | 2B | 0707 | 90 |
| 066E | 4C | 066F | 50 | 0708 | FA | 0709 | 7C |
| 0670 | 70 | 0671 | 5A | 070A | 54 | 070B | 55 |
| 0672 | 29 | 0673 | 05 | 070C | 20 | 070D | 18 |
| 0674 | ED | 0675 | 03 | 070E | B5 | 070F | A6 |
| 0676 | 18 | 0677 | 52 | 0710 | A6 | 0711 | 34 |
| 0678 | FC | 0679 | 53 | 0712 | 84 | 0713 | 09 |
| 067A | 1C | 067B | 08 | 0714 | A6 | 0715 | 81 |
| 067C | A1 | 067D | 56 | 0716 | FB | 0717 | A6 |
| 067E | 18 | 067F | EC | 0718 | 81 | 0719 | F8 |
| 0680 | 07 | 0681 | 28 | 071A | 90 | 071B | 5B |
| 0682 | 06 | 0683 | 75 | 071C | 20 | 071D | 9B |
| 0684 | 42 | 0685 | FA | 071E | B5 | 071F | 38 |
| 0686 | 84 | 0687 | 06 | 0720 | 94 | 0721 | E1 |
| 0688 | 5A | 0689 | FB | 0722 | 20 | 0723 | 46 |

APPENDIX A-continued

ROM CODE FOR MICROCOMPUTER 100 ASSOCIATED WITH TRANSCEIVER DECODER 56
© General Electric Company, 1979

| ADDRESS | DATA | ADDRESS | DATA | ADDRESS | DATA | ADDRESS | DATA |
|---|---|---|---|---|---|---|---|
| 0724 | 55 | 0725 | 62 | 0792 | 46 | 0793 | 13 |
| 0726 | 68 | 0727 | 4D | 0794 | 56 | 0795 | 72 |
| 0728 | 57 | 0729 | 78 | 0796 | 55 | 0797 | 74 |
| 072A | 58 | 072B | 35 | 0798 | 51 | 0799 | 70 |
| 072C | 84 | 072D | 04 | 079A | 50 | 079B | 4C |
| 072E | A6 | 072F | 90 | 079C | 18 | 079D | 91 |
| 0730 | FB | 0731 | 47 | 079E | 02 | 079F | 30 |
| 0732 | 21 | 0733 | 01 | 07A0 | 31 | 07A1 | 84 |
| 0734 | 84 | 0735 | 07 | 07A2 | 04 | 07A3 | 13 |
| 0736 | 20 | 0737 | 11 | 07A4 | 90 | 07A5 | F8 |
| 0738 | 54 | 0739 | 77 | 07A6 | 71 | 07A7 | F0 |
| 073A | 90 | 073B | 05 | 07A8 | 46 | 07A9 | 94 |
| 073C | 77 | 073D | 54 | 07AA | 02 | 07AB | 1F |
| 073E | 20 | 073F | 11 | 07AC | 56 | 07AD | 35 |
| 0740 | 55 | 0741 | 20 | 07AE | 84 | 07AF | 0B |
| 0742 | 18 | 0743 | B5 | 07B0 | 13 | 07B1 | 56 |
| 0744 | A6 | 0745 | A6 | 07B2 | 74 | 07B3 | 51 |
| 0746 | 34 | 0747 | 84 | 07B4 | 70 | 07B5 | 50 |
| 0748 | 09 | 0749 | A6 | 07B6 | 4E | 07B7 | 15 |
| 074A | 81 | 074B | FB | 07B8 | 90 | 07B9 | E4 |
| 074C | A6 | 074D | 81 | 07BA | 1C | 07BB | 4D |
| 074E | F8 | 074F | 90 | 07BC | C2 | 07BD | 52 |
| 0750 | 26 | 0751 | 20 | 07BE | 4D | 07BF | 19 |
| 0752 | 98 | 0753 | B5 | 07C0 | C3 | 07C1 | 53 |
| 0754 | 38 | 0755 | 84 | 07C2 | 1C | 07C3 | 43 |
| 0756 | 06 | 0757 | 47 | 07C4 | 21 | 07C5 | 01 |
| 0758 | 12 | 0759 | 57 | 07C6 | 1E | 07C7 | 43 |
| 075A | 90 | 075B | D0 | 07C8 | 12 | 07C9 | 53 |
| 075C | 0A | 075D | 25 | 07CA | 42 | 07CB | 12 |
| 075E | 15 | 075F | 94 | 07CC | 1D | 07CD | 84 |
| 0760 | C7 | 0761 | 36 | 07CE | 03 | 07CF | 22 |
| 0762 | 94 | 0763 | BF | 07D0 | 80 | 07D1 | 52 |
| 0764 | 20 | 0765 | 46 | 07D2 | 1C | 07D3 | 42 |
| 0766 | 55 | 0767 | 35 | 07D4 | CD | 07D5 | 52 |
| 0768 | 84 | 0769 | 04 | 07D6 | 43 | 07D7 | 19 |
| 076A | A6 | 076B | 90 | 07D8 | 53 | 07D9 | 1C |
| 076C | FB | 076D | 20 | 07DA | AA | 07DB | A9 |
| 076E | 18 | 076F | B5 | 07DC | A6 | 07DD | A5 |
| 0770 | 64 | 0771 | 68 | 07DE | 9A | 07DF | 99 |
| 0772 | 70 | 0773 | 5C | 07E0 | 96 | 07E1 | 95 |
| 0774 | 18 | 0775 | 1C | 07E2 | 6A | 07E3 | 69 |
| 0776 | 21 | 0777 | 00 | 07E4 | 66 | 07E5 | 65 |
| 0778 | 1C | 0779 | 08 | 07E6 | 5A | 07E7 | 59 |
| 077A | 1B | 077B | 2B | 07E8 | 56 | 07E9 | 55 |
| 077C | 90 | 077D | FE | 07EA | 2A | 07EB | 00 |
| 077E | 1D | 077F | 1E | 07EC | 00 | 07ED | 11 |
| 0780 | 40 | 0781 | 18 | 07EE | 4A | 07EF | B1 |
| 0782 | 1F | 0783 | C6 | 07F0 | 4B | 07F1 | B0 |
| 0784 | 92 | 0785 | 08 | 07F2 | 16 | 07F3 | B4 |
| 0786 | 84 | 0787 | 06 | 07F4 | A6 | 07F5 | 81 |
| 0788 | B7 | 0789 | 20 | 07F6 | FE | 07F7 | 90 |
| 078A | EA | 078B | B6 | 07F8 | F5 | 07F9 | 2B |
| 078C | 1C | 078D | 71 | 07FA | 2B | 07FB | 2B |
| 078E | B7 | 078F | E6 | 07FC | 2B | 07FD | 2B |
| 0790 | 90 | 0791 | F8 | 07FE | 2B | 07FF | 2B |

APPENDIX B

MACHINE CODE FOR MICROPROCESSOR 400 ASSOCIATED WITH CONTROLLER 50
ALL VALUES IN HEXADECIMAL FORMAT
© General Electric Company, 1979

| 0000H=F3H | 31H | FFH | BFH | 21H | FAH | BFH | 0EH | 14H | 7EH | 0DH | C2H | 09H | 00H | CDH | 39H |
|---|---|---|---|---|---|---|---|---|---|---|---|---|---|---|---|
| 0010H=11H | 0EH | C8H | CDH | B1H | 08H | CDH | 39H | 11H | 3EH | 06H | 32H | 52H | BEH | CDH | 27H |
| 0020H=10H | C3H | 3FH | 00H | C3H | 72H | 02H | 00H | 00H | 00H | 00H | 00H | C3H | 6EH | 13H | 00H |
| 0030H=00H | 00H | 00H | 00H | C3H | 9AH | 13H | 00H | C3H | 00H | 00H | 20H | C3H | C3H | 13H | DAH |
| 0040H=5AH | 00H | 2AH | B2H | B2H | 22H | A5H | BEH | 3AH | B1H | B2H | 32H | A4H | BEH | CDH | 7FH |
| 0050H=01H | CDH | EAH | 32H | CDH | 44H | 33H | C3H | D1H | 00H | F3H | 31H | FFH | BFH | CDH | 39H |
| 0060H=11H | CDH | 11H | 11H | 3EH | FFH | 32H | 90H | BEH | CDH | 7FH | 01H | 3AH | 43H | BEH | E6H |
| 0070H=01H | C2H | 91H | 00H | CDH | 13H | 02H | DBH | 1BH | E6H | 20H | CAH | B4H | 00H | CDH | 94H |
| 0080H=1FH | C3H | 77H | 00H | CDH | A6H | 11H | 3AH | 43H | BEH | 2FH | 32H | 43H | BEH | C3H | 6CH |
| 0090H=00H | CDH | 88H | 07H | D2H | A9H | 00H | AFH | 32H | 4CH | BEH | CDH | C9H | 19H | 21H | 41H |
| 00A0H=38H | 0EH | 00H | CDH | D3H | 19H | C3H | 77H | 00H | 3AH | 4CH | BEH | B7H | CAH | B9H | 00H |
| 00B0H=CDH | C9H | 19H | 21H | 38H | 38H | C3H | A1H | 00H | CDH | C9H | 19H | AFH | 32H | 4EH | BEH |
| 00C0H=CDH | 0CH | 0AH | F5H | CDH | A4H | 19H | F1H | D2H | CEH | 00H | C3H | B0H | 00H | CDH | 3CH |
| 00D0H=01H | 31H | FFH | BFH | 3AH | 49H | BEH | E6H | 04H | C2H | 39H | 01H | CDH | 26H | 01H | CDH |

APPENDIX B-continued

MACHINE CODE FOR MICROPROCESSOR 400
ASSOCIATED WITH CONTROLLER 50
ALL VALUES IN HEXADECIMAL FORMAT
© General Electric Company, 1979

| Addr | | | | | | | | | | | | | | | | |
|---|---|---|---|---|---|---|---|---|---|---|---|---|---|---|---|---|
| 00E0H=A1H | 18H | CDH | 26H | 01H | 3AH | B1H | B2H | B7H | CAH | 02H | 01H | CDH | 9CH | 16H | DAH |
| 00F0H=FBH | 00H | CDH | 26H | 01H | CDH | 36H | 15H | CDH | 26H | 01H | 3AH | 4DH | BEH | B7H | C2H |
| 0100H=1AH | 01H | CDH | A4H | 12H | CDH | 26H | 01H | CDH | 94H | 17H | CDH | 26H | 01H | CDH | 03H |
| 0110H=19H | CDH | 26H | 01H | CDH | 2CH | 19H | C3H | D1H | 00H | CDH | 87H | 15H | CDH | 26H | 01H |
| 0120H=CDH | A4H | 12H | C3H | D1H | 00H | CDH | AFH | 02H | CDH | 41H | 01H | CDH | AFH | 02H | FBH |
| 0130H=3AH | 48H | BEH | B7H | C8H | D1H | 00H | C3H | 5AH | C3H | 5AH | 00H | 3AH | 4EH | BEH | B7H |
| 0140H=C0H | FBH | CDH | 11H | 14H | CDH | B0H | 01H | CDH | 9FH | 1FH | CDH | 94H | 1FH | C9H | CDH |
| 0150H=39H | 11H | CDH | 13H | 1EH | CDH | 7EH | 01H | CDH | F6H | 16H | CDH | 44H | 33H | CDH | 7EH |
| 0160H=0FH | AFH | 32H | 49H | BEH | 32H | A4H | BEH | 32H | 4AH | BEH | 21H | 5BH | BAH | 11H | 1FH |
| 0170H=BBH | 0EH | 00H | CDH | 53H | 0EH | CDH | 36H | 1AH | CDH | C4H | 19H | C3H | D1H | 00H | AFH |
| 0180H=32H | 50H | BEH | 32H | 4EH | BEH | 32H | 4DH | BEH | 32H | 4BH | BEH | 32H | 43H | BEH | 32H |
| 0190H=47H | BEH | 3EH | 05H | 32H | 52H | BEH | 3Eh | 0AH | 32H | 51H | BEH | 3EH | 05H | 32H | 48H |
| 01A0H=BEH | CDH | 62H | 0CH | CDH | 9FH | 1FH | 3EH | 3CH | 32H | 45H | BEH | 32H | 44H | BEH | C9H |
| 01B0H=DBH | 18H | E6H | 20H | C0H | CDH | A6H | 11H | CDH | 61H | 12H | 3AH | 45H | BEH | 3DH | 32H |
| 01C0H=45H | BEH | CCH | C9H | 01H | CDH | E2H | 01H | C9H | 3EH | 3CH | 32H | 45H | BEH | 32H | 44H |
| 01D0H=BEH | CDH | 69H | 0CH | D8H | CDH | EAH | 32H | 3AH | 82H | B2H | FEH | 23H | C0H | 32H | 42H |
| 01E0H=BEH | C9H | 3AH | 49H | BEH | B7H | CAH | 1FH | 02H | 4FH | 3AH | 43H | BEH | EEH | 80H | 32H |
| 01F0H=43H | BEH | FAH | 1FH | 02H | 79H | 32H | 44H | BEH | E6H | 03H | C2H | 07H | 02H | 3EH | 99H |
| 0200H=32H | 57H | BEH | CDH | CFH | 1EH | C9H | CDH | C4H | 19H | 21H | 5EH | 38H | 0EH | 00H | CDH |
| 0210H=D3H | 19H | C9H | CDH | C4H | 19H | 21H | 81H | 38H | 0EH | 00H | CDH | D3H | 19H | C9H | CDH |
| 0220H=46H | 02H | CDH | 88H | 07H | DAH | 3DH | 02H | 3AH | 4CH | BEH | B7H | 16H | FFH | CAH | 33H |
| 0230H=02H | 16H | 68H | 0EH | 02H | CDH | 5CH | 1BH | 4AH | CDH | E2H | 19H | C9H | AFH | 32H | 4CH |
| 0240H=BEH | 16H | 78H | C3H | 33H | 02H | 3AH | 44H | BEH | B7H | C8H | CDH | C9H | 19H | CDH | BBH |
| 0250H=1AH | AFH | 32H | 44H | BEH | 3AH | 81H | B2H | B7H | CAH | 68H | 02H | 0EH | 00H | CDH | 5EH |
| 0260H=1AH | 2AH | 82H | B2H | CDH | F6H | 0BH | C9H | 0EH | 04H | 06H | 04H | 1EH | 7AH | CDH | 52H |
| 0270H=1AH | C9H | F3H | CDH | 39H | 11H | 21H | 88H | 38H | 0EH | 00H | CDH | D3H | 19H | 21H | 00H |
| 0280H=00H | 2BH | 7DH | B4H | CAH | 00H | 00H | 20H | E6H | B0H | C2H | 81H | 02H | C3H | 00H | 00H |
| 0290H=DBH | 18H | E6H | 80H | C2H | A7H | 02H | 06H | 7CH | DBH | 18H | E6H | 80H | C2H | A7H | 02H |
| 02A0H=05H | CAH | A7H | 02H | C3H | 99H | 02H | 3EH | 02H | 32H | 48H | BEH | C3H | DBH | 05H | 3AH |
| 02B0H=48H | BEH | B7H | CAH | 47H | 03H | FEH | 04H | CAH | 06H | 03H | FEH | 03H | CAH | CDH | 02H |
| 02C0H=FEH | 01H | CAH | CDH | 02H | 3EH | 00H | 32H | 05H | BFH | C3H | CDH | 02H | 3AH | 05H | BFH |
| 02D0H=4FH | 06H | 00H | DBH | 18H | E6H | 80H | CAH | E8H | 02H | 05H | CAH | EFH | 02H | DBH | 18H |
| 02E0H=E6H | 80H | CAH | E8H | 02H | C3H | D3H | 02H | CDH | 3DH | 05H | DAH | F6H | 02H | C9H | 3EH |
| 02F0H=04H | 32H | 48H | BEH | 37H | C9H | AFH | 32H | 48H | BEH | 3AH | 49H | BEH | E6H | FEH | 32H |
| 0300H=49H | BEH | CDH | 36H | 1AH | C9H | CDH | C4H | 05H | 06H | 00H | DBH | 18H | E6H | 80H | CAH |
| 0310H=39H | 03H | 05H | C2H | 0BH | 03H | 1AH | 3EH | 07H | D3H | 48H | 0EH | 14H | CDH |
| 0320H=81H | 08H | CDH | C4H | 05H | 0EH | 01H | CDH | 81H | 08H | CDH | 52H | 05H | CAH | 39H | 03H |
| 0330H=3AH | 49H | BEH | F6H | 01H | 32H | 49H | BEH | C9H | 3AH | 49H | BEH | E6H | FEH | 32H | 49H |
| 0340H=BEH | 3EH | 05H | 32H | 48H | BEH | C9H | CDH | 52H | 05H | C2H | 4EH | 03H | C9H | F3H | CDH |
| 0350H=3CH | 1AH | 2LH | E3H | BEH | CDH | 97H | 04H | DAH | 49H | 04H | FBH | 00H | F3H | 23H | CDH |
| 0360H=D2H | 04H | DAH | D5H | 03H | 3EH | 02H | 06H | 01H | 32H | D7H | BEH | 78H | 32H | 48H | BEH |
| 0370H=FBH | 21H | E6H | BEH | CDH | 5AH | 04H | 3AH | E7H | BEH | 91H | 32H | DAH | BEH | C2H | 8AH |
| 0380H=03H | 21H | E3H | BEH | CDH | 24H | 04H | D2H | A6H | 03H | 3AH | D7H | BEH | 3DH | 37H | C0H |
| 0390H=21H | EBH | BEH | CDH | 5AH | 04H | 3AH | ECH | BEH | 91H | 32H | DAH | BEH | 37H | C0H | 21H |
| 03A0H=E8H | BEH | CDH | 24H | 04H | D8H | 3AH | DBH | BEH | FEH | 06H | 37H | C0H | 5EH | 23H | 56H |
| 03B0H=3EH | 01H | 32H | DEH | BEH | EBH | 22H | DCH | BEH | 11H | F5H | BEH | AFH | 12H | 7DH | B7H |
| 03C0H=CAH | F7H | 03H | 1FH | 6FH | DAH | E2H | 03H | 7CH | 1FH | 67H | 3AH | DEH | BEH | 3CH | 32H |
| 03D0H=DEH | BEH | C3H | BEH | 03H | D6H | 02H | 47H | 3EH | 01H | CAH | 69H | 03H | 06H | 03H | C3H |
| 03E0H=69H | 03H | 7CH | 1FH | 67H | 3AH | DEH | BEH | DAH | F2H | 03H | F6H | 40H | 13H | 12H | C3H |
| 03F0H=CBH | 03H | F6H | C0H | C3H | EDH | 03H | 2AH | D8H | BEH | 22H | 59H | BEH | 1AH | B7H | C8H |
| 0400H=E6H | 0FH | 32H | 5BH | BEH | 79H | E6H | C0H | 07H | 32H | 93H | BEH | D5H | CDH | 9EH |
| 0410H=31H | DAH | 1FH | 04H | 3EH | 01H | 32H | 4FH | BEH | CDH | 9AH | 15H | 00H | 00H | 00H | D1H |
| 0420H=1BH | C3H | FDH | 03H | 7EH | CDH | AFH | 0DH | 1FH | 4FH | 7EH | 1FH | 1FH | 2FH | A9H | E6H |
| 0430H=07H | C2H | 47H | 04H | 79H | E6H | 07H | 32H | DBH | BEH | 7EH | E6H | 03H | 32H | D9H | BEH |
| 0440H=23H | 7EH | 32H | D8H | BEH | 23H | C9H | 37H | C9H | FEH | 02H | CAH | F6H | 02H | FEH | 03H |
| 0450H=CAH | EFH | 02H | 3EH | 05H | 32H | 48H | BEH | 37H | C9H | 0EH | 00H | 06H | 04H | 7EH | E6H |
| 0460H=F0H | EAH | 65H | 04H | 37H | 79H | 17H | 4FH | 7EH | E6H | 0FH | EAH | 6FH | 04H | 37H | 79H |
| 0470H=17H | 4FH | 05H | C8H | 2BH | C3H | 5EH | 04H | 3AH | 05H | BFH | 4FH | 3AH | 02H | BFH | 47H |
| 0480H=DBH | 18H | E6H | 80H | CAH | 90H | 04H | 05H | C8H | DBH | 18H | E6H | 80H | C2H | 80H | 04H |
| 0490H=CDH | 3DH | 05H | D2H | 78H | 04H | C9H | CDH | 52H | 05H | CAH | 11H | 05H | AFH | 57H | 4FH |
| 04A0H=06H | 00H | CDH | 28H | 05H | DAH | 1CH | 05H | 57H | 1EH | 03H | 0EH | 00H | 06H | 00H | CDH |
| 04B0H=28H | 05H | DAH | 1CH | 05H | 82H | 1FH | 57H | 1DH | C2H | ABH | 04H | 32H | 01H | BFH | 87H |
| 04C0H=32H | 04H | BFH | 32H | 02H | 5FH | 87H | 83H | 32H | 03H | BFH | 4FH | AFH | 91H | 32H |
| 04D0H=05H | BFH | CDH | 78H | 04H | 3EH | 02H | D8H | 22H | FFH | BEH | 3AH | 01H | BFH | 57H | E5H |
| 04E0H=26H | 05H | 2EH | 80H | 06H | 00H | C3H | EDH | 04H | 3AH | 02H | BFH | 47H | 3AH | 05H | BFH |
| 04F0H=4FH | CDH | 28H | 05H | DAH | 1DH | 05H | 3AH | 03H | BFH | 81H | 92H | 3FH | 7DH | 1FH | 6FH |
| 0500H=D2H | E9H | 04H | E3H | 77H | 23H | E3H | 25H | 2EH | 80H | C2H | E9H | 04H | E1H | 2BH | B7H |
| 0510H=C9H | 0EH | 00H | CDH | 3DH | 05H | D2H | 9DH | 04H | C9H | 00H | 00H | C9H | E1H | 2AH | FFH |
| 0520H=BEH | FEH | 02H | 37H | C8H | C3H | DBH | 04H | DBH | 18H | E6H | 80H | CAH | 3DH | 05H | 05H |
| 0530H=CAH | 4EH | 05H | DBH | 18H | E6H | 80H | CAH | 3DH | 05H | C3H | 28H | 05H | CAH | 0CH | 4AH |
| 0540H=05H | DBH | 18H | E6H | 80H | CAH | 3DH | 05H | 79H | C9H | 3EH | 02H | 37H | C9H | 3EH | 03H |
| 0550H=37H | C9H | DBH | 18H | E6H | 80H | C9H | 01H | DCH | 05H | CDH | 52H | 05H | CAH | 69H | 05H |
| 0560H=0BH | 78H | B1H | C2H | 5AH | 05H | C3H | EFH | 02H | 01H | C8H | 00H | CDH | C9H | 05H | B7H |
| 0570H=C9H | CDH | 90H | 02H | 16H | 07H | 01H | D2H | 01H | CDH | C9H | 05H | 0EH | 27H | 41H | CDH |
| 0580H=D4H | 05H | CDH | E5H | 05H | 15H | C2H | 7CH | 05H | 01H | C8H | 00H | 21H | EFH | BEH | 1EH |
| 0590H=05H | CDH | C9H | 05H | 16H | 08H | 7EH | 0FH | 77H | DAH | A3H | 05H | 06H | 17H | 0EH | 19H |
| 05A0H=C3H | A7H | 05H | 06H | 37H | 0EH | 19H | CDH | D4H | 05H | CDH | E5H | 05H | 15H | C2H | 96H |
| 05B0H=05H | 1DH | C8H | 23H | C3H | 94H | 05H | AFH | 32H | 48H | BEH | CDH | 36H | 1AH | 01H | D2H |

APPENDIX B-continued

MACHINE CODE FOR MICROPROCESSOR 400 ASSOCIATED WITH CONTROLLER 50
ALL VALUES IN HEXADECIMAL FORMAT
© General Electric Company, 1979

| | | | | | | | | | | | | | | | |
|---|---|---|---|---|---|---|---|---|---|---|---|---|---|---|---|
| 05C0H=01H | CDH | C9H | 05H | 3EH | 03H | D3H | 48H | C9H | 3EH | 01H | D3H | 48H | 08H | 79H | B0H |
| 05D0H=C2H | CDH | 05H | C9H | 3EH | 07H | D3H | 48H | CDH | E0H | 05H | 3EH | 01H | D3H | 48H | C9H |
| 05E0H=05H | C8H | C3H | E0H | 05H | 00H | C8H | C3H | E5H | 05H | AFH | 32H | 6FH | BEH | AFH | 32H |
| 05F0H=D6H | BEH | 3AH | 48H | BEH | B7H | CAH | 1EH | 06H | FEH | 02H | CAH | B2H | 06H | FEH | 03H |
| 0600H=CAH | 11H | 06H | FEH | 01H | CAH | 11H | 06H | FEH | 05H | 37H | C0H | 3EH | 00H | 32H | 05H |
| 0610H=BFH | CDH | CDH | 02H | D8H | 3AH | D6H | BEH | 3DH | C2H | EFH | 05H | 37H | C9H | CDH | 90H |
| 0620H=02H | CDH | 3CH | 1AH | CDH | 3CH | 01H | F3H | 3AH | 6FH | BEH | B7H | C2H | 82H | 06H | CDH |
| 0630H=79H | 06H | FAH | 8CH | 06H | CAH | 96H | 06H | 06H | 70H | CDH | DEH | 06H | CDH | BEH | 05H |
| 0640H=CDH | F2H | 06H | 3EH | 05H | 32H | 48H | BEH | D8H | 3AH | DBH | BEH | FEH | 05H | C2H | 74H |
| 0650H=06H | 5EH | 23H | 56H | 2AH | 63H | BEH | CDH | 56H | 0DH | C2H | 74H | 06H | CDH | 57H | 05H |
| 0660H=DAH | 74H | 06H | 21H | F1H | BEH | 36H | D2H | 23H | 36H | 00H | CDH | 87H | 06H | CDH | B7H |
| 0670H=05H | FBH | B7H | C9H | CDH | C4H | 05H | 37H | C9H | DBH | 08H | 17H | 17H | 17H | E6H | 03H |
| 0680H=3DH | C9H | 06H | 8CH | C3H | DEH | 06H | 06H | 8CH | C3H | EBH | 06H | 06H | 1CH | C3H | DEH |
| 0690H=06H | 06H | 1CH | C3H | E8H | 06H | 06H | 38H | CDH | DEH | 06H | 21H | F1H | BEH | 7EH | 2FH |
| 06A0H=77H | 23H | 7EH | 2FH | 77H | C3H | 2BH | 39H | E8H | 06H | 06H | 38H | CDH | E8H | 06H | C3H |
| 06B0H=9BH | 06H | F3H | 3AH | 6FH | BEH | B7H | C2H | 87H | 06H | CDH | 79H | 06H | FAH | 91H | 06H |
| 06C0H=CAH | AAH | 06H | 00H | 00H | 00H | C9H | 2AH | 59H | BEH | 7DH | 32H | F0H | BEH | 7CH | B0H |
| 06D0H=32H | EFH | BEH | 21H | F2H | BEH | CDH | 5AH | 04H | 21H | F3H | BEH | 71H | C9H | CDH | C7H |
| 06E0H=06H | F3H | CDH | 74H | 05H | FBH | B7H | C9H | CDH | C7H | 06H | F3H | CDH | 89H | 05H | C3H |
| 06F0H=E5H | 06H | 0EH | 00H | CDH | 3DH | 05H | D8H | F3H | 21H | E3H | BEH | CDH | 97H | 04H | D8H |
| 0700H=21H | E6H | BEH | CDH | 5AH | 04H | 3AH | E7H | BEH | 91H | 37H | C0H | 21H | E3H | BEH | CDH |
| 0710H=24H | 04H | D8H | E5H | 2AH | D8H | BEH | EBH | 2AH | 59H | BEH | CDH | 56H | 0DH | E1H | C8H |
| 0720H=37H | C9H | 3EH | 01H | 32H | 6FH | BEH | C3H | EEH | 05H | CDH | 22H | 07H | DAH | 3CH | 07H |
| 0730H=CDH | BEH | 05H | CDH | F2H | 06H | 3EH | 05H | 32H | 48H | BEH | C9H | CDH | 36H | 07H | C3H |
| 0740H=74H | 06H | 3EH | 03H | D3H | 48H | 3EH | BCH | D3H | 19H | C9H | CDH | 88H | 07H | D8H | E3H |
| 0750H=03H | D3H | 48H | 3EH | BAH | D3H | 19H | 0EH | 96H | CDH | 81H | 08H | 3EH | 02H | D3H | 48H |
| 0760H=0EH | 96H | CDH | 81H | 08H | CDH | 75H | 08H | DBH | 4CH | E6H | 02H | C2H | 79H | 07H | CDH |
| 0770H=88H | 07H | D2H | 68H | 07H | CDH | 42H | 07H | C9H | 0EH | 4BH | CDH | 81H | 08H | DBH | 4CH |
| 0780H=E6H | 02H | C2H | 75H | 07H | C3H | 68H | 07H | DBH | 4CH | E6H | 04H | C8H | 37H | C9H | 3EH |
| 0790H=03H | D3H | 48H | 0EH | 96H | CDH | 81H | 08H | 3EH | 02H | D3H | 48H | 0EH | 96H | CDH | 81H |
| 07A0H=08H | DBH | 4CH | E6H | 02H | C2H | AFH | 07H | DBH | 4CH | E6H | 02H | CAH | BAH | 07H | CDH |
| 07B0H=88H | 07H | D2H | A1H | 07H | CDH | 42H | 07H | 37H | C9H | 0EH | C8H | CDH | 81H | 08H | DBH |
| 07C0H=4CH | E6H | 02H | C2H | CFH | 07H | CDH | 88H | 07H | D2H | BFH | 07H | C3H | B5H | 07H | DBH |
| 07D0H=4CH | E6H | 02H | C2H | DBH | 07H | DBH | 4CH | E6H | 02H | C8H | CDH | 88H | 07H | D2H | CFH |
| 07E0H=07H | C3H | B5H | 07H | CDH | 66H | 08H | 1EH | 00H | CDH | 91H | 08H | E5H | 26H | 08H | 2EH |
| 07F0H=10H | CDH | 44H | 08H | 16H | 00H | 5DH | CDH | 8EH | 08H | E3H | 5CH | CDH | 8EH | 08H | 5DH |
| 0800H=CDH | 8EH | 08H | 1EH | 00H | CDH | 8EH | 08H | E3H | E3H | 5EH | 23H | CDH | BEH | 08H | E3H |
| 0810H=2DH | C2H | 09H | 08H | AFH | 92H | 5FH | CDH | 91H | 08H | 25H | C2H | EFH | 07H | CDH | A5H |
| 0820H=08H | 2AH | 91H | BEH | 2BH | 22H | 91H | BEH | 7DH | B4H | E1H | C2H | E7H | 07H | 1EH | 00H |
| 0830H=CDH | 91H | 08H | CDH | 44H | 08H | 1EH | 00H | CDH | 91H | 08H | 1EH | 00H | CDH | 91H | 08H |
| 0840H=CDH | 66H | 08H | C9H | CDH | 5BH | 08H | CDH | 5BH | 08H | CDH | 5BH | 08H | 1EH | 3AH | CDH |
| 0850H=08H | C9H | 3EH | B4H | D3H | 19H | 0DH | C2H | 57H | 08H | 0EH | 33H | 3EH | B5H | D3H |
| 0860H=19H | 0DH | C2H | 61H | 08H | C9H | CDH | 5BH | 08H | 3EH | B4H | D3H | 19H | 03H | 28H | CDH |
| 0870H=81H | 08H | C3H | 5BH | 08H | 06H | 04H | 0EH | FAH | CDH | 81H | 08H | 05H | C2H | 77H | 08H |
| 0880H=C9H | 3EH | 3CH | E3H | E3H | 3DH | C2H | 83H | 08H | 0DH | C2H | 81H | 08H | C9H | 7AH | 83H |
| 0890H=57H | 06H | 08H | 7BH | 0FH | 5FH | 0EH | 32H | D2H | 9DH | 08H | 0EH | 64H | CDH | 53H | 08H |
| 08A0H=05H | C8H | C3H | 93H | 08H | 0EH | 96H | CDH | 53H | 08H | C9H | AFH | 32H | 71H | BEH | 1EH |
| 08B0H=31H | 3EH | 08H | 32H | 91H | BEH | 06H | 07H | CDH | 25H | 09H | DAH | 1DH | 09H | 5FH | CDH |
| 08C0H=59H | 09H | BEH | DAH | 1DH | 09H | 83H | 1FH | 5FH | 05H | C2H | BFH | 08H | CDH | 1FH | 09H | 3AH |
| 08D0H=71H | BEH | 87H | C2H | 15H | 09H | 3CH | 32H | 71H | BEH | CDH | A2H | 09H | 08H | CAH | 1DH |
| 08E0H=09H | 22H | 0EH | BFH | D5H | 11H | 16H | BFH | 06H | 10H | 3AH | 6FH | BEH | B7H | CAH | 02H |
| 08F0H=09H | 1AH | BEH | C2H | FFH | 08H | 23H | 13H | 05H | C2H | F1H | 08H | C2H | 0AH | 09H | D1H |
| 0900H=37H | C9H | 1AH | 77H | 23H | 13H | 05H | C2H | 02H | 09H | D1H | 3AH | 91H | BEH | 3DH | 32H |
| 0910H=BEH | 91H | CAH | B1H | 08H | CDH | A2H | 09H | D8H | C8H | C3H | E4H | 08H | 37H | C9H | 7BH |
| 0920H=B7H | 1FH | 83H | 57H | C9H | 0EH | FFH | CDH | 88H | 07H | D8H | 0DH | CAH | 7CH | 09H | DBH |
| 0930H=4CH | E6H | 01H | CAH | 27H | 09H | 4BH | 0DH | CAH | 45H | 09H | DBH | 4CH | E6H | 01H | C2H |
| 0940H=37H | 09H | C3H | 25H | 09H | C3H | 00H | 39H | CAH | 7CH | 09H | DBH | 4CH | E6H | 01H | CAH |
| 0950H=59H | 09H | DBH | 4CH | E6H | 01H | C2H | 47H | 09H | DBH | 4CH | E6H | 01H | C2H | 7CH | 09H |
| 0960H=0EH | 00H | 0DH | CAH | 7CH | 09H | DBH | 4CH | E6H | 01H | CAH | 62H | 09H | 0EH | 00H | 0CH |
| 0970H=CAH | 7CH | 09H | DBH | 4CH | E6H | 01H | C2H | 6FH | 09H | 79H | C9H | 37H | C9H | E5H | 06H |
| 0980H=00H | 2EH | 08H | CDH | 59H | 09H | DAH | A0H | 09H | 92H | 78H | 1FH | 47H | B7H | 79H | FAH |
| 0990H=93H | 09H | 1FH | 83H | 1FH | 5FH | CDH | 1FH | 09H | 2DH | C2H | 83H | 09H | 78H | 2FH | 47H |
| 09A0H=E1H | C9H | CDH | 7EH | 09H | D8H | FEH | 3AH | C2H | 0AH | 0AH | CDH | 7EH | 09H | D8H | B7H |
| 09B0H=C8H | FEH | 10H | C2H | 0AH | 0AH | 32H | 98H | BFH | 32H | 99H | BEH | CDH | 7EH | 09H | D8H |
| 09C0H=67H | 3AH | 98H | BFH | B0H | 32H | 98H | BEH | CDH | 7EH | 09H | D8H | 6FH | 22H | 9AH | BFH |
| 09D0H=3AH | 98H | BFH | 80H | 32H | 98H | BFH | CDH | 7EH | 09H | D8H | 21H | 16H | BFH | B7H | C2H |
| 90E0H=0AH | 0AH | CDH | 7EH | 09H | D8H | 77H | 3AH | 98H | BFH | 80H | 32H | 98H | BFH | 3AH | 99H |
| 09F0H=BFH | 3DH | 32H | 99H | BEH | 23H | C2H | E2H | 09H | CDH | 7EH | 09H | D8H | 3AH | 98H | BFH |
| 0A00H=80H | C2H | 0AH | 0AH | 2AH | 9AH | BFH | F6H | 0AH | C9H | 37H | C9H | 0EH | FBH | CDH | 6BH |
| 0A10H=1AH | CDH | 42H | 07H | CDH | 88H | 07H | DAH | E5H | 0AH | 61H | 1FH | 3EH | 03H | 32H |
| 0A20H=9CH | BFH | CDH | 4BH | 07H | DAH | E5H | 0AH | AFH | 32H | 6FH | BEH | 3EH | BCH | D3H | 19H |
| 0A30H=CDH | 8FH | 07H | DAH | E5H | 0AH | CDH | ABH | 08H | F5H | CDH | 42H | 07H | CDH | 48H | 07H |
| 0A40H=F1H | DAH | 79H | 0AH | 2AH | 9EH | BFH | 11H | BFH | BFH | CDH | 56H | 0DH | CAH | BFH | BFH |
| 0A50H=11H | BDH | BFH | CAH | 56H | 0DH | CAH | BDH | BFH | 11H | 40H | CDH | 56H | 0DH | C2H | |
| 0A60H=6DH | 0AH | CDH | 27H | 10H | DAH | 6DH | 0AH | AFH | 32H | 4CH | BEH | C9H | 21H | 00H | 40H |
| 0A70H=11H | 7FH | B2H | CDH | 17H | 11H | C3H | F7H | 0AH | 3AH | 9CH | BFH | 3DH | 32H | 9CH | BFH |
| 0A80H=C2H | 28H | 0AH | 00H | 00H | 00H | C3H | F7H | 0AH | 0EH | F7H | CDH | 6BH | 1AH | CDH | 42H |
| 0A90H=07H | CDH | 88H | 07H | DAH | E5H | 0AH | CDH | 61H | 1FH | CDH | 7EH | 0FH | CDH | 4BH | 07H |

APPENDIX B-continued

MACHINE CODE FOR MICROPROCESSOR 400
ASSOCIATED WITH CONTROLLER 50
ALL VALUES IN HEXADECIMAL FORMAT
© General Electric Company, 1979

| Address | | | | | | | | | | | | | | | | |
|---|---|---|---|---|---|---|---|---|---|---|---|---|---|---|---|---|
| 0AA0H= | DAH | E5H | 0AH | 3EH | B5H | D3H | 19H | 3EH | B4H | D3H | 19H | CDH | 8FH | 07H | DAH | E5H |
| 0AB0H= | DAH | 21H | E5H | 00H | 22H | 91H | BEH | 21H | 00H | 40H | CDH | E4H | 07H | CDH | 42H | 07H |
| 0AC0H= | CDH | 4BH | 07H | 3EH | 01H | 32H | 6FH | BEH | 3EH | BCH | D3H | 19H | CDH | 8FH | 07H | DAH |
| 0AD0H= | E5H | 0AH | CDH | ABH | 08H | F5H | CDH | 42H | 07H | CDH | 4BH | 07H | F1H | DAH | F7H | 0AH |
| 0AE0H= | AFH | 32H | 4CH | BEH | C9H | CDH | 42H | 07H | 3AH | 4EH | BEH | B7H | 37H | C8H | CDH | E9H |
| 0AF0H= | 1AH | 21H | 41H | 38H | C3H | C1H | 1EH | CDH | 42H | 07H | 3EH | 01H | 32H | 4CH | BEH | 3AH |
| 0B00H= | 4EH | BEH | B7H | 37H | C8H | CDH | B3H | 19H | CDH | E9H | 1AH | 21H | 38H | 38H | C3H | C1H |
| 0B10H= | 1EH | 0EH | FEH | CDH | 6BH | 1AH | 0CH | 45H | 0BH | DAH | 98H | 1EH | 21H | 11H | 0BH | 22H |
| 0B20H= | 55H | BEH | 21H | 00H | 00H | 39H | 22H | 53H | BEH | 3AH | 8CH | BEH | FEH | 08H | D2H | A0H |
| 0B30H= | 1EH | CDH | 3CH | 1AH | 2AH | 6AH | BEH | 22H | 82H | B2H | EBH | CDH | F8H | 0CH | 3AH | 8CH |
| 0B40H= | BEH | 32H | 81H | B2H | C9H | 21H | 45H | 0BH | 22H | 55H | BEH | 21H | 00H | B0H | 39H | 22H |
| 0B50H= | 53H | BEH | CDH | C9H | 19H | CDH | 8CH | 0CH | DAH | 98H | 1EH | FEH | 2AH | C2H | 98H | 1EH |
| 0B60H= | 21H | 60H | 0BH | 22H | 55H | BEH | 21H | 00H | 00H | 39H | 22H | 53H | BEH | CDH | C9H | 19H |
| 0B70H= | 0EH | 00H | 3AH | 8CH | BEH | CDH | 5EH | 1AH | CDH | 7CH | 0BH | C9H | 3AH | 90H | BEH | E6H |
| 0B80H= | F3H | 32H | 90H | BEH | CDH | 8BH | 1AH | 06H | 04H | 0EH | 04H | CDH | 1DH | 1BH | DAH | BAH |
| 0B90H= | 0BH | F5H | 7EH | FEH | FFH | CAH | C4H | 0BH | CDH | B9H | 0DH | 3EH | 59H | BDH | DAH | A0H |
| 0BA0H= | 1EH | 3EH | 12H | BCH | DAH | A0H | 1EH | AFH | B4H | CAH | A0H | 1EH | F1H | FEH | 28H | CAH |
| 0BB0H= | C7H | 0BH | FEH | 29H | CAH | D5H | 0BH | C3H | 98H | 1EH | 7EH | FEH | FFH | C2H | 98H | 1EH |
| 0BC0H= | 3EH | 31H | 37H | C9H | F1H | 37H | C9H | CDH | 47H | 1AH | 7CH | FEH | 12H | C2H | E2H | 0BH |
| 0BD0H= | 26H | 00H | C3H | E2H | 0BH | CDH | 10H | 1AH | 7CH | FEH | 12H | CAH | E2H | 0BH | C6H | 12H |
| 0BE0H= | 27H | 67H | 22H | 6AH | BEH | CDH | F0H | 1AH | CAH | 7CH | 0BH | E6H | 3FH | FEH | 31H | C8H |
| 0BF0H= | FEH | 2AH | C8H | C3H | 98H | 1EH | CDH | 8BH | 1AH | 7CH | FEH | 12H | CAH | 18H | 0CH | D2H |
| 0C00H= | 1BH | 0CH | CDH | 47H | 1AH | 7CH | B7H | C2H | 0CH | 0CH | 26H | 12H | 0EH | 04H | 7CH | E6H |
| 0C10H= | F0H | C2H | 00H | 1DH | 0CH | C3H | 0DH | 1DH | F5H | CDH | 10H | 1AH | F1H | CAH | 0CH | 0CH |
| 0C20H= | CDH | AFH | 0DH | E6H | 0FH | 4FH | 7CH | E6H | 0FH | C6H | 0AH | 0DH | C2H | 29H | 0CH | D6H |
| 0C30H= | 0CH | B7H | 27H | 67H | C3H | 0CH | 0CH | 0EH | 01H | 21H | 4CH | 38H | CDH | D3H | 19H | 0EH |
| 0C40H= | 00H | 06H | 01H | CDH | 1DH | 1BH | F5H | 7EH | FEH | FFH | CAH | 5FH | 0CH | B7H | CAH | A0H |
| 0C50H= | 1EH | 32H | 8CH | BEH | F1H | DAH | 5DH | 0CH | FEH | 2AH | C2H | 98H | 1EH | B7H | C9H | F1H |
| 0C60H= | 37H | C9H | 3AH | 81H | B2H | B7H | CAH | 7CH | 0CH | CDH | 8FH | 0CH | EBH | 2AH | 82H | B2H |
| 0C70H= | CDH | 56H | 0DH | DAH | 7EH | 0CH | EBH | 22H | 82H | B2H | B7H | C9H | 37H | C9H | 3AH | 81H |
| 0C80H= | B2H | 3CH | FEH | 08H | DAH | 89H | 0CH | 3EH | 01H | 32H | 81H | B2H | C3H | 76H | 0CH | 21H |
| 0C90H= | 00H | 00H | 18H | E6H | 40H | F5H | DBH | 5CH | E6H | 10H | CAH | A4H | 0CH | CDH | B5H | E5H |
| 0CA0H= | 0CH | C3H | 97H | 0CH | CDH | F2H | 0CH | 6FH | CDH | E5H | 0CH | DBH | 5CH | E6H | 20H | C2H |
| 0CB0H= | A8H | 0CH | CDH | F2H | 0CH | CDH | 84H | 0DH | B5H | 6EH | CDH | E5H | 0CH | DBH | 5CH | E6H |
| 0CC0H= | 40H | C2H | BAH | 0CH | CDH | F2H | 0CH | 67H | CDH | E5H | 0CH | DBH | 5CH | E6H | 80H | C2H |
| 0CD0H= | 8H | CDH | F2H | 0CH | CDH | B4H | 0DH | B4H | 67H | DBH | 18H | E6H | 40H | 4FH | F1H |
| 0CE0H= | B9H | C2H | 8FH | 0CH | C9H | 3EH | 3CH | D3H | 19H | E5H | E1H | E5H | 31H | 3EH | BCH | D3H |
| 0CF0H= | 19H | C9H | DBH | 5CH | 2FH | E6H | 0FH | C9H | 3EH | BCH | D3H | 19H | CDH | 13H | 0DH | CDH |
| 0D00H= | 56H | 0DH | C2H | FCH | 0CH | 3EH | BCH | D3H | 19H | CDH | 8FH | 0CH | CDH | 56H | 0DH | C2H |
| 0D10H= | FBH | 0CH | C9H | DBH | 5CH | E6H | 10H | CAH | 20H | 0DH | CDH | 42H | 0DH | C3H | 13H | 0DH |
| 0D20H= | CDH | F2H | 0CH | 6FH | CDH | 42H | 0DH | CDH | F2H | 0CH | CDH | B4H | 0DH | B5H | 6FH | CDH |
| 0D30H= | 42H | 0CH | CDH | F2H | 0CH | 62H | CDH | 42H | 0DH | CDH | F2H | 0CH | CDH | B4H | 0DH | B4H |
| 0D40H= | 67H | C9H | 3EH | 7CH | D3H | 19H | E5H | E1H | 3EH | FCH | D3H | 19H | C9H | 7CH |
| 0D50H= | 1FH | 67H | 7DH | 1FH | 6FH | C9H | 7AH | BCH | C0H | 7BH | BDH | C9H | 7BH | 95H | 5FH | 7AH |
| 0D60H= | 9CH | 57H | C9H | EBH | 19H | EBH | 7BH | B2H | C9H | D5H | 5FH | 79H | B0H | 7BH | D1H | C9H |
| 0D70H= | CDH | 56H | 0DH | C8H | 79H | 95H | 4FH | 78H | 9CH | 47H | DAH | 8BH | 0DH | EBH | E5H | 7EH |
| 0D80H= | 09H | 72H | E1H | CDH | 56H | 0DH | C8H | 2BH | C3H | 7EH | 0DH | E5H | 7EH | 09H | 77H | E1H |
| 0D90H= | CDH | 56H | 0DH | C8H | 23H | C3H | 8BH | 0DH | 7CH | CDH | B4H | 0DH | E6H | F0H | 67H | 7DH |
| 0DA0H= | CDH | AFH | 0DH | E6H | 0FH | B4H | 67H | 7DH | CDH | B4H | 0DH | E6H | F0H | 6FH | C9H | 0FH |
| 0DB0H= | 0FH | 0FH | 0FH | C9H | 07H | 07H | 07H | 07H | C9H | 11H | 00H | 00H | 23H | 36H | FFH | 21H |
| 0DC0H= | 07H | BFH | EBH | 1AH | FEH | FFH | C3H | CDH | 98H | 0DH | 1AH | B5H | 6FH | 13H | C3H | C3H |
| 0DD0H= | 0DH | 21H | FFH | FFH | 1AH | FEH | FFH | CAH | 01H | 0EH | 6FH | 26H | 00H | 1BH | 1AH | FEH |
| 0DE0H= | FFH | C8H | 01H | 0AH | 00H | CDH | 03H | 0EH | 1BH | 1AH | FEH | FFH | C8H | 01H | 64H | 00H |
| 0DF0H= | CDH | 03H | 0EH | 1BH | 1AH | FEH | FFH | C8H | 01H | E8H | 03H | CDH | 03H | 0EH | B7H | 1BH |
| 0E00H= | C9H | 37H | 0EH | 3DH | F8H | 09H | C3H | 03H | 0EH | 22H | 71H | BEH | AFH | 32H | 73H | BEH |
| 0E10H= | 21H | EBH | 03H | CDH | 2AH | 0EH | 21H | 64H | 00H | CDH | 2AH | 0EH | 21H | 0AH | 00H | CDH |
| 0E20H= | 2AH | 0EH | 2AH | 71H | BEH | 73H | 23H | 36H | FFH | C9H | 0EH | FFH | CDH | 5CH | 0DH | 0CH |
| 0E30H= | D2H | 2CH | 0EH | CDH | 63H | DDH | 3AH | 73H | BEH | B7H | C2H | 43H | 0EH | 79H | B7H | C8H |
| 0E40H= | 32H | 73H | BEH | 2AH | 71H | BEH | 71H | 23H | 22H | 71H | BEH | C9H | 7DH | 17H | 6FH | 7CH |
| 0E50H= | 17H | 67H | C9H | 13H | CDH | 5CH | 0DH | 71H | 23H | 1BH | 7BH | B2H | C2H | 57H | 0EH | C9H |
| 0E60H= | E5H | D5H | 2AH | 87H | BEH | EBH | 2AH | 85H | BEH | CDH | 56H | 0DH | D1H | E1H | C9H | DBH |
| 0E70H= | 59H | 47H | E6H | 02H | CAH | 6FH | 0EH | DBH | 58H | E6H | 7FH | 47H | C9H | E5H | 21H | 00H |
| 0E80H= | 00H | 2BH | 7DH | B4H | CAH | ACH | 0EH | DBH | 59H | E6H | 04H | CAH | 81H | 0EH | E1H | 78H |
| 0E90H= | D3H | 58H | 3AH | 98H | BFH | 3CH | 32H | 98H | BFH | 78H | FEH | 0DH | C0H | 06H | 0AH | CDH |
| 0EA0H= | 7DH | 0EH | D8H | CDH | B5H | 0EH | D8H | AFH | 32H | 98H | BFH | C9H | E1H | 37H | C9H | 06H |
| 0EB0H= | 0DH | CDH | 7DH | 0EH | C9H | 06H | 7FH | 0EH | 07H | CDH | 7DH | 0EH | 0DH | C2H | B9H | 0EH |
| 0EC0H= | C9H | 3EH | 00H | 32H | 40H | BFH | 21H | 10H | 27H | 0EH | FFH | CDH | 5CH | 0DH | 0CH | D2H |
| 0ED0H= | CBH | 0EH | CDH | 63H | 0DH | 79H | B7H | C4H | 30H | 0FH | 21H | E8H | 03H | 0EH | FFH | CDH |
| 0EE0H= | 5CH | 0DH | 0CH | D2H | DFH | 0EH | CDH | 63H | 0DH | 79H | 87H | C'H | F2H | 0EH | 3AH | 40H |
| 0EF0H= | BFH | B7H | C4H | 30H | 0FH | 21H | 64H | 00H | 0EH | FFH | CDH | 5CH | 0DH | 0CH | D2H | FAH |
| 0F00H= | 0EH | CDH | 63H | 0DH | 79H | B7H | C2H | 0CH | 0FH | 3AH | 40H | FBH | B7H | C4H | 30H | 0FH |
| 0F10H= | 21H | 0AH | 00H | 0EH | FFH | CDH | 5CH | 0DH | 0CH | D2H | 15H | 0FH | CDH | 63H | 0DH | 79H |
| 0F20H= | B7H | C2H | 27H | 0FH | 3AH | 40H | BFH | B7H | C4H | 30H | 0FH | 4BH | CDH | 30H | 0FH | C9H |
| 0F30H= | 3EH | 01H | 32H | 40H | BFH | 2AH | BFH | 79H | C6H | 30H | 77H | 23H | 36H | 00H | 22H |
| 0F40H= | 16H | BFH | C9H | F5H | C5H | D5H | E5H | 21H | 18H | BFH | CDH | 58H | 0FH | 21H | 18H | BFH |
| 0F50H= | CDH | 63H | 0FH | E1H | D1H | C1H | F1H | C9H | AFH | 32H | 40H | BFH | 22H | 16H | BEH | CDH |
| 0F60H= | C1H | 0EH | C9H | 7EH | B7H | C8H | 47H | CDH | 7DH | 0EH | 23H | C3H | 63H | 0FH | DBH | 11H |
| 0F70H= | 2FH | E6H | 07H | C8H | FEH | 05H | CBH | FEH | 06H | C8H | FEH | 03H | C8H | C9H | 21H | 0CH |

APPENDIX B-continued

MACHINE CODE FOR MICROPROCESSOR 400
ASSOCIATED WITH CONTROLLER 50
ALL VALUES IN HEXADECIMAL FORMAT
© General Electric Company, 1979

| | | | | | | | | | | | | | | | | |
|---|---|---|---|---|---|---|---|---|---|---|---|---|---|---|---|---|
| 0F80H=5EH | 11H | 11H | 5EH | 0EH | 00H | CDH | 53H | 0EH | 21H | 00H | 40H | 11H | 11H | 5EH | CDH |
| 0F90H=1CH | 10H | 22H | 12H | 5EH | 21H | 15H | 5EH | 11H | ADH | 71H | CDH | 1CH | 10H | 22H | AEH |
| 0FA0H=71H | 21H | B5H | A2H | 11H | BBH | A2H | 0EH | FEH | CDH | 53H | 0EH | 21H | B1H | 71H | 11H |
| 0FB0H=BBH | A2H | CDH | 1CH | 10H | 22H | BCH | A2H | 21H | 5FH | B2H | 11H | 62H | B2H | 0EH | 00H |
| 0FC0H=CDH | 53H | 0EH | 21H | BFH | A2H | 11H | 62H | B2H | CDH | 1CH | 1DH | 22H | 63H | B2H | 21H |
| 0FD0H=FFH | FFH | 22H | 76H | B2H | 21H | 66H | B2H | 11H | 77H | B2H | CDH | 1CH | 10H | 22H | 78H |
| 0FE0H=B2H | 21H | 7BH | B2H | 36H | 45H | 23H | 36H | 42H | 23H | 36H | 4DH | 23H | 36H | 00H | 23H |
| 0FF0H=36H | FFH | AFH | 32H | 47H | BEH | 3AH | 49H | BEH | E6H | FBH | 32H | 49H | BEH | C9H | 22H |
| 1000H=85H | BEH | EBH | 22H | 87H | BEH | 06H | 00H | 21H | 00H | 00H | 1AH | 4FH | 09H | 13H | EBH |
| 1010H=22H | 85H | BEH | EBH | CDH | 60H | 0EH | D2H | 0BH | 10H | EBH | C9H | CDH | FFH | 0FH | 7BH |
| 1020H=2FH | 6FH | 7AH | 2FH | 67H | 23H | C9H | AFH | 32H | 47H | BEH | CDH | 9BH | 10H | FBH | 21H |
| 1030H=87H | 10H | E5H | 3AH | 52H | BEH | 3DH | F8H | 32H | 52H | BEH | CAH | AEH | 10H | 3DH | CAH |
| 1040H=D5H | 10H | 3DH | CAH | E4H | 10H | 3DH | CAH | F3H | 10H | 3DH | CAH | 02H | 11H | CDH | AEH |
| 1050H=10H | D8H | CDH | D5H | 10H | D8H | CDH | E4H | 10H | D8H | CDH | F3H | 10H | D8H | CDH | 02H |
| 1060H=11H | D8H | 21H | 7BH | B2H | 7EH | FEH | 45H | C2H | C5H | 10H | 23H | 7EH | FEH | 42H | C2H |
| 1070H=C5H | 10H | 23H | 7EH | FEH | 4DH | C2H | C5H | 10H | 23H | 7EH | B7H | C2H | C5H | 10H | 23H |
| 1080H=7EH | FEH | FFH | C2H | C5H | 10H | C9H | CDH | A7H | 10H | 3AH | 47H | BEH | B7H | CAH | F2H |
| 1090H=0FH | 3AH | 49H | BEH | F6H | 04H | 32H | 49H | BEH | 37H | C9H | CDH | DBH | 05H | 3EH | 05H |
| 10A0H=32H | 48H | BEH | CDH | 3CH | 1AH | C9H | CDH | C4H | 05H | CDH | 36H | 1AH | C9H | 3EH | 05H |
| 10B0H=32H | 52H | BEH | 21H | 00H | 40H | 11H | 11H | 5FH | CDH | FFH | 0FH | 2AH | 12H | 5EH | CDH |
| 10C0H=63H | 0DH | 37H | 3FH | C8H | 3EH | 01H | 32H | 47H | BEH | 06H | 04H | 3AH | 49H | BEH | B0H |
| 10D0H=32H | 49H | BEH | 37H | C9H | 21H | 15H | 5EH | 11H | ADH | 71H | CDH | FFH | 0FH | 2AH | AEH |
| 10E0H=71H | C3H | BFH | 10H | 21H | B1H | 11H | BBH | A2H | CDH | FFH | 0FH | 2AH | BCH | A2H |
| 10F0H=C3H | BFH | 10H | 21H | BFH | A2H | 11H | 62H | B2H | CDH | FFH | 0FH | 2AH | 63H | B2H | C3H |
| 1100H=BFH | 10H | 21H | 66H | B2H | 11H | 77H | B2H | CDH | FFH | 0FH | 2AH | 78H | B2H | C3H | BFH |
| 1110H=10H | 21H | 00H | 40H | 11H | ACH | BFH | 0EH | 00H | CDH | 53H | 0EH | 21H | B1H | 71H | 11H |
| 1120H=BBH | A2H | 0EH | FFH | CDH | 53H | 0EH | 21H | 66H | B2H | 11H | 77H | B2H | 0EH | FEH | CDH |
| 1130H=53H | 0EH | CDH | 2DH | 33H | CDH | 7EH | 0FH | C9H | F3H | 3EH | DFH | 30H | D3H | 40H | D3H |
| 1140H=44H | FBH | AFH | D3H | 02H | D3H | 03H | D3H | 0AH | D3H | 12H | D3H | 13H | D3H | 1AH | 3EH |
| 1150H=BCH | D3H | 19H | 3EH | FFH | D3H | 1BH | 3EH | BCH | D3H | 19H | 3EH | FFH | D3H | 0BH | D3H |
| 1160H=09H | CDH | 95H | 12H | CDH | 74H | 11H | CDH | A4H | 19H | CDH | A6H | 11H | CDH | C4H | 05H |
| 1170H=CDH | 42H | 07H | C9H | 3EH | 37H | D3H | 59H | D3H | 59H | D3H | 59H | 3EH | 77H | D3H | 59H |
| 1180H=DBH | 18H | E6H | 10H | 3EH | 7BH | C2H | 8BH | 11H | 3EH | 7AH | D3H | 59H | 3EH | 37H | D3H |
| 1190H=59H | C9H | F3H | 20H | E6H | 07H | F6H | 98H | A0H | 30H | FBH | C9H | F3H | 20H | E6H | 07H |
| 11A0H=BCH | F6H | 80H | 30H | FBH | C9H | 3EH | 40H | 30H | 00H | 00H | 3EH | C0H | 30H | C9H | CDH |
| 11B0H=B6H | 11H | 7EH | 81H | 77H | C9H | 7DH | E6H | 07H | 4FH | 3EH | 01H | CAH | C4H | 11H | 17H |
| 11C0H=0DH | C2H | BFH | 11H | 4FH | CDH | 4FH | 0DH | CDH | 4FH | 0DH | CDH | 4FH | 0DH | 3EH | 1FH |
| 11D0H=A4H | 67H | E5H | 19H | E3H | 3AH | 89H | BEH | 95H | 32H | 89H | BEH | E1H | C9H | 21H | 00H |
| 11E0H=00H | 01H | 08H | 00H | 1AH | B7H | C2H | F6H | 11H | 09H | 3AH | 89H | BEH | 3DH | 32H | 89H |
| 11F0H=BEH | C2H | E4H | 11H | 37H | C9H | 4FH | 3EH | 01H | B7H | 47H | A1H | C2H | 05H | 12H | 78H |
| 1200H=17H | 23H | C3H | FAH | 11H | 2FH | A1H | 12H | C9H | 11H | 00H | 00H | 22H | 9FH | BEH | 3EH |
| 1210H=01H | 32H | 9EH | BEH | 2AH | 9FH | BEH | 3AH | 9EH | BEH | 4FH | 7EH | A1H | C0H | 13H | 79H |
| 1220H=17H | 32H | 9EH | BEH | D2H | 1AH | 12H | 23H | 3AH | 89H | BEH | 3DH | 32H | 89H | BEH | C2H |
| 1230H=0CH | 12H | 37H | C9H | 2AH | 9FH | BEH | 3AH | 9EH | BEH | 4FH | B7H | C3H | 1EH | 12H | 11H |
| 1240H=00H | 00H | 2AH | 85H | BEH | 7EH | 0EH | 09H | 0DH | CAH | 54H | 12H | 1FH | D2H | 48H | 12H |
| 1250H=13H | C3H | 48H | 12H | D5H | 23H | 22H | 85H | BEH | CDH | 60H | 0EH | D1H | D2H | 42H | 12H |
| 1260H=C9H | 3AH | A8H | BEH | B7H | C4H | 7FH | 12H | 3AH | A9H | BEH | B7H | C4H | 8AH | 12H | 3AH |
| 1270H=AAH | BEH | B7H | C8H | 3AH | ADH | BEH | 3DH | 32H | ADH | BEH | C0H | C3H | 5DH | 13H | 3AH |
| 1280H=ABH | BEH | 3DH | 32H | ABH | BEH | C0H | C3H | 29H | 13H | 3AH | ACH | BEH | 3DH | 32H | ACH |
| 1290H=BEH | C0H | C3H | 4AH | 13H | 3EH | FFH | 32H | AEH | BEH | CDH | 29H | 13H | CDH | 4AH | 13H |
| 12A0H=CDH | 5DH | 13H | C9H | 3AH | 4BH | BEH | 1FH | F5H | D4H | BBH | 12H | F1H | 1FH | F5H | D4H |
| 12B0H=E7H | 12H | F1H | 1FH | D2H | 09H | 13H | C9H | DBH | 08H | E6H | 01H | C0H | F3H | DBH | 40H |
| 12C0H=0EH | FEH | 06H | BEH | 3EH | 0FH | 32H | ABH | BEH | 32H | ABH | BEH | 3EH | 06H | 32H | AFH |
| 12D0H=BEH | 21H | B8H | BEH | 22H | B2H | BEH | 36H | FFH | CDH | 92H | 11H | 3AH | AEH | BEH | A1H |
| 12E0H=32H | AEH | BEH | D3H | 09H | FBH | C9H | DBH | 08H | E6H | 04H | C0H | F3H | DBH | 44H | 0EH |
| 12F0H=FBH | 06H | 8DH | 3EH | 0FH | 32H | A9H | BEH | 32H | ACH | BEH | 3EH | 06H | 32H | B0H | BEH |
| 1300H=21H | C1H | BEH | 22H | B4H | BEH | C3H | D7H | 12H | DBH | 08H | E6H | 10H | C0H | F3H | 0EH |
| 1310H=EFH | 06H | 9BH | E3H | 0FH | 32H | AAH | BEH | 32H | ADH | BEH | 3EH | 06H | 32H | B1H | BEH |
| 1320H=21H | CAH | BEH | 22H | B6H | BEH | C3H | D7H | 12H | F3H | 0EH | 03H | 06H | 89H | AFH | 32H |
| 1330H=A8H | BEH | DBH | 40H | 3AH | 4BH | BEH | E6H | FEH | 32H | 4BH | BEH | CDH | 9CH | 11H | 3AH |
| 1340H=AEH | BEH | B1H | 32H | AEH | BEH | D3H | 09H | FBH | C9H | F3H | 0EH | 0CH | 06H | 8AH | AFH |
| 1350H=32H | A9H | BEH | DBH | 44H | 3AH | 4BH | BEH | E6H | FDH | C3H | 39H | 13H | F3H | 0EH | 30H |
| 1360H=06H | 9DH | AFH | 32H | AAH | BEH | 3AH | 4BH | BEH | E6H | FBH | C3H | 39H | 13H | F3H | F5H |
| 1370H=E5H | D5H | C5H | CDH | 0BH | 15H | FEH | 23H | CAH | EAH | 13H | FEH | 0AH | D2H | FFH | 13H |
| 1380H=3AH | AFH | BEH | 3DH | CAH | FFH | 13H | 32H | AFH | BEH | 2AH | B2H | BEH | 23H | 70H | 22H |
| 1390H=B2H | BEH | DBH | 40H | C1H | D1H | E1H | FBH | C9H | F3H | F5H | E5H | D5H | C5H | CDH |
| 13A0H=22H | 15H | FEH | 23H | CAH | F1H | 13H | FEH | 0AH | D2H | FFH | 13H | 3AH | B0H | BEH | 3DH |
| 13B0H=CAH | FFH | 13H | 32H | B0H | BEH | 2AH | B4H | BEH | 23H | 70H | 22H | B4H | BEH | DBH | 44H |
| 13C0H=C3H | 94H | 13H | F3H | F5H | E5H | D5H | C5H | CDH | 2CH | 15H | FEH | 23H | CAH | F8H | 13H |
| 13D0H=FEH | 0AH | D2H | FFH | 13H | 3AH | B1H | BEH | 3DH | CAH | FFH | 13H | 32H | B1H | BEH | 2AH |
| 13E0H=B6H | BEH | 23H | 70H | 22H | B6H | BEH | C3H | 94H | 13H | 21H | 94H | 13H | E5H | C3H | 2EH |
| 1400H=94H | 13H | E5H | 3AH | A7H | BEH | 3DH | CAH | 29H | 13H | 3DH | CAH | 4AH | 13H | C3H | 5DH |
| 1410H=13H | CDH | 1BH | 14H | CDH | 4CH | 14H | CDH | 7DH | 14H | C9H | 3AH | A8H | BEH | B7H | C8H |
| 1420H=1BH | BEH | FEH | 0CH | D0H | DBH | 08H | E6H | 02H | C8H | C3H | 29H | 13H | CDH | 29H |
| 1430H=13H | 2AH | B2H | BEH | CDH | AEH | 14H | D8H | 2AH | B2H | BEH | 7EH | EBH | 22H | B9H | BEH |
| 1440H=32H | BBH | BEH | 3AH | 4BH | BEH | F6H | 01H | 32H | 4BH | BEH | C9H | 3AH | A9H | BEH | B7H |
| 1450H=C8H | 3AH | ACH | BEH | FEH | 0CH | D0H | DBH | 08H | E6H | 08H | C8H | C3H | 4AH | 13H | CDH |
| 1460H=4AH | 13H | 2AH | B4H | BEH | CDH | AEH | 14H | D8H | 2AH | B4H | BEH | 7EH | EBH | 22H | C2H |

APPENDIX B-continued

MACHINE CODE FOR MICROPROCESSOR 400
ASSOCIATED WITH CONTROLLER 50
ALL VALUES IN HEXADECIMAL FORMAT
© General Electric Company, 1979

| Addr | | | | | | | | | | | | | | | | |
|---|---|---|---|---|---|---|---|---|---|---|---|---|---|---|---|---|
| 1470H=BEH | 32H | C4H | BEH | 3AH | 4BH | BEH | F6H | 02H | 32H | 4BH | BEH | C9H | 3AH | AAH | BEH |
| 1480H=B7H | C8H | 3AH | ADH | BEH | FEH | 0CH | D0H | DBH | 08H | E6H | 20H | C8H | C3H | 5DH | 13H |
| 1490H=CDH | 5DH | 13H | 2AH | B6H | BEH | CDH | AEH | 14H | D8H | 2AH | B6H | BEH | 7EH | EBH | 22H |
| 14A0H=CBH | BEH | 32H | CDH | BEH | 3AH | 4BH | BEH | F6H | 04H | 32H | 4BH | BEH | C9H | 7EH | FEH |
| 14B0H=FFH | 37H | C8H | 2BH | EBH | CDH | D1H | 0DH | D8H | 11H | A0H | 0FH | CDH | 56H | 0DH | D8H |
| 14C0H=EBH | C9H | E6H | 0FH | CDH | E8H | 14H | 4FH | 78H | 0FH | 0FH | 0FH | 0FH | E6H | 0FH | CDH |
| 14D0H=E8H | 14H | 07H | 07H | B1H | 4FH | 06H | 00H | 21H | FBH | 14H | 09H | 7EH | FEH | FFH | CAH |
| 14E0H=E4H | 14H | 47H | C9H | C1H | C3H | FFH | 13H | FEH | 04H | DAH | F9H | 14H | CAH | F3H | 14H |
| 14F0H=C3H | F6H | 14H | 3EH | 02H | C9H | 3EH | 03H | C9H | 3DH | C9H | 01H | 04H | 07H | 2AH | 02H |
| 1500H=05H | 08H | 00H | 03H | 06H | 09H | 23H | FFH | FFH | FFH | FFH | 3EH | 01H | 32H | A7H | BEH |
| 1510H=DBH | 40H | 47H | E6H | 0FH | CAH | E6H | 14H | 78H | E6H | F0H | CAH | E4H | 14H | 78H | C3H |
| 1520H=C2H | 14H | 3EH | 02H | 32H | A7H | DBH | BEH | 44H | C3H | 12H | 15H | 3EH | 03H | 32H | A7H |
| 1530H=BEH | DBH | 10H | C3H | 12H | 15H | 3AH | 4DH | BEH | B7H | C0H | 21H | 81H | B2H | 4EH | 3AH |
| 1540H=46H | BEH | B7H | CAH | 48H | 15H | F8H | 4FH | 23H | 5EH | 23H | 56H | 2AH | 94H | BEH | CDH |
| 1550H=25H | 26H | D8H | 22H | 94H | BEH | 7EH | E6H | 07H | 4FH | 3AH | 46H | BEH | B7H | 79H | CAH |
| 1560H=64H | 15H | C6H | 07H | 32H | 58H | BAH | 7EH | 1FH | 1FH | 1FH | E6H | 1FH | 32H | A1H | BEH |
| 1570H=23H | 5EH | 23H | 56H | EBH | 22H | 59H | BAH | EBH | 23H | 5EH | 23H | 56H | EBH | 22H | 83H |
| 1580H=BEH | 3EH | 01H | 32H | 4DH | BEH | C9H | AFH | 32H | 4FH | BEH | 32H | 4DH | BEH | 3AH | A1H |
| 1590H=BEH | 32H | 93H | BEH | 2AH | 83H | BEH | 22H | 7FH | BEH | FBH | 2AH | 7FH | BEH | 3EH | 01H |
| 15A0H=32H | 6FH | BEH | EBH | CDH | 93H | BEH | 2BH | D8H | 22H | DFH | BEH | 2AH | 79H | BEH | 22H | 59H |
| 15B0H=BEH | 23H | 22H | 79H | BEH | CDH | 0BH | 16H | DAH | C2H | 15H | CDH | EAH | 05H | DAH | 05H |
| 15C0H=16H | FBH | 2AH | 7BH | BEH | EBH | 2AH | 79H | BEH | CDH | 56H | 0DH | D2H | AEH | 15H | 2AH |
| 15D0H=7FH | BEH | EBH | 3EH | 01H | 32H | .6FH | BEH | 2AH | DFH | BEH | CDH | 96H | 2BH | DAH | E4H |
| 15E0H=15H | C3H | A8H | 15H | 3AH | 4FH | BEH | B7H | 3AH | 4AH | BEH | 21H | 00H | 00H | 06H | 01H |
| 15F0H=C2H | FFH | 15H | 04H | 22H | 9AH | BEH | B0H | 32H | 4AH | BEH | CDH | B7H | 05H | C9H | 22H |
| 1600H=98H | BEH | C3H | F7H | 15H | CDH | EAH | 05H | C3H | C1H | 15H | 3AH | 93H | BEH | B7H | FAH |
| 1610H=3DH | 16H | 32H | 5DH | BEH | CDH | 01H | 27H | D8H | 5EH | 23H | 56H | 3AH | 4FH | BEH | B7H |
| 1620H=CAH | 49H | 16H | D5H | 11H | 5CH | BAH | 2AH | 59H | BEH | CDH | AFH | 11H | 3AH | 58H | BEH |
| 1630H=B7H | CAH | 53H | 16H | CDH | 68H | 33H | D1H | CDH | 6EH | 16H | B7H | C9H | 11H | 00H | 00H |
| 1640H=E6H | 01H | CAH | 1CH | 16H | 1BH | C3H | 1CH | 16H | 32H | 58H | BEH | D5H | 11H | 9DH | BAH |
| 1650H=C3H | 27H | 16H | 2AH | 59H | BEH | 29H | 11H | 6EH | B6H | 19H | 5EH | 23H | 7EH | 2AH | 7DH |
| 1660H=BEH | 2FH | A4H | 67H | 7BH | 2FH | A5H | 6FH | 22H | 7DH | BEH | C3H | 37H | 16H | 2AH | 7DH |
| 1670H=BEH | 7DH | A3H | 4FH | 7CH | A2H | 47H | 2AH | 59H | BEH | 29H | 11H | B4H | B2H | 119H | 5EH |
| 1680H=23H | 56H | E5H | 2AH | 7DH | BEH | 7DH | 2FH | A3H | B1H | 5FH | 7CH | 2FH | A2H | B0H | 57H |
| 1690H=E1H | 72H | 2BH | 73H | EBH | 22H | 7FH | BEH | 22H | 63H | BEH | C9H | 21H | 51H | BEH | 35H |
| 16A0H=C2H | F1H | 16H | 36H | 0AH | 3AH | 46H | BEH | B7H | C2H | CEH | 16H | CDH | 6EH | 0FH | 37H |
| 16B0H=3FH | C8H | CDH | 17H | 17H | DAH | CAH | 16H | 22H | 96H | BEH | 32H | 8CH | BEH | EBH | 2AH |
| 16C0H=82H | B2H | EBH | CDH | 6FH | 25H | AFH | 32H | 50H | BEH | 22H | 94H | BEH | C9H | 4FH | CDH |
| 16D0H=6EH | 0FH | CAH | E4H | 16H | B9H | C8H | FEH | 04H | C2H | B2H | 16H | A1H | 37H | C0H | 3EH |
| 16E0H=04H | C3H | B2H | 16H | AFH | 32H | 46H | BEH | 21H | 15H | 5EH | 3AH | 81H | B2H | C3H | B8H |
| 16F0H=16H | 3AH | 46H | BEH | 17H | C9H | AFH | 32H | 50H | BEH | 32H | 46H | BEH | 3AH | 81H | B2H |
| 1700H=B7H | CAH | 0DH | 17H | CDH | 6EH | 0FH | CAH | E4H | 16H | C3H | B2H | 16H | 21H | 15H | 5EH |
| 1710H=22H | 96H | BEH | 22H | 94H | BEH | C9H | B7H | CAH | 26H | 17H | 3DH | CAH | 2DH | 17H | 3DH |
| 1720H=CAH | 35H | 17H | 37H | 3EH | FFH | 21H | 15H | 5EH | 32H | 46H | BEH | C9H | 3EH | 01H | 21H |
| 1730H=77H | 70H | C3H | 29H | 17H | 3EH | 02H | 21H | 12H | 71H | C3H | 29H | 17H | 00H | 3AH | 8BH |
| 1740H=BEH | 32H | 5AH | BEH | 2AH | 85H | BEH | 7EH | 32H | 59H | BEH | 23H | 5EH | 23H | 56H | 23H |
| 1750H=22H | 85H | BEH | EBH | 22H | 63H | BEH | 11H | 6EH | B6H | 2AH | 59H | BEH | 29H | 19H | 7EH |
| 1760H=2FH | 5FH | 23H | 7EH | 2FH | 57H | EBH | 22H | 7DH | BEH | 2AH | 63H | BEH | EBH | CDH | 6EH |
| 1770H=16H | CDH | EAH | 05H | 2AH | 85H | BEH | EBH | 2AH | 87H | BEH | CDH | 56H | 0DH | D2H | 84H |
| 1780H=17H | C3H | 44H | 17H | CDH | 66H | 27H | CAH | 8EH | 17H | CDH | B7H | 05H | C9H | CDH | C0H |
| 1790H=2AH | C3H | 3EH | 17H | 21H | D3H | BEH | 35H | C0H | 36H | 50H | 3AH | 4AH | BEH | 1FH | DAH |
| 17A0H=F5H | 17H | 1FH | DAH | 19H | 18H | C9H | 22H | 59H | BEH | CDH | 41H | 18H | 3EH | 40H | 32H |
| 17B0H=89H | BEH | EBH | 2AH | 75H | BEH | DAH | E0H | 17H | EBH | CDH | B6H | 11H | 79H | 32H | 9EH |
| 17C0H=BEH | C3H | 19H | 39H | EBH | CDH | 14H | 12H | DAH | E7H | 17H | EBH | 22H | 59H | BEH | CDH |
| 17D0H=4CH | 18H | D2H | ECH | 17H | FEH | 01H | CAH | F0H | 17H | 3EH | 02H | B7H | C3H | F0H | 17H |
| 17E0H=CDH | 09H | 12H | D2H | CBH | 17H | ·C9H | AFH | 21H | 00H | 00H | C9H | CDH | 37H | 18H | AFH |
| 17F0H=2AH | 59H | BEH | 23H | C9H | 21H | 5CH | BAH | 22H | 75H | BEH | 2AH | 98H | BEH | CDH | A7H |
| 1800H=17H | DAH | 10H | 18H | 22H | 98H | BEH | FEH | 02H | C0H | CDH | 37H | 18H | CDH | EBH | 18H |
| 1810H=3AH | 4AH | BEH | E6H | FEH | 32H | 4AH | BEH | C9H | 21H | 9DH | BAH | 22H | 75H | BEH | 2AH |
| 1820H=9AH | BEH | CDH | A7H | 17H | DAH | 2EH | 18H | 22H | 9AH | BEH | C3H | 07H | 18H | 3AH | 4AH |
| 1830H=BEH | E6H | FDH | 32H | 4AH | BEH | C9H | 3AH | 9EH | BEH | 2FH | 2AH | 9FH | BEH | A6H | 77H |
| 1840H=C9H | 7DH | B4H | 37H | C8H | 11H | F4H | 01H | CDH | 56H | 0DH | C9H | 11H | 84H | B2H | 2AH |
| 1850H=59H | BEH | 29H | 19H | 5EH | 23H | 56H | EBH | 22H | 63H | BEH | 3EH | 03H | 32H | D5H | BEH |
| 1860H=21H | F1H | BEH | 36H | 69H | 23H | 36H | 00H | CDH | 2AH | 07H | DAH | 97H | 18H | 3AH | DBH |
| 1870H=BEH | FEH | 05H | C2H | 97H | 18H | 5EH | 23H | 56H | 2AH | 63H | BEH | CEH | 56H | 0DH | C2H |
| 1880H=83H | 18H | C9H | CDH | 57H | 05H | DAH | 93H | 18H | 22H | F1H | BEH | CDH | 91H | 06H | CDH |
| 1890H=B7H | 05H | FBH | 3EH | 01H | 37H | C9H | FBH | 3AH | D5H | BEH | 3DH | C2H | 5DH | 18H | 37H |
| 18A0H=C9H | FBH | CDH | 11H | 14H | 3AH | 4BH | BEH | 1FH | DAH | B5H | 18H | 1FH | DAH | D5H | 18H |
| 18B0H=1FH | DAH | E0H | 18H | C9H | 21H | B9H | BEH | 3AH | 4BH | BEH | E6H | FEH | 32H | 4BH | BEH |
| 18C0H=5EH | 23H | 56H | 23H | 7EH | 32H | 93H | BEH | EBH | 22H | 7FH | BEH | 3EH | 01H | 32H | 4FH |
| 18D0H=BEH | CDH | 9AH | 15H | C9H | 21H | C2H | BEH | 3AH | 4BH | BEH | E6H | FDH | C3H | BDH | 18H |
| 18E0H=21H | CBH | BEH | 3AH | 4BH | BEH | E6H | FBH | C3H | BDH | 18H | 2AH | 59H | BEH | 11H | DEH |
| 18F0H=BAH | CDH | AFH | 11H | 3AH | 49H | BEH | F6H | 02H | 32H | 49H | BEH | 21H | 00H | 00H | 22H |
| 1900H=9CH | BEH | 3AH | 49H | BEH | E6H | 02H | C8H | 21H | D4H | BEH | 35H | C0H | 36H | A0H |
| 1910H=21H | DEH | BAH | 22H | 75H | BEH | 2AH | 9CH | BEH | CDH | A7H | 17H | DAH | 23H | 19H | 22H |
| 1920H=9CH | BEH | C9H | 3AH | 49H | BEH | E6H | FDH | 32H | 49H | BEH | C9H | 3AH | 42H | BDH | B7H |
| 1930H=C8H | AFH | 32H | 42H | BEH | FBH | CDH | 27H | 10H | C9H | F3H | 31H | FFH | BEH | CEH | 39H |
| 1940H=11H | CDH | 9FH | 1FH | CDH | 1BH | 1AH | CDH | 13H | 1FH | 3EH | 01H | 32H | 4EH | BEH | AFH |

APPENDIX B-continued
MACHINE CODE FOR MICROPROCESSOR 400
ASSOCIATED WITH CONTROLLER 50
ALL VALUES IN HEXADECIMAL FORMAT
© General Electric Company, 1979

| | | | | | | | | | | | | | | | |
|---|---|---|---|---|---|---|---|---|---|---|---|---|---|---|---|
| 1950H=32H | 4BH | BEH | 32H | 4DH | BEH | 3EH | 06H | 32H | 52H | BEH | CDH | 27H | 10H | DCH | E3H |
| 1960H=1EH | 31H | FFH | BFH | 21H | 64H | 19H | 22H | 55H | BEH | 21H | 00H | 00H | 39H | 22H | 53H |
| 1970H=BEH | CDH | 4DH | 1FH | CDH | 9FH | 1FH | CDH | 89H | 1EH | CDH | 08H | 1BH | DAH | 43H | 1EH |
| 1980H=C2H | 56H | 1DH | CDH | ABH | 1FH | CDH | 8FH | 19H | CDH | 97H | 19H | C3H | 74H | 19H | DBH |
| 1990H=18H | E6H | 02H | CAH | 83H | 35H | C9H | DBH | 08H | 17H | 17H | 17H | E6H | 03H | FEH | 03H |
| 19A0H=C0H | C3H | F0H | BFH | CDH | B3H | 19H | 3EH | FFH | 32H | 90H | BEH | 32H | A2H | BEH | 32H |
| 19B0H=A3H | BEH | C9H | 3EH | 08H | D3H | 61H | 3EH | 3DH | D3H | 61H | 3EH | E0H | D3H | 61H | 3EH |
| 19C0H=DFH | D3H | 61H | C9H | 0EH | F1H | CDH | F9H | 19H | 0EH | 00H | 06H | 08H | 1EH | FFH | CDH |
| 19D0H=52H | 1AH | C9H | CDH | 5CH | 1BH | 7EH | FEH | 61H | C8H | 4EH | CDH | E2H | 19H | 23H | C3H |
| 10E0H=D6H | 19H | DBH | 61H | E6H | 80H | C2H | E2H | 19H | 79H | D3H | 60H | C9H | 3AH | 90H | BEH |
| 19F0H=A1H | 4FH | 32H | 90H | BEH | CDH | 08H | 1AH | C9H | 79H | 2FH | 4FH | 3AH | 90H | BEH | B1H |
| 1A00H=32H | 90H | BEH | 4FH | CDH | 08H | 1AH | C9H | 3EH | 88H | D3H | 61H | CDH | E2H | 19H | C9H |
| 1A10H=0EH | F7H | CDH | EDH | 19H | 0EH | FBH | CDH | F9H | 19H | C9H | 0EH | EFH | CDH | EDH | 19H |
| 1A20H=0EH | DFH | CDH | F9H | 19H | C9H | 0EH | DFH | CDH | EDH | 19H | 0EH | EFH | CDH | F9H | 19H |
| 1A30H=C9H | 0EH | BFH | CDH | EDH | 19H | 0EH | 7FH | CDH | F9H | 19H | C9H | 0EH | 7FH | CDH | EDH |
| 1A40H=19H | 0EH | BFH | CDH | F9H | 19H | C9H | 0EH | FBH | CDH | EDH | 19H | 0EH | F7H | CDH | F9H |
| 1A50H=19H | C9H | CDH | 5CH | 1BH | 4BH | CDH | E2H | 19H | 05H | C8H | C3H | 56H | 1AH | F5H | CDH |
| 1A60H=5CH | 1BH | F1H | CDH | FCH | 1BH | 4FH | CDH | 1AH | 19H | CDH | 79H | 32H | A2H | BEH | 3EH |
| 1A70H=89H | D3H | 61H | CDH | E2H | 19H | C9H | 79H | 32H | A3H | BEH | 3EH | 8AH | D3H | 61H | CDH |
| 1A80H=E2H | 19H | C9H | 3EH | 8BH | D3H | 61H | CDH | E2H | 19H | C9H | 0EH | FDH | CDH | EDH | 19H |
| 1A90H=C9H | CDH | 5CH | 1BH | 7DH | B7H | 06H | 00H | C2H | A1H | 1AH | B4H | CAH | C3H | 1AH | 06H |
| 1AA0H=08H | 04H | 1FH | D2H | A1H | 1AH | 78H | FEH | 10H | CCH | CBH | 1AH | B7H | 27H | 47H | E6H |
| 1AB0H=F0H | CAH | C3H | 1AH | CDH | AFH | 0DH | E6H | 0FH | CDH | 63H | 1AH | 78H | E6H | 0FH | CDH |
| 1AC0H=63H | 1AH | C9H | 0EH | FFH | CDH | E2H | 19H | C3H | BCH | 1AH | 3EH | 16H | C9H | 3AH | 58H |
| 1AD0H=BEH | B7H | C8H | 0EH | 04H | CDH | 5CH | 1BH | 0EH | C8H | CDH | E2H | 19H | C9H | 0EH | FFH |
| 1AE0H=CDH | 6BH | 1AH | CDH | 77H | 1AH | CDH | 83H | 1AH | CDH | C4H | 19H | CDH | 31H | 1AH | C9H |
| 1AF0H=CDH | 08H | 1BH | DAH | 43H | 1EH | CAH | F0H | 1AH | 57H | E6H | 3FH | FEH | 30H | CAH | 51H |
| 1B00H=1EH | FEH | 13H | C8H | 37H | 3FH | 7AH | C9H | DBH | 61H | E6H | 30H | C2H | 1BH | 1BH | DBH |
| 1B10H=61H | 0FH | C8H | 3EH | 40H | D3H | 61H | DBH | 60H | C9H | 37H | C9H | C5H | CDH | 8DH |
| 1B20H=1BH | CDH | 9DH | 1BH | 21H | 06H | BFH | 36H | FFH | CDH | F0H | 1AH | CAH | 62H | 1BH | E6H |
| 1B30H=3FH | FEH | 0FH | DAH | 98H | 1EH | FEH | 31H | CAH | 66H | 1BH | FEH | 14H | CAH | 6EH | 1BH |
| 1B40H=FEH | 1CH | CAH | 6EH | 1BH | FEH | 23H | D2H | 6EH | 1BH | 05H | FAH | 98H | 1EH | CDH | A8H |
| 1B50H=1BH | 23H | 77H | CDH | E2H | 1BH | CDH | 9DH | 1BH | C3H | 29H | 1BH | 3EH | 90H | B1H | D3H |
| 1B60H=61H | C9H | C1H | C3H | 1DH | 1BH | CDH | 76H | 1BH | 37H | C1H | 3EH | 31H | C9H | B7H | F5H |
| 1B70H=CDH | 76H | 1BH | F1H | C1H | C9H | E5H | 21H | 0EH | BFH | 23H | 7EH | FEH | 61H | CAH | 8BH |
| 1B80H=1BH | FEH | 7FH | C2H | 7AH | 1BH | 36H | FFH | C3H | 7AH | 1BH | E1H | C9H | 21H | 0EH | BFH |
| 1B90H=71H | 48H | 23H | 36H | 7FH | 0DH | C2H | 92H | 1BH | 23H | 36H | 61H | C9H | E5H | 21H | 0EH |
| 1BA0H=BFH | 4EH | 23H | CDH | D3H | 19H | E1H | C9H | 1EH | 00H | FEH | 1BH | CAH | E0H | 1BH | 1CH |
| 1BB0H=FEH | 12H | CAH | E0H | 1BH | 1CH | FEH | 1AH | CAH | E0H | 1BH | 1CH | FEH | 22H | CAH | E0H |
| 1BC0H=1BH | 1CH | FEH | 11H | CAH | E0H | 1BH | 1CH | FEH | 19H | CAH | E0H | 1BH | 1CH | FEH | 21H |
| 1BD0H=E0H | 1BH | 1CH | FEH | 10H | CAH | E0H | 1BH | 1CH | FEH | 18H | CAH | E0H | 1BH | 1CH |
| 1BE0H=7BH | C9H | CDH | FCH | 1BH | E5H | 4FH | 21H | 0FH | BFH | 11H | 10H | BFH | 1AH | FEH | 61H |
| 1BF0H=CAH | F9H | 1BH | 77H | 23H | 13H | C3H | EDH | 1BH | 71H | E1H | C9H | E5H | 21H | 6CH | 38H |
| 1C00H=85H | 6FH | D2H | 06H | 1CH | 24H | 7EH | E1H | C9H | CDH | 1DH | 1BH | F5H | EBH | CDH | D1H |
| 1C10H=0DH | DAH | 22H | 1CH | EBH | 2AH | 89H | BEH | CDH | 56H | 0DH | D2H | A0H | 1EH | F1H | B7H |
| 1C20H=EBH | C9H | F1H | 37H | C9H | 0EH | FEH | CDH | 83H | 1AH | 06H | 02H | 0EH | 00H | 21H | 20H |
| 1C30H=00H | C3H | 40H | 1CH | 0EH | EFH | CDH | 83H | 1AH | 06H | 03H | 0EH | 00H | 21H | F4H | 01H |
| 1C40H=22H | 89H | BEH | CDH | 09H | 1CH | F5H | FEH | 31H | CAH | 56H | 1CH | FEH | 2AH | CAH | 56H |
| 1C50H=1CH | FEH | 23H | C2H | 98H | 1EH | 0EH | FFH | CDH | 83H | 1AH | F1H | C9H | CDH | C9H | 19H |
| 1C60H=CDH | 34H | 1CH | D8H | FEH | 2AH | C2H | 98H | 1EH | 22H | 59H | BEH | CDH | C9H | 19H | 0EH |
| 1C70H=BFH | CDH | 83H | 1AH | 0EH | 00H | 2AH | 59H | BEH | CDH | 45H | 1DH | 0EH | 07H | 06H | 01H |
| 1C80H=21H | 09H | 00H | 22H | 89H | BEH | CDH | 09H | 1CH | DAH | 98H | 1EH | F5H | 7DH | B7H | CAH |
| 1C90H=A0H | 1EH | 32H | 5BH | BEH | 0EH | FFH | CDH | 83H | 1AH | F1H | C9H | 0EH | 7FH | CDH | 83H |
| 1CA0H=1AH | 06H | 04H | 0EH | 00H | 21H | A0H | 0FH | C3H | 40H | 1CH | 21H | 04H | 38H | 0EH | 00H |
| 1CB0H=CDH | D3H | 19H | 0EH | 04H | CDH | 5CH | 1BH | 0EH | 7EH | CDH | E2H | 19H | 0EH | 04H | CDH |
| 1CC0H=5CH | 1BH | AFH | 32H | 58H | BEH | CDH | F0H | 1AH | CAH | B3H | 1CH | E6H | 3FH | FEH | 13H |
| 1CD0H=C2H | E5H | 1CH | 3EH | 80H | 0EH | 19H | 32H | 58H | BEH | CDH | E2H | 19H | CDH | F0H | 1AH |
| 1CE0H=CAH | B3H | 1CH | E6H | 3FH | FEH | 2AH | C2H | 98H | 1EH | 3AH | 58H | BEH | C9H | CDH | 5CH |
| 1CF0H=1BH | 7EH | FEH | FFH | C8H | CDH | FCH | 1BH | 4FH | CDH | E2H | 19H | 23H | C3H | F1H | 1CH |
| 1D00H=11H | 0EH | BFH | 7CH | CDH | AFH | 0DH | E6H | 0FH | C2H | 26H | 1DH | B4H | C2H | 2CH | 1DH |
| 1D10H=7DH | CDH | AFH | 0DH | E6H | 0FH | C2H | 35H | 1DH | B5H | CDH | 20H | 1DH | C3H | 3EH | 1DH |
| 1D20H=12H | 13H | 3EH | FFH | 12H | C9H | CDH | 20H | 1DH | 7CH | E6H | 0FH | CDH | 20H | 1DH | 7DH |
| 1D30H=CDH | AFH | 0DH | E6H | 0FH | CDH | 20H | 1DH | 7DH | E6H | 0FH | CDH | 20H | 1DH | 21H | 0EH |
| 1D40H=BFH | CDH | EEH | 1CH | C9H | CDH | 5CH | 1BH | EBH | 21H | 0EH | BFH | CDH | 09H | 0EH | 21H |
| 1D50H=0EH | BEH | CDH | F1H | 1CH | C9H | 47H | E6H | 3FH | FEH | 08H | D2H | 98H | 1EH | 87H | 6FH |
| 1D60H=26H | 00H | 11H | 6FH | 1DH | 19H | 5EH | 23H | 56H | 21H | 61H | 19H | E5H | EBH | E9H | C9H |
| 1D70H=1DH | 22H | 1EH | 35H | 1EH | DAH | 1DH | 11H | 0BH | F9H | 1DH | 0CH | 0AH | 89H | 0AH | 98H |
| 1D80H=1EH | 31H | 28H | 79H | 23H | CEH | 2DH | C0H | 32H | C2H | 2FH | 98H | 1EH | 98H | 1EH | E0H |
| 1D90H=29H | 73H | 24H | C4H | 2EH | 8FH | 32H | 77H | 30H | 98H | 1EH | 98H | 1EH | DAH | 2AH | 02H |
| 1DA0H=25H | E7H | 2CH | 1DH | 32H | 17H | 31H | 09H | 34H | 98H | 1EH | CDH | F0H | 1AH | CAH | 61H |
| 1DB0H=19H | E6H | 3FH | FEH | 08H | DAH | 98H | 1EH | FEH | 0EH | D2H | 98H | 1EH | F5H | CDH | C9H |
| 1DC0H=19H | F1H | E6H | 07H | 87H | 6FH | 26H | 00H | C9H | 0EH | EFH | CDH | 6BH | 1AH | CDH | ABH |
| 1DD0H=1DH | 11H | 81H | 1DH | 19H | 5EH | 23H | 56H | EBH | E9H | 0EH | 7FH | CDH | 6BH | 1AH | CDH |
| 1DE0H=F0H | 1AH | CAH | 61H | 19H | E6H | 3FH | FEH | 08H | CAH | 5EH | 36H | FEH | 0AH | CAH | 97H |
| 1DF0H=36H | FEH | 14H | CAH | 35H | 37H | C3H | 98H | 1EH | 0EH | FDH | CDH | 6BH | 1AH | 78H | 17H |
| 1E00H=H | 99H | 38H | CDH | F0H | 1AH | CAH | 61H | 19H | E6H | 3FH | FEH | 0DH | CAH | A9H | 33H |
| 1E10H=FEH | 09H | CAH | 85H | 34H | FEH | 14H | CAH | BEH | 34H | FEH | 1CH | CAH | 1CH | 34H | C3H |
| 1E20H=98H | 1EH | 0EH | DFH | CDH | 6BH | 1AH | 78H | 17H | D2H | 96H | 38H | CDH | ABH | 1DH | 11H |

APPENDIX B-continued

**MACHINE CODE FOR MICROPROCESSOR 400  
ASSOCIATED WITH CONTROLLER 50  
ALL VALUES IN HEXADECIMAL FORMAT  
© General Electric Company, 1979**

| | | | | | | | | | | | | | | | |
|---|---|---|---|---|---|---|---|---|---|---|---|---|---|---|---|
| 1E30H=8FH | 1DH | C3H | D4H | 1DH | 0EH | BFH | CDH | 6BH | 1AH | CDH | ABH | 1DH | 11H | 9DH | 1DH |
| 1E40H=C3H | D4H | 1DH | 31H | FFH | BFH | CDH | A4H | 19H | 3EH | 0BH | 32H | 57H | BEH | CDH | 57H |
| 1E50H=1EH | CDH | DEH | 1AH | C3H | 61H | 19H | CDH | E9H | 1AH | 21H | F7H | 37H | 0EH | 00H | CDH |
| 1E60H=D3H | 19H | 3AH | 57H | BEH | 4FH | CDH | E2H | 19H | 3EH | ACH | D3H | 19H | CDH | 75H | 08H |
| 1E70H=3EH | BCH | D3H | 19H | C9H | CDH | 57H | 1EH | 3EH | DFH | D3H | 61H | CDH | E9H | 1AH | CDH |
| 1E80H=90H | 1FH | 3AH | A2H | BEH | 4FH | CDH | 6BH | 1AH | 3AH | A3H | BEH | 4FH | CDH | 77H | 1AH |
| 1E90H=2AH | 53H | BEH | F9H | 2AH | 55H | BEH | E9H | 3EH | 9FH | 32H | 57H | BEH | C3H | 75H | 1EH |
| 1EA0H=3EH | 4AH | C3H | 9AH | 1EH | 3EH | 29H | C3H | 9AH | 1EH | CDH | E9H | 1AH | 21H | 14H | 38H |
| 1EB0H=0EH | 00H | CDH | D3H | 19H | CDH | F0H | 1AH | C3H | 78H | 1EH | CDH | C4H | 19H | 21H | 09H |
| 1EC0H=38H | 3EH | FFH | 32H | 57H | BEH | CDH | 5DH | 1EH | CDH | F0H | 1AH | C3H | 61H | 19H | CDH |
| 1ED0H=C4H | 19H | 21H | 66H | 38H | CDH | 5DH | 1EH | C9H | 32H | 57H | BEH | CDH | CFH | 1EH | CDH |
| 1EE0H=F0H | 1AH | C9H | CDH | 11H | 11H | 3EH | 99H | CDH | D9H | 1EH | C9H | E5H | CDH | C4H | 19H |
| 1EF0H=0EH | 7EH | CDH | 83H | 1AH | 0EH | 0AH | 2AH | 7FH | BEH | CDH | 45H | 1DH | 0EH | 05H | 1EH |
| 1F00H=7CH | 06H | 01H | CDH | 52H | 1AH | 3AH | 8EH | BEH | 6FH | 26H | 00H | 0EH | 06H | CDH | 45H |
| 1F10H=1DH | E1H | C9H | CDH | E9H | 1AH | 0EH | FFH | CDH | 83H | 1AH | 21H | 20H | 39H | 0EH | 00H |
| 1F20H=CDH | D3H | 19H | CDH | 3CH | 1AH | C9H | CDH | 13H | 1FH | CDH | 75H | 08H | C9H | CDH | E9H |
| 1F30H=1AH | 21H | 0EH | 38H | 0EH | 00H | CDH | D3H | 19H | CDH | 31H | 1AH | CDH | F0H | 1AH | CAH |
| 1F40H=78H | 1EH | E6H | 3FH | FEH | 31H | C8H | FEH | 2AH | C8H | C3H | 98H | 1EH | CDH | DEH | 1AH |
| 1F50H=21H | FEH | 37H | 0EH | 00H | CDH | D3H | 19H | 3EH | FFH | 32H | A3H | BEH | 32H | A2H | BEH |
| 1F60H=C9H | CDH | C9H | 19H | 3AH | 4EH | BEH | B7H | CAH | 7DH | 1FH | 21H | 25H | 38H | 0EH | 00H |
| 1F70H=CDH | D3H | 19H | CDH | F0H | 1AH | E6H | 3FH | FEH | 31H | C2H | 61H | 19H | 21H | 2CH | 38H |
| 1F80H=0EH | 00H | CDH | D3H | 19H | CDH | 3CH | 1AH | C9H | DBH | 18H | E6H | 01H | C2H | 4FH | 01H |
| 1F90H=CDH | 1BH | 1AH | C9H | DBH | 18H | E6H | 01H | CAH | 3AH | 19H | CDH | 26H | 1AH | C9H | DBH |
| 1FA0H=18H | E6H | 08H | 0EH | FEH | C2H | EDH | 19H | C3H | F9H | 19H | DBH | 54H | E6H | 40H | C0H |
| 1FB0H=C3H | E2H | 1FH | 0EH | 0FH | CDH | 81H | 08H | 16H | 00H | 06H | 25H | DBH | 54H | 4FH | E6H |
| 1FC0H=40H | C0H | B1H | FAH | BCH | 1FH | DBH | 50H | 77H | 23H | 71H | 23H | 14H | 05H | CAH | E0H |
| 1FD0H=1FH | DBH | 54H | B7H | F2H | D1H | 1FH | DBH | 54H | B7H | FAH | BCH | 1FH | C3H | D1H | 1FH |
| 1FE0H=37H | C9H | 21H | 61H | 19H | E5H | CDH | C9H | 19H | 21H | 51H | 38H | 0EH | 00H | CDH | D3H |
| 1FF0H=19H | CDH | 3CH | 1AH | 21H | 16H | BEH | CDH | B3H | 1FH | DAH | A5H | 1EH | 21H | 16H | BFH |
| 2000H=7EH | 23H | 23H | 1FH | DAH | C9H | 20H | 1FH | DAH | 35H | 22H | 1FH | DAH | FCH | 22H | 1FH |
| 2010H=DAH | 7DH | 21H | C3H | A5H | 1EH | 3EH | 01H | 32H | 6FH | BEH | 0EH | 04H | CDH | 6EH | 20H |
| 2020H=DAH | A5H | 1EH | E5H | 21H | A0H | 0FH | CDH | 56H | 0DH | D2H | A0H | 1EH | EBH | 22H | 7FH |
| 2030H=BEH | E1H | C9H | 3EH | 01H | 32H | 6FH | BEH | 0EH | 02H | CDH | 6EH | 20H | DAH | A5H | 1EH |
| 2040H=7BH | FEH | 20H | D2H | A0H | 1EH | C9H | D5H | 5EH | 23H | 7EH | E6H | 03H | 57H | B3H | CAH |
| 2050H=69H | 20H | EBH | B7H | 06H | 00H | CDH | 4FH | 0DH | DAH | 60H | 20H | 04H | C3H | 56H | 20H |
| 2060H=7CH | B5H | C2H | A5H | 1EH | EBH | 78H | D1H | C9H | AFH | 47H | 37H | D1H | C9H | 11H | 00H |
| 2070H=00H | CDH | 47H | 20H | 0DH | CAH | 97H | 20H | D2H | 7FH | 20H | 23H | C3H | 71H | 20H | EBH |
| 2080H=CDH | 98H | 0DH | 78H | B5H | 6FH | EBH | 79H | B7H | CAH | 9CH | 20H | 23H | CDH | 47H | 20H |
| 2090H=DAH | A5H | 1EH | 0DH | C3H | 7FH | 20H | D2H | 7FH | 20H | 37H | C9H | 3AH | 6FH | BEH | B7H |
| 20A0H=CBH | E5H | 21H | 06H | BFH | 36H | 7FH | CDH | AFH | 20H | E6H | 0FH | 77H | 23H |   |   |
| 20B0H=7AH | E6H | 0FH | 77H | 23H | 7BH | CDH | AFH | 20H | E6H | 0FH | 77H | 23H | 7BH | E6H | 0FH |
| 20C0H=77H | EBH | CDH | D1H | 0DH | EBH | E1H | B7H | C9H | 7AH | FEH | 23H | C2H | A5H | 1EH | 0EH |
| 20D0H=BFH | CDH | 77H | 1AH | AFH | 32H | 70H | BEH | CDH | 16H | 20H | E5H | 2BH | 2BH | 7EH | E6H |
| 20E0H=04H | E1H | CDH | BAH | 0DH | 17H | E6H | B0H | 32H | 58H | BEH | 23H | 0EH | 03H | CDH | 6EH |
| 20F0H=20H | DAH | A5H | 1EH | E5H | 21H | 61H | BFH | E5H | 21H | F4H | 01H | CDH | 56H | 0DH | 02H |
| 2100H=A0H | 1EH | E1H | 73H | 23H | 72H | 23H | EBH | 22H | 79H | BEH | EBH | E3H | 23H | 5EH | 23H |
| 2110H=23H | 56H | 23H | 7BH | B2H | CAH | A5H | 1EH | EBH | 22H | 7DH | BEH | EBH | E3H | 73H | 23H |
| 2120H=72H | E3H | 23H | 11H | 50H | BEH | CDH | 56H | 0DH | DAH | 3EH | 21H | 0EH | 03H | CDH | 6EH |
| 2130H=20H | DAH | 3EH | 21H | 3EH | 05H | 32H | 70H | BEH | E3H | 23H | C3H | FBH | 20H | 21H | 52H |
| 2140H=BFH | 0EH | 03H | CDH | 6EH | 20H | DAH | 73H | 21H | 3AH | 70H | BEH | B7H | C2H | A5H | 1EH |
| 2150H=E1H | 2AH | 79H | BEH | CDH | 56H | 0DH | DAH | A5H | 1EH | 21H | F4H | 01H | CDH | 56H | 0DH |
| 2160H=D2H | A5H | 1EH | EBH | 22H | 7BH | BEH | 3EH | 07H | 32H | 70H | BEH | CDH | 14H | 2CH | DAH |
| 2170H=BBH | 1EH | C9H | E1H | 22H | 87H | BEH | 21H | 61H | BEH | C3H | 98H | 2EH | 7AH | FEH | 23H |
| 2180H=C2H | A5H | 1EH | 0EH | DEH | CDH | 77H | 1AH | CDH | 47H | 20H | DAH | A5H | 1EH | 32H | 8CH |
| 2190H=BEH | 23H | 23H | 23H | E5H | 21H | 61H | BFH | E3H | AFH | 32H | 6FH | BEH | 0EH | 02H | CDH |
| 21A0H=6EH | 20H | DAH | 20H | 22H | 7BH | B7H | CAH | A0H | 1EH | FEH | 13H | D2H | A0H | 1EH | 7EH |
| 21B0H=E6H | 04H | 32H | 71H | BEH | 7BH | C2H | 16H | 22H | FEH | 12H | CAH | C2H | 21H | C6H | 12H |
| 21C0H=27H | 5FH | 23H | 0EH | 01H | CDH | 47H | 20H | DAH | A5H | 1EH | CDH | 7FH | 20H | 7BH | FEH |
| 21D0H=60H | D2H | A5H | 1EH | 7EH | E6H | 04H | 47H | 3AH | 71H | BEH | B0H | CAH | A5H | 1EH | 3AH |
| 21E0H=71H | BEH | A0H | C2H | A5H | 1EH | EBH | 22H | 6AH | BEH | EBH | 23H | CDH | 16H | 20H | 23H |
| 21F0H=CDH | 33H | 20H | E3H | 77H | 23H | EBH | 2AH | 6AH | BEH | EBH | 73H | 23H | 72H | 23H | EBH |
| 2200H=2AH | 7FH | BEH | EBH | 73H | 23H | 72H | 23H | 11H | 70H | BFH | CDH | 56H | 0DH | E3H | DAH |
| 2210H=20H | 22H | 23H | C3H | 99H | 21H | FEH | 12H | DAH | C2H | 21H | 1EH | 00H | C3H | C2H | 21H |
| 2220H=E1H | 2BH | 11H | 61H | BEH | CDH | 56H | 0DH | D2H | A5H | 1EH | 22H | 87H | BEH | EBH | 22H |
| 2230H=85H | BEH | 03H | 15H | 24H | 7AH | FEH | 23H | C2H | A5H | 1EH | 0EH | EFH | CDH | 77H | 1AH |
| 2240H=23H | 23H | CDH | 33H | 20H | 32H | 5DH | BEH | 23H | 0EH | 03H | CDH | 6EH | 20H | E5H | 21H |
| 2250H=F4H | 01H | CDH | 56H | 0DH | D2H | A0H | 1EH | 21H | 61H | BFH | E3H | 0EH | 0BH | EBH | 22H |
| 2260H=59H | BEH | EBH | 23H | 0DH | CAH | 91H | 22H | 5EH | 23H | 7EH | E6H | 02H | CAH | BCH | 22H |
| 2270H=23H | 56H | 23H | E3H | D5H | EBH | 2AH | 59H | BEH | EBH | 73H | 23H | 72H | 23H | D1H | 73H |
| 2280H=23H | 72H | 23H | E3H | EBH | 2AH | 59H | BEH | 23H | C3H | 5FH | 22H | 23H | 23H | C3H | 84H |
| 2290H=22H | E3H | 11H | 61H | BEH | CDH | 56H | 0DH | CAH | A5H | 1EH | E3H | 0EH | 03H | 23H | 23H |
| 22A0H=CDH | 6EH | 20H | DAH | EEH | 22H | 21H | F4H | 01H | CDH | 56H | 0DH | D2H | A0H | 1EH | EBH |
| 22B0H=22H | B7H | BEH | D1H | 21H | 65H | BEH | CDH | 56H | 0DH | C2H | A5H | 1EH | 21H | 61H | BFH |
| 22C0H=5EH | 23H | 56H | 23H | E5H | EBH | 22H | 85H | BEH | CDH | 60H | 0EH | DAH | A5H | 1EH | E1H |
| 22D0H=5EH | 23H | 56H | EBH | 22H | 63H | BEH | 2AH | 85H | BEH | 22H | 59H | BEH | 23H | 22H | 85H |
| 22E0H=BEH | CDH | 6FH | 29H | DAH | BBH | 1EH | CDH | 60H | 0EH | D8H | C3H | D7H | 22H | E1H | 2BH |
| 22F0H=22H | 87H | BEH | 21H | 61H | BFH | 22H | 85H | BEH | C3H | 2AH | 29H | 7AH | FEH | 24H | C2H |
| 2300H=A5H | 1EH | 0EH | FEH | CDH | 77H | 1AH | E5H | 21H | 61H | BFH | E3H | 3EH | 01H | 32H | 6FH |

APPENDIX B-continued

MACHINE CODE FOR MICROPROCESSOR 400
ASSOCIATED WITH CONTROLLER 50
ALL VALUES IN HEXADECIMAL FORMAT
© General Electric Company, 1979

| Addr | | | | | | | | | | | | | | | | |
|---|---|---|---|---|---|---|---|---|---|---|---|---|---|---|---|---|
| 2310H= | BEH | 0EH | 03H | CDH | 6EH | 20H | DAH | A5H | 1EH | E5H | 21H | F4H | 01H | CDH | 56H | 0DH |
| 2320H= | E1H | D2H | A0H | 1EH | EBH | 22H | 59H | BEH | EBH | 3EH | 01H | 32H | 58H | BEH | 23H | 0EH |
| 2330H= | 04H | CDH | 6EH | 20H | DAH | 58H | 23H | E5H | 21H | A0H | 0EH | CDH | 56H | 0DH | E1H | D2H |
| 2340H= | A0H | 1EH | E3H | D5H | EBH | 2AH | 59H | BEH | EBH | 73H | 23H | 72H | 3AH | 5BH | BEH | 23H |
| 2350H= | 77H | 23H | D1H | 73H | 23H | 72H | 23H | E3H | 3AH | 5BH | BEH | 3CH | FEH | 09H | 32H | 58H |
| 2360H= | BEH | DAH | 2EH | 23H | E1H | 2BH | 11H | 61H | BFH | CDH | 56H | 0DH | D2H | A5H | 1EH | 22H |
| 2370H= | 87H | BEH | EBH | 22H | 85H | BEH | C3H | 41H | 30H | 0EH | DFH | CDH | 77H | 1AH | 21H | 16H |
| 2380H= | BFH | 22H | 85H | BEH | 21H | ACH | BFH | 22H | 87H | BEH | CDH | 45H | 0BH | DAH | 98H | 1EH |
| 2390H= | 21H | 90H | 23H | 22H | 55H | BEH | 21H | 00H | 00H | 39H | 22H | 53H | BEH | CDH | C4H | 19H |
| 23A0H= | CDH | 9CH | 1CH | DAH | 98H | 1EH | FEH | 2AH | C2H | 98H | 1EH | 22H | 7FH | BeH | 21H | AEH |
| 23B0H= | 23H | 22H | 55H | BEH | 21H | 00H | 00H | 39H | 22H | 53H | BEW | CDH | C9H | 19H | CDH | 25H |
| 23C0H= | 1CH | DAH | 98H | 1EH | EBH | 2AH | 85H | BEH | 73H | 23H | EBH | 2AH | 6AH | BEH | EBH | 73H |
| 23D0H= | 23H | 72H | 23H | EBH | 2AH | 7FH | BEH | EBH | 73H | 23H | 72H | 23H | 22H | 85H | BEH | FEH |
| 23E0H= | 31H | CAH | 05H | 24H | FEH | 2AH | C2H | 98H | 1EH | CDH | 60H | 0BH | DAH | 00H | 24H | FEH |
| 23F0H= | 2AH | C2H | 08H | 1EH | CDH | 60H | 0EH | CAH | 05H | 24H | DAH | 05H | 24H | C3H | 90H | 23H |
| 2400H= | FEH | 31H | C2H | 98H | 1EH | CDH | 27H | 1FH | 2AH | 85H | BEH | 2BH | 22H | 87H | BEH | 21H |
| 2410H= | 16H | BFH | 22H | 85H | BEH | CDH | 44H | 24H | 32H | 8CH | BEH | CDH | 60H | 0EH | D8H | 2AH |
| 2420H= | 85H | BEH | 7EH | 32H | BEH | BEH | 23H | 5EH | 23H | 56H | 23H | EBH | 22H | 6AH | BEH | EBH |
| 2430H= | 5EH | 23H | 56H | 23H | 22H | 85H | BEH | BEH | 22H | 7FH | BEH | CDH | 9EH | 25H | DAH | BBH |
| 2440H= | 1EH | C3H | 1bH | 24H | 3AH | 8CH | BEH | FEH | 08H | DAH | 5FH | 24H | CAH | 68H | 24H | 3EH |
| 2450H= | 02H | 11H | 12H | 71H | 21H | ABH | 71H | 22H | 77H | BEH | EBH | 22H | 75H | BEH | C9H | 11H |
| 2460H= | 15H | 5EH | 21H | 71H | 70H | C3H | 57H | 24H | 3EH | 01H | 11H | 77H | 70H | 21H | 0DH | 71H |
| 2470H= | C3H | 57H | 24H | oEH | DEH | CDH | 77H | 1AH | 21H | 78H | 24H | 22H | 55H | BEH | 21H | 00H |
| 2480H= | 00H | 39H | 22H | 53H | BEH | CDH | C9H | 19H | 0EH | FFH | CDH | 83H | 1AH | CDH | 37H | 0CH |
| 2490H= | DAH | 98H | 1EH | FEH | 2AH | C2H | 98H | 1EH | 3AH | BCH | BEH | 32H | 8DH | BEH | 11H | 00H |
| 24A0H= | 00H | CDH | ADH | 26H | DAH | AAH | 1EH | 7EH | E6H | 07H | 4FH | 3AH | 8CH | BEH | B9H | C2H |
| 24B0H= | AAH | 1EH | E5H | CDH | C4H | 19H | oEH | FFH | CDH | 83H | 1AH | E1H | 7EH | 1FH | 1FH | 1FH |
| 24C0H= | E6H | 1FH | 32H | 8EH | BEH | 23H | 5EH | 23H | 56H | 23H | E5H | EBH | CDH | F6H | 0BH | 3AH |
| 24D0H= | 8CH | BEH | 6FH | 26H | 00H | 0EH | 00H | CDH | 45H | 1DH | E1H | CDH | F0H | 1AH | CAH | 78H |
| 24E0H= | 24H | 5EH | 22H | 56H | 23H | EBH | 22H | 7FH | BEH | EBH | CDH | ECH | 1EH | CDH | F0H | 1AH |
| 24F0H= | CAH | 78H | 24H | FEH | 31H | C8H | 7EH | E6H | 07H | 4FH | 3AH | 8CH | BEH | B9H | C0H | C3H |
| 2500H= | B2H | 24H | 0EH | DFH | CDH | 77H | 1AH | 21H | 07H | 25H | 22H | 55H | BEH | 21H | 00H | 00H |
| 2510H= | 39H | 22H | 53H | BEH | CDH | C9H | 19H | CDH | 37H | 0CH | DAH | 50H | 25H | FEH | 31H | C2H |
| 2520H= | 98H | 1EH | CDH | 27H | 1FH | 11H | 00H | 00H | CDH | ADH | 26H | DAH | AAH | 1EH | 3AH | 8CH |
| 2530H= | BEH | 4FH | 7EH | E6H | 07H | B9H | C2H | AAH | 1EH | E5H | 23H | 23H | 23H | 23H | 23H | 7EH |
| 2540H= | E6H | 07H | B9H | CAH | 3AH | 25H | C1H | EBH | 1AH | 77H | BEH | EBH | CDH | 70H | 0DH | C9H |
| 2550H= | FEH | 23H | C2H | 98H | 1EH | CDH | 2EH | 1FH | FEH | 31H | C2H | 98H | 1EH | CDH | 27H | 1FH |
| 2560H= | 00H | 0EH | 15H | 5EH | 11H | ADH | 71H | CDH | 53H | 0EH | C9H | 21H | 15H | 5EH | 55H |
| 2570H= | 7EH | B7H | CAH | 9BH | 25H | CDH | B3H | 26H | D1H | DAH | 7DH | 25H | C8H | CDH | 56H | 0DH |
| 2580H= | CAH | 8EH | 25H | D2H | 9CH | 25H | 2BH | 2BH | 2BH | 2BH | 2BH | F6H | 01H | C9H | 7EH | B7H |
| 2590H= | CAH | 86H | 25H | 23H | 23H | 23H | 23H | 23H | C3H | 8EH | 25H | E1H | 37H | C9H | 2AH | 77H |
| 25A0H= | BEH | CDH | F6H | 26H | 37H | C0H | E5H | 3AH | 8EH | BEH | 32H | 8FH | BEH | 2AH | 6AH | BEH |
| 25B0H= | EBH | 2AH | 75H | BEH | CDH | B3H | 26H | DAH | ECH | 25H | CAH | F0H | 25H | D1H | E5H | 4DH |
| 25C0H= | 44H | 03H | 03H | 03H | 03H | 03H | CDH | 70H | 0DH | E1H | 3AH | 8FH | BEH | 17H | 17H | 17H |
| 25D0H= | E6H | F8H | 4FH | 3AH | BCH | BEH | B1H | 77H | 23H | EBH | 2AH | 6AH | BEH | EBH | 73H | 23H |
| 25E0H= | 72H | 23H | EBH | 2AH | 7FH | BEH | EBH | 73H | 23H | 72H | B7H | C9H | D1H | C3H | CAH | 25H |
| 25F0H= | E5H | 2AH | 7FH | BEH | EBH | 2AH | 81H | BEH | CDH | 56H | 0DH | E1H | CAH | 15H | 26H | 23H |
| 2600H= | 23H | 23H | 23H | EBH | 2AH | 6AH | BEH | EBH | CDH | B3H | 26H | DAH | ECH | 25H | C2H |
| 2610H= | BDH | 25H | C3H | F0H | 25H | 3AH | 8FH | BEH | 17H | 17H | 17H | E6H | F8H | 4FH | 7EH | E6H |
| 2620H= | 07H | B1H | 77H | D1H | C9H | 7EH | B7H | C8H | E5H | E6H | 07H | B9H | C2H | 36H | 26H |
| 2630H= | CDH | 7AH | 26H | CAH | 50H | 26H | AFH | 32H | 50H | BEH | 23H | 23H | 23H | 23H | 23H | 7EH |
| 2640H= | B7H | CAH | 88H | 26H | E6H | 07H | B9H | CAH | 6CH | 26H | DAH | 72H | 26H | E1H | 37H | C9H |
| 2650H= | 3AH | 50H | BEH | B7H | CAH | 72H | 26H | 23H | 23H | 23H | 23H | 23H | 7EH | E6H | 07H | B9H |
| 2660H= | C2H | 4DH | 26H | CDH | 7AH | 26H | DAH | 4DH | 26H | C3H | 72H | 26H | CDH | 7AH | 26H | DAH |
| 2670H= | 4DH | 26H | 3EH | 01H | 32H | 50H | BEH | D1H | B7H | C9H | D5H | 23H | 5EH | 23H | 56H | 2BH |
| 2680H= | 2BH | E3H | EBH | CDH | 56H | 0DH | E1H | C9H | E1H | E5H | 7EH | E6H | 07H | B9H | CAH | A4H |
| 2690H= | 26H | DAH | 4DH | 26H | 2AH | 96H | BEH | 7EH | E6H | 07H | B9H | CAH | 6CH | 26H | DAH | 72H |
| 26A0H= | 26H | C3H | 4DH | 26H | CDH | 7AH | 26H | DAH | 94H | 26H | C3H | 4DH | 26H | CDH | 25H | 39H |
| 26B0H= | 32H | 8CH | BEH | 3AH | BCH | BEH | 4FH | 7EH | B7H | CAH | F2H | 26H | E6H | 07H | B9H | CAH |
| 26C0H= | BH | 26H | D0H | 23H | 23H | 23H | 23H | 23H | C3H | B7H | 26H | D5H | 7EH | 1FH | 1FH | 1FH |
| 26D0H= | E6H | 1FH | 32H | 8EH | BEH | 23H | 5EH | 23H | 56H | E3H | CDH | 56H | 0DH | EBH | E1H | DAH |
| 26E0H= | 05H | 26H | C2H | EFH | 26H | E5H | 23H | 5EH | 23H | 56H | EBH | 22H | 81H | BEH | E1H | 2BH |
| 26F0H= | 2BH | C9H | F6H | 01H | 37H | C9H | 0EH | 06H | AFH | 2BH | B6H | C0H | 0DH | C2H | F9H | 26H |
| 2700H= | C9H | 21H | 00H | 00H | 22H | 67H | BEH | CDH | 63H | 27H | C2H | 57H | 27H | EBH | 21H | 00H |
| 2710H= | 00H | 22H | 67H | BEH | 2AH | 59H | BEH | EBH | 7EH | 0EH | 06H | 1FH | 0DH | C2H | 1BH | 27H |
| 2720H= | E6H | 03H | BAH | C2H | 44H | 27H | 23H | 4EH | 23H | 46H | 23H | 7EH | BBH | CAH | 59H | 27H |
| 2730H= | D2H | 51H | 27H | 3EH | 03H | 23H | 0BH | CDH | 69H | 0DH | CAH | 57H | 27H | 3DH | C2H | 35H |
| 2740H= | 27H | C3H | 2BH | 27H | D2H | 57H | 27H | 3AH | 5DH | BEH | 47H | CDH | 78H | 27H | C3H | 0AH |
| 2750H= | 27H | C5H | E3H | 22H | 67H | BEH | E1H | C9H | 23H | 0BH | C5H | E3H | 22H | 67H | BEH |
| 2760H= | E1H | AFH | C9H | 21H | 00H | 40H | 3AH | 5DH | BEH | 47H | 7EH | B7H | CAH | B1H | 27H | E6H |
| 2770H= | 1FH | B8H | CAH | A1H | 27H | D2H | A2H | 27H | 23H | 5EH | 23H | 56H | 23H | 19H | C3H | 6AH |
| 2780H= | 27H | E5H | 23H | B6H | C2H | 9CH | 27H | 23H | B6H | C2H | 9CH | 27H | 11H | 0CH | 5EH | CDH |
| 2790H= | 56H | 0DH | E1H | C2H | A2H | 27H | 37H | C9H | 3AH | A2H | 27H | E1H | 7EH | C3H | 6FH |
| 27A0H= | 27H | AFH | 22H | 5FH | BEH | C9H | E5H | 21H | 00H | 40H | 7EH | B7H | CAH | C1H | 27H | 23H |
| 27B0H= | 5EH | 23H | 56H | 23H | 19H | 11H | 0CH | 5EH | CDH | 56H | 0DH | DAH | D3H | 27H | C3H | AAH |
| 27C0H= | 27H | E5H | 23H | B6H | C2H | D6H | 27H | 23H | B6H | C2H | D6H | 27H | E1H | 11H | 06H | 5EH |
| 27D0H= | CDH | 56H | 0DH | EBH | E1H | C9H | E1H | C3H | AFH | 27H | 2AH | 61H | BEH | 0EH | 06H | CDH |
| 27E0H= | 91H | 1AH | 2AH | 63H | BEH | EBH | 2AH | 61H | BEH | 7DH | A3H | C2H | F0H | 27H | 7CH | A2H |

APPENDIX B-continued

MACHINE CODE FOR MICROPROCESSOR 400
ASSOCIATED WITH CONTROLLER 50
ALL VALUES IN HEXADECIMAL FORMAT
© General Electric Company, 1979

| | | | | | | | | | | | | | | | | |
|---|---|---|---|---|---|---|---|---|---|---|---|---|---|---|---|---|
| 27F0H=32H | 65H | BEH | CAH | 10H | 1AH | C3H | 47H | 1AH | 3AH | 65H | BEH | B7H | C2H | 0AH | 28H |
| 2800H=AFH | 32H | ,65H | BEH | CDH | 10H | 1AH | C3H | 12H | 28H | 3EH | FFH | 32H | 65H | BEH | CDH |
| 2810H=47H | 1AH | CDH | F0H | 1AH | CAH | 90H | 1EH | E6H | 3FH | FEH | 2AH | C8H | FEH | 28H | CAH |
| 2820H=0AH | 28H | FEH | 29H | CAH | 00H | 28H | FEH | 14H | C8H | FEH | 31H | C2H | 98H | 1EH | 37H |
| 2830H=C9H | 0EH | EFH | CDH | 77H | 1AH | 21H | 00H | 00H | 22H | 59H | BEH | 21H | 16H | BFH | 22H |
| 2840H=B5H | BEH | 11H | ACH | BFH | 0EH | FEH | CDH | 53H | 0EH | 22H | 87H | BEH | 21H | 4DH | 28H |
| 2850H=22H | 55H | BEH | 21H | 00H | 00H | 39H | 22H | 53H | BEH | CDH | 5EH | 29H | DAH | 98H | 1EH |
| 2860H=21H | 60H | 28H | 22H | 55H | BEH | 21H | 00H | 00H | 39H | 22H | 53H | BEH | CDH | C4H | 19H |
| 2870H=CDH | 34H | 1CH | DAH | 0DH | 29H | FEH | 2AH | C2H | 98H | 1EH | 22H | 59H | BEH | 21H | 7EH |
| 2880H=28H | 22H | 55H | BEH | 21H | 00H | 00H | 39H | 22H | 53H | BEH | 21H | 01H | 00H | 22H | 61H |
| 2890H=BEH | 2EH | 00H | 22H | 63H | BEH | CDH | C9H | 19H | 2AH | 59H | BEH | 0EH | 00H | CDH | 45H |
| 28A0H=1DH | CDH | 01H | 27H | DAH | AEH | 28H | 5EH | 23H | 56H | FEH | 22H | 63H | BEH | 0EH | DFH |
| 28B0H=CDH | 83H | 1AH | CDH | DAH | 27H | CDH | F9H | 27H | DAH | 98H | 1EH | FEH | 14H | CAH | 60H |
| 28C0H=28H | 2AH | 63H | BEH | EBH | 2AH | 61H | BEH | 2AH | 65H | BEH | 4FH | A5H | 47H | 7DH | 2FH |
| 28D0H=A3H | B0H | 5FH | 79H | A4H | 47H | 7CH | 2FH | A2H | B0H | 57H | EBH | 22H | 63H | BEH | EBH |
| 28E0H=B7H | CDH | 4CH | 0EH | 22H | 61H | BEH | D2H | B3H | 28H | 2AH | 85H | BEH | EBH | 2AH | 59H |
| 28F0H=BEH | 7DH | 12H | 13H | 7CH | 12H | 13H | 2AH | 63H | BEH | 7DH | 12H | 13H | 7CH | 12H | 13H |
| 2900H=EBH | 22H | 85H | BEH | CDH | 60H | 0EH | DAH | 2AH | 29H | C3H | 60H | 28H | FEH | 31H | CAH |
| 2910H=2AH | 29H | FEH | 2AH | C2H | 98H | 1EH | 1AH | 59H | BEH | 23H | 11H | F3H | 01H | CDH | 56H |
| 2920H=0DH | DAH | 98H | 1EH | 22H | 59H | BEH | C3H | 7EH | 28H | 2AH | 85H | BEH | 2BH | 22H | 87H |
| 2930H=BEH | 21H | 16H | BFH | 22H | 85H | BEH | CDH | 27H | 1FH | CDH | 60H | 0EH | D8H | 2AH | 85H |
| 2940H=BEH | 5EH | 23H | 56H | 23H | EBH | 22H | 59H | BEH | EBH | 5EH | 23H | 56H | 23H | 22H | 85H |
| 2950H=BEH | EBH | 22H | 63H | BEH | CDH | 6FH | 29H | DAH | BBH | 1EH | C3H | 3AH | 29H | CDH | C9H |
| 2960H=19H | CDH | 25H | 1CH | D8H | FEH | 2AH | C2H | 9BH | 1EH | 7DH | 32H | 5DH | BEH | C9H | CDH |
| 2970H=01H | 27H | D2H | AAH | 29H | CDH | A6H | 27H | DBH | EBH | 01H | 06H | 00H | 09H | E5H | 2AH |
| 2980H=5FH | BEH | CDH | 56H | 0DH | EBH | D1H | CAH | B5H | 29H | 4DH | 44H | 03H | 03H | 03H | E5H |
| 2990H=CDH | 70H | 0DH | 2AH | 5FH | BEH | 23H | 5EH | 23H | 56H | E5H | 21H | 03H | 00H | 19H | EBH |
| 29A0H=E1H | 72H | 2BH | 73H | E1H | 3AH | 59H | BEH | 77H | 23H | 3AH | 63H | BEH | 77H | 23H | 3AH |
| 29B0H=64H | BEH | 77H | B7H | C9H | 01H | 06H | 00H | 09H | 4DH | 44H | 2AH | 5FH | BEH | CDH | 70H |
| 29C0H=0DH | 2AH | 5FH | BEH | 3AH | 5DH | BEH | 4FH | 3AH | 5AH | BEH | 06H | 06H | 17H | 05H | C2H |
| 29D0H=CDH | 29H | E6H | C0H | B1H | 77H | 23H | 36H | 03H | 23H | 36H | D0H | 23H | C3H | A5H | 29H |
| 29E0H=0EH | EFH | CDH | 77H | 1AH | 21H | 21H | 29H | 22H | 55H | BEH | 21H | 00H | 00H | 39H | 22H |
| 29F0H=53H | BEH | CDH | AAH | 2AH | 21H | F5H | 29H | 22H | 55H | BEH | 21H | 00H | 00H | 39H | 22H |
| 2A00H=53H | BEH | CDH | C4H | 19H | CDH | 34H | 1CH | DAH | 97H | 2AH | FEH | 2AH | C2H | 98H | 1EH |
| 2A10H=22H | 59H | BEH | CDH | 3CH | 1AH | CDH | 01H | 27H | DAH | AAH | 1EH | 2BH | 22H | 85H | BEH |
| 2A20H=23H | EBH | 2AH | 67H | BEH | 19H | 22H | 87H | BEH | 3AH | 5AH | BEH | 32H | 8BH | BEH | CDH |
| 2A30H=60H | 0EH | CAH | 9DH | 2AH | DAH | 9DH | 2AH | CDH | C9H | 19H | 3AH | 8BH | BEH | 57H | 2AH |
| 2A40H=85H | BEH | 5EH | 23H | 22H | 85H | BEH | EBH | 22H | 59H | BEH | 0EH | 00H | CDH | 45H | 1DH |
| 2A50H=21H | 01H | 00H | 22H | 61H | BEH | 2AH | 85H | BEH | 5EH | 23H | 56H | 23H | 22H | 85H | BEH |
| 2A60H=EBH | 22H | 63H | BEH | 0EH | DFH | BEH | 1AH | CDH | 31H | 1AH | CDH | 73H | 2AH | D8H |
| 2A70H=C3H | F5H | 29H | CDH | DAH | 27H | CDH | F0H | 1AH | C8H | E6H | 3FH | FEH | 14H | C8H | FEH |
| 2A80H=31H | 37H | C8H | FEH | 2AH | C2H | 98H | 1EH | 2AH | 61H | BEH | B7H | CDH | 4CH | 0EH | 22H |
| 2A90H=61H | BEH | D2H | 73H | 2AH | B7H | C9H | FEH | 31H | C8H | C3H | 2FH | 2AH | 2AH | 87H | BEH |
| 2AA0H=CDH | 66H | 27H | C0H | C3H | C0H | 2AH | C3H | 2FH | 2AH | CDH | 5EH | 29H | DAH | 98H | 1EH |
| 2AB0H=CDH | 3CH | 1AH | CDH | 63H | 27H | C2H | AAH | 1EH | CDH | C0H | 2AH | CDH | 31H | 1AH | C9H |
| 2AC0H=7EH | 0EH | 06H | 1FH | 0DH | C2H | C3H | 2AH | E6H | 03H | 32H | BBH | BEH | 23H | 5EH | 23H |
| 2AD0H=56H | 23H | 22H | 85H | BEH | 19H | 22H | 87H | BEH | C9H | 0EH | EFH | CDH | 77H | 1AH | 21H |
| 2AE0H=FFH | FFH | 22H | 59H | BEH | 21H | E5H | 2AH | 22H | 55H | BEH | 21H | 00H | 00H | 39H | 22H |
| 2AF0H=53H | BEH | CDH | 5EH | 29H | DAH | 77H | 2BH | CDH | B0H | 2AH | 21H | FBH | 2AH | 22H | 55H |
| 2B00H=BEH | 21H | 00H | 00H | 39H | 22H | 53H | BEH | CDH | C9H | 19H | CDH | 34H | 1CH | DAH | 42H |
| 2B10H=2BH | FEH | 31H | C2H | 98H | 1EH | 22H | 59H | BEH | CDH | 27H | 1FH | CDH | 01H | 27H | DAH |
| 2B20H=AAH | 1EH | 2BH | 22H | 85H | BEH | EBH | 2AH | 5FH | BEH | 23H | 4EH | 23H | 46H | 0BH | 0BH |
| 2B30H=0BH | 78H | B1H | CAH | 52H | 2BH | 70H | 2BH | 71H | EBH | 4DH | 44H | 23H | 23H | 23H | C3H |
| 2B40H=70H | 2BH | FEH | 23H | C2H | 98H | 1EH | CDH | 2EH | 1FH | FEH | 31H | C2H | 98H | 1EH | CDH |
| 2B50H=27H | 1FH | 2AH | 5FH | BEH | 4DH | 23H | 5EH | 23H | 56H | 23H | 19H | 3AH | 5AH | BEH |
| 2B60H=FEH | FFH | C2H | 70H | 2BH | 3AH | 5DH | BEH | 5FH | 7EH | E6H | 1FH | BBH | CAH | 57H | 2BH |
| 2B70H=11H | 11H | 5EH | CDH | 70H | 0DH | C9H | FEH | 23H | C2H | 98H | 1EH | CDH | 2EH | 1FH | FEH |
| 2B80H=31H | C2H | 98H | 1EH | CDH | 27H | 1FH | 0EH | 00H | 21H | 00H | 40H | 11H | 11H | 5EH | CDH |
| 2B90H=0EH | C9H | 21H | B1H | 71H | D5H | 06H | 00H | 7EH | FEH | FFH | CAH | C6H | 2BH | E6H |
| 2BA0H=0FH | 57H | 23H | 5EH | 2BH | 3AH | 6FH | BEH | FEH | 03H | CAH | CFH | 2BH | E3H | CDH | 56H |
| 2BB0H=0DH | E3H | CAH | D2H | 2BH | D2H | CCH | 2BH | 7EH | E6H | 40H | 0EH | 05H | CAH | C2H | 2BH |
| 2BC0H=0EH | 07H | 09H | C3H | 99H | 2BH | 23H | BEH | 2BH | C2H | 9FH | 2BH | D1H | 37H | C9H | EBH |
| 2BD0H=E3W | EBH | 3AH | 6FH | BEH | B7H | CAH | 8BH | 2BH | FEH | 02H | CAH | 11H | 2CH | 7EH | E6H |
| 2BE0H=80H | 32H | 58H | BEH | 7EH | CDH | AFH | 0DH | E6H | 03H | 57H | 7EH | E6H | 40H | F5H | 23H |
| 2BF0H=23H | 5EH | EBH | 22H | 79H | BEH | EBH | 23H | 5EH | 23H | 56H | EBH | 22H | 7DH | BEH | 2AH |
| 2C00H=79H | BEH | EBH | 23H | F1H | CAH | 0CH | 2CH | 56H | 23H | 5EH | 23H | EBH | 22H | 7BH | BEH |
| 2C10H=EBH | D1H | B7H | C9H | CDH | A8H | 2DH | D8H | 01H | 00H | 09H | 22H | 73H | BEH | 2AH |
| 2C20H=7FH | BEH | EBH | 3AH | 70H | BEH | FEH | 05H | CAH | 8DH | 2CH | AFH | 32H | 6FH | BEH | CDH |
| 2C30H=93H | 2BH | 22H | 71H | BEH | 06H | 00H | 3AH | 70H | BEH | 4FH | 09H | 4DH | 44H | 2AH | 73H |
| 2C40H=BEH | EBH | 2AH | 71H | BEH | CDH | 70H | 0DH | 3AH | 7AH | BEH | CDH | B4H | 0DH | E6H | 30H |
| 2C50H=4FH | 3AH | 70H | BEH | D6H | 05H | CAH | 5BH | 2CH | 3EH | 40H | B1H | 4FH | 3AH | 58H | BEH |
| 2C60H=B1H | 4FH | 2AH | 7FH | BEH | 7CH | B1H | EBH | 2AH | 71H | BEH | 77H | 23H | 73H | 23H | 3AH |
| 2C70H=79H | BEH | 77H | 23H | EBH | 2AH | 7DH | BEH | EBH | 73H | 23H | 72H | 23H | 3AH | 70H | BEH |
| 2C80H=FEH | 05H | C8H | EBH | 2AH | 7BH | BEH | EBH | 72H | 23H | 73H | 23H | C9H | 3EH | 02H | 32H |
| 2C90H=6FH | BEH | CDH | 93H | 2BH | DAH | 32H | 2CH | 22H | 71H | BEH | 7EH | E&H | 40H | C2H | CFH |
| 2CA0H=2CH | 7EH | CDH | AFH | 0DH | E6H | 03H | 57H | 23H | 23H | 5EH | 23H | 22H | E1H | BEH | 2AH |
| 2CB0H=79H | BEH | CDH | 56H | 0DH | C2H | DFH | 2CH | 2AH | 7DH | BEH | EBH | 2AH | E1H | BEH | 7EH |
| 2CC0H=B3H | 77H | 23H | 7EH | B2H | 77H | 2AH | 71H | BEH | 3AH | 58H | BEH | B6H | 77H | C9H | 0EH |

APPENDIX B-continued

MACHINE CODE FOR MICROPROCESSOR 400
ASSOCIATED WITH CONTROLLER 50
ALL VALUES IN HEXADECIMAL FORMAT
© General Electric Company, 1979

| Address | | | | | | | | | | | | | | | | |
|---|---|---|---|---|---|---|---|---|---|---|---|---|---|---|---|---|
| 2CD0H= | 07H | 06H | 00H | 09H | EBH | 2AH | 7FH | BEH | ebh | CDH | 96H | 2BH | C3H | 95H | 2CH | 2AH |
| 2CE0H= | 71H | BEH | 0EH | 05H | C3H | D1H | 2CH | 0EH | BFH | CDH | 77H | 1AH | 21H | ECH | 2CH | 22H |
| 2CF0H= | 55H | BEH | 21H | 00H | 00H | 39H | 22H | 53H | BEH | CDH | C9H | 19H | CDH | 9CH | 1CH | DAH |
| 2D00H= | 27H | 2DH | FEH | 31H | C2H | 98H | 1EH | E5H | CDH | 27H | 1FH | D1H | 3EH | 02H | 32H | 6FH |
| 2D10H= | BEH | CDH | 93H | 2BH | DAH | AAH | 1EH | E5H | AFH | 32H | 6FH | BEH | CDH | 96H | 2BH | C1H |
| 2D20H= | 11H | BBH | A2H | CDH | 70H | 00H | C9H | FEH | 23H | C2H | 98H | 1EH | CDH | 2EH | 1FH | FEH |
| 2D30H= | 31H | C2H | 98H | 1EH | CDH | 27H | 1FH | 0EH | FFH | 21H | B1H | 71H | 11H | BBH | A2H | CDH |
| 2D40H= | 53H | 0EH | C9H | CDH | C9H | 19H | 0EH | DFH | CDH | 83H | 1AH | 0EH | 00H | 2AH | 59H | BEH |
| 2D50H= | CDH | 45H | 1DH | 0EH | 06H | 06H | 02H | 21H | 11H | 00H | 22H | 89H | BEH | CDH | 09H | 1CH |
| 2D60H= | DAH | BEH | 2DH | F5H | 4DH | 7DH | B7H | CAH | A0H | 1EH | 21H | 01H | 00H | 0DH | CAH | 77H |
| 2D70H= | 2DH | CDH | 4CH | 0EH | C3H | 6DH | 2DH | EBH | 2AH | 63H | BEH | 7DH | B3H | 6FH | 7CH | B2H |
| 2D80H= | 67H | 22H | 63H | BEH | F1H | FEH | 31H | C8H | FEH | 14H | C8H | C3H | 53H | 2DH | FEH | 31H |
| 2D90H= | C8H | FEH | 14H | C8H | FEH | 2AH | C8H | FEH | 23H | C2H | 98H | 1EH | 0EH | 04H | CDH | 2EH |
| 2DA0H= | 1FH | 21H | FFH | FFH | 22H | 63H | BEH | C9H | 21H | B1H | 71H | 11H | AEH | A2H | 06H | 00H |
| 2DB0H= | 7EH | FEH | FFH | CAH | C7H | 2DH | 0EH | 05H | E6H | 40H | CAH | BFH | 2DH | 0EH | 07H | 09H |
| 2DC0H= | CDH | 56H | 0DH | D8H | C3H | B0H | 2DH | 23H | BEH | 2BH | C2H | B6H | 2DH | C9H | 0EH | BFH |
| 2DD0H= | CDH | 77H | 1AH | 21H | 16H | BFH | 22H | 85H | BEH | 21H | ACH | BFH | 22H | 87H | BEH | 21H |
| 2DE0H= | DFH | 2DH | 22H | 55H | BEH | 21H | 00H | 00H | 39H | 22H | 53H | BEH | CDH | C9H | 19H | CDH |
| 2DF0H= | 9CH | 1CH | DAH | 98H | 1EH | FEH | 2AH | C2H | 98H | 1EH | 22H | 7FH | BEH | 21H | FDH | 2DH |
| 2E00H= | 22H | 55H | BEH | 21H | 00H | 00H | 39H | 22H | 53H | BEH | CDH | C9H | 19H | CDH | ABH | 1CH |
| 2E10H= | 21H | 00H | 00H | 22H | 59H | BEH | 21H | 16H | 2EH | 22H | 55H | BEH | 21H | 00H | 00H | 39H |
| 2E20H= | 22H | 53H | BEH | CDH | C9H | 19H | CDH | 34H | 1CH | DAH | 71H | 2EH | FEH | 2AH | C2H | 98H |
| 2E30H= | 1EH | 22H | 59H | BEH | 21H | 00H | 00H | 22H | 63H | BEH | CDH | 43H | 2DH | F5H | 0EH | FFH |
| 2E40H= | CDH | 83H | 1AH | 2AH | 63H | BEH | 7DH | B4H | CAH | 82H | 2EH | F1H | 2AH | 59H | BEH | EBH |
| 2E50H= | 2AH | 85H | BEH | 73H | 23H | 72H | 23H | EBH | 2AH | 63H | BEH | EBH | 73H | 23H | 72H | 23H |
| 2E60H= | 22H | 85H | BEH | FEH | 31H | CAH | 8BH | 2EH | CDH | 60H | 0EH | DAH | 88H | 2EH | C3H | 16H |
| 2E70H= | 2EH | FEH | 31H | CAH | 8BH | 2EH | FEH | 2AH | C2H | 98H | 1EH | 2AH | 59H | BEH | 23H | C3H |
| 2E80H= | 31H | 2EH | F1H | FEH | 31H | CAH | 8BH | 2EH | C3H | 16H | 2EH | CDH | 27H | 1FH | 2AH | 85H |
| 2E90H= | BEH | 2BH | 22H | 87H | BEH | 21H | 16H | BFH | 22H | 85H | BEH | 3EH | 05H | 32H | 70H | BEH |
| 2EA0H= | CDH | 60H | 0EH | D8H | 2AH | 85H | BEH | 5EH | 23H | 56H | 23H | EBH | 22H | 79H | BEH | EBH |
| 2EB0H= | 5EH | 23H | 56H | 23H | 22H | 85H | BEH | EBH | 22H | 7DH | BEH | CDH | 14H | 2CH | DAH | BBH |
| 2EC0H= | 1EH | C3H | A0H | 2EH | 0EH | BEH | CDH | 77H | 1AH | 21H | B1H | 71H | 22H | E1H | BEH | 21H |
| 2ED0H= | CFH | 2EH | 22H | 55H | BEH | 21H | 00H | 00H | 39H | 22H | 53H | BEH | CDH | 31H | 1AH | CDH |
| 2EE0H= | C9H | 19H | CDH | 9CH | 1CH | DAH | 84H | 2FH | FEH | 2AH | C2H | 98H | 1EH | 22H | 7FH | BEH |
| 2EF0H= | CDH | 3CH | 1AH | EBH | 3EH | 01H | 32H | 6FH | BEH | CDH | 93H | 2BH | DAH | AAH | 1EH | 22H |
| 2F00H= | E1H | BEH | 21H | 02H | 2FH | 22H | 55H | BEH | 21H | 00H | 00H | 39H | 22H | 53H | BEH | CDH |
| 2F10H= | C4H | 19H | 0EH | CFH | CDH | 83H | 1AH | 2AH | 79H | BEH | 0EH | 00H | CDH | 45H | 1DH | CDH |
| 2F20H= | CEH | 1AH | 21H | 01H | 00H | 22H | 73H | BEH | 2AH | 7DH | BEH | EBH | 0EH | 06H | 7DH |
| 2F30H= | A3H | C2H | 39H | 2FH | 7CH | A2H | CAH | 51H | 2FH | C4H | 91H | 1AH | CDH | 31H | 1AH | CDH |
| 2F40H= | F0H | 1AH | E6H | 3FH | FEH | 31H | C8H | FEH | 14H | CAH | 5BH | 2FH | FEH | 2AH | C2H | 98H |
| 2F50H= | 1EH | 2AH | 73H | BEH | B7H | CDH | 4CH | 0EH | D2H | 25H | 2FH | 2AH | 7BH | BEH | EBH | 2AH |
| 2F60H= | 79H | BEH | 23H | 22H | 79H | BEH | CDH | 56H | 0DH | D2H | 0FH | 2FH | 2AH | 7FH | BEH | CDH |
| 2F70H= | 3CH | 1AH | EBH | 3EH | 01H | 32H | 6FH | BEH | 2AH | E1H | BEH | CDH | 96H | 2BH | DAH | CFH |
| 2F80H= | 2EH | C3H | FFH | 2EH | FEH | 31H | C8H | FEH | 2AH | C2H | 98H | 1EH | 2AH | E1H | BEH | 3EH |
| 2F90H= | 03H | 32H | 6FH | BEH | CDH | 96H | 2BH | D8H | 22H | E1H | BEH | EBH | 22H | 7FH | BEH | CDH |
| 2FA0H= | C9H | 19H | 0EH | 00H | 2AH | 7FH | BEH | CDH | 45H | 1DH | 0EH | 7FH | CDH | 83H | 1AH | CDH |
| 2FB0H= | F0H | 1AH | CAH | CFH | 2EH | E6H | 3FH | FEH | 31H | C8H | FEH | 2AH | C2H | 98H | 1EH | C3H |
| 2FD0H= | 22H | 87H | BEH | 21H | D3H | 2FH | 22H | 55H | BEH | 21H | 00H | 00H | 39H | 22H | 53H | BEH |
| 2FE0H= | CDH | 5DH | 1CH | DAH | 6BH | 30H | FEH | 2AH | C2H | 98H | 1EH | 21H | EBH | 2FH | 22H | 55H |
| 2FF0H= | BEH | 21H | 00H | 00H | 39H | 22H | 53H | BEH | CDH | C9H | 19H | CDH | 9CH | 1CH | DAH | 98H |
| 3000H= | 1EH | FEH | 2AH | CAH | 0BH | 30H | FEH | 31H | C2H | 98H | 1EH | F5H | E5H | 2AH | 59H | BEH |
| 3010H= | EBH | 2AH | 85H | BEH | 73H | 23H | 72H | 23H | 3AH | 5BH | BEH | 77H | 23H | D1H | 73H | 23H |
| 3020H= | 72H | 23H | 22H | 85H | BEH | CDH | 60H | 0EH | DAH | 73H | 30H | F1H | FEH | 2AH | CAH | D3H |
| 3030H= | 2FH | CDH | 27H | 1FH | 2AH | 85H | BEH | 2BH | 22H | 87H | BEH | 21H | 16H | BFH | 22H | 85H |
| 3040H= | BEH | CDH | 60H | 0EH | C8H | D8H | 2AH | 85H | BEH | 5EH | 23H | 56H | 23H | EBH | 22H | 59H |
| 3050H= | BEH | EBH | 7EH | 32H | 5BH | BEH | 23H | 5EH | 23H | 56H | 23H | 22H | 85H | BEH | EBH | 22H |
| 3060H= | 7FH | BEH | CDH | 65H | 31H | DAH | 4AH | 1EH | C3H | 41H | 30H | FEH | 31H | C2H | 98H | 1EH |
| 3070H= | C3H | 31H | 30H | F1H | C3H | 31H | 30H | 0EH | FEH | CDH | 77H | 1AH | 21H | BFH | A2H | 22H |
| 3080H= | 85H | BEH | 21H | 5EH | B2H | 22H | 87H | BEH | 21H | 88H | 30H | 22H | 55H | BEH | 21H | 00H |
| 3090H= | 00H | 39H | 22H | 53H | BEH | CDH | 5DH | 1CH | DAH | C6H | 30H | CDH | 9EH | 31H | DAH | AAH |
| 30A0H= | 1EH | 23H | 22H | 85H | BEH | CDH | C9H | 19H | 2AH | 7FH | BEH | 0EH | 00H | CDH | 45H |
| 30B0H= | 1DH | 0EH | 7FH | CDH | 83H | 1AH | CDH | F0H | 1AH | E6H | 3FH | FEH | 2AH | CAH | 88H | 30H |
| 30C0H= | FEH | 31H | C8H | C3H | 98H | 1EH | FEH | 31H | C8H | FEH | 2AH | C2H | 98H | 1EH | C0H | 60H |
| 30D0H= | 0EH | D8H | 2AH | 85H | BEH | 5EH | 23H | 7EH | B7H | C8H | E6H | 03H | 57H | 7EH | 1FH | 1FH |
| 30E0H= | E6H | 0FH | 32H | 5BH | BEH | EBH | 22H | 59H | BEH | 23H | 5EH | 23H | 56H | 23H |
| 30F0H= | 85H | BEH | EBH | 22H | 7FH | BEH | CDH | C9H | 19H | 0EH | 00H | 2AH | 59H | BEH | CDH | 45H |
| 3100H= | 1DH | 0EH | BFH | CDH | 83H | 1AH | 0EH | 07H | 3AH | 5BH | BEH | 6FH | 26H | 00H | CDH | 45H |
| 3110H= | 1DH | CDH | F0H | 1AH | C3H | A6H | 30H | 0EH | FEH | CDH | 77H | 1AH | 21H | 1CH | 31H | 22H |
| 3120H= | 55H | BEH | 21H | 00H | 00H | 39H | 22H | 53H | BEH | CDH | 5DH | 1CH | DAH | 4CH | 31H | FEH |
| 3130H= | 31H | C2H | 98H | 1EH | CDH | 9EH | 31H | DAH | AAH | 1EH | E5H | CDH | 27H | 1FH | E1H | 4DH |
| 3140H= | 44H | 23H | 23H | 23H | 23H | 11H | 62H | B2H | CDH | 70H | 0DH | C9H | FEH | 23H | C2H | 98H |
| 3150H= | 1EH | CDH | 2EH | 1FH | FEH | 31H | C2H | 98H | 1EH | 0EH | 00H | 21H | BFH | A2H | 11H | 62H |
| 3160H= | B2H | CDH | 53H | 0EH | C9H | 2AH | 7FH | BEH | E5H | CDH | 9EH | 31H | D2H | 83H | 31H | E5H |
| 3170H= | CDH | E1H | 31H | C2H | 9AH | 31H | EBH | E1H | E5H | 4DH | 44H | 03H | 03H | 03H | 03H | CDH |
| 3180H= | 70H | 0DH | E1H | 3AH | 5BH | BEH | 17H | 17H | E6H | 3CH | EBH | 2AH | 59H | BEH | B4H | EBH |
| 3190H= | 23H | 77H | D1H | C3H | BAH | 73H | 72H | B7H | C9H | E1H | D1H | 37H | C9H | 2AH | 59H |
| 31A0H= | BEH | 3AH | 5BH | BEH | 4FH | E5H | 21H | BFH | A2H | 5EH | 23H | 7EH | B7H | CAH | D0H | 31H |
| 31B0H= | E6H | 03H | 57H | E3H | CDH | 56H | 0DH | E3H | CAH | C4H | 31H | D2H | D0H | 31H | 23H | 23H |

APPENDIX B-continued

MACHINE CODE FOR MICROPROCESSOR 400
ASSOCIATED WITH CONTROLLER 50
ALL VALUES IN HEXADECIMAL FORMAT
© General Electric Company, 1979

| | | | | | | | | | | | | | | | |
|---|---|---|---|---|---|---|---|---|---|---|---|---|---|---|---|
| 31C0H=23H | C3H | A9H | 31H | 7EH | 1FH | 1FH | E6H | 0FH | B9H | DAH | BEH | 31H | C2H | D0H | 31H |
| 31D0H=E5H | 23H | 5EH | 23H | 56H | EBH | 22H | 7FH | BEH | E1H | 2BH | D1H | C9H | 2BH | D1H | 37H |
| 31E0H=C9H | 21H | 5AH | B2H | 0EH | 04H | AFH | B6H | C0H | 0DH | C8H | 23H | C3H | E7H | 31H | 21H |
| 31F0H=74H | B2H | 7EH | FEH | FFH | C2H | 05H | 32H | 2AH | 6AH | BEH | CDH | 6AH | 32H | DAH | 07H |
| 3200H=32H | C8H | C3H | 0CH | 32H | 37H | C9H | 73H | 23H | 72H | B7H | C9H | D5H | E5H | 11H | 73H |
| 3210H=B2H | 4DH | 44H | 03H | 03H | CDH | 70H | 0DH | E1H | D1H | C3H | 07H | 32H | 0EH | 7FH | CDH |
| 3220H=77H | 1AH | 21H | 22H | 32H | 22H | 55H | BEH | 21H | 00H | 00H | 39H | 22H | 53H | BEH | CDH |
| 3230H=C9H | 19H | CDH | 7CH | 0BH | DAH | 51H | 32H | FEH | 31H | C2H | 98H | 1EH | CDH | 6AH | 32H |
| 3240H=DAH | AAH | 1EH | C2H | AAH | 1EH | 4DH | 44H | 23H | 23H | 11H | 77H | B2H | CDH | 70H | 70H |
| 3250H=C9H | FEH | 23H | C2H | 98H | 1EH | CDH | 2EH | 1FH | FEH | 31H | C2H | 98H | 1EH | 0EH | FFH |
| 3260H=21H | 66H | B2H | 11H | 77H | B2H | CDH | 53H | 0EH | C9H | E5H | 21H | 66H | B2H | 7EH | FEH |
| 3270H=FFH | CAH | 88H | 32H | 5FH | 23H | 56H | 2BH | E3H | CDH | 56H | 0DH | E3H | CAH | BBH | 32H |
| 3280H=D2H | 8BH | 32H | 23H | 23H | C3H | 6EH | 32H | D1H | 37H | C9H | D1H | 37H | 3FH | C9H | 0EH |
| 3290H=7FH | CDH | 77H | LAH | CDH | C9H | 19H | 21H | 66H | B2H | 7EH | FEH | FFH | CAH | AAH | 1EH |
| 32A0H=5FH | 23H | 56H | 23H | 22H | 71H | BEH | EBH | CDH | F6H | 0BH | CDH | F0H | 1AH | E6H | 3FH |
| 32B0H=FEH | 31H | C8H | CDH | C9H | 19H | 2AH | 71H | BEH | 7EH | FEH | FFH | C8H | C3H | A0H | 32H |
| 32C0H=0EH | 7FH | CDH | 77H | 1AH | 21H | C5H | 32H | 22H | 55H | BEH | 21H | 00H | 00H | 39H | 22H |
| 32D0H=53H | BEH | CDH | C9H | 19H | CDH | 7CH | 0BH | DAH | 98H | 1EH | FEH | 31H | C2H | 98H | 1EH |
| 32E0H=22H | 6AH | BEH | CDH | EFH | 31H | DAH | BBH | 1EH | C9H | 2AH | 6DH | BEH | 7EH | FEH | FFH |
| 32F0H=C8H | 5FH | 23H | 56H | E5H | 2AH | 82H | B2H | CDH | 56H | 0DH | CAH | 08H | 33H | D2H | 27H |
| 3300H=33H | 3AH | 6CH | BEH | B7H | C2H | 27H | 33H | CDH | 2DH | 33H | E1H | 23H | 7EH | FEH | FFH |
| 3310H=CAH | 1BH | 33H | 22H | 6DH | BEH | AFH | 32H | 6CH | BEH | C9H | 21H | 66H | B2H | 22H | 6DH |
| 3320H=BEH | 3EH | 01H | 32H | 6CH | BEH | C9H | E1H | AFH | 32H | 6CH | BEH | C9H | 0EH | FFH | 21H |
| 3330H=20H | BBH | 11H | 41H | BEH | CDH | 53H | 0EH | 00H | 21H | 0EH | B6H | 11H | 57H | 1BH | BAH |
| 3340H=CDH | 53H | 0EH | C9H | 3AH | 81H | B2H | B7H | CAH | 5CH | 33H | 2AH | 82H | B2H | CDH | 6AH |
| 3350H=32H | DAH | 5CH | 33H | AFH | 32H | 6CH | BEH | 22H | 6DH | BEH | C9H | 21H | 66H | B2H | 22H |
| 3360H=6DH | BEH | 3EH | 01H | 32H | 6CH | BEH | C9H | 2AH | 59H | BEH | 29H | 11H | 6EH | B6H | 19H |
| 3370H=EBH | 2AH | 7DH | BEH | EBH | 7EH | B2H | 77H | 23H | 7EH | B2H | 77H | CDH | 58H | 34H | DAH |
| 3380H=97H | 33H | 3AH | 93H | BEH | B7H | F2H | 88H | 33H | F6H | 0AH | CDH | B4H | 0DH | E6H | F0H |
| 3390H=47H | 7EH | E6H | 0FH | B0H | 77H | C9H | 11H | 40H | BEH | EBH | CDH | 56H | 0DH | D0H | 2AH |
| 33A0H=7FH | BEH | EBH | 73H | 23H | 72H | C3H | 82H | 33H | 0EH | FDH | CDH | 77H | 1AH | 21H | 21H |
| 33B0H=BEH | 7EH | 2BH | FEH | FFH | CAH | AAH | 1EH | E5H | CDH | C4H | 19H | 0EH | 7FH | CDH | 83H |
| 33C0H=1AH | E1H | 5EH | 23H | 7EH | FEH | FFH | C8H | E6H | 0FH | 57H | E5H | EBH | 0EH | 00H | CDH |
| 33D0H=45H | 1DH | 0EH | 05H | 21H | 49H | 38H | CDH | D3H | 19H | E1H | 7EH | CDH | AFH | 0DH | E6H |
| 33E0H=0FH | 23H | E5H | FEH | 0AH | D2H | FAH | 33H | 6FH | 26H | 00H | 0EH | 06H | CDH | 45H | 1DH |
| 33F0H=CDH | F0H | 1AH | FEH | 31H | E1H | C3H | 88H | 33H | CAH | 03H | 34H | CDH | 47H | 1AH |
| 3400H=C3H | F0H | 33H | CDH | 10H | 1AH | C3H | F0H | 33H | 0EH | FDH | CDH | 77H | 1AH | CDH | 2EH |
| 3210H=1FH | FEH | 31H | C2H | 9BH | 1EH | CDH | 27H | 1FH | C3H | 2DH | 33H | CDH | 13H | 1FH | 21H |
| 3420H=84H | B2H | 22H | 85H | BEH | 21H | 6BH | B6H | 22H | 87H | BEH | CDH | 3FH | 12H | D5H | CDH |
| 3430H=C4H | 19H | C8H | 31H | 1AH | E1H | 0EH | 00H | CDH | 45H | 1DH | CDH | F0H | 1AH | 3AH | A4H |
| 3440H=BEH | B7H | C8H | CDH | C4H | 19H | 2AH | A5H | BEH | CDH | F6H | 0BH | 3AH | A4H | BEH | 0EH |
| 3450H=00H | CDH | 5EH | 1AH | CDH | F0H | 1AH | C9H | 2AH | 7FH | BEH | E5H | 21H | 20H | BBH | 5EH |
| 3460H=23H | 7EH | FEH | FFH | CAH | 76H | 34H | E6H | 0FH | 57H | E3H | CDH | 56H | 0DH | CAH | 7AH |
| 3470H=34H | E3H | 23H | C3H | 5FH | 34H | 2BH | 37H | D1H | C9H | E1H | 7EH | CDH | AFH | 0DH | E6H |
| 3480H=0FH | 32H | 69H | BEH | C9H | DEH | DFH | CDH | 77H | 1AH | CDH | C9H | 19H | 3AH | 58H | BAH |
| 3490H=B7H | CAH | AAH | 1EH | 0EH | 00H | CDH | 5EH | 1AH | 2AH | 59H | BAH | CDH | F6H | 0BH | CDH |
| 34A0H=F0H | 1AH | C9H | EBH | E5H | 0EH | 00H | CDH | 45H | 1DH | E1H | CDH | F0H | 1AH | FEH | 31H |
| 34B0H=37H | C8H | EBH | CDH | 34H | 12H | DAH | BCH | 34H | C3H | A3H | 34H | B7H | C9H | 0EH | EFH |
| 34C0H=CDH | 83H | 1AH | CDH | C9H | 19H | 3AH | 49H | BEH | 1FH | DCH | 35H | 35H | D8H | 3AH | 49H |
| 34D0H=BEH | 1FH | 1HF | DAH | 49H | 35H | 21H | 59H | 38H | 0EH | 00H | CDH | D3H | 19H | CDH | FDH |
| 34E0H=1AH | FEH | 31H | C8H | 21H | 00H | 00H | 22H | 59H | BEH | 21H | EAH | 34H | 22H | 55H | BEH |
| 34F0H=21H | 00H | 00H | 39H | 22H | 53H | BEH | CDH | C4H | 19H | CDH | 34H | 1CH | DAH | 6BH | 35H |
| 3500H=FEH | 31H | C8H | 22H | 59H | BEH | CDH | C9H | 19H | 2AH | 59H | BEH | 0EH | 00H | CDH | 45H |
| 3510H=1DH | 21H | 01H | 00H | 22H | 61H | BEH | 2AH | 59H | BEH | 29H | 11H | 84H | B2H | 19H | 5EH |
| 3520H=23H | 56H | EBH | 22H | 63H | BEH | 0EM | DFH | CDH | 83H | 1AH | CDH | 31H | 1AH | CDH | 73H |
| 3530H=2AH | D8H | C3H | EAH | 34H | 21H | 77H | 38H | 0EH | 00H | CDH | D3H | 19H | CDH | F0H | 1AH |
| 3540H=FEH | 31H | 37H | C8H | CDM | C9H | 19H | AFH | C9H | 21H | DEH | BAH | 3EH | 3FH | 32H | 89H |
| 3550H=BEH | CDH | 09H | 12H | DAH | D6H | 34H | D5H | 21H | 1BH | 38H | 0EH | 04H | CDH | D3H | 19H |
| 3560H=BEH | CDH | D1H | 34H | D8H | CDH | D1H | 19H | C3H | E4H | 34H | FEH | 31H | C8H | FEH | 2AH |
| 3570H=C2H | 98H | 1EH | 2AH | 59H | BEH | 23H | 11H | F4H | 01H | CDH | 56H | 0DH | DAH | ADH | 1EH |
| 3580H=C3H | 03H | 35H | CDH | 54H | 36H | CDH | C9H | 19H | 21H | 7CH | 38H | 0EH | 00H | CDH | D3H |
| 3590H=19H | CDH | F0H | 1AH | CDH | 54H | 36H | 21H | 97H | 35H | 22H | 55H | BEH | 21H | 00H | 00H |
| 35A0H=39H | 22H | 53H | BEH | CDH | C4H | 19H | CDH | 54H | 36H | CDH | 34H | 1CH | DAH | 98H | 1EH |
| 35B0H=FEH | 2AH | C2H | 98H | 1EH | 22H | 59H | BEH | E5H | CDH | C9H | 19H | CDH | 3CH | 1AH | E1H |
| 35C0H=0EH | 00H | CDH | 45H | 1DH | 3EH | 05H | 32H | 48H | BEH | 3EH | 03H | 32H | D5H | BEH | 21H |
| 35D0H=F1H | BEH | 36H | 69H | 23H | 36H | 00H | CDH | 2AH | 07H | DAH | 47H | 36H | 5EH | 23H | 56H |
| 35E0H=05H | 01H | 84H | B2H | 2AH | 59H | BEH | 29H | 09H | 5EH | 23H | 56H | E1H | 22H | 63H | BEH |
| 35F0H=CDH | 56H | 0DH | 21H | 34H | 38H | C2H | FCH | 35H | 21H | 59H | 38H | 0EH | 04H | CDH | D3H |
| 3600H=19H | CDH | 31H | 1AH | CDH | F0H | 1AH | E6H | 3FH | CDH | 54H | 36H | FEH | 14H | CAH | 97H |
| 3610H=35H | FEH | 1CH | CAH | 2BH | 36H | FEH | 2AH | C2H | 98H | 1EH | 2AH | 59H | BEH | 23H | 11H |
| 3620H=F3H | 01H | CDH | 56H | 0DH | DAH | 97H | 35H | C3H | B5H | 35H | CDH | C4H | 19H | 2AH | 59H |
| 3630H=BEH | 0EH | 00H | CDH | 45H | 1DH | 21H | 01H | 00H | 22H | 61H | BEH | DEH | DFH | CDH | 83H |
| 3640=1AH | CDH | 73H | 2AH | C3H | 97H | 35H | 3AH | D5H | BEH | 3DH | C2H | CCH | 35H | 21H | 1BH |
| 3650H=38H | C3H | FCH | 35H | F5H | DBM | 1EH | E6H | 02H | C2H | 61H | 19H | F1H | C9H | 0EH | EFM |
| 3660H=CDH | 77H | 1AH | 21H | 63H | 36H | 22H | 55H | BEH | 21H | 00H | 00H | 39H | 22H | 53H | BEH |
| 3670H=CDH | C9H | 19H | CDH | 25H | 1CH | DAH | 98H | 1EH | FEH | 31H | C2H | 98H | 1EH | 7DH | 32H |
| 3680H=5DH | BEH | CDH | B0H | 2AH | CDH | 27H | 1FH | 3EH | 05H | 32H | 48H | BEH | 3AH | 5DH | BEH |
| 3690H=32H | A1H | BEH | CDH | 3DH | 17H | C9H | 0EH | BEH | CDH | 77H | 1AH | 21H | 9CH | 36H | 22H |

APPENDIX B-continued

MACHINE CODE FOR MICROPROCESSOR 400
ASSOCIATED WITH CONTROLLER 50
ALL VALUES IN HEXADECIMAL FORMAT
© General Electric Company, 1979

| | | | | | | | | | | | | | | |
|---|---|---|---|---|---|---|---|---|---|---|---|---|---|---|
| 36A0H=55H | BEH | 21H | 00H | 00H | 39H | 22H | 53H | BEH | CDH | C9H | 19H | CDH | 9CH | 1CH | DAH |
| 36B0H=98H | 1EH | FEH | 2AH | C2H | 98H | 1EH | 22H | 7FH | BEH | 3EH | 01H | 32H | 6FH | BEH | EBH |
| 36C0H=CDH | 93H | 28H | DAH | AAH | 1EH | 21H | C6H | 36H | 22H | 55H | BEH | 21H | 00H | 00H | 39H |
| 36D0H=22H | 53H | BEH | CDH | C9H | 19H | 0EH | 00H | 2AH | 7FH | BEH | CDH | 45H | 1DH | 0EH | 05H |
| 36E0H=21H | 49H | 38H | CDH | D3H | 19H | 06H | 01H | 0EH | 07H | CDH | 1DH | 1BH | F5H | 7EH | FEH |
| 36F0H=FFH | CAH | 16H | 37H | F1H | D2H | 98H | 1EH | EBH | CDH | D1H | 0DH | 7DH | FEH | 20H | D2H |
| 3700H=A0H | 1EH | 32H | 93H | BEH | CDH | 27H | 1FH | 3EH | 05H | 32H | 48H | BEH | 3EH | 01H | 32H |
| 3710H=4FH | BEH | CDH | 9AH | 15H | C9H | F1H | FEH | 28H | CAH | 22H | 37H | FEH | 29H | C2H | 98H |
| 3720H=1EH | AFH | 32H | 65H | BEH | CDH | F9H | 27H | D2H | 98H | 1EH | 3AH | 65H | BEH | E6H | 01H |
| 3730H=F6H | B0H | C3H | 02H | 37H | 21H | 35H | 37H | 22H | 55H | BEH | 21H | 00H | 00H | 39H | 22H |
| 3740H=53H | BEH | CDH | C9H | 19H | CDH | 34H | 1CH | FEH | 2AH | C2H | 98H | 1EH | 22H | 59H | BEH |
| 3750H=21H | 50H | 37H | 22H | 55H | BEH | 21H | 00H | 00H | 39H | 22H | 53H | BEH | CDH | C9H | 19H |
| 3760H=2AH | 59H | BEH | 0EH | 00H | CDH | 45H | 1DH | 0EH | DFH | CDH | 83H | 1AH | 0EH | 06H | 06H |
| 3770H=02H | 21H | 11H | 00H | 22H | 89H | BEH | CDH | 09H | 1CH | DAH | 98H | 1EH | FEH | 28H | CAH |
| 3780H=8AH | 37H | FEH | 29H | CAH | F0H | 37H | C3H | 98H | 1EH | 3EH | FFH | 32H | 65H | BEH | 7DH |
| 3790H=B7H | CAH | A0H | 1EH | 32H | 71H | BEH | CDH | F9H | 27H | D2H | 98H | 1EH | CDH | 27H | 1FH |
| 37A0H=3AH | 71H | BEH | 32H | F2H | BEH | 0EH | F0H | 3AH | 65H | BEH | B7H | C4H | F4H | 37H | 79H |
| 37B0H=32H | F1H | BEH | 3EH | 05H | 32H | 48H | BEH | CDH | 22H | 07H | CDH | BEH | 05H | 21H | 01H |
| 37C0H=00H | B7H | 3AH | 71H | BEH | 5FH | 1DH | CAH | D0H | 37H | CDH | 4CH | 0EH | C3H | C6H | 37H |
| 37D0H=E5H | 2AH | 59H | BEH | 29H | 11H | 84H | B2H | 19H | 3AH | 65H | BEH | 5FH | C1H | 78H | A3H |
| 37E0H=57H | 79H | A3H | 5FH | 79H | 2FH | A6H | B3H | 77H | 23H | 78H | 2FH | A6H | B2H | 77H | C9H |
| 37F0H=AFH | CAH | 8CH | 37H | 0EH | E1H | C9H | 68H | FAH | FAH | 3AH | FAH | 7BH | 61H | ECH | 69H |
| 3800H=88H | 1AH | 19H | 61H | C8H | FAH | BFH | 7BH | 61H | E8H | 1CH | 7CH | 7CH | 61H | 88H | 7CH |
| 3810H=7CH | FFH | CAH | 61H | BAH | 3AH | 78H | FBH | BFH | BAH | 61H | E8H | 88H | 9FH | 7CH | 61H |
| 3820H=38H | 1CH | 29H | 19H | 61H | 78H | 88H | C8H | 68H | FBH | CAH | 61H | 78H | 88H | C8H | 68H |
| 3830H=FBH | 3AH | BAH | 61H | ECH | 7CH | 19H | 61H | 38H | 88H | 1AH | FBH | 78H | 88H | C8H | 68H |
| 3840H=61H | BAH | 3AH | FBH | 78H | 88H | C8H | 68H | 61H | 7CH | 7BH | 61H | FFH | 1AH | 88H | 19H |
| 3850H=61H | 6CH | 88H | ECH | 1AH | FBH | BFH | BAH | 61H | 09H | 3AH | 3AH | 1AH | 61H | E8H | 88H |
| 3860H=9FH | 7CH | 1CH | ECH | 68H | 61H | E8H | 88H | 9FH | 7CH | 7BH | 61H | 0CH | 9FH | 4AH | 0BH |
| 3870H=99H | 29H | 28H | BFH | 08H | 89H | 61H | 7CH | 9FH | BCH | 68H | 61H | 78H | 68H | 29H | 78H |
| 3880H=61H | 1AH | 68H | E8H | 9FH | 8CH | 68H | 61H | 78H | ECH | 88H | C8H | 61H | BAH | 3AH | FBH |
| 3890H=C8H | FAH | BFH | BAH | 78H | 61H | 00H | 00H | 00H | CDH | C4H | 19H | 21H | 8DH | 38H | C3H |
| 38A0H=C1H | 1EH | 00H | 00H | FFH | FFH | FFH | FFH | FFH | FFH | FFH | FFH | FFH | FFH | BEH | FFH |
| 38B0H=FFH | FFH | FFH | FFH | FFH | FFH | FFH | FFH | FFH | FFH | FFH | FFH | FFH | FFH | FFH | FFH |
| 38C0H=00H | 00H | 00H | 04H | 00H | 00H | 00H | 00H | 00H | 00H | 00H | 00H | 00H | 00H | 00H | 00H |
| 38D0H=00H | 00H | 00H | 00H | 00H | 00H | 00H | 00H | 00H | 00H | 00H | 00H | 00H | 00H | 00H | 00H |
| 38E0H=00H | 00H | 00H | 00H | 00H | 00H | 00H | 00H | 00H | 00H | 00H | 00H | 00H | 00H | 00H | 00H |
| 38F0H=00H | 00H | 00H | 00H | 00H | 00H | 00H | 00H | 00H | 00H | 00H | 00H | 00H | 00H | 00H | 00H |
| 3900H=C5H | 01H | 70H | 17H | 0BH | 78H | B1H | CAH | 15H | 39H | DBH | 4CH | E6H | 01H | C2H | 04H |
| 3910H=39H | C1H | C3H | 59H | 09H | C1H | C3H | 7CH | 9FH | 22H | 9FH | BEH | 2AH | 59H | BEH | C3H |
| 3920H=C4H | 17H | FFH | FFH | FFH | D5H | CDH | 44H | 24H | D1H | C9H | 01H | C8H | 00H | CDH | C9H |
| 3930H=05H | 06H | 54H | C3H | E8H | 06H | FFH | FFH | FFH | FFH | FFH | FFH | FFH | FFH | FFH | FFH |
| 3940H=00H | 00H | 00H | 00H | 00H | 00H | 00H | 00H | 00H | 00H | 00H | 00H | 00H | 00H | 00H | 00H |
| 3950H=00H | 00H | 00H | 00H | 00H | 00H | 00H | 00H | 00H | 00H | 00H | 00H | 00H | 00H | 00H | 00H |
| 3960H=00H | 00H | 00H | 00H | 00H | 00H | 00H | 00H | 00H | 00H | 00H | 00H | 00H | 00H | 00H | 00H |
| 3970H=00H | 00H | 00H | 00H | 00H | 00H | 00H | 00H | 00H | 00H | 00H | 00H | 00H | 00H | 00H | 00H |

3980 through 3FFF is presently unused and is reserved for possible future use.

What is claimed is:

1. Apparatus at plural remote locations permitting non-interfering randomly occurring digital data communication between plural locations via a common data communications link, said apparatus being situated at each of said plural locations and comprising:

data transmitting means for serially transmitting digital binary bit information conveying signals having first and second states onto said communications link as described, one of said first and second states being dominant when transmitted on said link even if simultaneous transmission of the other state on the same link is attempted from another location, said binary bit information conveying signals including unique duration or sequence patterns of said first and second states identifying respective ones of a plurality of output modes of said data transmitting means, said arbitatration means for monitoring the existence of and first and second states on the link during the time required for the transmission of said binary bit of information, for comparing the state value then being transmitted from its respective remote location with the state value then existing on said link, and for inhibiting further transmission of the data onto said link by its respective data transmission means if there is a difference between the value then being transmitted and the actual state then existing thus eventually leaving only one remote location transmitting on said link.

2. Apparatus as in claim 1 wherein:
said communication link comprises two electrical conductors, and said first and second states comprise high and low impedance states respectively between said conductors.

3. Apparatus as in claim 1 wherein:
said communication link is a bi-directional data communication channel.

4. Apparatus as in claim 1, 2 or 3 wherein said information conveying signals comprise width modulated pulses of electrical signals where the two binary values are represented by different pulse widths occurring as required to represent desired data values within successive bit cells or time periods.

5. Apparatus as in claim 4 wherein said bit cells or time periods have varying total time durations corresponding respectively to the binary value encoded therein.

6. In a programmable system for controlling plural distributed electrical loads including plural relays, each connected to control a respectively corresponding one of said plural distributed electrical loads; plural remotely located transceiver decoder circuits all connected in common to a data link for controlling a predetermined subset of said relays in response to received data signals and for transmitting data signals relating to such control onto said data link; and a programmable central controller connected to provide said received data signals to each of said transceiver decoders via said data link; the improvement comprising:

access means at each transceiver decoder site for monitoring the busy or free status of said data line and for inhibiting initial transmitting access thereto from the respectively associated transceiver decoder unless a free status exists;

data transmitting means within each transceiver decoder for serially transmitting digital binary bit information conveying signals having first and second states onto said data link as desired only if permitted by said access means, one of said first and second states being dominant when transmitted on said link even if simultaneous transmission of the other state on the link is attempted by another transceiver decoder; and arbitration means at each transceiver decoder site for monitoring the existence of said first and second states on the link during the time required for the transmission of each binary bit of information, for comparing the state value then being transmitted from its respective transceiver decoder with the state value then existing on said link, and for inhibiting further transmission of data onto said link by its respective said data tansmission means if there is a difference thus eventually leaving only one transceiver decoder in communication on said link and doing so without interferring with the communication from said one transceiver decoder.

7. An improvement as in claim 6 wherein:

said data link comprises two electrical conductors, and said first and second states comprise high and low impedance states respectively between said conductors.

8. An inprovement as in claim 6 wherein said data link is a bi-directional data communication channel.

9. An improvement as in claim 6 wherein central processor controls a relays in at least one pre-programmed time-dependent sequence.

10. An improvement as in claim 6, 7, 8 9 wherein said information conveyng signals comprise width modulated pulses of electrical signals where the two binary values are represented by different pulse widths occurring as required to represent desired data values within successive bit cells or time periods.

11. An improvement as in claim 10 wherein said bit cells or time periods have varying total time durations corresponding respectively to the binary value encoded therein.

12. Apparatus at plural remote locations permit non-interferring randomly occurring digital data communication between plural remote locations via a common data communication link, said apparatus being situated at each of said plural remote locations and comprising:

access means for monitoring the busy or free status of said communication link for inhibiting initial access thereto from its respective remote location unless a free status exists, data transmitting means for serially transmitting digital binary bit information conveying signals having first and second states onto said communications link as desired only if permitted by said access means, one of said first and second states being dominant when transmitted on said link even if simultaneous transmission of the other state on the same link is attempted from another remote location, arbitration means for monitoring the existence of said first and second states on the link during the time required for the transmission of each binary bit of information, for comparing the state value then being transmitted from its respective remote location with the state value respective remote location with the state value then existing on said link, and for inhibiting further transmission of data onto said link by its respective said data transmission means if there is a difference thus eventually leaving only one remote location in communication on said link and doing so without interferring with the communication from said one remote location, and wherein said information conveying signals comprise width modulated pulses of electrical signals where the two binary values are represented by different pulse widths in said first state as required to represent desired data values within successive bit cells or time periods, each such width modulated pulse being separated from the next such pulse by a period of said second state, said period of said second state providing said apparatus at each of said plural locations time to process the preceding information bit.

13. Apparatus as in claim 12 wherein said period of said second state is of a fixed duration thereby making the total time required to tansmit a binary bit of information vary as a function of the information value being transmitted.

14. Apparatus as in claim 13 wherein said communication link comprises two electrical conductors, and said first and second states comprise high and low impedance states respectively between said conductors.

15. Apparatus at plural remote locations permitting non-interfering randomly occuring bi-directional digital data communication via a common communication channel between a master apparatus and a plurality of master/slave apparatuses, said apparatus comprising:

master apparatus operating in a master mode wherein it can access the common communication channel whereever free and without regard to any predetermined time schedule, said apparatus being adapted to transmit master and slave mode commands to a master/slave apparatus;

means for receiving and decoding a data signal on said communication channel, said digital data signal including a command for a master/slave apparatus to operate either in said master mode or in a slave mode; and means for inhibiting transmitting access to said communication channel for a predetermined period of time in response to a slave mode command from said master apparatus.

16. Apparatus according to claim 15 wherein said communication channel is bi-directional.

17. Apparatus according to either of claims 15 or 16 wherein said master and slave mode commands are width modulated pulses.

18. Apparatus according to claim 1 further including access means for monitoring the busy or free status of said communication link for inhibiiting access thereto from a remote location unless a free status exists.

* * * * *